(12) United States Patent
Togashi et al.

(10) Patent No.: US 7,428,135 B2
(45) Date of Patent: Sep. 23, 2008

(54) MULTILAYER CAPACITOR

(75) Inventors: Masaaki Togashi, Tokyo (JP); Takashi Aoki, Tokyo (JP); Takeru Yoshida, Tokyo (JP); Chris T Burket, Huntington Beach, CA (US)

(73) Assignee: TDK Corporation, Tokyo (JP)

( * ) Notice: Subject to any disclaimer, the term of this patent is extended or adjusted under 35 U.S.C. 154(b) by 310 days.

(21) Appl. No.: 11/474,306

(22) Filed: Jun. 26, 2006

(65) Prior Publication Data

US 2007/0297153 A1 Dec. 27, 2007

(51) Int. Cl.
*H01G 4/005* (2006.01)
(52) U.S. Cl. .................................................. 361/303
(58) Field of Classification Search ................ 361/303, 361/305, 304, 306.1, 306.3, 310–315
See application file for complete search history.

(56) References Cited

U.S. PATENT DOCUMENTS

| | | | | |
|---|---|---|---|---|
| 5,742,471 A | * | 4/1998 | Barbee et al. | ............... 361/312 |
| 5,880,925 A | | 3/1999 | DuPre et al. | |
| 6,038,121 A | * | 3/2000 | Naito et al. | .................. 361/303 |
| 6,243,253 B1 | | 6/2001 | DuPre et al. | |
| 6,753,218 B2 | * | 6/2004 | Devoe et al. | ................. 438/240 |
| 6,940,710 B1 | * | 9/2005 | Lee et al. | .................. 361/321.2 |

FOREIGN PATENT DOCUMENTS

| | | |
|---|---|---|
| JP | A 2004-047983 | 2/2004 |
| JP | A-2007-043093 | 2/2007 |

* cited by examiner

*Primary Examiner*—Phuong K Dinh
(74) *Attorney, Agent, or Firm*—Oliff & Berridge, PLC

(57) ABSTRACT

A multilayer capacitor comprises a multilayer body in which dielectric layers and first and second inner electrodes are alternately laminated, and first and second terminal conductors and first and second outer connecting conductors. At least one each of first and second terminal conductors and the first outer connecting conductor are formed on a first side face of the multilayer body. At least one each of the first and second terminal conductors and the second outer connecting conductor are formed on a second side face of the multilayer body opposing the first side face. Each inner electrode is electrically connected to the corresponding outer connecting conductors. First and second inner connecting conductors electrically connected to the corresponding terminal and outer connecting conductors are laminated in the multilayer body. An equivalent series resistance is set to a desirable value by adjusting the number or positions of the inner connecting conductors.

6 Claims, 64 Drawing Sheets

MULTILAYER CAPACITOR

BACKGROUND OF THE INVENTION

1. Field of the Invention

The present invention relates to a multilayer capacitor.

2. Related Background Art

Known as this kind of multilayer capacitor is one comprising a multilayer body in which a plurality of dielectric layers and a plurality of inner electrodes are alternately laminated, and a plurality of terminal conductors formed on the multilayer body.

Power supplies for central processing units (CPUs) mounted in digital electronic devices have been increasing their load current and load transients while lowering their voltage. Therefore, it has become very difficult to suppress the fluctuation in power supply voltage under a tolerable level in response to a drastic change in load current, whereby a multilayer capacitor known as decoupling capacitor has come into use so as to be connected to a power supply. At the time when the load current fluctuates transiently, the multilayer capacitor supplies a current to the CPU, thereby suppressing the fluctuation of the power supply voltage.

In recent years, as the CPUs have further been raising their operating frequencies, the load current and load transients have been becoming faster and greater, whereby, the multilayer capacitor used in the decoupling capacitor is demanded to increase its capacity and equivalent series resistance (ESR) and lower its equivalent series inductance (ESL) to help maintain a constant impedance loadline over a broad frequency spectrum. Therefore, a multilayer capacitor whose terminal conductor has a multilayer structure including an inner resistance layer, so as to increase the equivalent series resistance has been under consideration. Traditional means to lower the ESL of a capacitor have also resulted in the lowering of ESR. The CPU system levels of needed impedance (as it relates to ESR) have been met by current products to the point that they need to be raised, while continuing to drive ESL lower.

SUMMARY OF THE INVENTION

However, the following problem exists when adjusting the multilayer capacitor equipped with a terminal conductor having a multilayer structure including an inner resistance layer to a desirable value. Namely, for adjusting the equivalent series resistance to a desirable value in a multilayer capacitor equipped with a terminal conductor having a multilayer structure including an inner resistance layer, the thickness and material composition of the inner resistance layer included in the terminal conductor must be regulated while remaining independent of the capacitor's capacitance and ESL, which makes it very difficult to control the equivalent series resistance.

For overcoming the above-mentioned problem, it is an object of the present invention to provide a multilayer capacitor which can regulate the equivalent series resistance easily with a high precision.

In a typical multilayer capacitor, all the inner electrodes are connected to their corresponding terminal conductors through lead conductors. Consequently, the lead conductors exist by the number of inner electrodes, thereby lowering the equivalent series resistance. As the number of layers of the dielectric layers and inner electrodes is made greater in order to increase the capacity of the multilayer capacitor, the number of lead conductors becomes greater. Since resistance components of lead conductors are connected to the terminal conductors in parallel, the equivalent series resistance of the multilayer capacitor further decreases as the number of lead conductors increases. Thus, the demand for increasing the capacity of the multilayer capacitor and the demand for increasing the equivalent series resistance contradict each other.

Therefore, the inventors diligently conducted studies about multilayer capacitors which can satisfy both of the demands for increasing the capacity and equivalent series resistance. As a result, the inventors have found a new fact that, even when the number of laminated inner electrodes is the same, the equivalent series resistance can be adjusted to a desirable value if the inner electrodes are connected to outer connecting conductors formed on the surface of the multilayer body and inner connecting conductors laminated within the multilayer body while making it possible to change the number of inner connecting conductors connected to the terminal conductors. The inventors have also found a new fact that the equivalent series resistance can be adjusted to a desirable value if the inner electrodes are connected to outer connecting conductors formed on the surface of the multilayer body and inner connecting conductors laminated within the multilayer body while making it possible to change positions of inner connecting conductors in the laminating direction of the multilayer body. When the number of inner connecting conductors connected to the terminal conductors is made smaller than that of inner electrodes in particular, the adjustment can be made such as to increase the equivalent series resistance.

In view of such results of studies, in one aspect, the present invention provides a multilayer capacitor comprising a multilayer body in which a plurality of dielectric layers and a plurality of inner electrodes are alternately laminated, and a plurality of outer conductors formed on side faces of the multilayer body; wherein the plurality of inner electrodes include a plurality of first inner electrodes and a plurality of second inner electrodes alternately arranged; wherein the plurality of outer conductors include a plurality of first terminal conductors, a plurality of second terminal conductors, a first outer connecting conductor, and a second outer connecting conductor; wherein with respect to two selected first terminal conductors from among the plurality of first terminal conductors, one is formed on a first side face of the multilayer body, whereas the other is formed on a second side face of the multilayer body opposing the first side face; wherein with respect to two selected second terminal conductors from among the plurality of second terminal conductors, one is formed on the first side face of the multilayer body, whereas the other is formed on the second side face of the multilayer body; wherein the first outer connecting conductor is formed on the first side face of the multilayer body; wherein the second outer connecting conductor is formed on the second side face of the multilayer body; wherein each of the first inner electrodes is electrically connected to the first outer connecting conductor through a lead conductor; wherein each of the second inner electrodes is electrically connected to the second outer connecting conductor through a lead conductor; wherein at least one first inner connecting conductor and at least one second inner connecting conductor are laminated in the multilayer body; wherein the first inner connecting conductor is electrically connected to the plurality of first terminal conductors and the first outer connecting conductor, whereas the second inner connecting conductor is electrically insulated from the first inner connecting conductor but is electrically connected to the plurality of second terminal conductors and the second outer connecting conductor; wherein the first and second inner connecting conductors are laminated in the multilayer body such that the multilayer body includes at least one set of the first and second inner electrodes neighboring each other with the dielectric layer in between in a laminating direction; and wherein an equivalent series resistance is set to a desirable value by adjusting the number of first inner connecting conductors and the number of second inner connecting conductors respectively.

By adjusting the number of first inner connecting conductors and the number of second inner connecting conductors, the multilayer capacitor in accordance with this aspect of the present invention sets the equivalent series resistance to a desirable value, and thus can control the equivalent series resistance easily with a high precision.

In another aspect, the present invention provides a multilayer capacitor comprising a multilayer body in which a plurality of dielectric layers and a plurality of inner electrodes are alternately laminated, and a plurality of outer conductors formed on side faces of the multilayer body; wherein the plurality of inner electrodes include a plurality of first inner electrodes and a plurality of second inner electrodes alternately arranged; wherein the plurality of outer conductors include a plurality of first terminal conductors, a plurality of second terminal conductors, a first outer connecting conductor, and a second outer connecting conductor; wherein with respect to two selected first terminal conductors from among the plurality of first terminal conductors, one is formed on a first side face of the multilayer body, whereas the other is formed on a second side face of the multilayer body opposing the first side face; wherein with respect to two selected second terminal conductors from among the plurality of second terminal conductors, one is formed on the first side face of the multilayer body, whereas the other is formed on the second side face of the multilayer body; wherein the first outer connecting conductor is formed on the first side face of the multilayer body; wherein the second outer connecting conductor is formed on the second side face of the multilayer body; wherein each of the first inner electrodes is electrically connected to the first outer connecting conductor through a lead conductor; wherein each of the second inner electrodes is electrically connected to the second outer connecting conductor through a lead conductor; wherein at least one first inner connecting conductor and at least one second inner connecting conductor are laminated in the multilayer body; wherein the first inner connecting conductor is electrically connected to the plurality of first terminal conductors and the first outer connecting conductor, whereas the second inner connecting conductor is electrically insulated from the first inner connecting conductor but is electrically connected to the plurality of second terminal conductors and the second outer connecting conductor; wherein the first and second inner connecting conductors are laminated in the multilayer body such that the multilayer body includes at least one set of the first and second inner electrodes neighboring each other with the dielectric layer in between in a laminating direction; and wherein an equivalent series resistance is set to a desirable value by adjusting a position of the first inner connecting conductor in the multilayer body in the laminating direction and a position of the second inner connecting conductor in the multilayer body in the laminating direction.

By adjusting the position and shape of the first inner connecting conductor in the multilayer body in the laminating direction and the position of the second inner connecting conductor in the multilayer body in the laminating direction, the multilayer capacitor in accordance with this aspect of the present invention sets the equivalent series resistance to a desirable value, and thus can control the equivalent series resistance easily with a high precision.

For example, the first outer connecting conductor is formed so as to be positioned between the first and second terminal conductors on the first side face; and that wherein the second outer connecting conductor is formed so as to be positioned between the first and second terminal conductors on the second side face.

Preferably, the first terminal conductor formed on the first side face and the second terminal conductor formed on the second side face oppose each other along a direction in which the first and second side faces oppose each other; and wherein the first terminal conductor formed on the second side face and the second terminal conductor formed on the first side face oppose each other along the direction in which the first and second side faces oppose each other.

On the other hand, as a method of adjusting an equivalent series resistance of a multilayer capacitor, there is a method of adjusting an equivalent series resistance of a multilayer capacitor comprising a multilayer body in which a plurality of dielectric layers and a plurality of inner electrodes are alternately laminated, and a plurality of outer conductors formed on side faces of the multilayer body; wherein the plurality of inner electrodes include a plurality of first inner electrodes and a plurality of second inner electrodes alternately arranged; wherein the plurality of outer conductors include a plurality of first terminal conductors, a plurality of second terminal conductors, a first outer connecting conductor, and a second outer connecting conductor; wherein with respect to two selected first terminal conductors from among the plurality of first terminal conductors, one is formed on a first side face of the multilayer body, whereas the other is formed on a second side face of the multilayer body opposing the first side face; wherein with respect to two selected second terminal conductors from among the plurality of second terminal conductors, one is formed on the first side face of the multilayer body, whereas the other is formed on the second side face of the multilayer body; wherein the first outer connecting conductor is formed on the first side face of the multilayer body; wherein the second outer connecting conductor is formed on the second side face of the multilayer body; wherein each of the first inner electrodes is electrically connected to the first outer connecting conductor through a lead conductor; wherein each of the second inner electrodes is electrically connected to the second outer connecting conductor through a lead conductor; wherein at least one first inner connecting conductor and at least one second inner connecting conductor are laminated in the multilayer body; wherein the first inner connecting conductor is electrically connected to the plurality of first terminal conductors and the first outer connecting conductor, whereas the second inner connecting conductor is electrically insulated from the first inner connecting conductor but is electrically connected to the plurality of second terminal conductors and the second outer connecting conductor; wherein the first and second inner connecting conductors are laminated in the multilayer body such that the multilayer body includes at least one set of the first and second inner electrodes neighboring each other with the dielectric layer in between in a laminating direction; and setting the equivalent series resistance to a desirable value by adjusting the number of first inner connecting conductors and the number of second inner connecting conductors respectively.

As a method of adjusting an equivalent series resistance of a multilayer capacitor, there is a method of adjusting an equivalent series resistance of a multilayer capacitor comprising a multilayer body in which a plurality of dielectric layers and a plurality of inner electrodes are alternately laminated, and a plurality of outer conductors formed on side faces of the multilayer body; wherein the plurality of inner electrodes include a plurality of first inner electrodes and a plurality of second inner electrodes alternately arranged; wherein the plurality of outer conductors include a plurality of first terminal conductors, a plurality of second terminal conductors, a first outer connecting conductor, and a second outer connecting conductor; wherein with respect to two selected first terminal conductors from among the plurality of first terminal conductors, one is formed on a first side face of the multilayer body, whereas the other is formed on a second side face of the multilayer body opposing the first side face; wherein with respect to two selected second terminal conductors from among the plurality of second terminal conductors, one is formed on the first side face of the multilayer body, whereas the other is formed on the second side face of the multilayer body; wherein the first outer connecting conductor is formed on the first side face of the multilayer body; wherein the second outer connecting conductor is formed on the second side face of the multilayer body; wherein each of the first inner electrodes is electrically connected to the first outer connecting conductor through a lead conductor; wherein each of the second inner electrodes is electrically connected to the second outer connecting conductor through a lead conductor; wherein at least one first inner connecting conductor and at least one second inner connecting conductor are laminated in the multilayer body; wherein the first inner connecting conductor is electrically connected to the plurality of first terminal conductors and the first outer connecting conductor, whereas the second inner connecting conductor is electrically insulated from the first inner connecting conductor but is electrically connected to the plurality of second terminal conductors and the second outer connecting conductor; wherein the first and second inner connecting conductors are laminated in the multilayer body such that the multilayer body includes at least one set of the first and second inner electrodes neighboring each other with the dielectric layer in between in a laminating direction; and setting the equivalent series resistance to a desirable value by adjusting a position of the first inner connecting conductor in the multilayer body in the laminating direction and a position of the second inner connecting conductor in the multilayer body in the laminating direction.

The present invention can provide a multilayer capacitor which can regulate the equivalent series resistance easily with a high precision.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments of the present invention will be explained in detail with reference to the accompanying drawings. In the explanation, constituents identical to each other or those having functions identical to each other will be referred to with numerals identical to each other without repeating their overlapping descriptions. Words "left" and "right" used in the explanation conform to the lateral direction in each drawing.

First Embodiment

Figure 1:
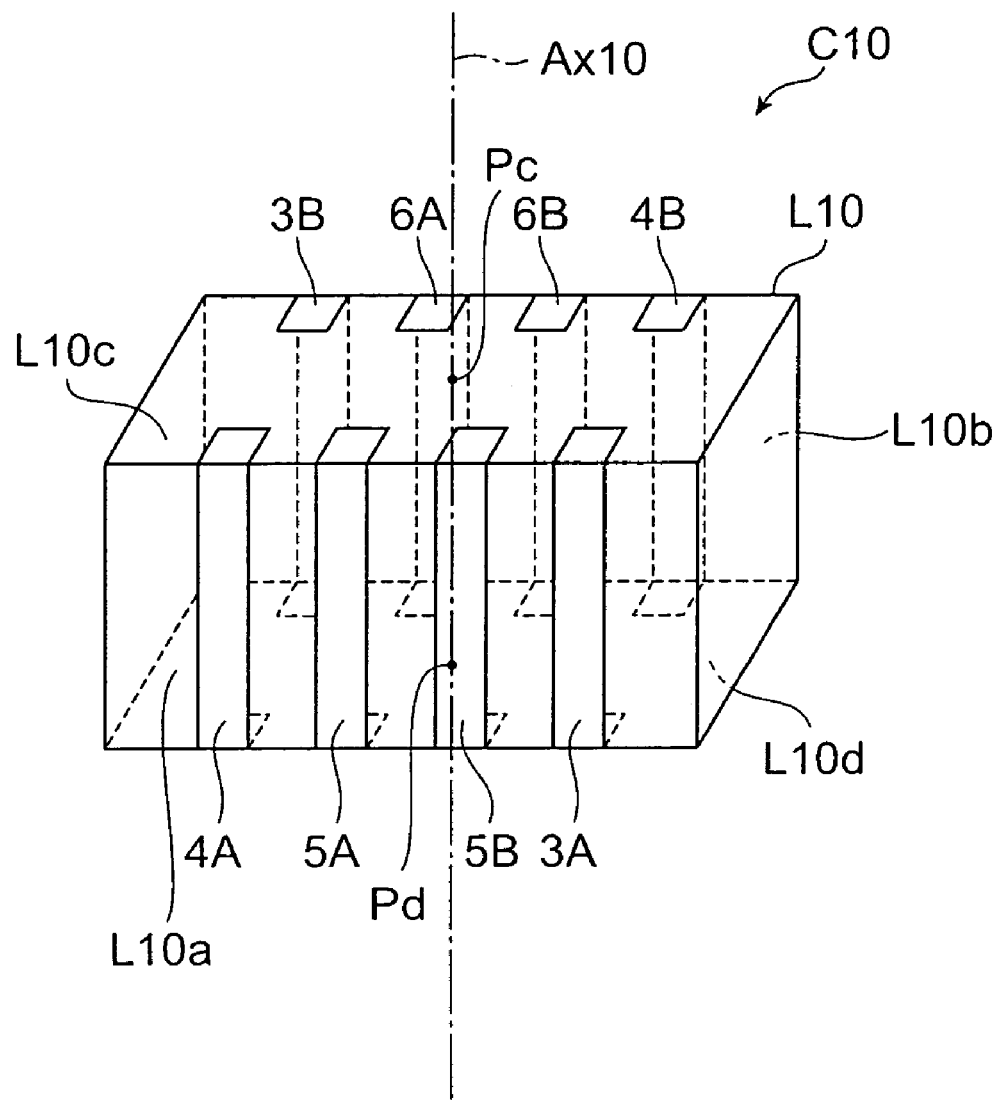
FIG. 1 is a perspective view of the multilayer capacitor in accordance with a first embodiment.
Figure 2:
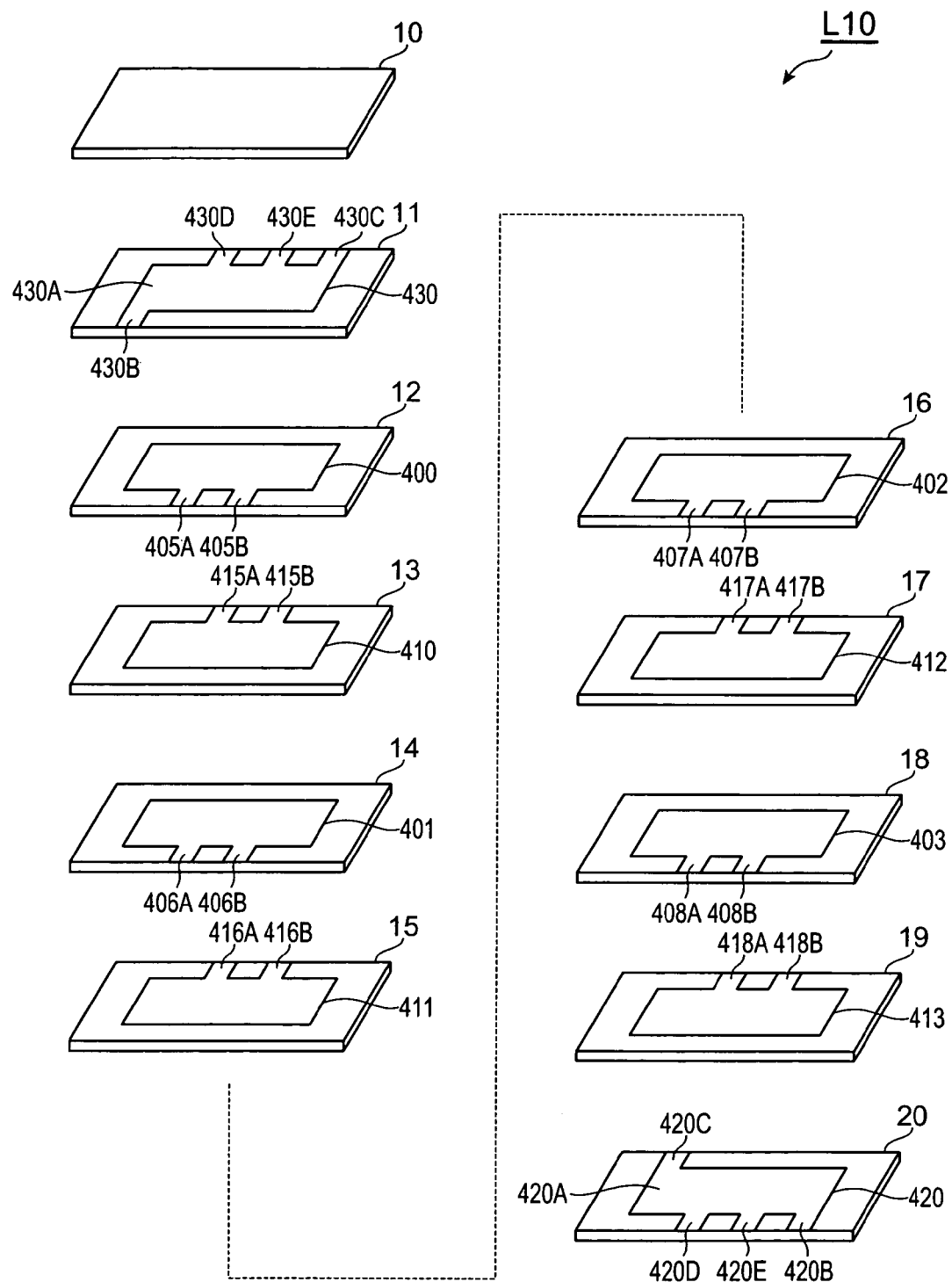
FIG. 2 is an exploded perspective view of the multilayer body included in the multilayer capacitor in accordance with the first embodiment.

With reference to FIGS. 1 and 2, the structure of the multilayer capacitor C10 in accordance with a first embodiment will be explained. FIG. 1 is a perspective view of the multilayer capacitor in accordance with the first embodiment. FIG. 2 is an exploded perspective view of the multilayer body included in the multilayer capacitor in accordance with the first embodiment.

As shown in FIG. 1, the multilayer capacitor C10 in accordance with the first embodiment comprises a multilayer body L10 having a substantially rectangular parallelepiped form, and a plurality of outer conductors formed on side faces of the multilayer body L10. The plurality of outer conductors include a plurality of (2 in this embodiment) first terminal conductors 3A, 3B; a plurality of (2 in this embodiment) second terminal conductors 4A, 4B; a plurality of (2 in this embodiment) first outer connecting conductors 5A, 5B; and a plurality of (2 in this embodiment) second outer connecting conductors 6A, 6B. The plurality of outer conductors are formed so as to be electrically insulated from each other on surfaces of the multilayer body L11.

The outer conductors 3A, 3B, 4A, 4B, 5A, 5B, 6A, 6B are formed, for example, by applying a conductive paste containing conductive metal powder and glass frit onto outer surfaces of the multilayer body and burning it. A plated layer may be formed on the burned outer conductors if necessary.

Thus, the first terminal conductors 3A, 3B and first outer connecting conductors 5A, 5B are plural by the same number (2 each in this embodiment). The second terminal conductors 4A, 4B and second outer connecting conductors 6A, 6B are plural by the same number (2 each in this embodiment).

Each of the first terminal conductor 3A, second terminal conductor 4A, and first outer connecting conductors 5A, 5B is positioned on a first side face L10a among side faces parallel to the laminating direction of the multilayer body L10 which will be explained later, i.e., on the first side face L10a that is a side face extending longitudinally of side faces orthogonal to the laminating direction of the multilayer body L10. The first terminal conductor 3A, second terminal conductor 4A, and first outer connecting conductors 5A, 5B are formed in the order of the second terminal conductor 4A, first outer connecting conductor 5A, first outer connecting conductor 5B, and first terminal conductor 3A from the left side to right side in FIG. 1. Namely, the first outer connecting conductors 5A, 5B are formed so as to be positioned between the first terminal conductor 3A and second terminal conductor 4A on the first side face L10a.

Each of the first terminal conductor 3B, second terminal conductor 4B, and second outer connecting conductors 6A, 6B is positioned on a second side face L10b among side faces parallel to the laminating direction of the multilayer body L10 which will be explained later, i.e., on the second side face L10b that is a side face extending longitudinally of side faces orthogonal to the laminating direction of the multilayer body L10 and opposing the first side face L10a. The first terminal conductor 3B, second terminal conductor 4B, and second outer connecting conductors 6A, 6B are formed in the order of the first terminal conductor 3B, second outer connecting conductor 6A, second outer connecting conductor 6B, and second terminal conductor 4B. Namely, the second outer connecting conductors 6A, 6B are formed so as to be positioned between the first terminal conductor 3B and second terminal conductor 4B on the second side face L10b.

The first terminal conductor 3B is located at a position symmetrical to the first terminal conductor 3A about a center axis Ax10 passing respective center positions Pc, Pd of two side faces L10c, L10d orthogonal to the laminating direction of the multilayer body L10 among center axes of the multilayer body L10. The second terminal conductor 4B is located at a position symmetrical to the second terminal conductor 4A about the center axis Ax10 of the multilayer body L10. The second outer connecting conductor 6B is located at a position symmetrical to the first outer connecting conductor 5A about the center axis Ax10 of the multilayer body L10. The second outer connecting conductor 6A is located at a position symmetrical to the first outer connecting conductor 5B about the center axis Ax10 of the multilayer body L10.

The first terminal conductor 3A formed on the first side face L10a and the second terminal conductor 4B formed on the second side face L10b oppose each other along a direction in which the first side face L10a and the second side face L10b oppose each other. The first terminal conductor 3B formed on the second side face L10b and the second terminal conductor 4A formed on the first side face L10a oppose each other along the direction in which the first side face L10a and the second side face L10b oppose each other.

As shown in FIG. 2, the multilayer body L10 is constructed by alternately laminating a plurality of (11 in this embodiment) dielectric layers 10 to 20 with a plurality of (4 each in this embodiment) first and second inner electrodes 400 to 403, 410 to 413. Each of the dielectric layers 10 to 20 is constructed by a sintered body of a ceramic green sheet containing a dielectric ceramic, for example. Each of the inner electrodes 400 to 403, 410 to 413 is constructed by a sintered body of a conductive paste, for example. In the actual multilayer capacitor C10, the dielectric layers 10 to 20 are integrated to such an extent that their boundaries are indiscernible.

Further, one first inner connecting conductor 420 and one second inner connecting conductor 430 are laminated in the multilayer body L10. In the multilayer body L10, a plurality of first inner electrodes 400 to 403 and a plurality of second inner electrodes 410 to 413 are arranged between one inner connecting conductor 420 which is part of the two layers of inner connecting conductors 420, 430 and the remaining one second inner connecting conductor 430.

Each of the first inner electrodes 400 to 403 has a substantially rectangular form. The plurality of first inner electrodes 400 to 403 are formed at respective positions separated by a predetermined distance from a side face parallel to the laminating direction of the dielectric layers 10 to 20 (hereinafter simply referred to as "laminating direction") in the multilayer body L10. The first inner electrodes 400 to 403 are formed with lead conductors 405A to 408A, 405B to 408B extending so as to be led to the first side face L10a of the multilayer body L10.

Each of the lead conductors 405A and 405B is integrally formed with the first inner electrode 400, and extends therefrom so as to reach the first side face L10a of the multilayer body L10. Each of the lead conductors 406A and 406B is integrally formed with the first inner electrode 401, and extends therefrom so as to reach the first side face L10a of the multilayer body L10. Each of the lead conductors 407A and 407B is integrally formed with the first inner electrode 402, and extends therefrom so as to reach the first side face L10a of the multilayer body L10. Each of the lead conductors 408A and 408B is integrally formed with the first inner electrode 403, and extends therefrom so as to reach the first side face L10a of the multilayer body L10.

The first inner electrode 400 is electrically connected to the first outer connecting conductors 5A and 5B through the lead conductors 405A and 405B, respectively. The first inner electrode 401 is electrically connected to the first outer connecting conductors 5A and 5B through the lead conductors 406A and 406B, respectively. The first inner electrode 402 is electrically connected to the first outer connecting conductors 5A and 5B through the lead conductors 407A and 407B, respectively. The first inner electrode 403 is electrically connected to the first outer connecting conductors 5A and 5B through the lead conductors 408A and 408B, respectively. As a consequence, the plurality of first inner electrodes 400 to 403 are electrically connected to each other through the first outer connecting conductors 5A and 5B.

Each of the second inner electrodes 410 to 413 has a substantially rectangular form. The plurality of second inner electrodes 410 to 413 are formed at respective positions separated by a predetermined distance from a side face parallel to the laminating direction of the multilayer body L10. The second inner electrodes 410 to 413 are formed with lead conductors 415A to 418A, 415B to 418B extending so as to be led to the second side face L10b of the multilayer body L10.

Each of the lead conductors 415A and 415B is integrally formed with the second inner electrode 410, and extends therefrom so as to reach the second side face L10b of the multilayer body L10. Each of the lead conductors 416A and 416B is integrally formed with the second inner electrode 411, and extends therefrom so as to reach the second side face L10b of the multilayer body L10. Each of the lead conductors 417A and 417B is integrally formed with the second inner electrode 412, and extends therefrom so as to reach the second side face L10b of the multilayer body L10. Each of the lead conductors 418A and 418B is integrally formed with the second inner electrode 413, and extends therefrom so as to reach the second side face L10b of the multilayer body L10.

The second inner electrode 410 is electrically connected to the second outer connecting conductors 6A and 6B through the lead conductors 415A and 415B, respectively. The second inner electrode 411 is electrically connected to the second outer connecting conductors 6A and 6B through the lead conductors 416A and 416B, respectively. The second inner electrode 412 is electrically connected to the second outer connecting conductors 6A and 6B through the lead conductors 417A and 417B, respectively. The second inner electrode 413 is electrically connected to the second outer connecting conductors 6A and 6B through the lead conductors 418A and 418B, respectively. As a consequence, the plurality of second inner electrodes 410 to 413 are electrically connected to each other through the second outer connecting conductors 6A, 6B.

The first inner connecting conductor 420 is positioned so as to be held between the dielectric layers 19 and 20. The second inner connecting conductor 430 is positioned so as to be held between the dielectric layers 10 and 11. The first inner connecting conductor 420 and second inner connecting conductor 430 are electrically insulated from each other.

The first inner connecting conductor 420 includes a first conductor portion 420A having an oblong form; second, fourth, and fifth conductor portions 420B, 420D, 420E extending from the first conductor portion 420A so as to be led to the first side face L10a of the multilayer body L10; and a third conductor portion 420C extending from the first conductor portion 420A so as to be led to the second side face L10b of the multilayer body L10. The first conductor portion 420A is arranged such that its longitudinal axis is parallel to the first and second side faces L10a, L10b of the multilayer body L10.

The second, fourth, and fifth conductor portions 420B, 420D, 420E of the first inner connecting conductor 420 are positioned in the order of the fourth conductor portion 420D, fifth conductor portion 420E, and second conductor portion 420B from the left side to right side in FIG. 2. The second conductor portion 420B, third conductor portion 420C, fourth conductor portion 420D, and fifth conductor portion 420E are electrically connected to the first terminal conductor 3A, first terminal conductor 3B, first outer connecting conductor 5A, and first outer connecting conductor 5B, respectively. As a consequence, the first inner connecting conductor 420 is electrically connected to the first terminal conductors 3A, 3B and first outer connecting conductors 5A, 5B.

The second inner connecting conductor 430 includes a first conductor portion 430A having an oblong form, a second conductor portion 430B extending from the first conductor portion 430A so as to be led to the first side face L10a of the multilayer body L10, and third to fifth conductor portions 430C to 430E extending from the first conductor portion 430A so as to be led to the second side face L10b of the multilayer body L10. The first conductor portion 430A is arranged such that its longitudinal axis is parallel to the first and second side faces L10a, L10b of the multilayer body L10.

The third to fifth conductor portions 430C to 430E in the second inner connecting conductor 430 are positioned in the order of the fourth conductor portion 430D, fifth conductor portion 430E, and third conductor portion 430C from the left side to right side in FIG. 2. The second conductor portion 430B, third conductor portion 430C, fourth conductor portion 430D, and fifth conductor portion 430E are electrically connected to the second terminal conductor 4A, second terminal conductor 4B, second outer connecting conductor 6A, and second outer connecting conductor 6B, respectively. As a consequence, the second inner connecting conductor 430 is electrically connected to the second terminal conductors 4A, 4B and second outer connecting conductors 6A, 6B.

The first conductor portion 420A in the first inner connecting conductor 420 is a region opposing the second inner electrode 413 with the dielectric layer 19 in between. The first conductor portion 430A in the second inner connecting conductor 430 is a region opposing the first inner electrode 400 with the dielectric layer 11 in between.

The first and second inner connecting conductors 420, 430 are laminated in the multilayer body L10 such that the multilayer body L10 includes at least one set (four sets in this embodiment) of first and second inner electrodes neighboring each other with a dielectric layer in between in the laminating direction. Specifically, the first and second inner connecting conductors 420, 430 are laminated in the multilayer body L10 such that the multilayer body L10 includes the first inner electrode 400 and second inner electrode 410 neighboring each other with the dielectric layer 12 in between, for example. Namely, in the multilayer body L10, the first and second inner connecting conductors 420, 430 are arranged on the outside of the one set of first and second inner electrodes 400, 410 in the multilayer body L10 in the laminating direction.

In the multilayer capacitor C10, the first terminal conductors 3A, 3B are connected to the first inner electrodes 400 to 403 not directly but electrically through the first outer connecting conductors 5A, 5B and first inner connecting conductor 420. Also, in the multilayer capacitor C10, the second terminal conductors 4A, 4B are connected to the second inner electrodes 410 to 413 not directly but electrically through the second outer connecting conductors 6A, 6B and second inner connecting conductor 430. As a result, the multilayer capacitor C10 yields an equivalent series resistance greater than that of a conventional multilayer capacitor in which all the inner electrodes are connected to their corresponding terminal conductors through lead conductors.

By adjusting the number of first and second inner connecting conductors 420, 430 directly connected to the first terminal conductors 3A, 3B and second terminal conductors 4A, 4B in such a fashion, this embodiment sets the equivalent series resistance of the multilayer capacitor C10 to a desirable value, and thus can regulate the equivalent series resistance easily with a high precision. Since the equivalent series resistance is controlled by the first and second inner connecting conductors, the multilayer capacitor C10 can regulate the equivalent series resistance while attaining a desirable value (e.g., large value) of capacitance.

The first and second terminal conductors 3A, 3B, 4A, 4B and first and second outer connecting conductors 5A, 5B, 6A, 6B, which are outer conductors of the multilayer capacitor C10, are formed on any of the opposing first and second side faces L10a, L10b of the multilayer body L10. Thus, in the multilayer capacitor C10, all the outer connecting conductors (first terminal conductors 3A, 3B; second terminal conductors 4A, 4B; first outer connecting conductors 5A, 5B; and second outer connecting conductors 6A, 6B) are formed on the two opposing side faces L10a, L10b of the multilayer body L10. Consequently, the number of steps required for forming outer conductors can be made smaller in the multilayer capacitor C10 than in the case where terminal conductors are formed on three or more side faces (e.g., four side faces) of a multilayer body. Therefore, the multilayer capacitor C10 can be manufactured easily.

The first inner connecting conductor 420 has the first conductor portion 420A that is a region opposing the second inner electrode 413 with the dielectric layer 19 in between in the multilayer body L10 in the laminating direction. Therefore, the first inner connecting conductor 420 can also contribute to forming a capacity component of the multilayer capacitor C10. Consequently, the multilayer capacitor C10 can further increase its capacitance.

The second inner connecting conductor 430 has the first conductor portion 430A that is a region opposing the second inner electrode 413 with the dielectric layer 11 in between in the multilayer body L10 in the laminating direction. Therefore, the second inner connecting conductor 430 can also contribute to forming a capacity component of the multilayer capacitor C10. Consequently, the multilayer capacitor C10 can further increase its capacitance.

In the multilayer body L10 of the multilayer capacitor C10, a plurality of first inner electrodes 400 to 403 and a plurality of second inner electrodes 410 to 413 are arranged between part of the inner connecting conductors 420, 430 (first inner connecting conductor 420) and the rest (second inner connecting conductor 430). Therefore, the multilayer capacitor C10 can set the equivalent series resistance with a favorable balance.

The multilayer capacitor C10 can lower its equivalent series inductance. A reason therefor can be considered as follows. Namely, when the multilayer capacitor C10 is mounted to a substrate or the like such that the first terminal conductors 3A, 3B are directly connected to land patterns, the second terminal conductors 4A, 4B are directly connected to land patterns having a polarity different from that of the land patterns connected to the first terminal conductors 3A, 3B, and the first and second outer connecting conductors 5A, 5B, 6A, 6B are not directly connected to any land patterns, a current flowing between the first terminal conductor 3A and second terminal conductor 4B and a current flowing between the first terminal conductor 3B and second terminal conductor 4A are directed opposite to each other along the direction in which the first and second side faces L10a, L10b oppose each other. Therefore, a magnetic field caused by the current flowing between the first terminal conductor 3A and second terminal conductor 4B and a magnetic field caused by the current flowing between the first terminal conductor 3B and second terminal conductor 4A cancel each other out. As a result, the multilayer capacitor C10 can lower the equivalent series inductance.

In the multilayer capacitor C10, the first terminal conductor 3A and first outer connecting conductor 5B are formed adjacent to each other on the first side face L10a of the multilayer body L10. Therefore, the following effect is obtained when the multilayer capacitor C10 is mounted to a substrate or the like such that the first terminal conductors 3A, 3B are directly connected to land patterns while the first outer connecting conductors 5A, 5B are not directly connected to land patterns. Namely, a magnetic field caused by a current flowing between the first terminal conductor 3A and the first inner connecting conductor 420 (the second conductor portion 420B of the first inner connecting conductor 420) and a magnetic field caused by a current flowing between the first outer connecting conductor 5B and the first inner connecting conductor 420 (the fifth conductor portion 420E of the first inner connecting conductor 420) cancel each other out. As a result, the multilayer capacitor C10 can lower the equivalent series inductance. When there is at least one pair of first terminal conductor and first outer connecting conductor adjacent to each other, the equivalent series inductance can be lowered.

In the multilayer capacitor C10, the second terminal conductor 4B and second outer connecting conductor 6B are formed adjacent to each other on the second side face L10b of the multilayer body L10. Therefore, the following effect is obtained when the multilayer capacitor C10 is mounted to a substrate or the like such that the second terminal conductors 4A, 4B are directly connected to land patterns while the second outer connecting conductors 6A, 6B are not directly connected to land patterns. Namely, a magnetic field caused by a current flowing between the second terminal conductor 4B and the second inner connecting conductor 430 (the third conductor portion 430C of the second inner connecting conductor 430) and a magnetic field caused by a current flowing between the second outer connecting conductor 6B and the second inner connecting conductor 430 (the fifth conductor portion 430E of the second inner connecting conductor 430) cancel each other out. As a result, the multilayer capacitor C10 can lower the equivalent series inductance. When there is at least one pair of second terminal conductor and second outer connecting conductor adjacent to each other, the equivalent series inductance can be lowered.

In the multilayer capacitor C10, each of pairs of the first terminal conductors 3A and 3B, the second terminal conductors 4A and 4B, the first outer connecting conductor 5A and second outer connecting conductor 6B, and the first outer connecting conductor 5B and second outer connecting conductor 6A are formed at positions symmetrical to each other about the center axis Ax10 of the multilayer body L10. Therefore, even when the multilayer capacitor C10 is rotated by 180 degrees about the center axis Ax10 on a substrate or the like, the relationship of connections between the land patterns and the terminal conductors and outer connecting conductors is not changed.

In the multilayer capacitor C10, each of pairs of the first terminal conductor 3A and second terminal conductor 4B, the first terminal conductor 3B and second terminal conductor 4A, the first outer connecting conductor 5A and second outer connecting conductor 6A, and the first outer connecting conductor 5B and second outer connecting conductor 6B oppose each other along the direction in which the first side face L10a and second side face L10b oppose each other in the multilayer body L10. Therefore, even when the multilayer capacitor C10 is reversed so as to be mounted to a substrate or the like at the opposite side face, the relationship of connections between the land patterns and the terminal conductors and outer connecting conductors is not changed.

Even when the multilayer capacitor C10 is reversed about an axis orthogonal to the side faces L10a, L10b of the multilayer body L10, the relationship of connections between the land patterns and the terminal conductors and outer connecting conductors is not changed.

Since the terminal conductors 3A, 3B, 4A, 4B and outer connecting conductors 5A, 5B, 6A, 6B are arranged as mentioned above, the multilayer capacitor C10 can be mounted in conformity to various mounting directions. Therefore, the multilayer capacitor C10 can be mounted easily.

Second Embodiment

Figure 3:
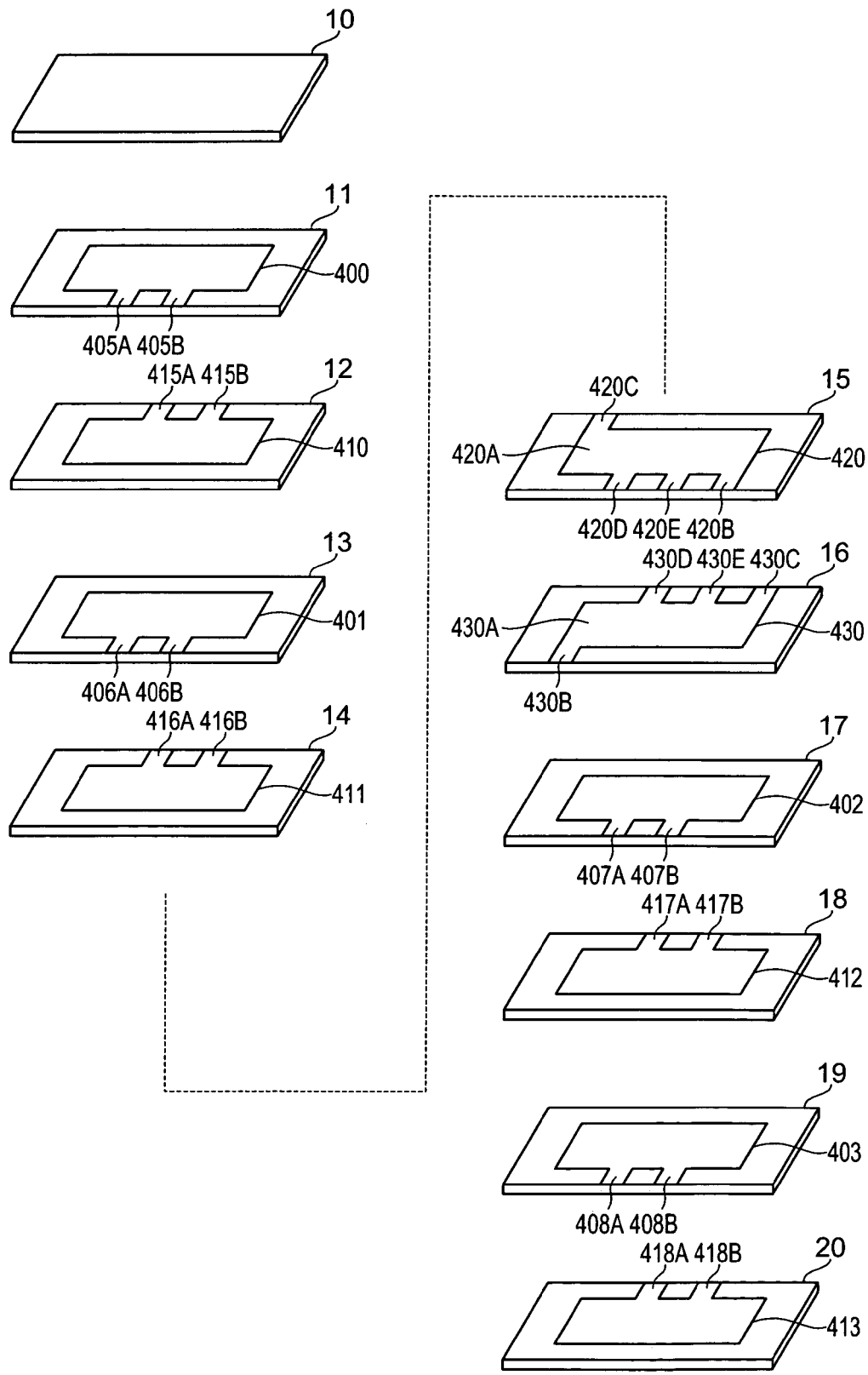
FIG. 3 is an exploded perspective view of the multilayer body included in the multilayer capacitor in accordance with a second embodiment.

With reference to FIG. 3, the structure of the multilayer capacitor in accordance with a second embodiment will be explained. The multilayer capacitor in accordance with the second embodiment differs from the multilayer capacitor C10 in accordance with the first embodiment in terms of positions of inner connecting conductors 420, 430 in the laminating direction. FIG. 3 is an exploded perspective view of the multilayer body included in the multilayer capacitor in accordance with the second embodiment.

As shown in FIG. 3, in the multilayer capacitor in accordance with the second embodiment, one each of first and second inner connecting conductors 420, 430 is laminated between two layers each of first and second inner electrodes 400, 401, 410, 411 and two layers each of first and second inner electrodes 402, 403, 412, 413. More specifically, the first inner connecting conductor 420 is positioned so as to be held between the dielectric layers 14 and 15. The second inner connecting conductor 430 is positioned so as to be held between the dielectric layers 15 and 16.

In the multilayer capacitor in accordance with the second embodiment, each of the first and second inner connecting conductors 420, 430 is laminated in the multilayer body such that the multilayer body includes at least one set of first and second inner electrodes neighboring each other (e.g., first and second inner electrodes 400, 410 with the dielectric layer 11 in between) with a dielectric layer in between in the laminating direction.

In the multilayer capacitor in accordance with the second embodiment, the first terminal conductors 3A, 3B are connected to the first inner electrodes 400 to 403 not directly but electrically through the first outer connecting conductors 5A, 5B and first inner connecting conductor 420. Also, in the multilayer capacitor in accordance with the second embodiment, the second terminal conductors 4A, 4B are connected to the second inner electrodes 410 to 413 not directly but electrically through the second outer connecting conductors 6A, 6B and second inner connecting conductor 430. These allow the multilayer capacitor in accordance with the second embodiment to yield an equivalent series resistance greater than that of a conventional multilayer capacitor in which all the inner electrodes are connected to their corresponding terminal conductors through lead conductors.

When the first terminal conductors 3A, 3B are concerned, the multilayer capacitor in accordance with the second embodiment differs from the multilayer capacitor C10 in accordance with the first embodiment in terms of how the respective resistance components of the first outer connecting conductors 5A, 5B are connected to the respective first terminal conductors 3A, 3B. Namely, the respective resistance components of the first outer connecting conductors 5A, 5B in the multilayer capacitor C10 in accordance with the first embodiment are connected in series to the first inner connecting conductor 420 so as to be connected to the respective first terminal conductors 3A, 3B. In multilayer capacitor in accordance with the second embodiment, by contrast, the respective resistance components of the first outer connecting conductors 5A, 5B are divided at the first inner connecting conductor 420 as a boundary so as to be connected in parallel to the respective first terminal conductors 3A, 3B.

When the second terminal conductors 4A, 4B are concerned, the multilayer capacitor in accordance with the second embodiment differs from the multilayer capacitor C10 in accordance with the first embodiment in terms of how the respective resistance components of the second outer connecting conductors 6A, 6B are connected to the respective second terminal conductors 4A, 4B. Namely, the respective resistance components of the second outer connecting conductors 6A, 6B in the multilayer capacitor C10 in accordance with the first embodiment are connected in series to the second inner connecting conductor 430, so as to be connected to the respective second terminal conductors 4A, 4B. In multilayer capacitor in accordance with the second embodiment, by contrast, the respective resistance components of the second outer connecting conductors 6A, 6B are divided at the second inner connecting conductor 430 as a boundary, so as to be connected in parallel to the respective second terminal conductors 4A, 4B.

Therefore, because of the difference in resistance components of the first and second outer connecting conductors 5A, 5B, 6A, 6B, the multilayer capacitor in accordance with the second embodiment yields an equivalent series resistance smaller than that of the multilayer capacitor C10 in accordance with the first embodiment.

By adjusting positions of the first inner connecting conductor 420 directly connected to the first terminal conductors 3A, 3B and the second inner connecting conductor 430 directly connected to the second terminal conductors 4A, 4B as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors, the multilayer capacitor in accordance with the second embodiment can regulate the equivalent series resistance while attaining a desirable value (e.g., large value) of capacitance.

All the outer conductors (first and second terminal conductors 3A, 3B, 4A, 4B and first and second outer connecting conductors 5A, 5B, 6A, 6B) of the multilayer capacitor in accordance with the second embodiment are formed on the opposing first and second side faces of the multilayer body. Consequently, the number of steps required for forming outer conductors can be made smaller in the multilayer capacitor in accordance with the second embodiment than in the case where outer conductors are formed on three or more side faces (e.g., four side faces) of a multilayer body, whereby the multilayer capacitor in accordance with the second embodiment can be manufactured easily.

The first conductor portion 420A of the first inner connecting conductor 420 opposes the second inner electrode 411 with the dielectric layer 14 in between. The first conductor portion 430A of the second inner connecting conductor 430 opposes the first inner electrode 402 with the dielectric layer 16 in between. Therefore, the first and second inner connecting conductors 420, 430 can also contribute to forming the capacity component in the multilayer capacitor in accordance with the second embodiment, whereby the capacitance in the multilayer capacitor can further be increased.

As with the multilayer capacitor C10, the multilayer capacitor in accordance with the second embodiment can lower the equivalent series inductance. As with the multilayer capacitor C10, the multilayer capacitor in accordance with the second embodiment can be mounted easily.

Third Embodiment

Figure 4:
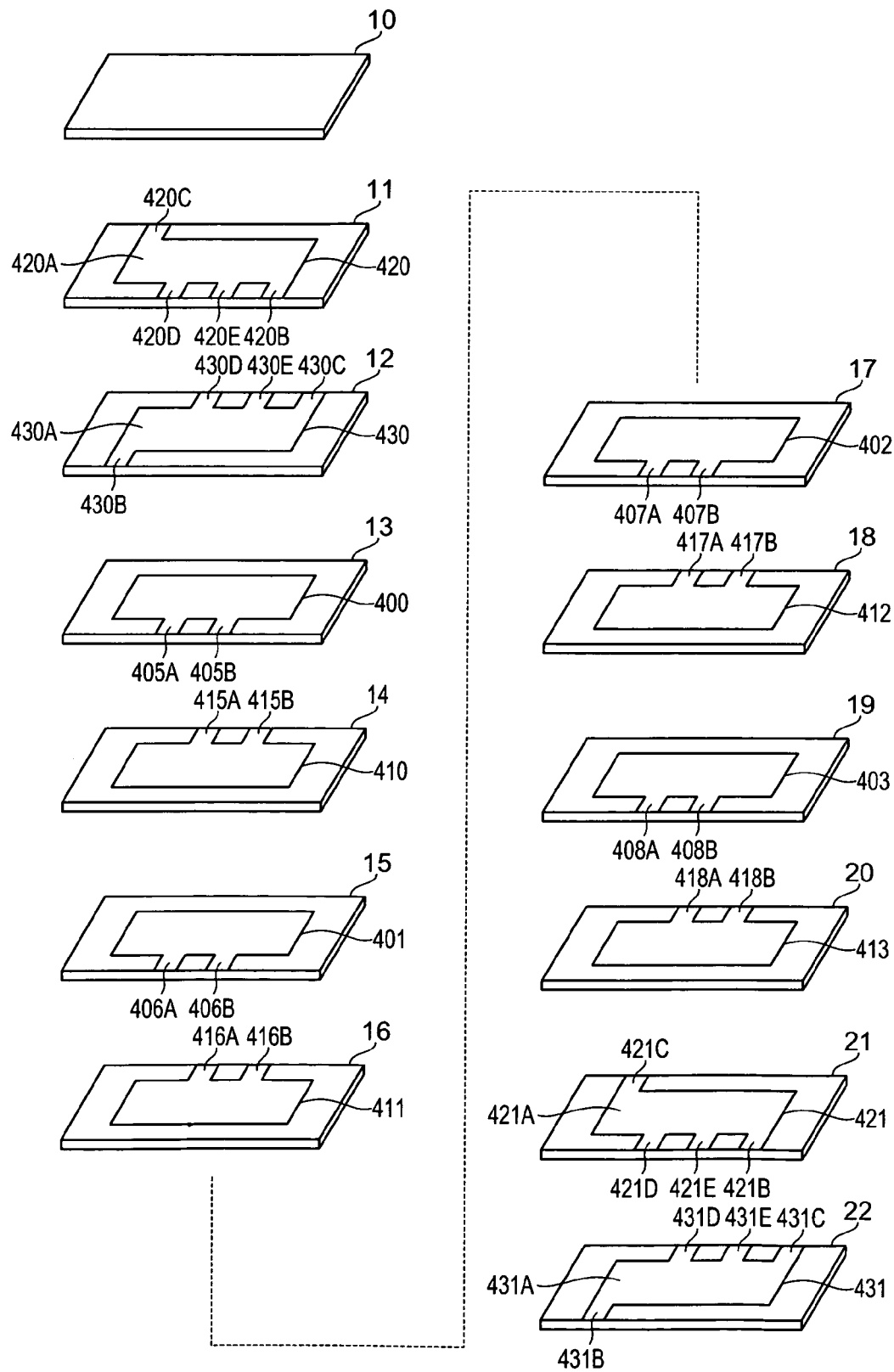
FIG. 4 is an exploded perspective view of the multilayer body included in the multilayer capacitor in accordance with a third embodiment.

With reference to FIG. 4, the structure of the multilayer capacitor in accordance with a third embodiment will be explained. The multilayer capacitor in accordance with the third embodiment differs from the multilayer capacitor C10 in accordance with the first embodiment in terms of the number of first and second inner connecting conductors. FIG. 4 is an exploded perspective view of the multilayer body included in the multilayer capacitor in accordance with the third embodiment.

As shown in FIG. 4, the multilayer body of the multilayer capacitor in accordance with the third embodiment is constructed by alternately laminating a plurality of (13 in this embodiment) dielectric layers 10 to 22 with a plurality of (4 each in this embodiment) first and second inner electrodes 400 to 403, 410 to 413.

In the multilayer body of the multilayer capacitor in accordance with the third embodiment, a plurality of (2 in this embodiment) first inner connecting conductors 420, 421 and a plurality of (2 in this embodiment) second inner connecting conductors 430, 431 are laminated. In the multilayer body of the multilayer capacitor in accordance with the third embodiment, four layers of first inner electrodes 400 to 403 and four layers of second inner electrodes 410 to 413 are arranged between one each of the first and second inner connecting conductors 420, 430, which are part of the plurality of inner connecting conductors 420, 421, 430, 431, and the remaining first and second connecting conductors 421, 431.

The first inner connecting conductor 420 is positioned so as to be held between the dielectric layers 10 and 11. The first inner connecting conductor 421 is positioned so as to be held between the dielectric layers 20 and 21. The second inner connecting conductor 430 is positioned so as to be held between the dielectric layers 11 and 12. The second inner connecting conductor 431 is positioned so as to be held between the dielectric layers 21 and 22.

The first inner connecting conductor 421 includes a first conductor portion 421A having an oblong form, and second to fifth conductor portions 421B to 421E extending from the first conductor portion 421A so as to be led to side faces of the multilayer body. The second to fifth conductor portions 421B to 421E of the first inner connecting conductor 421 extend so as to be led to side faces corresponding to respective side faces where the second to fifth conductor portions 420B to 420E of the first inner connecting conductor 420 are led.

The second conductor portion 421B, third conductor portion 421C, fourth conductor portion 421D, and fifth conductor portion 421E are electrically connected to the first terminal conductor 3A, first terminal conductor 3B, first outer connecting conductor 5A, and first outer connecting conductor 5B, respectively. As a consequence, the first inner connecting conductor 421 is electrically connected to the first terminal conductors 3A, 3B and first outer connecting conductors 5A, 5B.

The second inner connecting conductor 431 includes a first conductor portion 431A having an oblong form, and second to fifth conductor portions 431B to 431E extending from the first conductor portion 431A so as to be led to side faces of the multilayer body. The second to fifth conductor portions 431B to 431E of the second inner connecting conductor 431 extend so as to be led to side faces corresponding to respective side faces where the second to fifth conductor portions 430B to 430E of the second inner connecting conductor 430 are led.

The second conductor portion 431B, third conductor portion 431C, fourth conductor portion 431D, and fifth conductor portion 431E are electrically connected to the second terminal conductor 4A, second terminal conductor 4B, second outer connecting conductor 6A, and second outer connecting conductor 6B, respectively. As a consequence, the second inner connecting conductor 431 is electrically connected to the second terminal conductors 4A, 4B and second outer connecting conductors 6A, 6B.

In the multilayer capacitor in accordance with the third embodiment, the first and second inner connecting conductors 420, 421, 430, 431 are laminated in the multilayer body such that the multilayer body includes at least one set (four sets in this embodiment) of first and second inner electrodes neighboring each other with a dielectric layer in between in the laminating direction.

In the multilayer capacitor in accordance with the third embodiment, the first terminal conductors 3A, 3B are connected to the first inner electrodes 400 to 403 not directly but electrically through the first outer connecting conductors 5A, 5B and first inner connecting conductors 420, 421. Also, in the multilayer capacitor in accordance with the third embodiment, the second terminal conductors 4A, 4B are connected to the second inner electrodes 410 to 413 not directly but electrically through the second outer connecting conductors 6A, 6B and second inner connecting conductors 430, 431. Consequently, the multilayer capacitor in accordance with the third embodiment yields an equivalent series resistance greater than that of a conventional multilayer capacitor in which all the inner electrodes are connected to their corresponding terminal conductors through lead conductors.

The number of first inner connecting conductors 420, 421 is greater in the multilayer capacitor in accordance with the third embodiment than in the multilayer capacitor C10, whereas the first inner connecting conductors 420, 421 are connected in parallel to their corresponding first terminal conductors 3A, 3B. Since the number of first inner connecting conductors 420, 421 is greater, the number of current paths between the first terminal conductors 3A, 3B and first inner electrodes 400 to 403 increases. On the other hand, the number of second inner connecting conductors 430, 431 is greater in the multilayer capacitor in accordance with the third embodiment than in the multilayer capacitor C10, whereas the second inner connecting conductors 430, 431 are connected in parallel to their corresponding second terminal conductors 4A, 4B. Since the number of second inner connecting conductors 430, 431 is greater, the number of current paths between the second terminal conductors 4A, 4B and second inner electrodes 410 to 413 increases. Consequently, the multilayer capacitor in accordance with the third embodiment yields an equivalent series resistance smaller than that of the multilayer capacitor C10.

By adjusting the number of first inner connecting conductors 420, 421 directly connected to the first terminal conductors 3A, 3B and the number of second inner connecting conductors 430, 431 directly connected to the second terminal conductors 4A, 4B as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors, the multilayer capacitor in accordance with the third embodiment can regulate the equivalent series resistance while attaining a desirable value (e.g., large value) of capacitance.

All the outer conductors (first and second terminal conductors 3A, 3B, 4A, 4B and first and second outer connecting conductors 5A, 5B, 6A, 6B) of the multilayer capacitor in accordance with the third embodiment are formed on the opposing first and second side faces of the multilayer body. Consequently, the multilayer capacitor in accordance with the third embodiment can be manufactured more easily than in the case where outer conductors are formed on three or more side faces (e.g., four side faces) of a multilayer body.

The first conductor portion 421A of the first inner connecting conductor 421 opposes the second inner electrode 413 with the dielectric layer 20 in between. The first conductor portion 430A of the second inner connecting conductor 430 opposes the first inner electrode 400 with the dielectric layer 12 in between. Therefore, the first and second inner connecting conductors 421, 430 can also contribute to forming the capacity component in the multilayer capacitor in accordance with the third embodiment, whereby the capacitance in the multilayer capacitor can further be increased.

In the multilayer body of the multilayer capacitor in accordance with the third embodiment, a plurality of first and second inner electrodes 400 to 403, 410 to 413 are arranged between the first and second inner connecting conductors 420, 430 and the first and second inner connecting conductors 421, 431. Therefore, the multilayer capacitor in accordance with the third embodiment can set the equivalent series resistance with a favorable balance.

As with the multilayer capacitor C10, the multilayer capacitor in accordance with the third embodiment can lower the equivalent series inductance. Also, the multilayer capacitor in accordance with the third embodiment can be mounted easily as with the multilayer capacitor C10.

Fourth Embodiment

Figure 5:
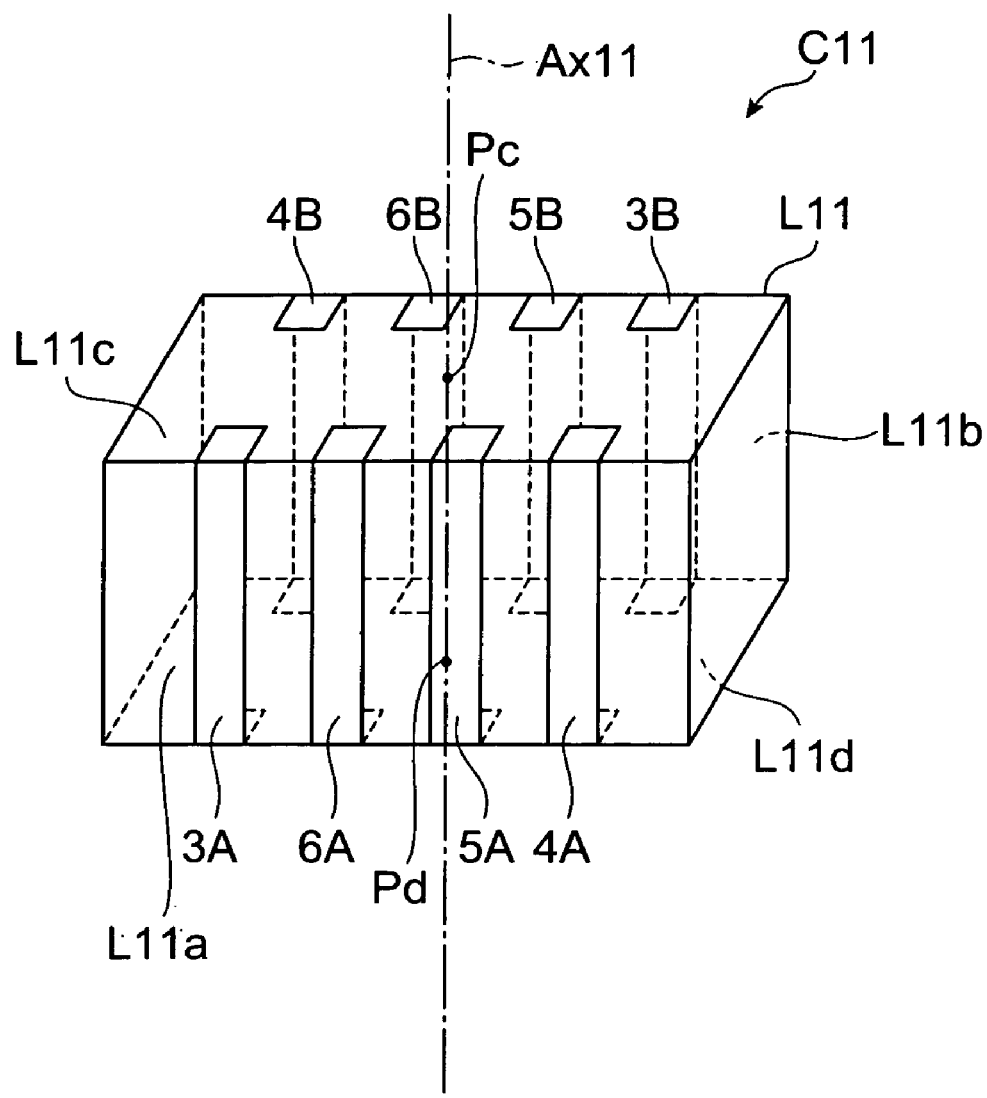
FIG. 5 is a perspective view of the multilayer capacitor in accordance with a fourth embodiment.
Figure 6:
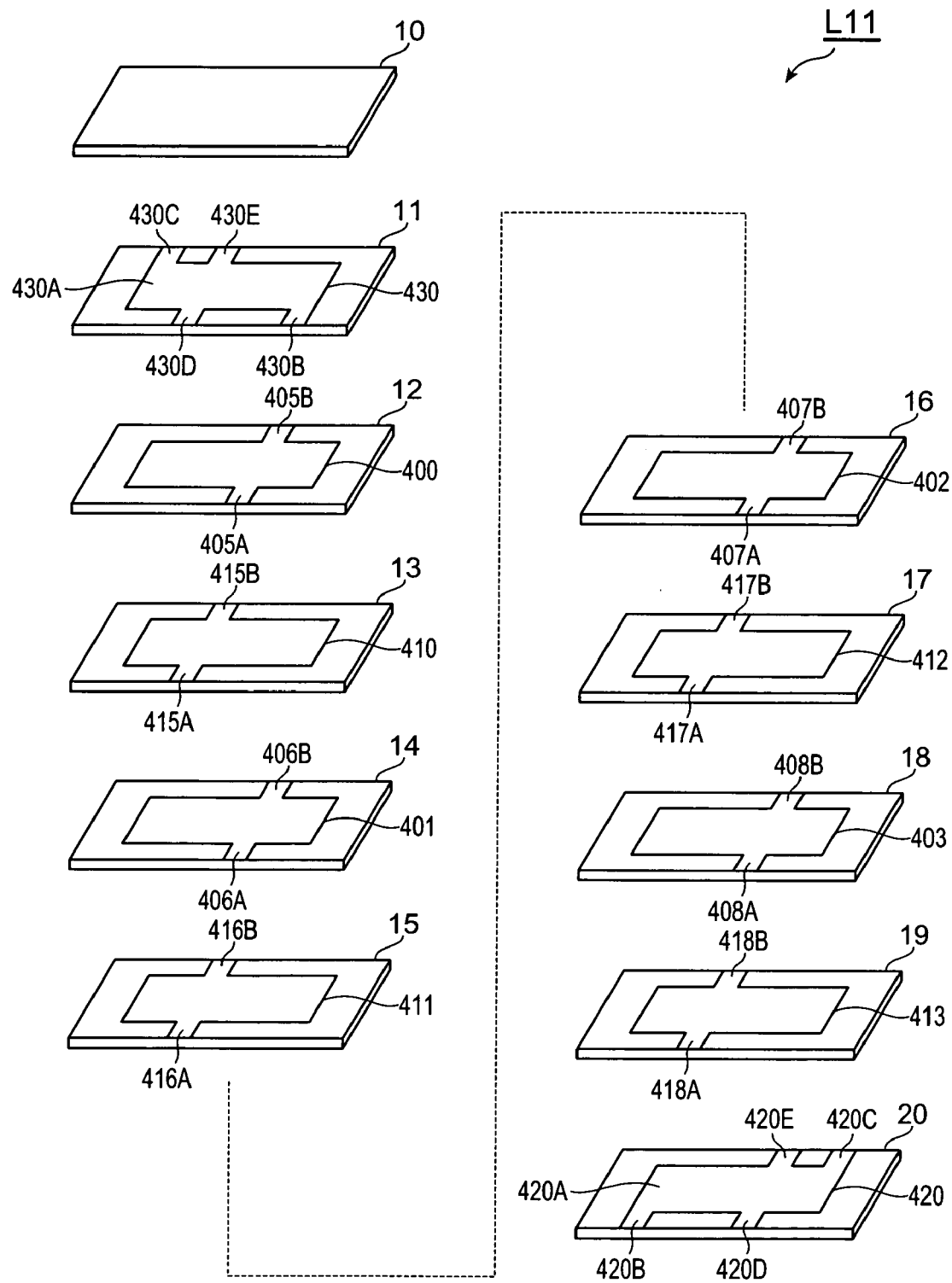
FIG. 6 is an exploded perspective view of the multilayer body included in the multilayer capacitor in accordance with the fourth embodiment.

With reference to FIGS. 5 and 6, the structure of the multilayer capacitor C11 in accordance with a fourth embodiment will be explained. The multilayer capacitor C11 in accordance with the fourth embodiment differs from the multilayer capacitor C10 in accordance with the first embodiment in terms of arrangement of outer conductors formed on the multilayer body. FIG. 5 is a perspective view of the multilayer capacitor in accordance with the fourth embodiment. FIG. 6 is an exploded perspective view of the multilayer body included in the multilayer capacitor in accordance with the fourth embodiment.

On a first side face L11a which is a side face extending longitudinally of faces L11c and L11d orthogonal to the laminating direction of the multilayer body L11 among side faces parallel to the laminating direction of the multilayer body L11, a first terminal conductor 3A, a second outer connecting conductor 6A, a first outer connecting conductor 5A, and a second terminal conductor 4A are formed in this order from the left side to right side in FIG. 5. Namely, the first outer connecting conductor 5A and second outer connecting conductor 6A are formed so as to be positioned between the first terminal conductor 3A and second terminal conductor 4A on the first side face L11a.

On a second side face L11b which is a side face extending longitudinally of the faces L11c and L11d orthogonal to the laminating direction of the multilayer body L11 among the side faces parallel to the laminating direction of the multilayer body L11, a second terminal conductor 4B, a second outer connecting conductor 6B, a first outer connecting conductor 5B, and a first terminal conductor 3B are formed in this order from the left side to right side in FIG. 5. Namely, the first outer connecting conductor 5B and second outer connecting conductor 6B are formed so as to be positioned between the first terminal conductor 3B and second terminal conductor 4B on the second side face L11b.

Therefore, the first terminal conductor 3B and first outer connecting conductor 5B are formed adjacent to each other on the same side face, i.e., second side face L11b, of the multilayer body L11. The second terminal conductor 4B and second outer connecting conductor 6B are formed adjacent to each other on the same side face, i.e., second side face L11b, of the multilayer body L11.

Each of pairs of the first terminal conductors 3A and 3B, the second terminal conductors 4A and 4B, the first outer connecting conductor 5A and second outer connecting conductor 6B, and the first outer connecting conductor 5B and second outer connecting conductor 6A are symmetrical to each other about a center axis Ax11 passing respective center positions Pc, Pd of the two side faces L11c, L11d orthogonal to the laminating direction of the multilayer body L11 among center axes of the multilayer body L11. Each of pairs of the first terminal conductor 3A and second terminal conductor 4B, the first terminal conductor 3B and second terminal conductor 4A, the first outer connecting conductors 5A and 5B, and the second outer connecting conductors 6A and 6B oppose each other along a direction in which the first side face L11a and second side face L11b of the multilayer body L11 oppose each other.

As shown in FIG. 6, the multilayer body L11 is constructed by alternately laminating a plurality of (11 in this embodiment) dielectric layers 10 to 20 with a plurality of (4 each in this embodiment) first and second inner electrodes 400 to 403, 410 to 413. Further, one first inner connecting conductor 420 and one second inner connecting conductor 430 are laminated in the multilayer body L11.

Lead conductors 405A to 408A extend from their corresponding first inner electrodes 400 to 403 so as to reach the first side face L11a of the multilayer body L11. Lead conductors 405B to 408B extend from their corresponding first inner electrodes 400 to 403 so as to reach the second side face L11b of the multilayer body L11.

Lead conductors 415A to 418A extend from their corresponding second inner electrodes 410 to 413 so as to reach the first side face L11a of the multilayer body L11. Lead conductors 415B to 418B extend from their corresponding second inner electrodes 410 to 413 so as to reach the second side face L11b of the multilayer body L11.

The first inner connecting conductor 420 includes a first conductor portion 420A having an oblong form; second and fourth conductor portions 420B, 420D extending from the first conductor portion 420A so as to be led to the first side face L11a of the multilayer body L11; and third and fifth conductor portions 420C, 420E extending from the first conductor portion 420A so as to be led to the second side face L11b of the multilayer body L11.

The second inner connecting conductor 430 includes a first conductor portion 430A having an oblong form; second and fourth conductor portions 430B, 430D extending from the first conductor portion 430A so as to be led to the first side face L11a of the multilayer body L11; and third and fifth conductor portions 430C, 430E extending from the first conductor portion 430A so as to be led to the second side face L11b of the multilayer body L11.

In the multilayer capacitor C11, the first terminal conductors 3A, 3B are connected to the first inner electrodes 400 to 403 not directly but electrically through the first outer connecting conductors 5A, 5B and first inner connecting conductor 420. Also, in the multilayer capacitor C11, the second terminal conductors 4A, 4B are connected to the second inner electrodes 410 to 413 not directly but electrically through the second outer connecting conductors 6A, 6B and second inner connecting conductor 430. These allow the multilayer capacitor C11 to yield an equivalent series resistance greater than that of a conventional multilayer capacitor in which all the inner electrodes are connected to their corresponding terminal conductors through lead conductors.

By adjusting the number of first inner connecting conductor 420 directly connected to the first terminal conductors 3A, 3B and the number of second inner connecting conductor 430 directly connected to the second terminal conductors 4A, 4B in such a fashion, this embodiment sets the equivalent series resistance of the multilayer capacitor C11 to a desirable value, and thus can regulate the equivalent series resistance easily with a high precision. Since the equivalent series resistance is controlled by the first and second inner connecting conductors, the multilayer capacitor C11 can regulate the equivalent series resistance while attaining a desirable value (e.g., large value) of capacitance.

All of the first and second terminal conductors 3A, 3B, 4A, 4B and first and second outer connecting conductors 5A, 5B, 6A, 6B, which are outer conductors of the multilayer capacitor C11, are formed on the opposing first and second side faces L11a, L11b of the multilayer body L11. Consequently, the number of steps required for forming outer conductors can be made smaller in the multilayer capacitor C11 than in the case where terminal conductors are formed on four side faces of the multilayer body L11. Therefore, the multilayer capacitor C11 can be manufactured easily.

The first conductor portion 420A of the first inner connecting conductor 420 and the first conductor portion 430A of the second inner connecting conductor 430 oppose their corresponding inner electrodes with a dielectric layer in between respectively, and thus can contribute to forming a capacity component. Therefore, the multilayer capacitor C11 can further increase its capacitance.

Since a plurality of first and second inner electrodes 400 to 403, 410 to 413 are arranged between the first inner connecting conductor 420 and second inner connecting conductor 430 in the multilayer body L11 of the multilayer capacitor C11, the equivalent series resistance can be set with a favorable balance.

The multilayer capacitor C11 can lower the equivalent series inductance. A reason therefore can be considered as follows. Namely, when the multilayer capacitor C11 is mounted to a substrate or the like such that the first terminal conductors 3A, 3B and second terminal conductors 4A, 4B are directly connected to land patterns having respective polarities different from each other, a magnetic field caused by a current flowing between the first terminal conductor 3A and second terminal conductor 4B and a magnetic field caused by a current flowing between the first terminal conductor 3B and second terminal conductor 4A seem to cancel each other out, thereby lowering the equivalent series inductance.

In the multilayer capacitor C11, the first terminal conductor 3B and first outer connecting conductor 5B are formed adjacent to each other on the second side face L11b of the multilayer body L11. Also, in the multilayer capacitor C11, the second terminal conductor 4B and second outer connecting conductor 6B are formed adjacent to each other on the second side face L11b of the multilayer body L11. Therefore, when the multilayer capacitor C11 is mounted to a substrate or the like such that the terminal conductors 3A, 3B, 4A, 4B are directly connected to land patterns, whereas the outer connecting conductors 5A, 5B, 6A, 6B are not directly connected to land patterns, magnetic fields caused by currents flowing through the multilayer body L11 cancel each other out, thereby lowering the equivalent series inductance of the multilayer capacitor C11.

The multilayer capacitor C11 can be mounted easily because of positional relationships of the outer conductors 3A to 6A, 3B to 6B with the center axis Ax11, and positional relationships among the outer conductors 3A to 6A, 3B to 6B in the opposing direction of the first side face L11a and second side face L11b of the multilayer body L11.

Fifth Embodiment

Figure 7:
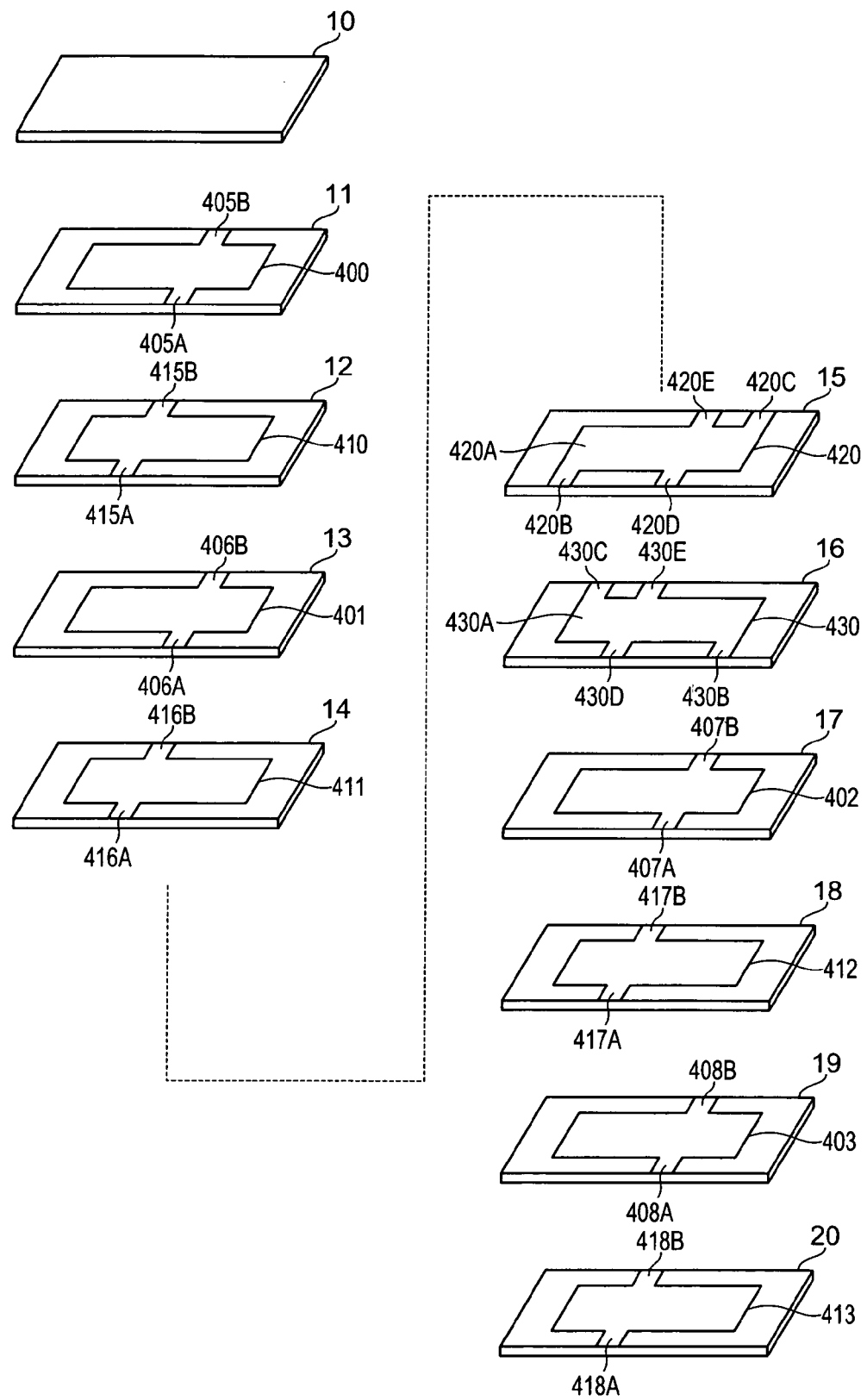
FIG. 7 is an exploded perspective view of the multilayer body included in the multilayer capacitor in accordance with a fifth embodiment.

With reference to FIG. 7, the structure of the multilayer capacitor in accordance with a fifth embodiment will be explained. The multilayer capacitor in accordance with the fifth embodiment differs from the multilayer capacitor C11 in accordance with the fourth embodiment in terms of positions of inner connecting conductors 420, 430 in the laminating direction. FIG. 7 is an exploded perspective view of the multilayer body included in the multilayer capacitor in accordance with the fifth embodiment.

In the multilayer capacitor in accordance with the fifth embodiment, as shown in FIG. 7, one each of the first and second inner connecting conductors 420, 430 is laminated between two each of first and second inner electrodes 400, 401, 410, 411 and two each of first and second inner electrodes 402, 403, 412, 413. More specifically, the first inner connecting conductor 420 is positioned so as to be held between dielectric layers 14 and 15. The second inner connecting conductor 430 is positioned so as to be held between dielectric layers 15 and 16.

In the multilayer capacitor in accordance with the fifth embodiment, terminal conductors 3A, 3B, 4A, 4B are connected to the inner electrodes 400 to 403, 410 to 413 not directly but electrically through the outer connecting conductors 5A, 5B, 6A, 6B and the inner connecting conductors 420, 430. Therefore, the multilayer capacitor in accordance with the fifth embodiment can yield an equivalent series resistance greater than that of a conventional multilayer capacitor in which all the inner electrodes are connected to their corresponding terminal conductors through lead conductors.

When the first terminal conductors 3A, 3B are concerned, the multilayer capacitor in accordance with the fifth embodiment differs from the multilayer capacitor C11 in accordance with the fourth embodiment in terms of the position of the first inner connecting conductor 420 and, consequently, in terms of how the respective resistance components of the first outer connecting conductors 5A, 5B are connected to the respective first terminal conductors 3A, 3B. Also, when the second terminal conductors 4A, 4B are concerned, the multilayer capacitor in accordance with the fifth embodiment differs from the multilayer capacitor C11 in accordance with the fourth embodiment in terms of the position of the second inner connecting conductor 430 and, consequently, in terms of how the respective resistance components of the second outer connecting conductors 6A, 6B are connected to the respective second terminal conductors 4A, 4B.

Because of the difference in resistance components of the first and second outer connecting conductors 5A, 5B, 6A, 6B, the multilayer capacitor in accordance with the fifth embodiment yields an equivalent series resistance smaller than that in the multilayer capacitor C11 in accordance with the fourth embodiment.

By adjusting positions of the first inner connecting conductors 420, 430 in the laminating direction as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors 420, 430, the multilayer capacitor in accordance with the fifth embodiment can regulate the equivalent series resistance while attaining a desirable value (e.g., large value) of capacitance.

The first conductor portion 420A of the first inner connecting conductor 420 and the first conductor portion 430A of the second inner connecting conductor 430 oppose their corresponding inner electrodes with a dielectric layer in between respectively, and thus can contribute to forming a capacity component. Therefore, the multilayer capacitor in accordance with the fifth embodiment can further increase its capacitance.

Since the outer conductors are arranged such as in the multilayer capacitor C11, the multilayer capacitor in accordance with the fifth embodiment can be manufactured easily as with the multilayer capacitor C11. The multilayer capacitor in accordance with the fifth embodiment can lower the equivalent series inductance as with the multilayer capacitor C11. Also, the multilayer capacitor in accordance with the fifth embodiment can be mounted easily as with the multilayer capacitor C11.

Sixth Embodiment

Figure 8:
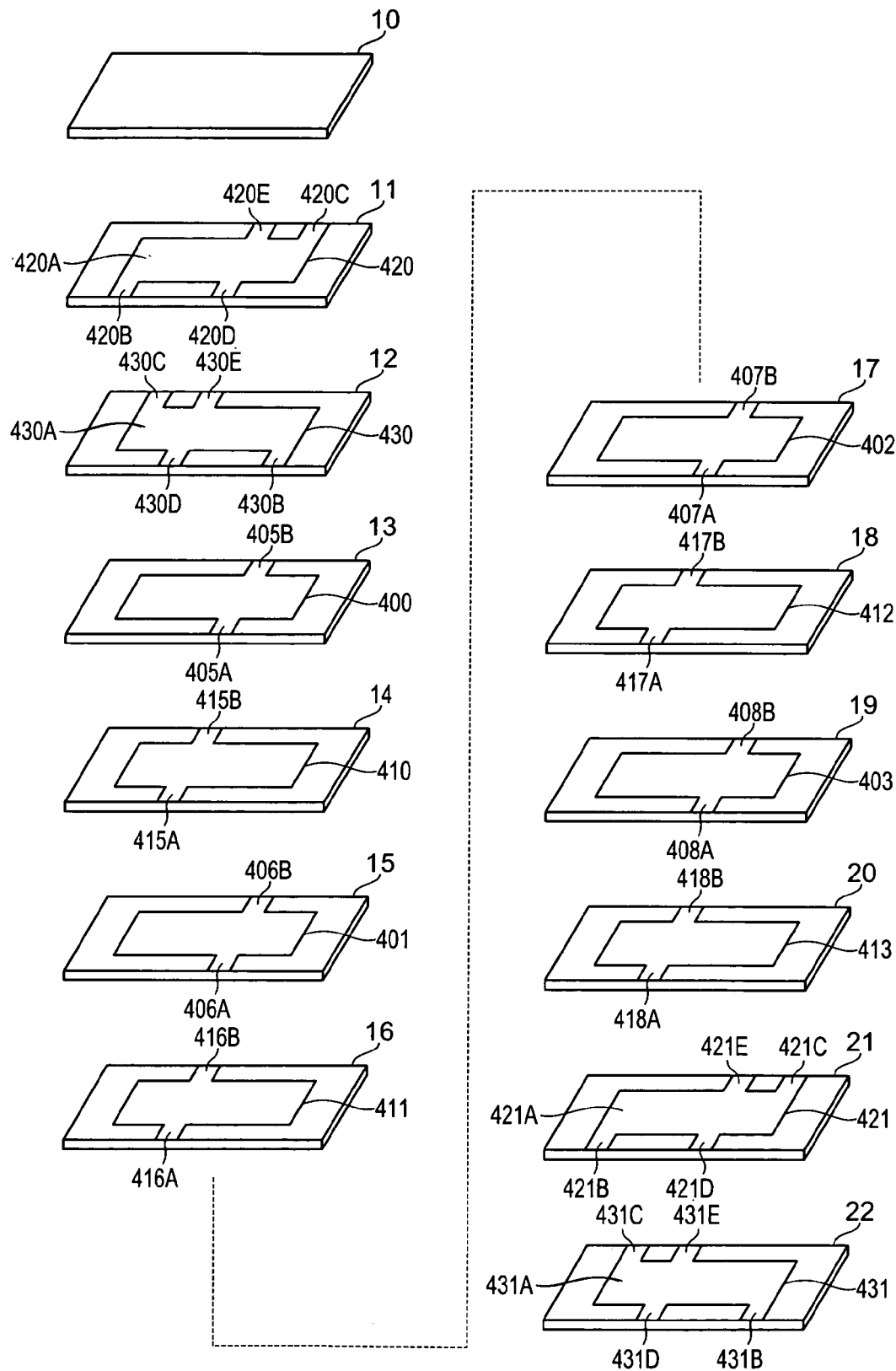
FIG. 8 is an exploded perspective view of the multilayer body included in the multilayer capacitor in accordance with a sixth embodiment.

With reference to FIG. 8, the structure of the multilayer capacitor in accordance with a sixth embodiment will be explained. The multilayer capacitor in accordance with the sixth embodiment differs from the multilayer capacitor C11 in accordance with the fourth embodiment in terms of the number of first and second inner connecting conductors. FIG. 8 is an exploded perspective view of the multilayer body included in the multilayer capacitor in accordance with the sixth embodiment.

As shown in FIG. 8, the multilayer body of the multilayer capacitor in accordance with the sixth embodiment is constructed by alternately laminating a plurality of (13 in this embodiment) dielectric layers 10 to 22 and a plurality of (4 each in this embodiment) first and second inner electrodes 400 to 403, 410 to 413.

In the multilayer body of the multilayer capacitor in accordance with the sixth embodiment, a plurality of (2 in this embodiment) first inner connecting conductors 420, 421 and a plurality of (2 in this embodiment) second inner connecting conductors 430, 431 are laminated. In the multilayer body of the multilayer capacitor in accordance with the sixth embodiment, the first inner electrodes 400 to 403 and second inner electrodes 410 to 413 are arranged between the first and second inner connecting conductors 420, 430 and the first and second inner connecting conductors 421, 431.

The first inner connecting conductor 420 is positioned so as to be held between the dielectric layers 10 and 11, whereas the first inner connecting conductor 421 is positioned so as to be held between the dielectric layers 20 and 21. The second inner connecting conductor 430 is positioned so as to be held between the dielectric layers 11 and 12, whereas the second inner connecting conductor 431 is positioned so as to be held between the dielectric layers 21 and 22.

In the multilayer capacitor in accordance with the sixth embodiment, terminal conductors 3A, 3B, 4A, 4B are connected to the inner electrodes 400 to 403, 410 to 413 not directly but electrically through outer connecting conductors 5A, 5B, 6A, 6B and the inner connecting conductors 420, 421, 430, 431. Therefore, the multilayer capacitor in accordance with the sixth embodiment yields an equivalent series resistance greater than that of a conventional multilayer capacitor in which all the inner electrodes are connected to their corresponding terminal conductors through lead conductors.

The number of first inner connecting conductors 420, 421 and second inner connecting conductors 430, 431 is greater in the multilayer capacitor in the sixth embodiment than in the multilayer capacitor C11, whereas the inner connecting conductors 420, 421, 430, 431 are connected in parallel to their corresponding terminal conductors 3A, 3B, 4A, 4B. Since the number of inner connecting conductors 420, 421, 430, 431 is greater, the number of current paths between the terminal conductors 3A, 3B, 4A, 4B and inner electrodes 400 to 403, 410 to 413 increases. Therefore, the multilayer capacitor in accordance with the sixth embodiment yields an equivalent series resistance smaller than that of the multilayer capacitor C11.

By adjusting the number of first inner connecting conductors 420, 421 and the number of second inner connecting conductors 430, 431 as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors, the multilayer capacitor in accordance with the sixth embodiment can regulate the equivalent series resistance while attaining a desirable value (e.g., large value) of capacitance.

The first conductor portion 421A of the first inner connecting conductor 421 and the first conductor portion 430A of the second inner connecting conductor 430 oppose their corresponding inner electrodes with a dielectric layer in between respectively, and thus can contribute to forming a capacity component. Therefore, the multilayer capacitor in accordance with the sixth embodiment can further increase its capacitance.

In the multilayer body of the multilayer capacitor in accordance with the sixth embodiment, a plurality of first and second inner electrodes 400 to 403, 410 to 413 are arranged between the first and second inner connecting conductors 420, 430 and the first and second inner connecting conductors 421, 431. Therefore, the multilayer capacitor in accordance with the sixth embodiment can set the equivalent series resistance with a favorable balance.

Since the outer conductors are arranged as in the multilayer capacitor C11, the multilayer capacitor in accordance with the sixth embodiment can be manufactured easily as with the multilayer capacitor C11. The multilayer capacitor in accordance with the sixth embodiment can lower the equivalent series inductance as with the multilayer capacitor C11. Also, the multilayer capacitor in accordance with the sixth embodiment can be mounted easily as with the multilayer capacitor C11.

Seventh Embodiment

Figure 9:
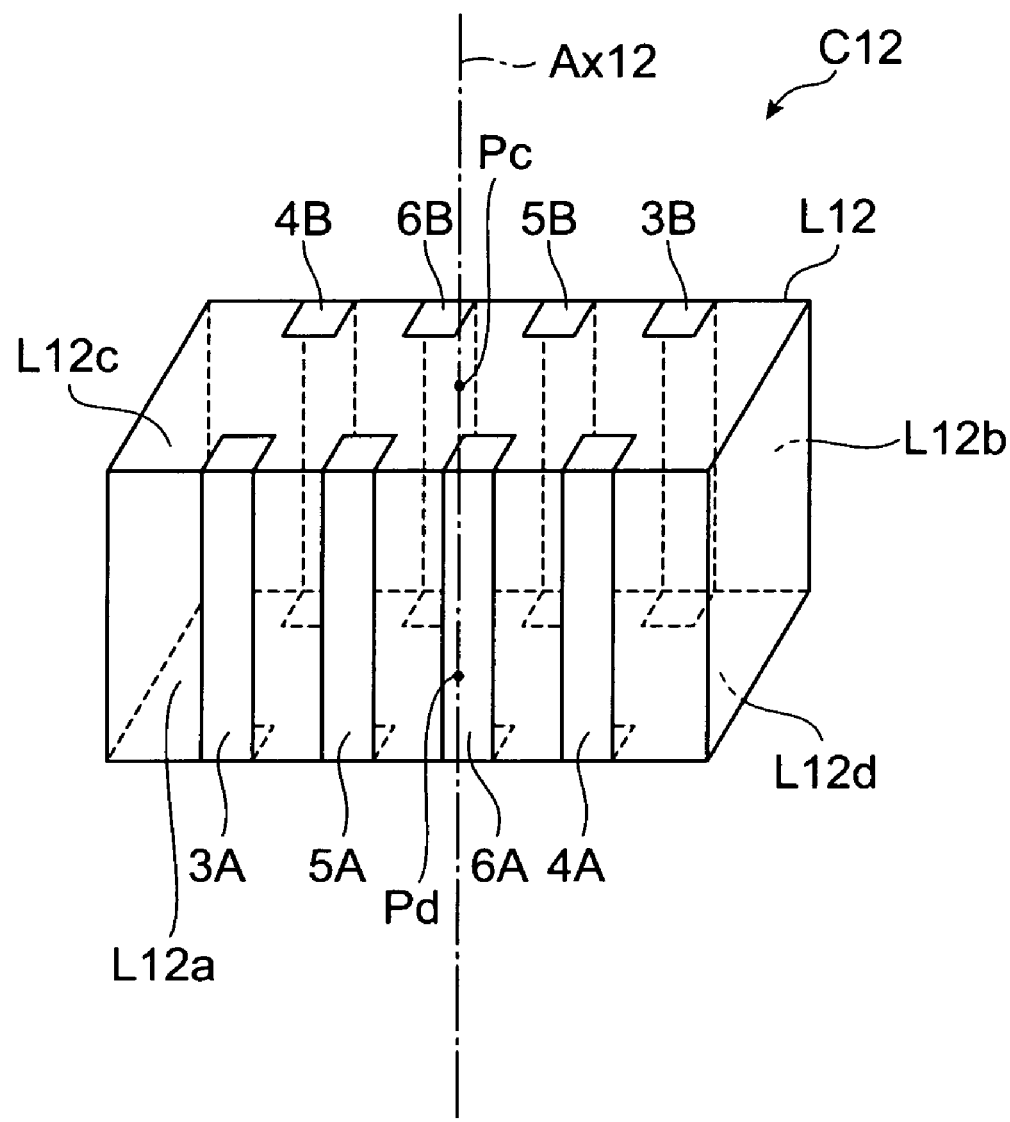
FIG. 9 is a perspective view of the multilayer capacitor in accordance with a seventh embodiment.
Figure 10:
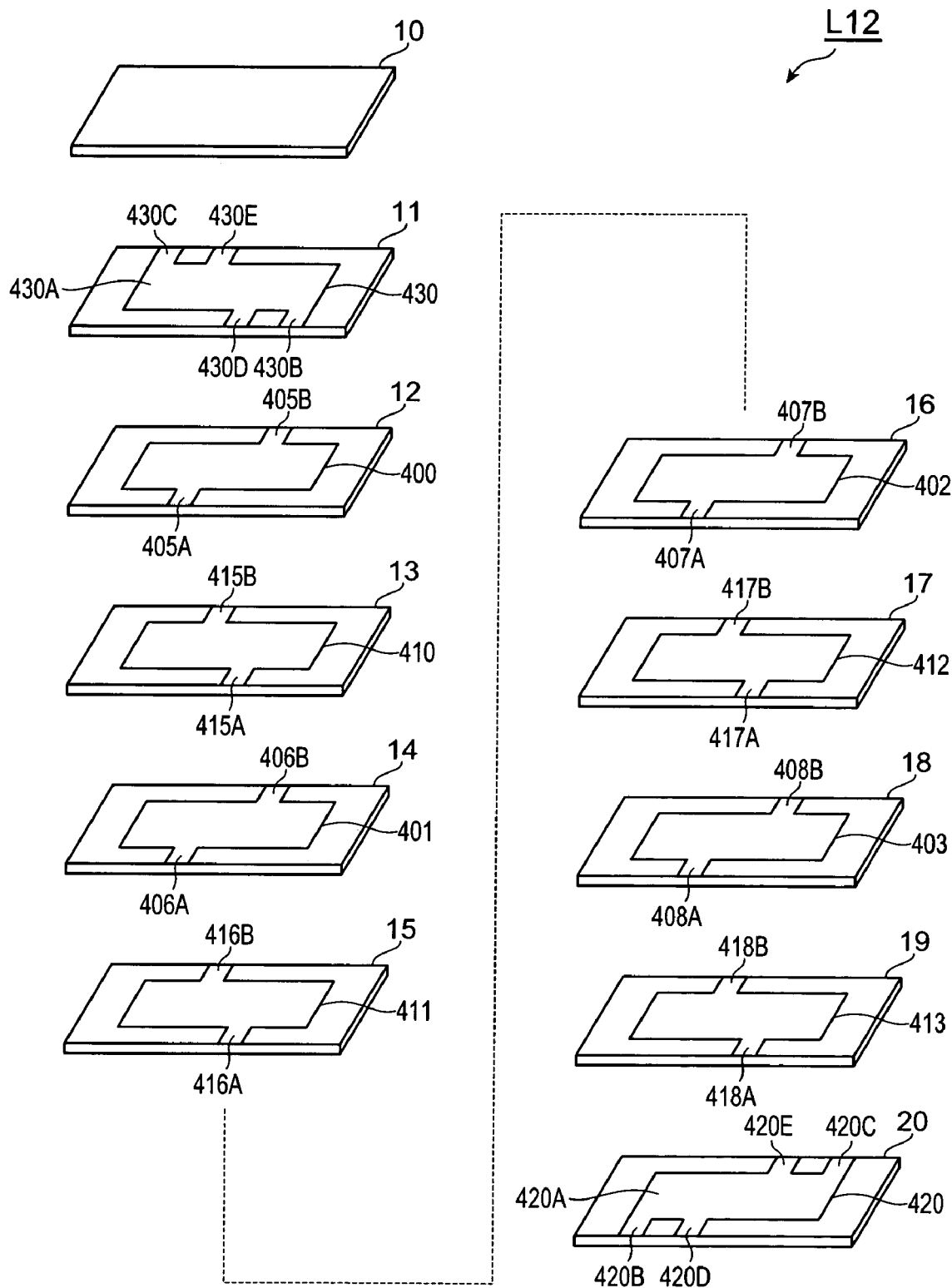
FIG. 10 is an exploded perspective view of the multilayer body included in the multilayer capacitor in accordance with the seventh embodiment.

With reference to FIGS. 9 and 10, the structure of the multilayer capacitor C12 in accordance with a seventh embodiment will be explained. The multilayer capacitor C12 in accordance with the seventh embodiment differs from the multilayer capacitor C10 in accordance with the first embodiment in terms of arrangement of outer conductors formed on the multilayer body. FIG. 9 is a perspective view of the multilayer capacitor in accordance with the seventh embodiment. FIG. 10 is an exploded perspective view of the multilayer body included in the multilayer capacitor in accordance with the seventh embodiment.

On a first side face L12a which is a side face extending longitudinally of faces L12c and L12d orthogonal to the laminating direction of the multilayer body L12 among side faces parallel to the laminating direction of the multilayer body L12, a first terminal conductor 3A, a first outer connecting conductor 5A, a second outer connecting conductor 6A, and a second terminal conductor 4A are formed in this order from the left side to right side in FIG. 9. Namely, the first outer connecting conductor 5A and second outer connecting conductor 6A are formed so as to be positioned between the first terminal conductor 3A and second terminal conductor 4A on the first side face L12a.

On a second side face L12b which is a side face extending longitudinally of the faces L12c and L12d orthogonal to the laminating direction of the multilayer body L12 among the side faces parallel to the laminating direction of the multilayer body L12, a second terminal conductor 4B, a second outer connecting conductor 6B, a first outer connecting conductor 5B, and a first terminal conductor 3B are formed in this order from the left side to right side in FIG. 9. Namely, the first outer connecting conductor 5B and second outer connecting conductor 6B are formed so as to be positioned between the first terminal conductor 3B and second terminal conductor 4B on the second side face L12b.

Therefore, the first terminal conductor 3A and first outer connecting conductor 5A are formed adjacent to each other on the same side face, i.e., first side face L12a, of the multilayer body L12. The first terminal conductor 3B and first outer connecting conductor 5B are formed adjacent to each other on the same side face, i.e., second side face L12b, of the multilayer body L12. The second terminal conductor 4A and second outer connecting conductor 6A are formed adjacent to each other on the same side face, i.e., first side face L12a, of the multilayer body L12. The second terminal conductor 4B and second outer connecting conductor 6B are formed adjacent to each other on the same side face, i.e., second side face L12b, of the multilayer body L12.

Each of pairs of the first terminal conductors 3A and 3B, the second terminal conductors 4A and 4B, the first outer connecting conductors 5A and 5B, the second outer connecting conductors 6A and 6B are symmetrical to each other about a center axis Ax12 passing respective center positions Pc, Pd of the two side faces L12c, L12d orthogonal to the laminating direction of the multilayer body L12 among center axes of the multilayer body L12. Each of pairs of the first terminal conductor 3A and second terminal conductor 4B, the first terminal conductor 3B and second terminal conductor 4A, the first outer connecting conductor 5A and second outer connecting conductor 6B, and the first outer connecting conductor 5B and second outer connecting conductors 6A oppose each other along a direction in which the first side face L12a and second side face L12b of the multilayer body L12 oppose each other.

As shown in FIG. 10, the multilayer body L12 is constructed by alternately laminating a plurality of (11 in this embodiment) dielectric layers 10 to 20 with a plurality of (4 each in this embodiment) first and second inner electrodes 400 to 403, 410 to 413. Further, one first inner connecting conductor 420 and one second inner connecting conductor 430 are laminated in the multilayer body L12.

Lead conductors 405A to 408A extend from their corresponding first inner electrodes 400 to 403 so as to reach the first side face L12a of the multilayer body L12. Lead conductors 405B to 408B extend from their corresponding first inner electrodes 400 to 403 so as to reach the second side face L12b of the multilayer body L12.

Lead conductors 415A to 418A extend from their corresponding second inner electrodes 410 to 413 so as to reach the first side face L12a of the multilayer body L12. Lead conductors 415B to 418B extend from their corresponding second inner electrodes 410 to 413 so as to reach the second side face L12b of the multilayer body L12.

The first inner connecting conductor 420 includes a first conductor portion 420A having an oblong form; second and fourth conductor portions 420B, 420D extending from the first conductor portion 420A so as to be led to the first side face L12a of the multilayer body L12; and third and fifth conductor portions 420C, 420E extending from the first conductor portion 420A so as to be led to the second side face L12b of the multilayer body L12.

The second inner connecting conductor 430 includes a first conductor portion 430A having an oblong form; second and fourth conductor portions 430B, 430D extending from the first conductor portion 430A so as to be led to the first side face L12a of the multilayer body L12; and third and fifth conductor portions 430C, 430E extending from the first conductor portion 430A so as to be led to the second side face L12b of the multilayer body L12.

In the multilayer capacitor C12, the first terminal conductors 3A, 3B are connected to the first inner electrodes 400 to 403 not directly but electrically through the first outer connecting conductors 5A, 5B and first inner connecting conductor 420. Also, in the multilayer capacitor C12, the second terminal conductors 4A, 4B are connected to the second inner electrodes 410 to 413 not directly but electrically through the second outer connecting conductors 6A, 6B and second inner connecting conductor 430. These allow the multilayer capacitor C12 to yield an equivalent series resistance greater than that of a conventional multilayer capacitor in which all the inner electrodes are connected to their corresponding terminal conductors through lead conductors.

By adjusting the number of first inner connecting conductor 420 directly connected to the first terminal conductors 3A, 3B and the number of second inner connecting conductor 430 directly connected to the second terminal conductors 4A, 4B in such a fashion, this embodiment sets the equivalent series resistance of the multilayer capacitor C12 to a desirable value, and thus can regulate the equivalent series resistance easily with a high precision. Since the equivalent series resistance is controlled by the first and second inner connecting conductors, the multilayer capacitor C12 can regulate the equivalent series resistance while attaining a desirable value (e.g., large value) of capacitance.

All of the first and second terminal conductors 3A, 3B, 4A, 4B and first and second outer connecting conductors 5A, 5B, 6A, 6B, which are outer conductors of the multilayer capacitor C12, are formed on the opposing first and second side faces L12a, L12b of the multilayer body L12. Consequently, the number of steps required for forming outer conductors can be made smaller in the multilayer capacitor C12 than in the case where terminal conductors are formed on four side faces of the multilayer body L12. Therefore, the multilayer capacitor C12 can be manufactured easily.

The first conductor portion 420A of the first inner connecting conductor 420 and the first conductor portion 430A of the second inner connecting conductor 430 oppose their corresponding inner electrodes with a dielectric layer in between respectively, and thus can contribute to forming a capacity component. Therefore, the multilayer capacitor C12 can further increase its capacitance.

Since a plurality of first and second inner electrodes 400 to 403, 410 to 413 are arranged between the first inner connecting conductor 420 and second inner connecting conductor 430 in the multilayer body L12 of the multilayer capacitor C12, the equivalent series resistance can be set with a favorable balance.

The multilayer capacitor C12 can lower the equivalent series inductance. A reason therefore can be considered as follows. Namely, when the multilayer capacitor C12 is mounted to a substrate or the like such that the first terminal conductors 3A, 3B and second terminal conductors 4A, 4B are directly connected to land patterns having respective polarities different from each other, a magnetic field caused by a current flowing between the first terminal conductor 3A and second terminal conductor 4B and a magnetic field caused by a current flowing between the first terminal conductor 3B and second terminal conductor 4A seem to cancel each other out, thereby lowering the equivalent series inductance.

In the multilayer capacitor C12, the first terminal conductors 3A, 3B and first outer connecting conductors 5A, 5B are formed adjacent to each other on the corresponding side faces L12a, L12b of the multilayer body L12. Also, in the multilayer capacitor C12, the second terminal conductors 4A, 4B and second outer connecting conductors 6A, 6B are formed adjacent to each other on the corresponding side faces L12a, L12b of the multilayer body L12. Therefore, when the multilayer capacitor C12 is mounted to a substrate or the like such that the terminal conductors 3A, 3B, 4A, 4B are directly connected to land patterns, whereas the outer connecting conductors 5A, 5B, 6A, 6B are not directly connected to land patterns, magnetic fields caused by currents flowing through the multilayer body L12 cancel each other out, thereby lowering the equivalent series inductance of the multilayer capacitor C12.

The multilayer capacitor C12 can be mounted easily because of positional relationships of the outer conductors 3A to 6A, 3B to 6B with the center axis Ax12, and positional relationships among the outer conductors 3A to 6A, 3B to 6B in the opposing direction of the first side face L12a and second side face L12b of the multilayer body L12.

Eighth Embodiment

Figure 11:
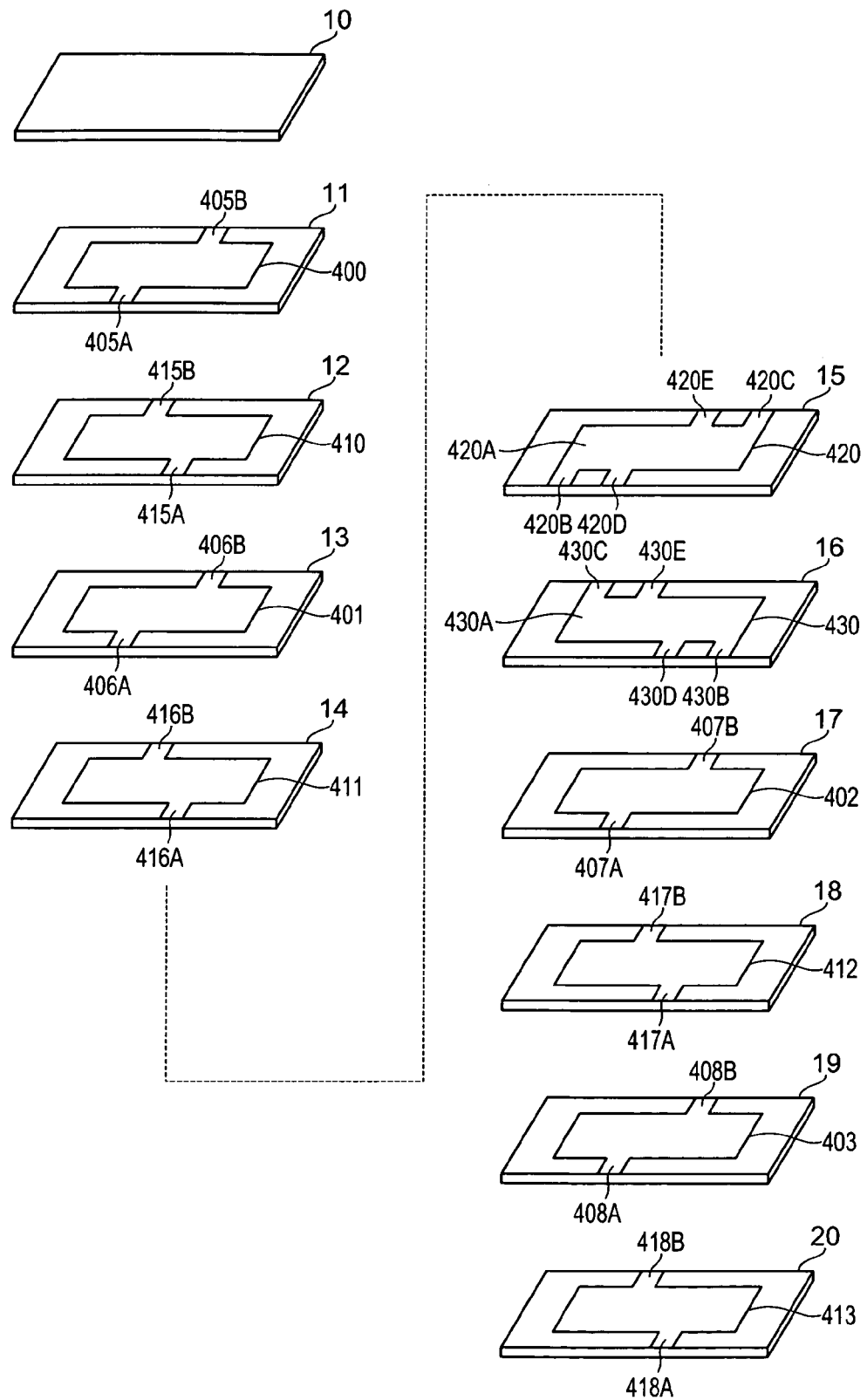
FIG. 11 is an exploded perspective view of the multilayer body included in the multilayer capacitor in accordance with an eighth embodiment.

With reference to FIG. 11, the structure of the multilayer capacitor in accordance with an eighth embodiment will be explained. The multilayer capacitor in accordance with the eighth embodiment differs from the multilayer capacitor C12 in accordance with the seventh embodiment in terms of positions of inner connecting conductors 420, 430 in the laminating direction. FIG. 11 is an exploded perspective view of the multilayer body included in the multilayer capacitor in accordance with the eighth Embodiment.

In the multilayer capacitor in accordance with the eighth embodiment, as shown in FIG. 11, one each of the first and second inner connecting conductors 420, 430 is laminated between two each of first and second inner electrodes 400, 401, 410, 411 and two each of first and second inner electrodes 402, 403, 412, 413. More specifically, the first inner connecting conductor 420 is positioned so as to be held between dielectric layers 14 and 15. The second inner connecting conductor 430 is positioned so as to be held between dielectric layers 15 and 16.

In the multilayer capacitor in accordance with the eighth embodiment, terminal conductors 3A, 3B, 4A, 4B are connected to the inner electrodes 400 to 403, 410 to 413 not directly but electrically through the outer connecting conductors 5A, 5B, 6A, 6B and the inner connecting conductors 420, 430. Therefore, the multilayer capacitor in accordance with the eighth embodiment can yield an equivalent series resistance greater than that of a conventional multilayer capacitor in which all the inner electrodes are connected to their corresponding terminal conductors through lead conductors.

When the first terminal conductors 3A, 3B are concerned, the multilayer capacitor in accordance with the eighth embodiment differs from the multilayer capacitor C12 in accordance with the seventh embodiment in terms of the position of the first inner connecting conductor 420 and, consequently, in terms of how the respective resistance components of the first outer connecting conductors 5A, 5B are connected to the respective first terminal conductors 3A, 3B. Also, when the second terminal conductors 4A, 4B are concerned, the multilayer capacitor in accordance with the eighth embodiment differs from the multilayer capacitor C12 in accordance with the seventh embodiment in terms of the position of the second inner connecting conductor 430 and, consequently, in terms of how the respective resistance components of the second outer connecting conductors 6A, 6B are connected to the respective second terminal conductors 4A, 4B.

Because of the difference in resistance components of the first and second outer connecting conductors 5A, 5B, 6A, 6B, the multilayer capacitor in accordance with the eighth embodiment yields an equivalent series resistance smaller than that in the multilayer capacitor C12 in accordance with the seventh embodiment.

By adjusting positions of the first inner connecting conductors 420, 430 in the laminating direction as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors 420, 430, the multilayer capacitor in accordance with the eighth embodiment can regulate the equivalent series resistance while attaining a desirable value (e.g., large value) of capacitance.

The first conductor portion 420A of the first inner connecting conductor 420 and the first conductor portion 430A of the second inner connecting conductor 430 oppose their corresponding inner electrodes with a dielectric layer in between respectively, and thus can contribute to forming a capacity component. Therefore, the multilayer capacitor in accordance with the eighth embodiment can further increase its capacitance.

Since the outer conductors are arranged such as in the multilayer capacitor C12, the multilayer capacitor in accordance with the eighth embodiment can be manufactured easily as with the multilayer capacitor C12. The multilayer capacitor in accordance with the eighth embodiment can lower the equivalent series inductance as with the multilayer capacitor C12. Also, the multilayer capacitor in accordance with the eighth embodiment can be mounted easily as with the multilayer capacitor C12.

Ninth Embodiment

Figure 12:
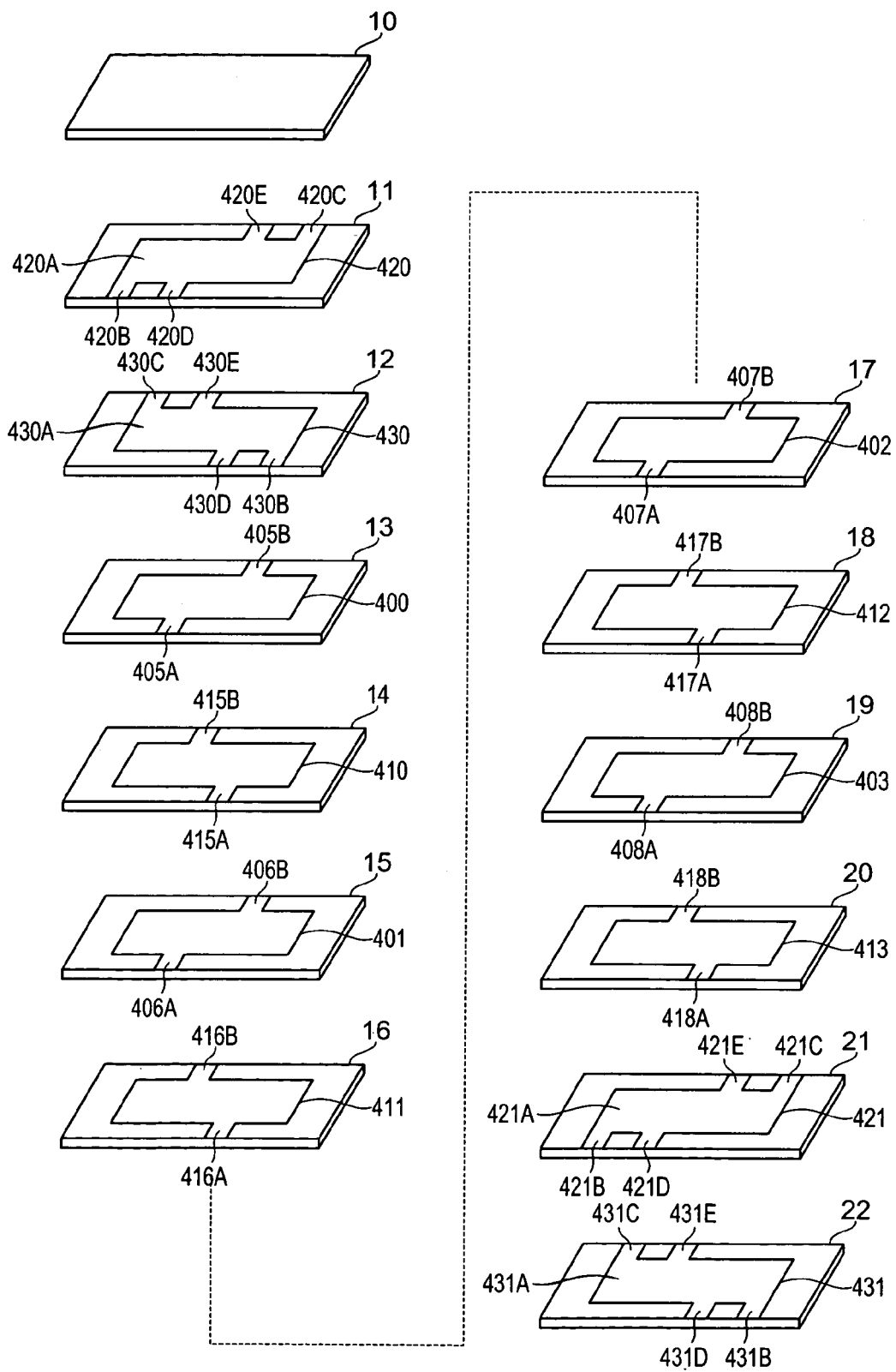
FIG. 12 is an exploded perspective view of the multilayer body included in the multilayer capacitor in accordance with a ninth embodiment.

With reference to FIG. 12, the structure of the multilayer capacitor in accordance with a ninth embodiment will be explained. The multilayer capacitor in accordance with the ninth embodiment differs from the multilayer capacitor C12 in accordance with the seventh embodiment in terms of the number of first and second inner connecting conductors. FIG. 12 is an exploded perspective view of the multilayer body included in the multilayer capacitor in accordance with the ninth embodiment.

As shown in FIG. 12, the multilayer body of the multilayer capacitor in accordance with the ninth embodiment is constructed by alternately laminating a plurality of (13 in this embodiment) dielectric layers 10 to 22 and a plurality of (4 each in this embodiment) first and second inner electrodes 400 to 403, 410 to 413.

In the multilayer body of the multilayer capacitor in accordance with the ninth embodiment, a plurality of (2 in this embodiment) first inner connecting conductors 420, 421 and a plurality of (2 in this embodiment) second inner connecting conductors 430, 431 are laminated. In the multilayer body of the multilayer capacitor in accordance with the ninth embodiment, the first inner electrodes 400 to 403 and second inner electrodes 410 to 413 are arranged between the first and second inner connecting conductors 420, 430 and the first and second inner connecting conductors 421, 431.

The first inner connecting conductor 420 is positioned so as to be held between the dielectric layers 10 and 11, whereas the first inner connecting conductor 421 is positioned so as to be held between the dielectric layers 20 and 21. The second inner connecting conductor 430 is positioned so as to be held between the dielectric layers 11 and 12, whereas the second inner connecting conductor 431 is positioned so as to be held between the dielectric layers 21 and 22.

In the multilayer capacitor in accordance with the ninth embodiment, terminal conductors 3A, 3B, 4A, 4B are connected to the inner electrodes 400 to 403, 410 to 413 not directly but electrically through outer connecting conductors 5A, 5B, 6A, 6B and the inner connecting conductors 420, 421, 430, 431. Therefore, the multilayer capacitor in accordance with the ninth embodiment yields an equivalent series resistance greater than that of a conventional multilayer capacitor in which all the inner electrodes are connected to their corresponding terminal conductors through lead conductors.

The number of first inner connecting conductors 420, 421 and second inner connecting conductors 430, 431 is greater in the multilayer capacitor in the ninth embodiment than in the multilayer capacitor C12, whereas the inner connecting conductors 420, 421, 430, 431 are connected in parallel to their corresponding terminal conductors 3A, 3B, 4A, 4B. Since the number of inner connecting conductors 420, 421, 430, 431 is greater, the number of current paths between the terminal conductors 3A, 3B, 4A, 4B and inner electrodes 400 to 403, 410 to 413 increases. Therefore, the multilayer capacitor in accordance with the ninth embodiment yields an equivalent series resistance smaller than that of the multilayer capacitor C12.

By adjusting the number of first inner connecting conductors 420, 421 and the number of second inner connecting conductors 430, 431 as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors, the multilayer capacitor in accordance with the ninth embodiment can regulate the equivalent series resistance while attaining a desirable value (e.g., large value) of capacitance.

The first conductor portion 421A of the first inner connecting conductor 421 and the first conductor portion 430A of the second inner connecting conductor 430 oppose their corresponding inner electrodes with a dielectric layer in between respectively, and thus can contribute to forming a capacity component. Therefore, the multilayer capacitor in accordance with the ninth embodiment can further increase its capacitance.

In the multilayer body of the multilayer capacitor in accordance with the ninth embodiment, a plurality of first and second inner electrodes 400 to 403, 410 to 413 are arranged between the first and second inner connecting conductors 420, 430 and the first and second inner connecting conductors 421, 431. Therefore, the multilayer capacitor in accordance with the ninth embodiment can set the equivalent series resistance with a favorable balance.

Since the outer conductors are arranged as in the multilayer capacitor C12, the multilayer capacitor in accordance with the ninth embodiment can be manufactured easily as with the multilayer capacitor C12. The multilayer capacitor in accordance with the ninth embodiment can lower the equivalent series inductance as with the multilayer capacitor C12. Also, the multilayer capacitor in accordance with the ninth embodiment can be mounted easily as with the multilayer capacitor C12.

Tenth Embodiment

Figure 13:
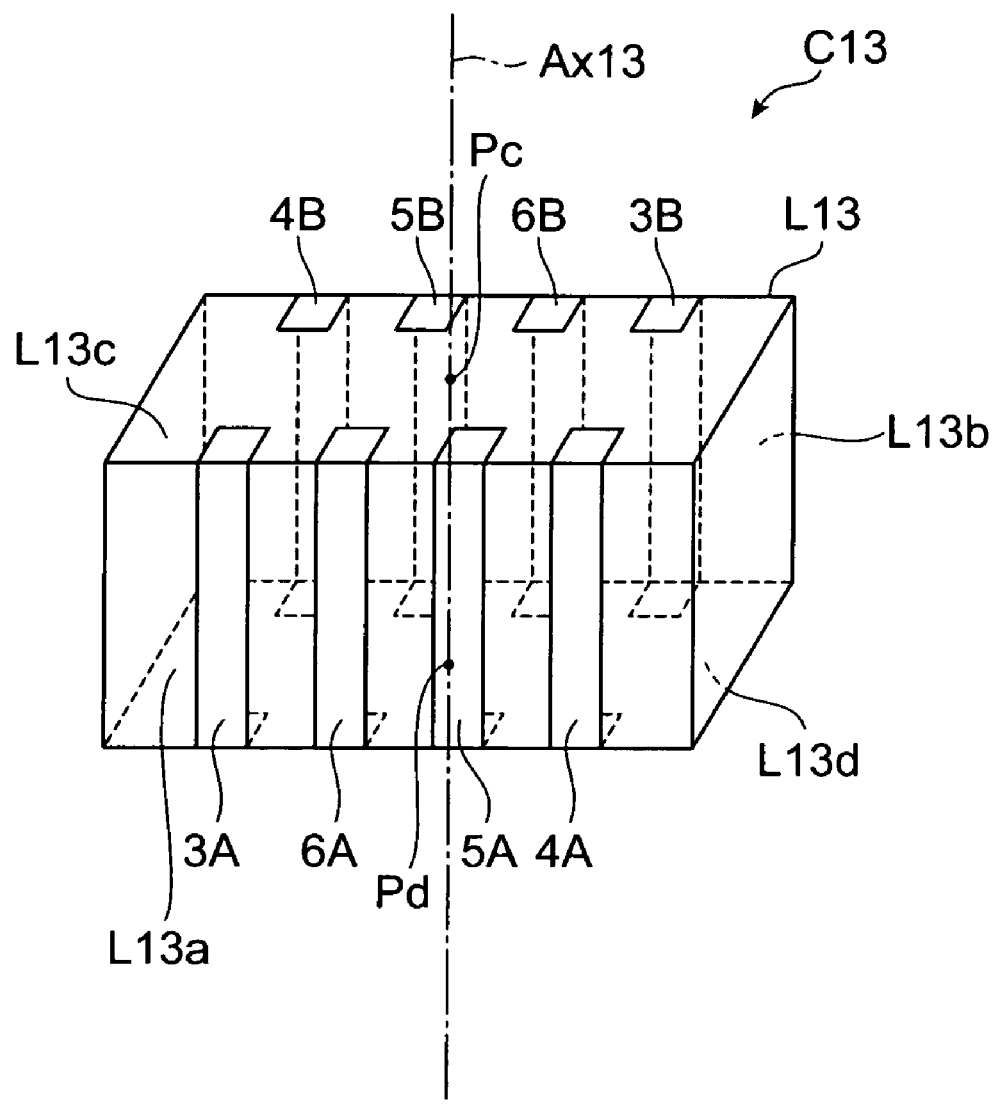
FIG. 13 is a perspective view of the multilayer capacitor in accordance with a tenth embodiment.
Figure 14:
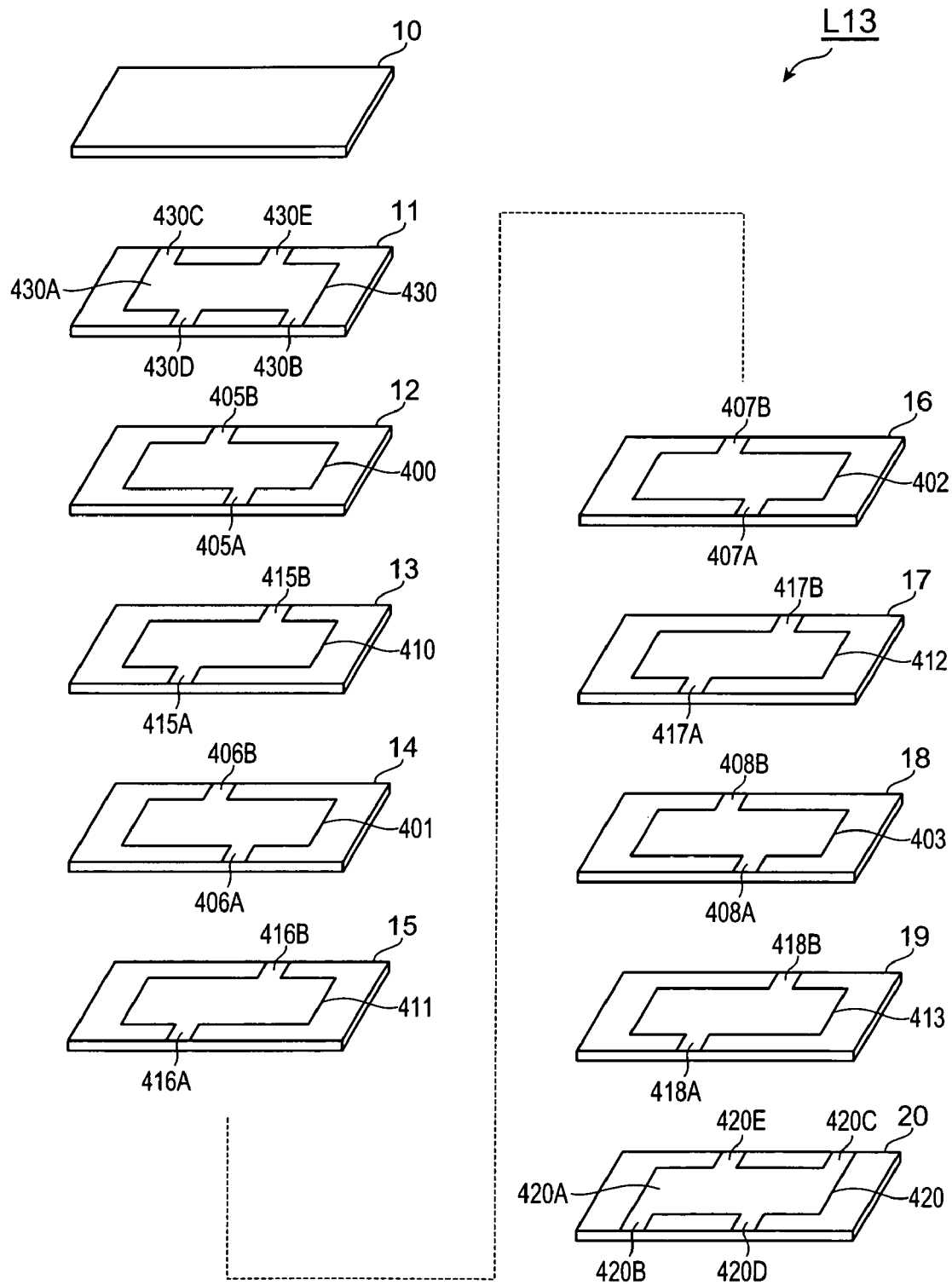
FIG. 14 is an exploded perspective view of the multilayer body included in the multilayer capacitor in accordance with the tenth embodiment.

With reference to FIGS. 13 and 14, the structure of the multilayer capacitor C13 in accordance with a tenth embodiment will be explained. The multilayer capacitor C13 in accordance with the tenth embodiment differs from the multilayer capacitor C10 in accordance with the first embodiment in terms of arrangement of outer conductors formed on the multilayer body. FIG. 13 is a perspective view of the multilayer capacitor in accordance with the tenth embodiment. FIG. 14 is an exploded perspective view of the multilayer body included in the multilayer capacitor in accordance with the tenth embodiment.

On a first side face L13$a$ which is a side face extending longitudinally of faces L13$c$ and L13$d$ orthogonal to the laminating direction of the multilayer body L13 among side faces parallel to the laminating direction of the multilayer body L13, a first terminal conductor 3A, a second outer connecting conductor 6A, a first outer connecting conductor 5A, and a second terminal conductor 4A are formed in this order from the left side to right side in FIG. 13. Namely, the first outer connecting conductor 5A and second outer connecting conductor 6A are formed so as to be positioned between the first terminal conductor 3A and second terminal conductor 4A on the first side face L13$a$.

On a second side face L13$b$ which is a side face extending longitudinally of the faces L13$c$ and L13$d$ orthogonal to the laminating direction of the multilayer body L13 among the side faces parallel to the laminating direction of the multilayer body L13, a second terminal conductor 4B, a first outer connecting conductor 5B, a second outer connecting conductor 6B, and a first terminal conductor 3B are formed in this order from the left side to right side in FIG. 13. Namely, the first outer connecting conductor 5B and second outer connecting conductor 6B are formed so as to be positioned between the first terminal conductor 3B and second terminal conductor 4B on the second side face L13$b$.

Each of pairs of the first terminal conductors 3A and 3B, the second terminal conductors 4A and 4B, the first outer connecting conductors 5A and 5B, and the second outer connecting conductors 6A and 6B are symmetrical to each other about a center axis Ax13 passing respective center positions Pc, Pd of the two side faces L13$c$, L13$d$ orthogonal to the laminating direction of the multilayer body L13 among center axes of the multilayer body L13. Each of pairs of the first terminal conductor 3A and second terminal conductor 4B, the first terminal conductor 3B and second terminal conductor 4A, the first outer connecting conductor 5A and second outer connecting conductor 6B, and the first outer connecting conductor 5B and second outer connecting conductors 6A oppose each other along a direction in which the first side face L13$a$ and second side face L13$b$ of the multilayer body L13 oppose each other.

As shown in FIG. 14, the multilayer body L13 is constructed by alternately laminating a plurality of (11 in this embodiment) dielectric layers 10 to 20 with a plurality of (4 each in this embodiment) first and second inner electrodes 400 to 403, 410 to 413. Further, one first inner connecting conductor 420 and one second inner connecting conductor 430 are laminated in the multilayer body L13.

Lead conductors 405A to 408A extend from their corresponding first inner electrodes 400 to 403 so as to reach the first side face L13a of the multilayer body L13. Lead conductors 405B to 408B extend from their corresponding first inner electrodes 400 to 403 so as to reach the second side face L13b of the multilayer body L13.

Lead conductors 415A to 418A extend from their corresponding second inner electrodes 410 to 413 so as to reach the first side face L13a of the multilayer body L13. Lead conductors 415B to 418B extend from their corresponding second inner electrodes 410 to 413 so as to reach the second side face L13b of the multilayer body L13.

The first inner connecting conductor 420 includes a first conductor portion 420A having an oblong form; second and fourth conductor portions 420B, 420D extending from the first conductor portion 420A so as to be led to the first side face L13a of the multilayer body L13; and third and fifth conductor portions 420C, 420E extending from the first conductor portion 420A so as to be led to the second side face L13b of the multilayer body L13.

The second inner connecting conductor 430 includes a first conductor portion 430A having an oblong form; second and fourth conductor portions 430B, 430D extending from the first conductor portion 430A so as to be led to the first side face L13a of the multilayer body L13; and third and fifth conductor portions 430C, 430E extending from the first conductor portion 430A so as to be led to the second side face L13b of the multilayer body L13.

In the multilayer capacitor C13, the first terminal conductors 3A, 3B are connected to the first inner electrodes 400 to 403 not directly but electrically through the first outer connecting conductors 5A, 5B and first inner connecting conductor 420. Also, in the multilayer capacitor C13, the second terminal conductors 4A, 4B are connected to the second inner electrodes 410 to 413 not directly but electrically through the second outer connecting conductors 6A, 6B and second inner connecting conductor 430. These allow the multilayer capacitor C13 to yield an equivalent series resistance greater than that of a conventional multilayer capacitor in which all the inner electrodes are connected to their corresponding terminal conductors through lead conductors.

By adjusting the number of first inner connecting conductor 420 directly connected to the first terminal conductors 3A, 3B and the number of second inner connecting conductor 430 directly connected to the second terminal conductors 4A, 4B in such a fashion, this embodiment sets the equivalent series resistance of the multilayer capacitor C13 to a desirable value, and thus can regulate the equivalent series resistance easily with a high precision. Since the equivalent series resistance is controlled by the first and second inner connecting conductors, the multilayer capacitor C13 can regulate the equivalent series resistance while attaining a desirable value (e.g., large value) of capacitance.

All of the first and second terminal conductors 3A, 3B, 4A, 4B and first and second outer connecting conductors 5A, 5B, 6A, 6B, which are outer conductors of the multilayer capacitor C13, are formed on the opposing first and second side faces L13a, L13b of the multilayer body L13. Consequently, the number of steps required for forming outer conductors can be made smaller in the multilayer capacitor C13 than in the case where terminal conductors are formed on four side faces of the multilayer body L13. Therefore, the multilayer capacitor C13 can be manufactured easily.

The first conductor portion 420A of the first inner connecting conductor 420 and the first conductor portion 430A of the second inner connecting conductor 430 oppose their corresponding inner electrodes with a dielectric layer in between respectively, and thus can contribute to forming a capacity component. Therefore, the multilayer capacitor C13 can further increase its capacitance.

Since a plurality of first and second inner electrodes 400 to 403, 410 to 413 are arranged between the first inner connecting conductor 420 and second inner connecting conductor 430 in the multilayer body L13 of the multilayer capacitor C13, the equivalent series resistance can be set with a favorable balance.

The multilayer capacitor C13 can lower the equivalent series inductance. A reason therefore can be considered as follows. Namely, when the multilayer capacitor C13 is mounted to a substrate or the like such that the first terminal conductors 3A, 3B and second terminal conductors 4A, 4B are directly connected to land patterns having respective polarities different from each other, a magnetic field caused by a current flowing between the first terminal conductor 3A and second terminal conductor 4B and a magnetic field caused by a current flowing between the first terminal conductor 3B and second terminal conductor 4A seem to cancel each other out, thereby lowering the equivalent series inductance.

The multilayer capacitor C13 can be mounted easily because of positional relationships of the outer conductors 3A to 6A, 3B to 6B with the center axis Ax13, and positional relationships among the outer conductors 3A to 6A, 3B to 6B in the opposing direction of the first side face L13a and second side face L13b of the multilayer body L13.

Eleventh Embodiment

Figure 15:
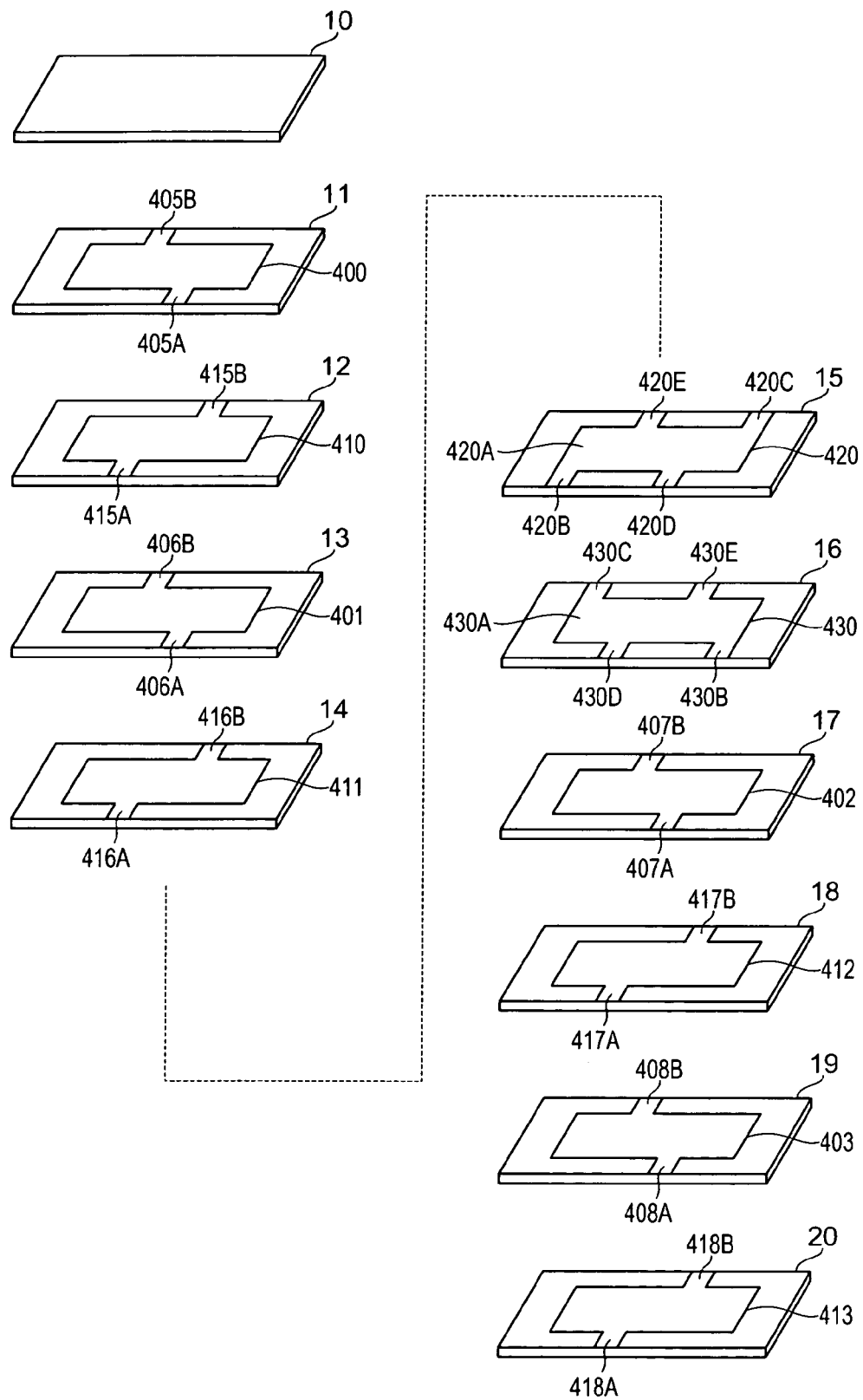
FIG. 15 is an exploded perspective view of the multilayer body included in the multilayer capacitor in accordance with an eleventh embodiment.

With reference to FIG. 15, the structure of the multilayer capacitor in accordance with an eleventh embodiment will be explained. The multilayer capacitor in accordance with the eleventh embodiment differs from the multilayer capacitor C13 in accordance with the tenth embodiment in terms of positions of inner connecting conductors 420, 430 in the laminating direction. FIG. 15 is an exploded perspective view of the multilayer body included in the multilayer capacitor in accordance with the eleventh embodiment.

In the multilayer capacitor in accordance with the eleventh embodiment, as shown in FIG. 15, one each of the first and second inner connecting conductors 420, 430 is laminated between two each of first and second inner electrodes 400, 401, 410, 411 and two each of first and second inner electrodes 402, 403, 412, 413. More specifically, the first inner connecting conductor 420 is positioned so as to be held between dielectric layers 14 and 15. The second inner connecting conductor 430 is positioned so as to be held between dielectric layers 15 and 16.

In the multilayer capacitor in accordance with the eleventh embodiment, terminal conductors 3A, 3B, 4A, 4B are connected to the inner electrodes 400 to 403, 410 to 413 not directly but electrically through the outer connecting conductors 5A, 5B, 6A, 6B and the inner connecting conductors 420, 430. Therefore, the multilayer capacitor in accordance with the eleventh embodiment can yield an equivalent series resistance greater than that of a conventional multilayer capacitor in which all the inner electrodes are connected to their corresponding terminal conductors through lead conductors.

When the first terminal conductors 3A, 3B are concerned, the multilayer capacitor in accordance with the eleventh embodiment differs from the multilayer capacitor C13 in accordance with the tenth embodiment in terms of the position of the first inner connecting conductor 420 and, consequently, in terms of how the respective resistance components of the first outer connecting conductors 5A, 5B are connected to the respective first terminal conductors 3A, 3B. Also, when the second terminal conductors 4A, 4B are concerned, the multilayer capacitor in accordance with the eleventh embodiment differs from the multilayer capacitor C13 in accordance with the tenth embodiment in terms of the position of the second inner connecting conductor 430 and, consequently, in terms of how the respective resistance components of the second outer connecting conductors 6A, 6B are connected to the respective second terminal conductors 4A, 4B.

Because of the difference in resistance components of the first and second outer connecting conductors 5A, 5B, 6A, 6B, the multilayer capacitor in accordance with the eleventh embodiment yields an equivalent series resistance smaller than that in the multilayer capacitor C13 in accordance with the tenth embodiment.

By adjusting positions of the first inner connecting conductors 420, 430 in the laminating direction as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors 420, 430, the multilayer capacitor in accordance with the eleventh embodiment can regulate the equivalent series resistance while attaining a desirable value (e.g., large value) of capacitance.

The first conductor portion 420A of the first inner connecting conductor 420 and the first conductor portion 430A of the second inner connecting conductor 430 oppose their corresponding inner electrodes with a dielectric layer in between respectively, and thus can contribute to forming a capacity component. Therefore, the multilayer capacitor in accordance with the eleventh embodiment can further increase its capacitance.

Since the outer conductors are arranged such as in the multilayer capacitor C13, the multilayer capacitor in accordance with the eleventh embodiment can be manufactured easily as with the multilayer capacitor C13. The multilayer capacitor in accordance with the eleventh embodiment can lower the equivalent series inductance as with the multilayer capacitor C13. Also, the multilayer capacitor in accordance with the eleventh embodiment can be mounted easily as with the multilayer capacitor C13.

Twelfth Embodiment

Figure 16:
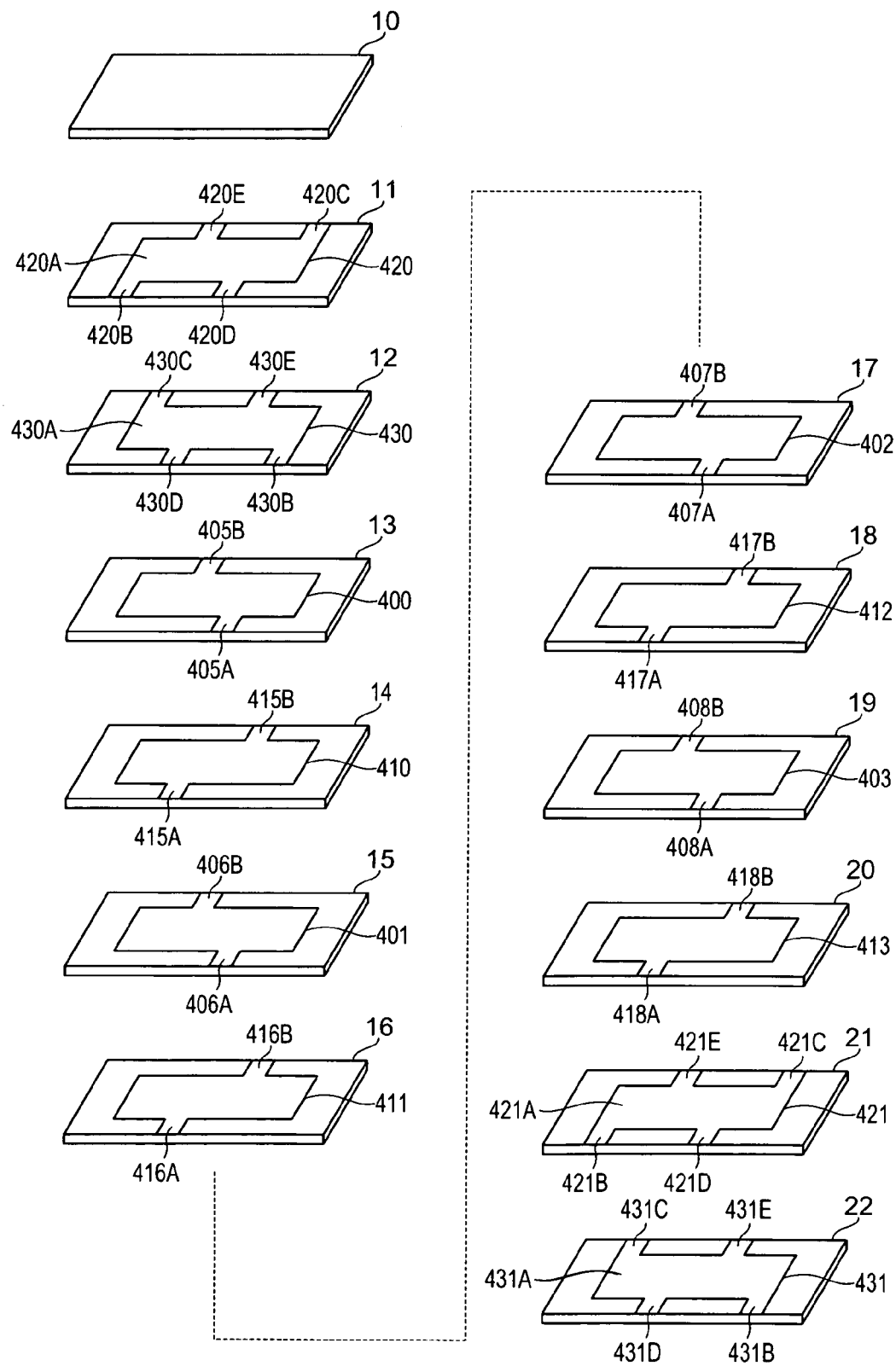
FIG. 16 is an exploded perspective view of the multilayer body included in the multilayer capacitor in accordance with a twelfth embodiment.

With reference to FIG. 16, the structure of the multilayer capacitor in accordance with a twelfth embodiment will be explained. The multilayer capacitor in accordance with the twelfth embodiment differs from the multilayer capacitor C13 in accordance with the tenth embodiment in terms of the number of first and second inner connecting conductors. FIG. 16 is an exploded perspective view of the multilayer body included in the multilayer capacitor in accordance with the twelfth embodiment.

As shown in FIG. 16, the multilayer body of the multilayer capacitor in accordance with the twelfth embodiment is constructed by alternately laminating a plurality of (13 in this embodiment) dielectric layers 10 to 22 and a plurality of (4 each in this embodiment) first and second inner electrodes 400 to 403, 410 to 413.

In the multilayer body of the multilayer capacitor in accordance with the twelfth embodiment, a plurality of (2 in this embodiment) first inner connecting conductors 420, 421 and a plurality of (2 in this embodiment) second inner connecting conductors 430, 431 are laminated. In the multilayer body of the multilayer capacitor in accordance with the twelfth embodiment, the first inner electrodes 400 to 403 and second inner electrodes 410 to 413 are arranged between the first and second inner connecting conductors 420, 430 and the first and second inner connecting conductors 421, 431.

The first inner connecting conductor 420 is positioned so as to be held between the dielectric layers 10 and 11, whereas the first inner connecting conductor 421 is positioned so as to be held between the dielectric layers 20 and 21. The second inner connecting conductor 430 is positioned so as to be held between the dielectric layers 11 and 12, whereas the second inner connecting conductor 431 is positioned so as to be held between the dielectric layers 21 and 22.

In the multilayer capacitor in accordance with the twelfth embodiment, terminal conductors 3A, 3B, 4A, 4B are connected to the inner electrodes 400 to 403, 410 to 413 not directly but electrically through outer connecting conductors 5A, 5B, 6A, 6B and the inner connecting conductors 420, 421, 430, 431. Therefore, the multilayer capacitor in accordance with the twelfth embodiment yields an equivalent series resistance greater than that of a conventional multilayer capacitor in which all the inner electrodes are connected to their corresponding terminal conductors through lead conductors.

The number of first inner connecting conductors 420, 421 and second inner connecting conductors 430, 431 is greater in the multilayer capacitor in the twelfth embodiment than in the multilayer capacitor C13, whereas the inner connecting conductors 420, 421, 430, 431 are connected in parallel to their corresponding terminal conductors 3A, 3B, 4A, 4B. Since the number of inner connecting conductors 420, 421, 430, 431 is greater, the number of current paths between the terminal conductors 3A, 3B, 4A, 4B and inner electrodes 400 to 403, 410 to 413 increases. Therefore, the multilayer capacitor in accordance with the twelfth embodiment yields an equivalent series resistance smaller than that of the multilayer capacitor C13.

By adjusting the number of first inner connecting conductors 420, 421 and the number of second inner connecting conductors 430, 431 as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors, the multilayer capacitor in accordance with the twelfth embodiment can regulate the equivalent series resistance while attaining a desirable value (e.g., large value) of capacitance.

The first conductor portion 421A of the first inner connecting conductor 421 and the first conductor portion 430A of the second inner connecting conductor 430 oppose their corresponding inner electrodes with a dielectric layer in between respectively, and thus can contribute to forming a capacity component. Therefore, the multilayer capacitor in accordance with the twelfth embodiment can further increase its capacitance.

In the multilayer body of the multilayer capacitor in accordance with the twelfth embodiment, a plurality of first and second inner electrodes 400 to 403, 410 to 413 are arranged between the first and second inner connecting conductors 420, 430 and the first and second inner connecting conductors 421, 431. Therefore, the multilayer capacitor in accordance with the twelfth embodiment can set the equivalent series resistance with a favorable balance.

Since the outer conductors are arranged as in the multilayer capacitor C13, the multilayer capacitor in accordance with the twelfth embodiment can be manufactured easily as with the multilayer capacitor C13. The multilayer capacitor in accordance with the twelfth embodiment can lower the equivalent series inductance as with the multilayer capacitor C13. Also, the multilayer capacitor in accordance with the twelfth embodiment can be mounted easily as with the multilayer capacitor C13.

Thirteenth Embodiment

Figure 17:
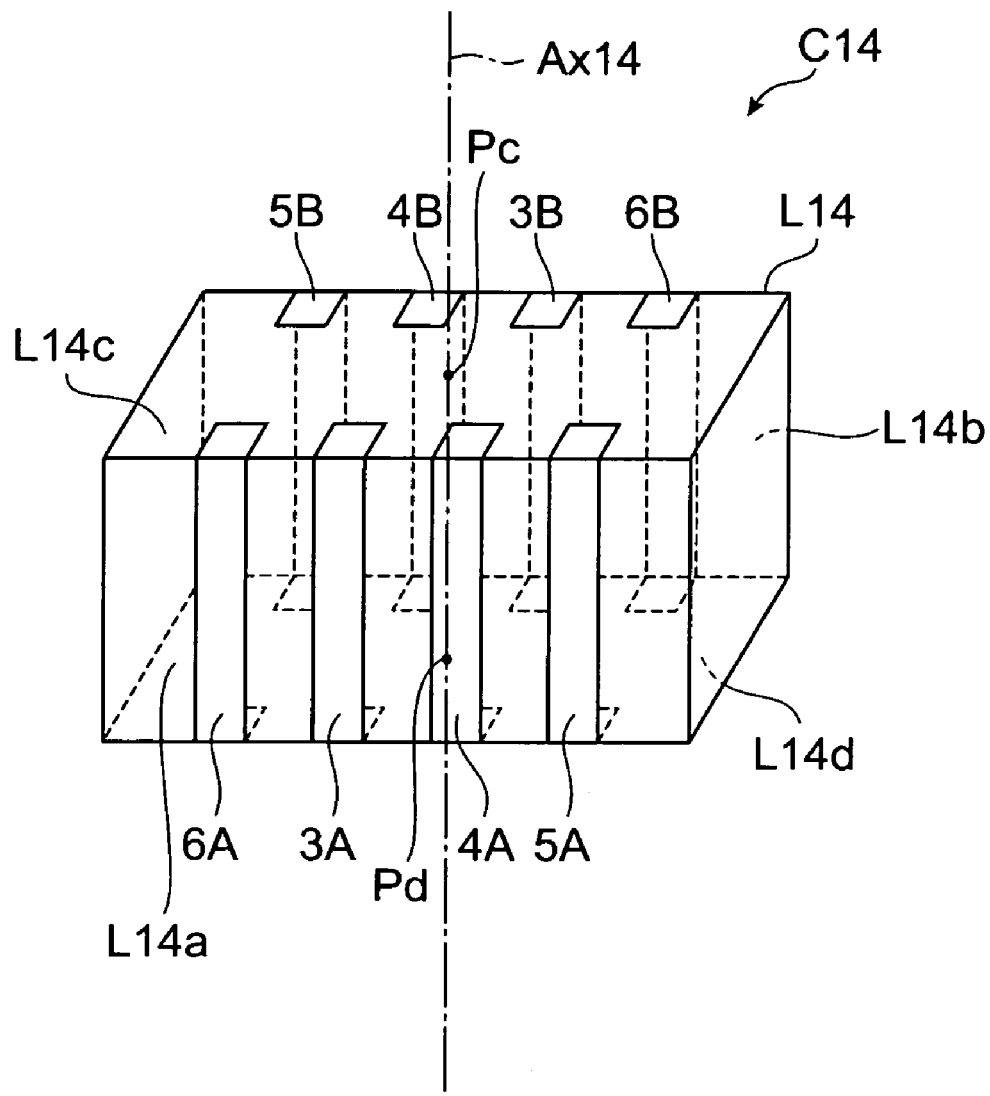
FIG. 17 is a perspective view of the multilayer capacitor in accordance with a thirteenth embodiment.
Figure 18:
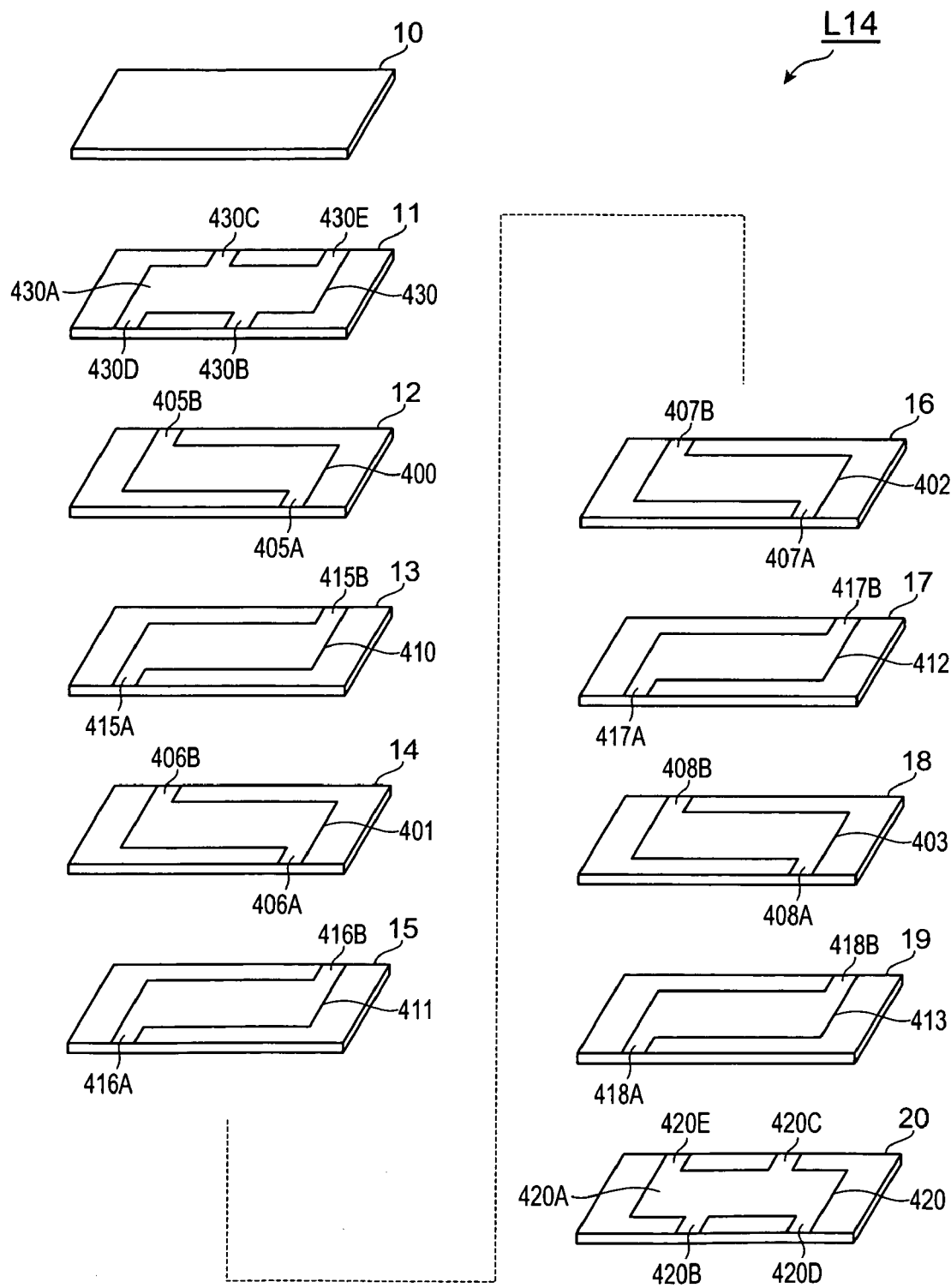
FIG. 18 is an exploded perspective view of the multilayer body included in the multilayer capacitor in accordance with the thirteenth embodiment.

With reference to FIGS. 17 and 18, the structure of the multilayer capacitor C14 in accordance with a thirteenth embodiment will be explained. The multilayer capacitor C14 in accordance with the thirteenth embodiment differs from the multilayer capacitor C10 in accordance with the first embodiment in terms of arrangement of outer conductors formed on the multilayer body. FIG. 17 is a perspective view of the multilayer capacitor in accordance with the thirteenth embodiment. FIG. 18 is an exploded perspective view of the multilayer body included in the multilayer capacitor in accordance with the thirteenth embodiment.

On a first side face L14a which is a side face extending longitudinally of faces L14c and L14d orthogonal to the laminating direction of the multilayer body L14 among side faces parallel to the laminating direction of the multilayer body L14, a second outer connecting conductor 6A, a first terminal conductor 3A, a second terminal conductor 4A, and a first outer connecting conductor 5A are formed in this order from the left side to right side in FIG. 17.

On a second side face L14b which opposes the first side face L14a and which is a side face extending longitudinally of the faces L14c and L14d orthogonal to the laminating direction of the multilayer body L14 among the side faces parallel to the laminating direction of the multilayer body L14, a first outer connecting conductor 5B, a second terminal conductor 4B, a first terminal conductor 3B and a second outer connecting conductor 6B are formed in this order from the left side to right side in FIG. 17.

Each of pairs of the first terminal conductors 3A and 3B, the second terminal conductors 4A and 4B, the first outer connecting conductors 5A and 5B, and the second outer connecting conductors 6A and 6B are symmetrical to each other about a center axis Ax14 passing respective center positions Pc, Pd of the two side faces L14c, L14d orthogonal to the laminating direction of the multilayer body L14 among center axes of the multilayer body L14. Each of pairs of the first terminal conductor 3A and second terminal conductor 4B, the first terminal conductor 3B and second terminal conductor 4A, the first outer connecting conductor 5A and second outer connecting conductor 6B, and the first outer connecting conductor 5B and second outer connecting conductor 6A oppose each other along a direction in which the first side face L14a and second side face L14b of the multilayer body L14 oppose each other.

As shown in FIG. 18, the multilayer body L14 is constructed by alternately laminating a plurality of (11 in this embodiment) dielectric layers 10 to 20 with a plurality of (4 each in this embodiment) first and second inner electrodes 400 to 403, 410 to 413. Further, one first inner connecting conductor 420 and one second inner connecting conductor 430 are laminated in the multilayer body L14.

Lead conductors 405A to 408A extend from their corresponding first inner electrodes 400 to 403 so as to reach the first side face L14a of the multilayer body L14. Lead conductors 405B to 408B extend from their corresponding first inner electrodes 400 to 403 so as to reach the second side face L14b of the multilayer body L14.

Lead conductors 415A to 418A extend from their corresponding second inner electrodes 410 to 413 so as to reach the first side face L14a of the multilayer body L14. Lead conductors 415B to 418B extend from their corresponding second inner electrodes 410 to 413 so as to reach the second side face L14b of the multilayer body L14.

The first inner connecting conductor 420 includes a first conductor portion 420A having an oblong form; second and fourth conductor portions 420B, 420D extending from the first conductor portion 420A so as to be led to the first side face L14a of the multilayer body L14; and third and fifth conductor portions 420C, 420E extending from the first conductor portion 420A so as to be led to the second side face L14b of the multilayer body L14.

The second inner connecting conductor 430 includes a first conductor portion 430A having an oblong form; second and fourth conductor portions 430B, 430D extending from the first conductor portion 430A so as to be led to the first side face L14a of the multilayer body L14; and third and fifth conductor portions 430C, 430E extending from the first conductor portion 430A so as to be led to the second side face L14b of the multilayer body L14.

In the multilayer capacitor C14, the first terminal conductors 3A, 3B are connected to the first inner electrodes 400 to 403 not directly but electrically through the first outer connecting conductors 5A, 5B and first inner connecting conductor 420. Also, in the multilayer capacitor C14, the second terminal conductors 4A, 4B are connected to the second inner electrodes 410 to 413 not directly but electrically through the second outer connecting conductors 6A, 6B and second inner connecting conductor 430. These allow the multilayer capacitor C14 to yield an equivalent series resistance greater than that of a conventional multilayer capacitor in which all the inner electrodes are connected to their corresponding terminal conductors through lead conductors.

By adjusting the number of first inner connecting conductor 420 directly connected to the first terminal conductors 3A, 3B and the number of second inner connecting conductor 430 directly connected to the second terminal conductors 4A, 4B in such a fashion, this embodiment sets the equivalent series resistance of the multilayer capacitor C14 to a desirable value, and thus can regulate the equivalent series resistance easily with a high precision. Since the equivalent series resistance is controlled by the first and second inner connecting conductors, the multilayer capacitor C14 can regulate the equivalent series resistance while attaining a desirable value (e.g., large value) of capacitance.

All of the first and second terminal conductors 3A, 3B, 4A, 4B and first and second outer connecting conductors 5A, 5B, 6A, 6B, which are outer conductors of the multilayer capacitor C14, are formed on the opposing first and second side faces L14a, L14b of the multilayer body L14. Consequently, the number of steps required for forming outer conductors can be made smaller in the multilayer capacitor C14 than in the case where terminal conductors are formed on four side faces of the multilayer body L14. Therefore, the multilayer capacitor C14 can be manufactured easily.

The first conductor portion 420A of the first inner connecting conductor 420 and the first conductor portion 430A of the second inner connecting conductor 430 oppose their corresponding inner electrodes with a dielectric layer in between respectively, and thus can contribute to forming a capacity component. Therefore, the multilayer capacitor C14 can further increase its capacitance.

Since a plurality of first and second inner electrodes 400 to 403, 410 to 413 are arranged between the first inner connecting conductor 420 and second inner connecting conductor 430 in the multilayer body L14 of the multilayer capacitor C14, the equivalent series resistance can be set with a favorable balance.

The multilayer capacitor C14 can lower the equivalent series inductance. A reason therefore can be considered as follows. Namely, when the multilayer capacitor C14 is mounted to a substrate or the like such that the first terminal conductors 3A, 3B and second terminal conductors 4A, 4B are directly connected to land patterns having respective polarities different from each other, a magnetic field caused by a current flowing between the first terminal conductor 3A and second terminal conductor 4B and a magnetic field caused by a current flowing between the first terminal conductor 3B and second terminal conductor 4A seem to cancel each other out, thereby lowering the equivalent series inductance.

The multilayer capacitor C14 can be mounted easily because of positional relationships of the outer conductors 3A to 6A, 3B to 6B with the center axis Ax14, and positional relationships among the outer conductors 3A to 6A, 3B to 6B in the opposing direction of the first side face L14a and second side face L14b of the multilayer body L14.

Fourteenth Embodiment

Figure 19:
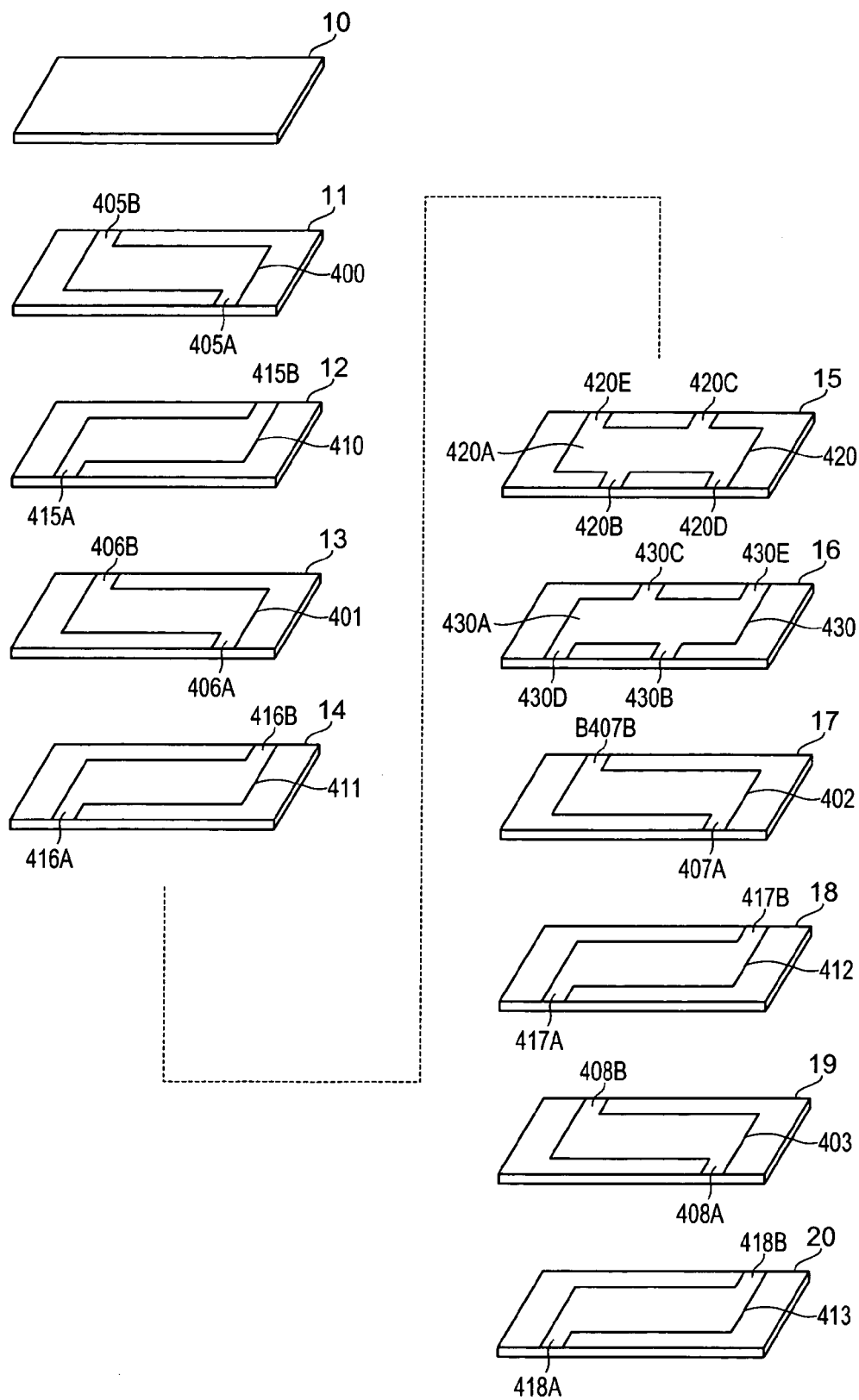
FIG. 19 is an exploded perspective view of the multilayer body included in the multilayer capacitor in accordance with a fourteenth embodiment.

With reference to FIG. 19, the structure of the multilayer capacitor in accordance with a fourteenth embodiment will be explained. The multilayer capacitor in accordance with the fourteenth embodiment differs from the multilayer capacitor C14 in accordance with the thirteenth embodiment in terms of positions of inner connecting conductors 420, 430 in the laminating direction. FIG. 19 is an exploded perspective view of the multilayer body included in the multilayer capacitor in accordance with the fourteenth embodiment.

In the multilayer capacitor in accordance with the fourteenth embodiment, as shown in FIG. 19, one each of the first and second inner connecting conductors 420, 430 is laminated between two each of first and second inner electrodes 400, 401, 410, 411 and two each of first and second inner electrodes 402, 403, 412, 413. More specifically, the first inner connecting conductor 420 is positioned so as to be held between dielectric layers 14 and 15. The second inner connecting conductor 430 is positioned so as to be held between dielectric layers 15 and 16.

In the multilayer capacitor in accordance with the fourteenth embodiment, terminal conductors 3A, 3B, 4A, 4B are connected to the inner electrodes 400 to 403, 410 to 413 not directly but electrically through the outer connecting conductors 5A, 5B, 6A, 6B and the inner connecting conductors 420, 430. Therefore, the multilayer capacitor in accordance with the fourteenth embodiment can yield an equivalent series resistance greater than that of a conventional multilayer capacitor in which all the inner electrodes are connected to their corresponding terminal conductors through lead conductors.

When the first terminal conductors 3A, 3B are concerned, the multilayer capacitor in accordance with the fourteenth embodiment differs from the multilayer capacitor C14 in accordance with the thirteenth embodiment in terms of the position of the first inner connecting conductor 420 and, consequently, in terms of how the respective resistance components of the first outer connecting conductors 5A, 5B are connected to the respective first terminal conductors 3A, 3B. Also, when the second terminal conductors 4A, 4B are concerned, the multilayer capacitor in accordance with the fourteenth embodiment differs from the multilayer capacitor C14 in accordance with the thirteenth embodiment in terms of the position of the second inner connecting conductor 430 and, consequently, in terms of how the respective resistance components of the second outer connecting conductors 6A, 6B are connected to the respective second terminal conductors 4A, 4B.

Because of the difference in resistance components of the first and second outer connecting conductors 5A, 5B, 6A, 6B, the multilayer capacitor in accordance with the fourteenth embodiment yields an equivalent series resistance smaller than that in the multilayer capacitor C14 in accordance with the thirteenth embodiment.

By adjusting positions of the first inner connecting conductors 420, 430 in the laminating direction as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors 420, 430, the multilayer capacitor in accordance with the fourteenth embodiment can regulate the equivalent series resistance while attaining a desirable value (e.g., large value) of capacitance.

The first conductor portion 420A of the first inner connecting conductor 420 and the first conductor portion 430A of the second inner connecting conductor 430 oppose their corresponding inner electrodes with a dielectric layer in between respectively, and thus can contribute to forming a capacity component. Therefore, the multilayer capacitor in accordance with the fourteenth embodiment can further increase its capacitance.

Since the outer conductors are arranged such as in the multilayer capacitor C14, the multilayer capacitor in accordance with the fourteenth embodiment can be manufactured easily as with the multilayer capacitor C14. The multilayer capacitor in accordance with the fourteenth embodiment can lower the equivalent series inductance as with the multilayer capacitor C14. Also, the multilayer capacitor in accordance with the fourteenth embodiment can be mounted easily as with the multilayer capacitor C14.

Fifteenth Embodiment

Figure 20:
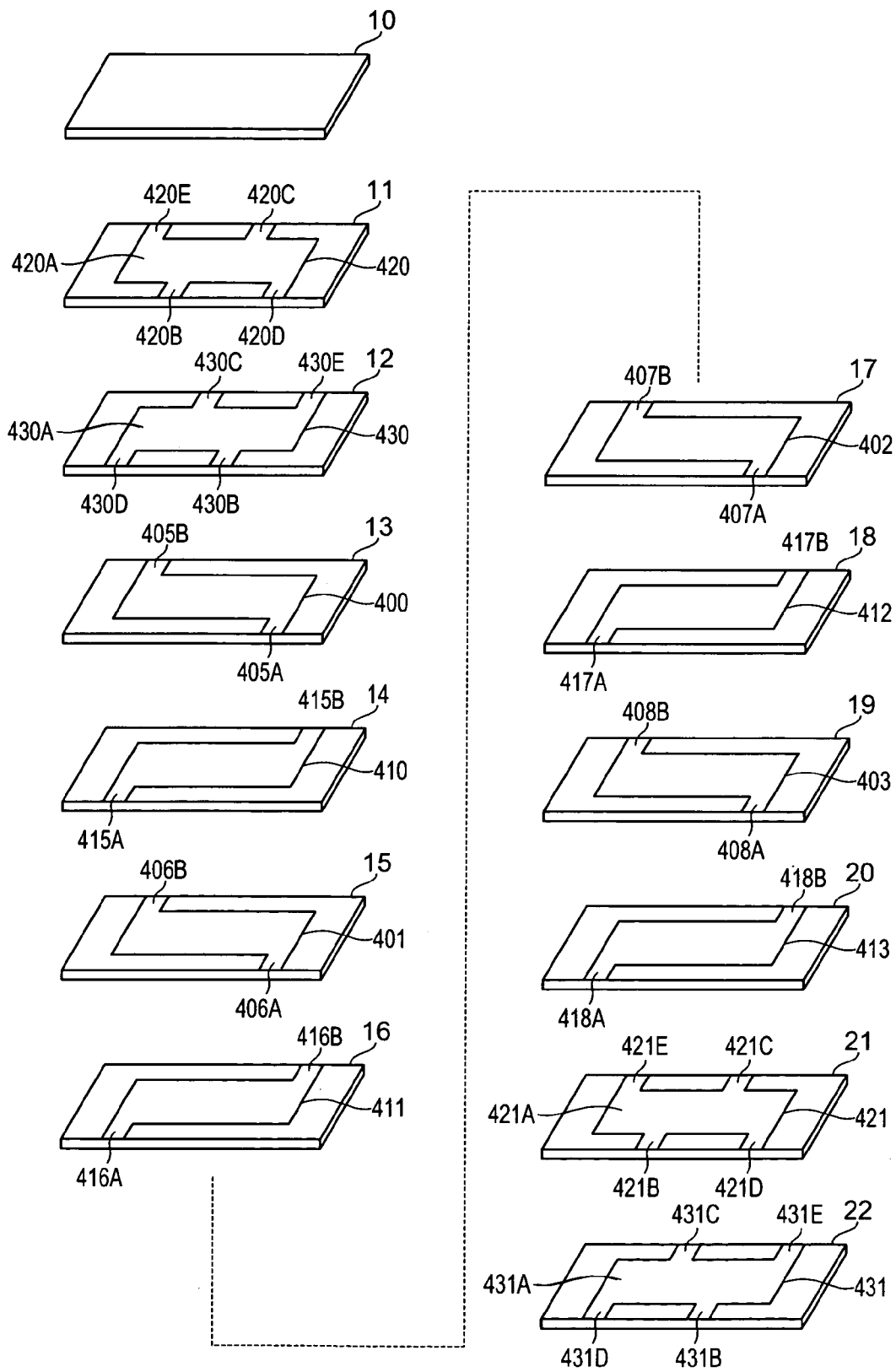
FIG. 20 is an exploded perspective view of the multilayer body included in the multilayer capacitor in accordance with a fifteenth embodiment.

With reference to FIG. 20, the structure of the multilayer capacitor in accordance with a fifteenth embodiment will be explained. The multilayer capacitor in accordance with the fifteenth embodiment differs from the multilayer capacitor C14 in accordance with the thirteenth embodiment in terms of the number of first and second inner connecting conductors. FIG. 20 is an exploded perspective view of the multilayer body included in the multilayer capacitor in accordance with the fifteenth embodiment.

As shown in FIG. 20, the multilayer body of the multilayer capacitor in accordance with the fifteenth embodiment is constructed by alternately laminating a plurality of (13 in this embodiment) dielectric layers 10 to 22 and a plurality of (4 each in this embodiment) first and second inner electrodes 400 to 403, 410 to 413.

In the multilayer body of the multilayer capacitor in accordance with the fifteenth embodiment, a plurality of (2 in this embodiment) first inner connecting conductors 420, 421 and a plurality of (2 in this embodiment) second inner connecting conductors 430, 431 are laminated. In the multilayer body of the multilayer capacitor in accordance with the fifteenth embodiment, the first inner electrodes 400 to 403 and second inner electrodes 410 to 413 are arranged between the first and second inner connecting conductors 420, 430 and the first and second inner connecting conductors 421, 431.

The first inner connecting conductor 420 is positioned so as to be held between the dielectric layers 10 and 11, whereas the first inner connecting conductor 421 is positioned so as to be held between the dielectric layers 20 and 21. The second inner connecting conductor 430 is positioned so as to be held between the dielectric layers 11 and 12, whereas the second inner connecting conductor 431 is positioned so as to be held between the dielectric layers 21 and 22.

In the multilayer capacitor in accordance with the fifteenth embodiment, terminal conductors 3A, 3B, 4A, 4B are connected to the inner electrodes 400 to 403, 410 to 413 not directly but electrically through outer connecting conductors 5A, 5B, 6A, 6B and the inner connecting conductors 420, 421, 430, 431. Therefore, the multilayer capacitor in accordance with the fifteenth embodiment yields an equivalent series resistance greater than that of a conventional multilayer capacitor in which all the inner electrodes are connected to their corresponding terminal conductors through lead conductors.

The number of first inner connecting conductors 420, 421 and second inner connecting conductors 430, 431 is greater in the multilayer capacitor in the fifteenth embodiment than in the multilayer capacitor C14, whereas the inner connecting conductors 420, 421, 430, 431 are connected in parallel to their corresponding terminal conductors 3A, 3B, 4A, 4B. Since the number of inner connecting conductors 420, 421, 430, 431 is greater, the number of current paths between the terminal conductors 3A, 3B, 4A, 4B and inner electrodes 400 to 403, 410 to 413 increases. Therefore, the multilayer capacitor in accordance with the fifteenth embodiment yields an equivalent series resistance smaller than that of the multilayer capacitor C14.

By adjusting the number of first inner connecting conductors 420, 421 and the number of second inner connecting conductors 430, 431 as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors, the multilayer capacitor in accordance with the fifteenth embodiment can regulate the equivalent series resistance while attaining a desirable value (e.g., large value) of capacitance.

The first conductor portion 421A of the first inner connecting conductor 421 and the first conductor portion 430A of the second inner connecting conductor 430 oppose their corresponding inner electrodes with a dielectric layer in between respectively, and thus can contribute to forming a capacity component. Therefore, the multilayer capacitor in accordance with the fifteenth embodiment can further increase its capacitance.

In the multilayer body of the multilayer capacitor in accordance with the fifteenth embodiment, a plurality of first and second inner electrodes 400 to 403, 410 to 413 are arranged between the first and second inner connecting conductors 420, 430 and the first and second inner connecting conductors 421, 431. Therefore, the multilayer capacitor in accordance with the fifteenth embodiment can set the equivalent series resistance with a favorable balance.

Since the outer conductors are arranged as in the multilayer capacitor C14, the multilayer capacitor in accordance with the fifteenth embodiment can be manufactured easily as with the multilayer capacitor C14. The multilayer capacitor in accordance with the fifteenth embodiment can lower the equivalent series inductance as with the multilayer capacitor C14. Also, the multilayer capacitor in accordance with the fifteenth embodiment can be mounted easily as with the multilayer capacitor C14.

Sixteenth Embodiment

Figure 21:
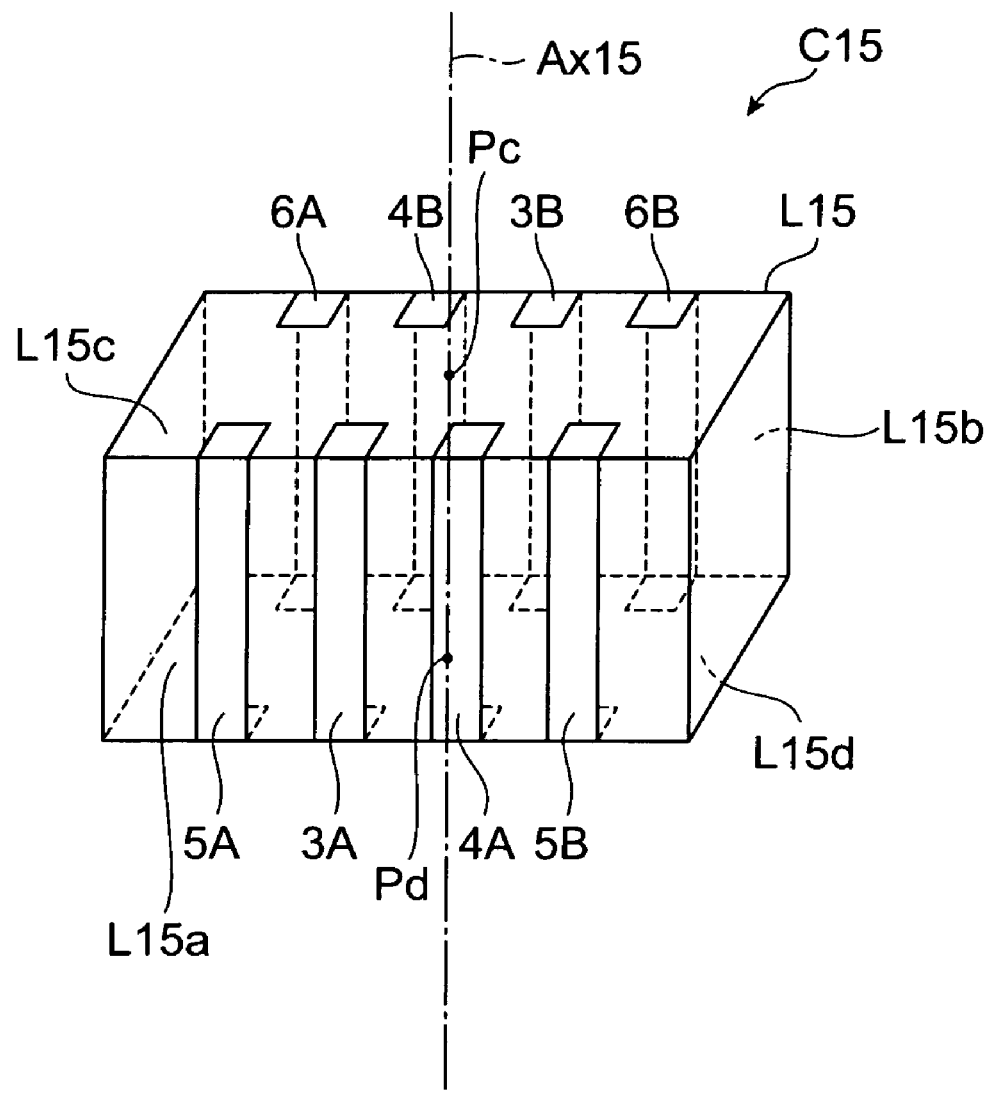
FIG. 21 is a perspective view of the multilayer capacitor in accordance with a sixteenth embodiment.
Figure 22:
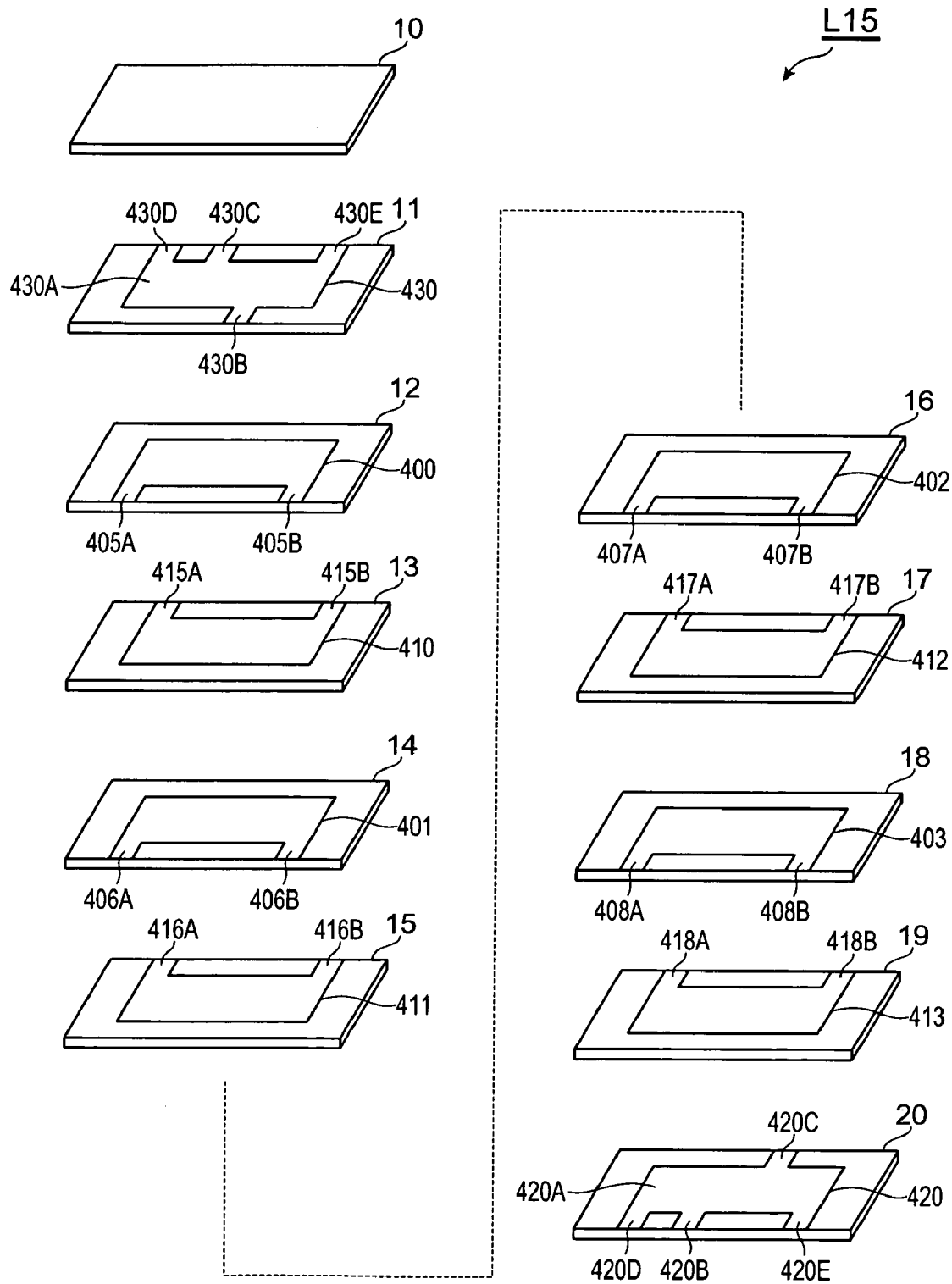
FIG. 22 is an exploded perspective view of the multilayer body included in the multilayer capacitor in accordance with the sixteenth embodiment.

With reference to FIGS. 21 and 22, the structure of the multilayer capacitor C15 in accordance with a sixteenth embodiment will be explained. The multilayer capacitor C15 in accordance with the sixteenth embodiment differs from the multilayer capacitor C10 in accordance with the first embodiment in terms of arrangement of outer conductors formed on the multilayer body. FIG. 21 is a perspective view of the multilayer capacitor in accordance with the sixteenth embodiment. FIG. 22 is an exploded perspective view of the multilayer body included in the multilayer capacitor in accordance with the sixteenth embodiment.

On a first side face L15a which is a side face extending longitudinally of faces L15c and L15d orthogonal to the laminating direction of the multilayer body L15 among side faces parallel to the laminating direction of the multilayer body L15, a first outer connecting conductor 5A, a first terminal conductor 3A, a second terminal conductor 4A, and a first outer connecting conductor 5B are formed in this order from the left side to right side in FIG. 21.

On a second side face L15b which opposes the first side face L15a and which is a side face extending longitudinally of the faces L15c and L15d orthogonal to the laminating direction of the multilayer body L15 among the side faces parallel to the laminating direction of the multilayer body L15, a second outer connecting conductor 6A, a second terminal conductor 4B, a first terminal conductor 3B, and a second outer connecting conductor 6B are formed in this order from the left side to right side in FIG. 21.

Therefore, the first terminal conductor 3A and first outer connecting conductor 5A are formed adjacent to each other on the same side face, i.e., first side face L15a, of the multilayer body L15. The second terminal conductor 4B and second outer connecting conductor 6A are formed adjacent to each other on the same side face, i.e., second side face L15b, of the multilayer body L15.

Each of pairs of the first terminal conductors 3A and 3B, the second terminal conductors 4A and 4B, the first outer connecting conductor 5A and second outer connecting conductor 6B, and the first outer connecting conductor 5B and second outer connecting conductor 6A are symmetrical to each other about a center axis Ax15 passing respective center positions Pc, Pd of the two side faces L15c, L15d orthogonal to the laminating direction of the multilayer body L15 among center axes of the multilayer body L15. Each of pairs of the first terminal conductor 3A and second terminal conductor 4B, the first terminal conductor 3B and second terminal conductor 4A, the first outer connecting conductor 5A and second outer connecting conductor 6A, and the first outer connecting conductor 5B and second outer connecting conductor 6B oppose each other along a direction in which the first side face L15a and second side face L15b of the multilayer body L15 oppose each other.

As shown in FIG. 22, the multilayer body L15 is constructed by alternately laminating a plurality of (11 in this embodiment) dielectric layers 10 to 20 with a plurality of (4 each in this embodiment) first and second inner electrodes 400 to 403, 410 to 413. Further, one first inner connecting conductor 420 and one second inner connecting conductor 430 are laminated in the multilayer body L15.

Lead conductors 405A to 408A extend from their corresponding first inner electrodes 400 to 403 so as to reach the first side face L15a of the multilayer body L15. Lead conductors 405B to 408B extend from their corresponding first inner electrodes 400 to 403 so as to reach the first side face L15a of the multilayer body L15.

Lead conductors 415A to 418A extend from their corresponding second inner electrodes 410 to 413 so as to reach the second side face L15b of the multilayer body L15. Lead conductors 415B to 418B extend from their corresponding second inner electrodes 410 to 413 so as to reach the second side face L15b of the multilayer body L15.

The first inner connecting conductor 420 includes a first conductor portion 420A having an oblong form; second, fourth and fifth conductor portions 420B, 420D, 420E extending from the first conductor portion 420A so as to be led to the first side face L15a of the multilayer body L15; and third conductor portion 420C extending from the first conductor portion 420A so as to be led to the second side face L15b of the multilayer body L15.

The second inner connecting conductor 430 includes a first conductor portion 430A having an oblong form; second conductor portion 430B extending from the first conductor portion 430A so as to be led to the first side face L15a of the multilayer body L15; and third, fourth and fifth conductor portions 430C, 430D, 430E extending from the first conductor portion 430A so as to be led to the second side face L15b of the multilayer body L15.

In the multilayer capacitor C15, the first terminal conductors 3A, 3B are connected to the first inner electrodes 400 to 403 not directly but electrically through the first outer connecting conductors 5A, 5B and first inner connecting conductor 420. Also, in the multilayer capacitor C15, the second terminal conductors 4A, 4B are connected to the second inner electrodes 410 to 413 not directly but electrically through the second outer connecting conductors 6A, 6B and second inner connecting conductor 430. These allow the multilayer capacitor C15 to yield an equivalent series resistance greater than that of a conventional multilayer capacitor in which all the inner electrodes are connected to their corresponding terminal conductors through lead conductors.

By adjusting the number of first inner connecting conductor 420 directly connected to the first terminal conductors 3A, 3B and the number of second inner connecting conductor 430 directly connected to the second terminal conductors 4A, 4B in such a fashion, this embodiment sets the equivalent series resistance of the multilayer capacitor C15 to a desirable value, and thus can regulate the equivalent series resistance easily with a high precision. Since the equivalent series resistance is controlled by the first and second inner connecting conductors, the multilayer capacitor C15 can regulate the equivalent series resistance while attaining a desirable value (e.g., large value) of capacitance.

All of the first and second terminal conductors 3A, 3B, 4A, 4B and first and second outer connecting conductors 5A, 5B, 6A, 6B, which are outer conductors of the multilayer capacitor C15, are formed on the opposing first and second side faces L15a, L15b of the multilayer body L15. Consequently, the number of steps required for forming outer conductors can be made smaller in the multilayer capacitor C15 than in the case where terminal conductors are formed on four side faces of the multilayer body L15. Therefore, the multilayer capacitor C15 can be manufactured easily.

The first conductor portion 420A of the first inner connecting conductor 420 and the first conductor portion 430A of the second inner connecting conductor 430 oppose their corresponding inner electrodes with a dielectric layer in between respectively, and thus can contribute to forming a capacity component. Therefore, the multilayer capacitor C15 can further increase its capacitance.

Since a plurality of first and second inner electrodes 400 to 403, 410 to 413 are arranged between the first inner connecting conductor 420 and second inner connecting conductor 430 in the multilayer body L15 of the multilayer capacitor C15, the equivalent series resistance can be set with a favorable balance.

The multilayer capacitor C15 can lower the equivalent series inductance. A reason therefore can be considered as follows. Namely, when the multilayer capacitor C15 is mounted to a substrate or the like such that the first terminal conductors 3A, 3B and second terminal conductors 4A, 4B are directly connected to land patterns having respective polarities different from each other, a magnetic field caused by a current flowing between the first terminal conductor 3A and second terminal conductor 4B and a magnetic field caused by a current flowing between the first terminal conductor 3B and second terminal conductor 4A seem to cancel each other out, thereby lowering the equivalent series inductance.

In the multilayer capacitor C15, the first terminal conductor 3A and first outer connecting conductor 5A are formed adjacent to each other on the first side face L15a of the multilayer body L15. Also, in the multilayer capacitor C15, the second terminal conductor 4B and second outer connecting conductor 6A are formed adjacent to each other on the second side face L15b of the multilayer body L15. Therefore, when the multilayer capacitor C15 is mounted to a substrate or the like such that the terminal conductors 3A, 3B, 4A, 4B are directly connected to land patterns, whereas the outer connecting conductors 5A, 5B, 6A, 6B are not directly connected to land patterns, magnetic fields caused by currents flowing through the multilayer body L15 cancel each other out, thereby lowering the equivalent series inductance of the multilayer capacitor C15.

The multilayer capacitor C15 can be mounted easily because of positional relationships of the outer conductors 3A to 6A, 3B to 6B with the center axis Ax15, and positional relationships among the outer conductors 3A to 6A, 3B to 6B in the opposing direction of the first side face L11a and second side face L15b of the multilayer body L15.

Seventeenth Embodiment

Figure 23:
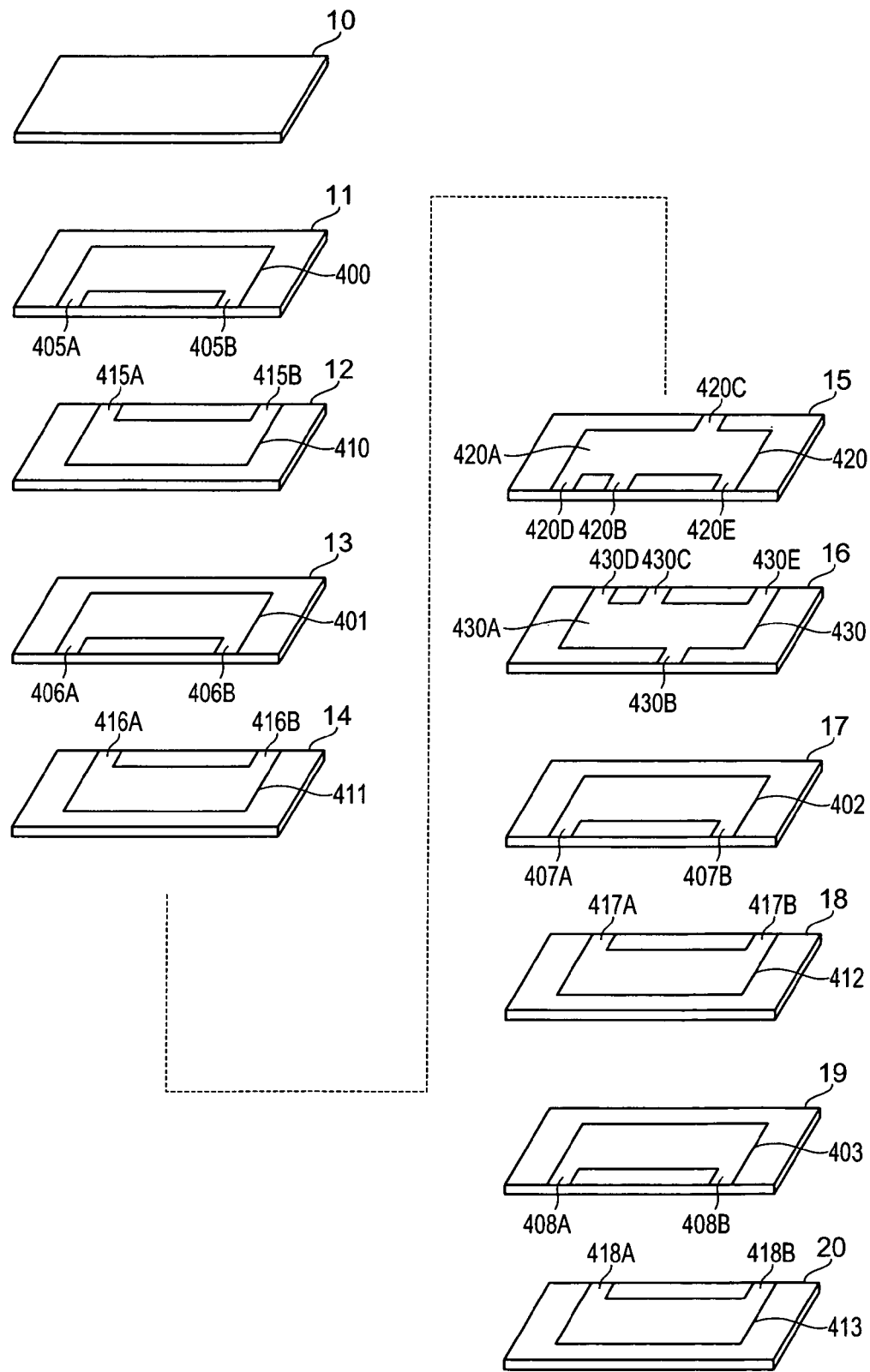
FIG. 23 is an exploded perspective view of the multilayer body included in the multilayer capacitor in accordance with a seventeenth embodiment.

With reference to FIG. 23, the structure of the multilayer capacitor in accordance with a seventeenth embodiment will be explained. The multilayer capacitor in accordance with the seventeenth embodiment differs from the multilayer capacitor C15 in accordance with the sixteenth embodiment in terms of positions of inner connecting conductors 420, 430 in the laminating direction. FIG. 23 is an exploded perspective view of the multilayer body included in the multilayer capacitor in accordance with the seventeenth embodiment.

In the multilayer capacitor in accordance with the seventeenth embodiment, as shown in FIG. 23, one each of the first and second inner connecting conductors 420, 430 is laminated between two each of first and second inner electrodes 400, 401, 410, 411 and two each of first and second inner electrodes 402, 403, 412, 413. More specifically, the first inner connecting conductor 420 is positioned so as to be held between dielectric layers 14 and 15. The second inner connecting conductor 430 is positioned so as to be held between dielectric layers 15 and 16.

In the multilayer capacitor in accordance with the seventeenth embodiment, terminal conductors 3A, 3B, 4A, 4B are connected to the inner electrodes 400 to 403, 410 to 413 not directly but electrically through the outer connecting conductors 5A, 5B, 6A, 6B and the inner connecting conductors 420, 430. Therefore, the multilayer capacitor in accordance with the seventeenth embodiment can yield an equivalent series resistance greater than that of a conventional multilayer capacitor in which all the inner electrodes are connected to their corresponding terminal conductors through lead conductors.

When the first terminal conductors 3A, 3B are concerned, the multilayer capacitor in accordance with the seventeenth embodiment differs from the multilayer capacitor C15 in accordance with the sixteenth embodiment in terms of the position of the first inner connecting conductor 420 and, consequently, in terms of how the respective resistance components of the first outer connecting conductors 5A, 5B are connected to the respective first terminal conductors 3A, 3B. Also, when the second terminal conductors 4A, 4B are concerned, the multilayer capacitor in accordance with the seventeenth embodiment differs from the multilayer capacitor C15 in accordance with the sixteenth embodiment in terms of the position of the second inner connecting conductor 430 and, consequently, in terms of how the respective resistance components of the second outer connecting conductors 6A, 6B are connected to the respective second terminal conductors 4A, 4B.

Because of the difference in resistance components of the first and second outer connecting conductors 5A, 5B, 6A, 6B, the multilayer capacitor in accordance with the seventeenth embodiment yields an equivalent series resistance smaller than that in the multilayer capacitor C15 in accordance with the sixteenth embodiment.

By adjusting positions of the first inner connecting conductors 420, 430 in the laminating direction as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors 420, 430, the multilayer capacitor in accordance with the seventeenth embodiment can regulate the equivalent series resistance while attaining a desirable value (e.g., large value) of capacitance.

The first conductor portion 420A of the first inner connecting conductor 420 and the first conductor portion 430A of the second inner connecting conductor 430 oppose their corresponding inner electrodes with a dielectric layer in between respectively, and thus can contribute to forming a capacity component. Therefore, the multilayer capacitor in accordance with the seventeenth embodiment can further increase its capacitance.

Since the outer conductors are arranged such as in the multilayer capacitor C15, the multilayer capacitor in accordance with the seventeenth embodiment can be manufactured easily as with the multilayer capacitor C15. The multilayer capacitor in accordance with the seventeenth embodiment can lower the equivalent series inductance as with the multilayer capacitor C15. Also, the multilayer capacitor in accordance with the seventeenth embodiment can be mounted easily as with the multilayer capacitor C15.

Eighteenth Embodiment

Figure 24:
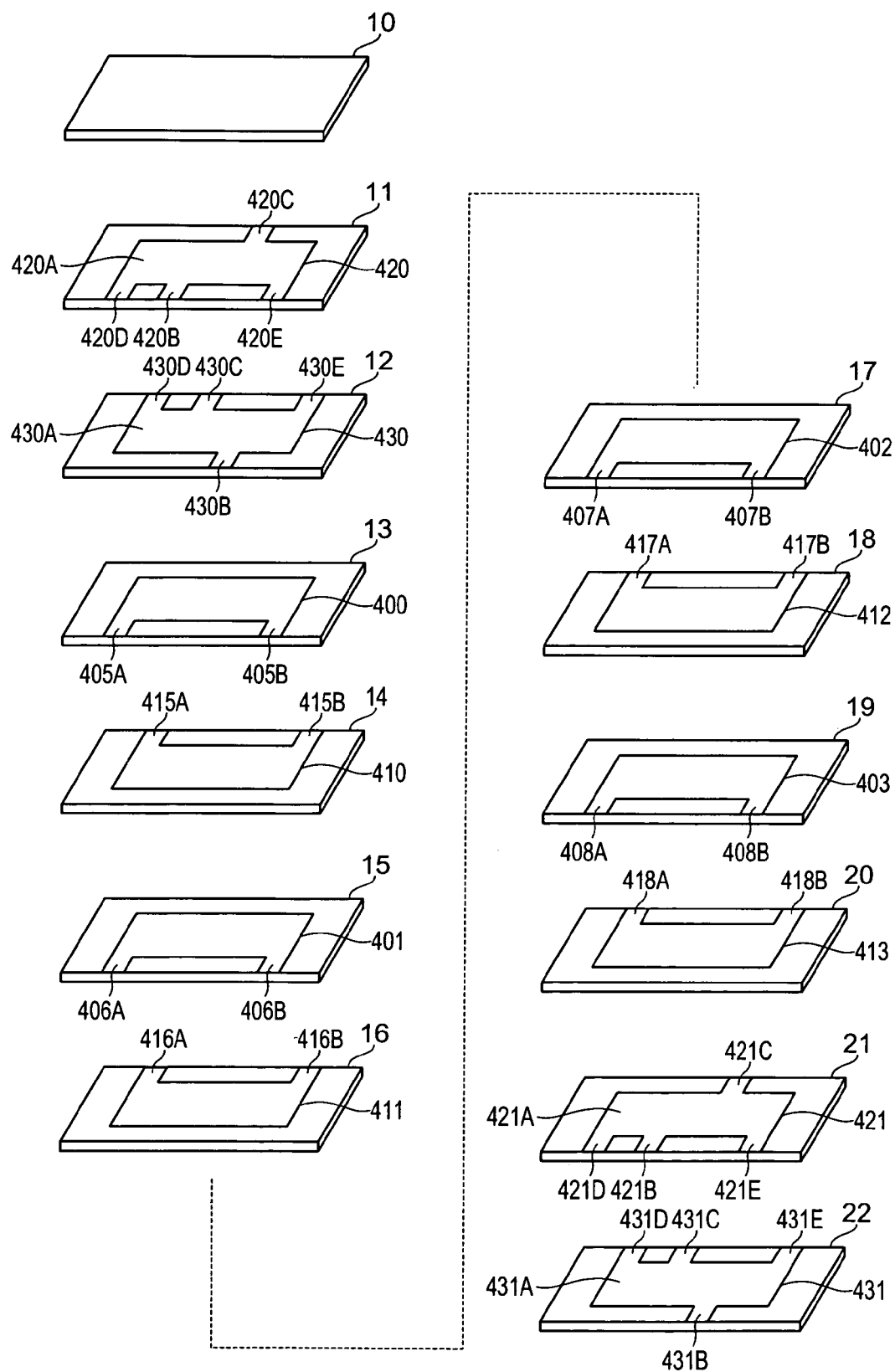
FIG. 24 is an exploded perspective view of the multilayer body included in the multilayer capacitor in accordance with an eighteenth embodiment.

With reference to FIG. 24, the structure of the multilayer capacitor in accordance with an eighteenth embodiment will be explained. The multilayer capacitor in accordance with the eighteenth embodiment differs from the multilayer capacitor C15 in accordance with the sixteenth embodiment in terms of the number of first and second inner connecting conductors. FIG. 24 is an exploded perspective view of the multilayer body included in the multilayer capacitor in accordance with the eighteenth embodiment.

As shown in FIG. 24, the multilayer body of the multilayer capacitor in accordance with the eighteenth embodiment is constructed by alternately laminating a plurality of (13 in this embodiment) dielectric layers 10 to 22 and a plurality of (4 each in this embodiment) first and second inner electrodes 400 to 403, 410 to 413.

In the multilayer body of the multilayer capacitor in accordance with the eighteenth embodiment, a plurality of (2 in this embodiment) first inner connecting conductors 420, 421 and a plurality of (2 in this embodiment) second inner connecting conductors 430, 431 are laminated. In the multilayer body of the multilayer capacitor in accordance with the eighteenth embodiment, the first inner electrodes 400 to 403 and second inner electrodes 410 to 413 are arranged between the first and second inner connecting conductors 420, 430 and the first and second inner connecting conductors 421, 431.

The first inner connecting conductor 420 is positioned so as to be held between the dielectric layers 10 and 11, whereas the first inner connecting conductor 421 is positioned so as to be held between the dielectric layers 20 and 21. The second inner connecting conductor 430 is positioned so as to be held between the dielectric layers 11 and 12, whereas the second inner connecting conductor 431 is positioned so as to be held between the dielectric layers 21 and 22.

In the multilayer capacitor in accordance with the eighteenth embodiment, terminal conductors 3A, 3B, 4A, 4B are connected to the inner electrodes 400 to 403, 410 to 413 not directly but electrically through outer connecting conductors 5A, 5B, 6A, 6B and the inner connecting conductors 420, 421, 430, 431. Therefore, the multilayer capacitor in accordance with the eighteenth embodiment yields an equivalent series resistance greater than that of a conventional multilayer capacitor in which all the inner electrodes are connected to their corresponding terminal conductors through lead conductors.

The number of first inner connecting conductors 420, 421 and second inner connecting conductors 430, 431 is greater in the multilayer capacitor in the eighteenth embodiment than in the multilayer capacitor C15, whereas the inner connecting conductors 420, 421, 430, 431 are connected in parallel to their corresponding terminal conductors 3A, 3B, 4A, 4B. Since the number of inner connecting conductors 420, 421, 430, 431 is greater, the number of current paths between the terminal conductors 3A, 3B, 4A, 4B and inner electrodes 400 to 403, 410 to 413 increases. Therefore, the multilayer capacitor in accordance with the eighteenth embodiment yields an equivalent series resistance smaller than that of the multilayer capacitor C15.

By adjusting the number of first inner connecting conductors 420, 421 and the number of second inner connecting conductors 430, 431 as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors, the multilayer capacitor in accordance with the eighteenth embodiment can regulate the equivalent series resistance while attaining a desirable value (e.g., large value) of capacitance.

The first conductor portion 421A of the first inner connecting conductor 421 and the first conductor portion 430A of the second inner connecting conductor 430 oppose their corresponding inner electrodes with a dielectric layer in between respectively, and thus can contribute to forming a capacity component. Therefore, the multilayer capacitor in accordance with the eighteenth embodiment can further increase its capacitance.

In the multilayer body of the multilayer capacitor in accordance with the eighteenth embodiment, a plurality of first and second inner electrodes 400 to 403, 410 to 413 are arranged between the first and second inner connecting conductors 420, 430 and the first and second inner connecting conductors 421, 431. Therefore, the multilayer capacitor in accordance with the eighteenth embodiment can set the equivalent series resistance with a favorable balance.

Since the outer conductors are arranged as in the multilayer capacitor C15, the multilayer capacitor in accordance with the eighteenth embodiment can be manufactured easily as with the multilayer capacitor C15. The multilayer capacitor in accordance with the eighteenth embodiment can lower the equivalent series inductance as with the multilayer capacitor C15. Also, the multilayer capacitor in accordance with the eighteenth embodiment can be mounted easily as with the multilayer capacitor C15.

Nineteenth Embodiment

Figure 25:
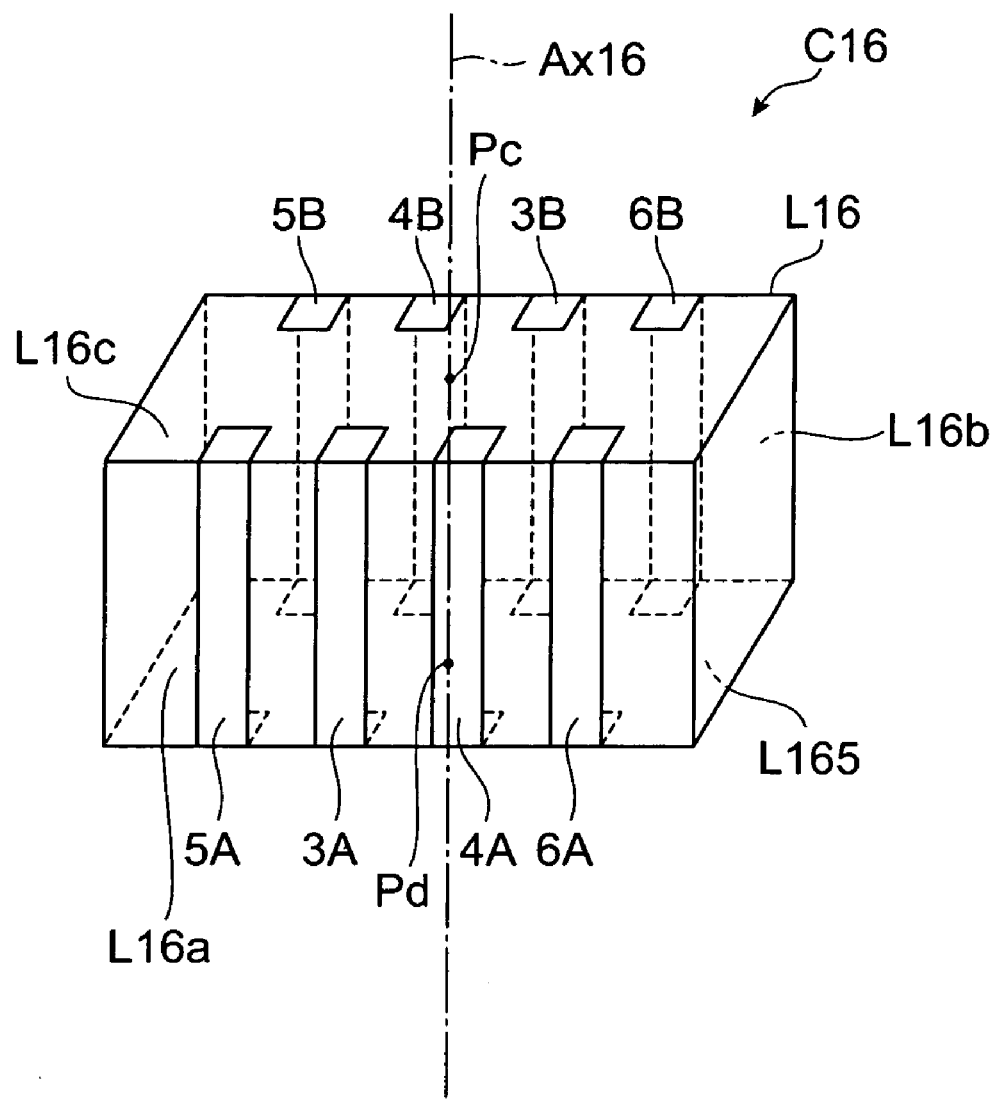
FIG. 25 is a perspective view of the multilayer capacitor in accordance with a nineteenth embodiment.
Figure 26:
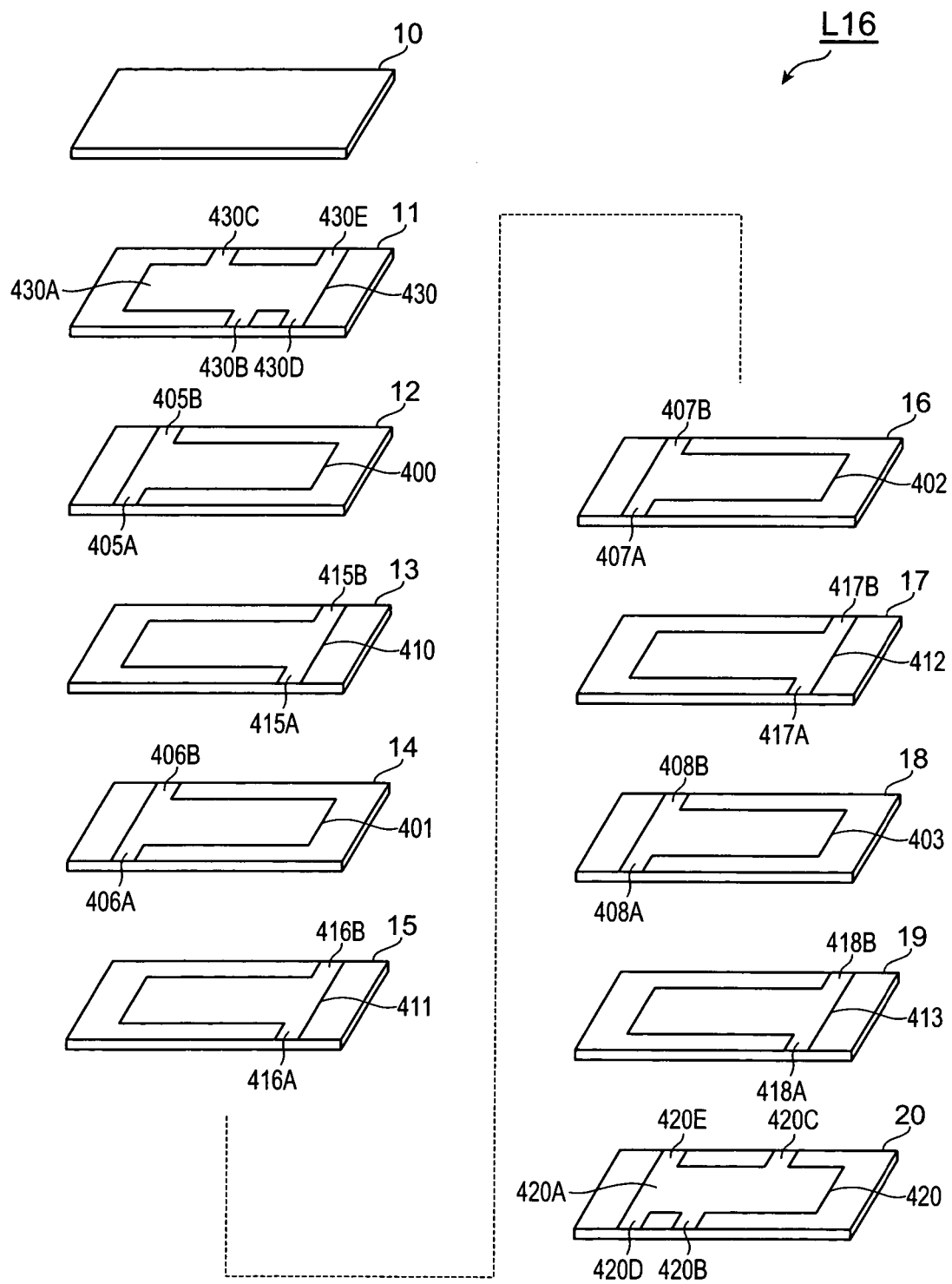
FIG. 26 is an exploded perspective view of the multilayer body included in the multilayer capacitor in accordance with the nineteenth embodiment.

With reference to FIGS. 25 and 26, the structure of the multilayer capacitor C16 in accordance with a nineteenth embodiment will be explained. The multilayer capacitor C16 in accordance with the nineteenth embodiment differs from the multilayer capacitor C10 in accordance with the first embodiment in terms of arrangement of outer conductors formed on the multilayer body. FIG. 25 is a perspective view of the multilayer capacitor in accordance with the nineteenth embodiment. FIG. 26 is an exploded perspective view of the multilayer body included in the multilayer capacitor in accordance with the nineteenth embodiment.

On a first side face L16a which is a side face extending longitudinally of faces L16c and L16d orthogonal to the laminating direction of the multilayer body L16 among side faces parallel to the laminating direction of the multilayer body L16, a first outer connecting conductor 5A, a first terminal conductor 3A, a second terminal conductor 4A, and a second outer connecting conductor 6A are formed in this order from the left side to right side in FIG. 25.

On a second side face L16b which opposes the first side face L16a and which is a side face extending longitudinally of the faces L16c and L16d orthogonal to the laminating direction of the multilayer body L16 among the side faces parallel to the laminating direction of the multilayer body L16, a first outer connecting conductor 5B, a second terminal conductor 4B, a first terminal conductor 3B, and a second outer connecting conductor 6B are formed in this order from the left side to right side in FIG. 25.

Therefore, the first terminal conductor 3A and first outer connecting conductor 5A are formed adjacent to each other on the same side face, i.e., first side face L16a, of the multilayer body L16. The second terminal conductor 4A and second outer connecting conductor 6A are formed adjacent to each other on the same side face, i.e., first side face L16a, of the multilayer body L16.

Each of pairs of the first terminal conductors 3A and 3B, the second terminal conductors 4A and 4B, the first outer connecting conductor 5A and second outer connecting conductor 6B, and the first outer connecting conductor 5B and second outer connecting conductor 6A are symmetrical to each other about a center axis Ax16 passing respective center positions Pc, Pd of the two side faces L16c, L16d orthogonal to the laminating direction of the multilayer body L16 among center axes of the multilayer body L16. Each of pairs of the first terminal conductor 3A and second terminal conductor 4B, the first terminal conductor 3B and second terminal conductor 4A, the first outer connecting conductors 5A and 5B, and the second outer connecting conductors 6A and 6B oppose each other along a direction in which the first side face L16a and second side face L16b of the multilayer body L16 oppose each other.

As shown in FIG. 26, the multilayer body L16 is constructed by alternately laminating a plurality of (11 in this embodiment) dielectric layers 10 to 20 with a plurality of (4 each in this embodiment) first and second inner electrodes 400 to 403, 410 to 413. Further, one first inner connecting conductor 420 and one second inner connecting conductor 430 are laminated in the multilayer body L16.

Lead conductors 405A to 408A extend from their corresponding first inner electrodes 400 to 403 so as to reach the first side face L16a of the multilayer body L16. Lead conductors 405B to 408B extend from their corresponding first inner electrodes 400 to 403 so as to reach the second side face L16b of the multilayer body L16.

Lead conductors 415A to 418A extend from their corresponding second inner electrodes 410 to 413 so as to reach the first side face L16a of the multilayer body L16. Lead conductors 415B to 418B extend from their corresponding second inner electrodes 410 to 413 so as to reach the second side face L16b of the multilayer body L16.

The first inner connecting conductor 420 includes a first conductor portion 420A having an oblong form; second and fourth conductor portions 420B, 420D extending from the first conductor portion 420A so as to be led to the first side face L16a of the multilayer body L16; and third and fifth conductor portions 420C, 420E extending from the first conductor portion 420A so as to be led to the second side face L16b of the multilayer body L16.

The second inner connecting conductor 430 includes a first conductor portion 430A having an oblong form; second and fourth conductor portions 430B, 430D extending from the first conductor portion 430A so as to be led to the first side face L16a of the multilayer body L16; and third and fifth conductor portions 430C, 430E extending from the first conductor portion 430A so as to be led to the second side face L16b of the multilayer body L16.

In the multilayer capacitor C16, the first terminal conductors 3A, 3B are connected to the first inner electrodes 400 to 403 not directly but electrically through the first outer connecting conductors 5A, 5B and first inner connecting conductor 420. Also, in the multilayer capacitor C16, the second terminal conductors 4A, 4B are connected to the second inner electrodes 410 to 413 not directly but electrically through the second outer connecting conductors 6A, 6B and second inner connecting conductor 430. These allow the multilayer capacitor C16 to yield an equivalent series resistance greater than that of a conventional multilayer capacitor in which all the inner electrodes are connected to their corresponding terminal conductors through lead conductors.

By adjusting the number of first inner connecting conductor 420 directly connected to the first terminal conductors 3A, 3B and the number of second inner connecting conductor 430 directly connected to the second terminal conductors 4A, 4B in such a fashion, this embodiment sets the equivalent series resistance of the multilayer capacitor C16 to a desirable value, and thus can regulate the equivalent series resistance easily with a high precision. Since the equivalent series resistance is controlled by the first and second inner connecting conductors, the multilayer capacitor C16 can regulate the equivalent series resistance while attaining a desirable value (e.g., large value) of capacitance.

All of the first and second terminal conductors 3A, 3B, 4A, 4B and first and second outer connecting conductors 5A, 5B, 6A, 6B, which are outer conductors of the multilayer capacitor C16, are formed on the opposing first and second side faces L16a, L16b of the multilayer body L16. Consequently, the number of steps required for forming outer conductors can be made smaller in the multilayer capacitor C16 than in the case where terminal conductors are formed on four side faces of the multilayer body L16. Therefore, the multilayer capacitor C16 can be manufactured easily.

The first conductor portion 420A of the first inner connecting conductor 420 and the first conductor portion 430A of the second inner connecting conductor 430 oppose their corresponding inner electrodes with a dielectric layer in between respectively, and thus can contribute to forming a capacity component. Therefore, the multilayer capacitor C16 can further increase its capacitance.

Since a plurality of first and second inner electrodes 400 to 403, 410 to 413 are arranged between the first inner connecting conductor 420 and second inner connecting conductor 430 in the multilayer body L16 of the multilayer capacitor C16, the equivalent series resistance can be set with a favorable balance.

The multilayer capacitor C16 can lower the equivalent series inductance. A reason therefore can be considered as follows. Namely, when the multilayer capacitor C16 is mounted to a substrate or the like such that the first terminal conductors 3A, 3B and second terminal conductors 4A, 4B are directly connected to land patterns having respective polarities different from each other, a magnetic field caused by a current flowing between the first terminal conductor 3A and second terminal conductor 4B and a magnetic field caused by a current flowing between the first terminal conductor 3B and second terminal conductor 4A seem to cancel each other out, thereby lowering the equivalent series inductance.

In the multilayer capacitor C16, the first terminal conductor 3A and first outer connecting conductor 5A are formed adjacent to each other on the first side face L16a of the multilayer body L16. Also, in the multilayer capacitor C16, the second terminal conductor 4A and second outer connecting conductor 6A are formed adjacent to each other on the first side face L16a of the multilayer body L16. Therefore, when the multilayer capacitor C16 is mounted to a substrate or the like such that the terminal conductors 3A, 3B, 4A, 4B are directly connected to land patterns, whereas the outer connecting conductors 5A, 5B, 6A, 6B are not directly connected to land patterns, magnetic fields caused by currents flowing through the multilayer body L16 cancel each other out, thereby lowering the equivalent series inductance of the multilayer capacitor C16.

The multilayer capacitor C16 can be mounted easily because of positional relationships of the outer conductors 3A to 6A, 3B to 6B with the center axis Ax16, and positional relationships among the outer conductors 3A to 6A, 3B to 6B in the opposing direction of the first side face L16a and second side face L16b of the multilayer body L16.

Twentieth Embodiment

Figure 27:
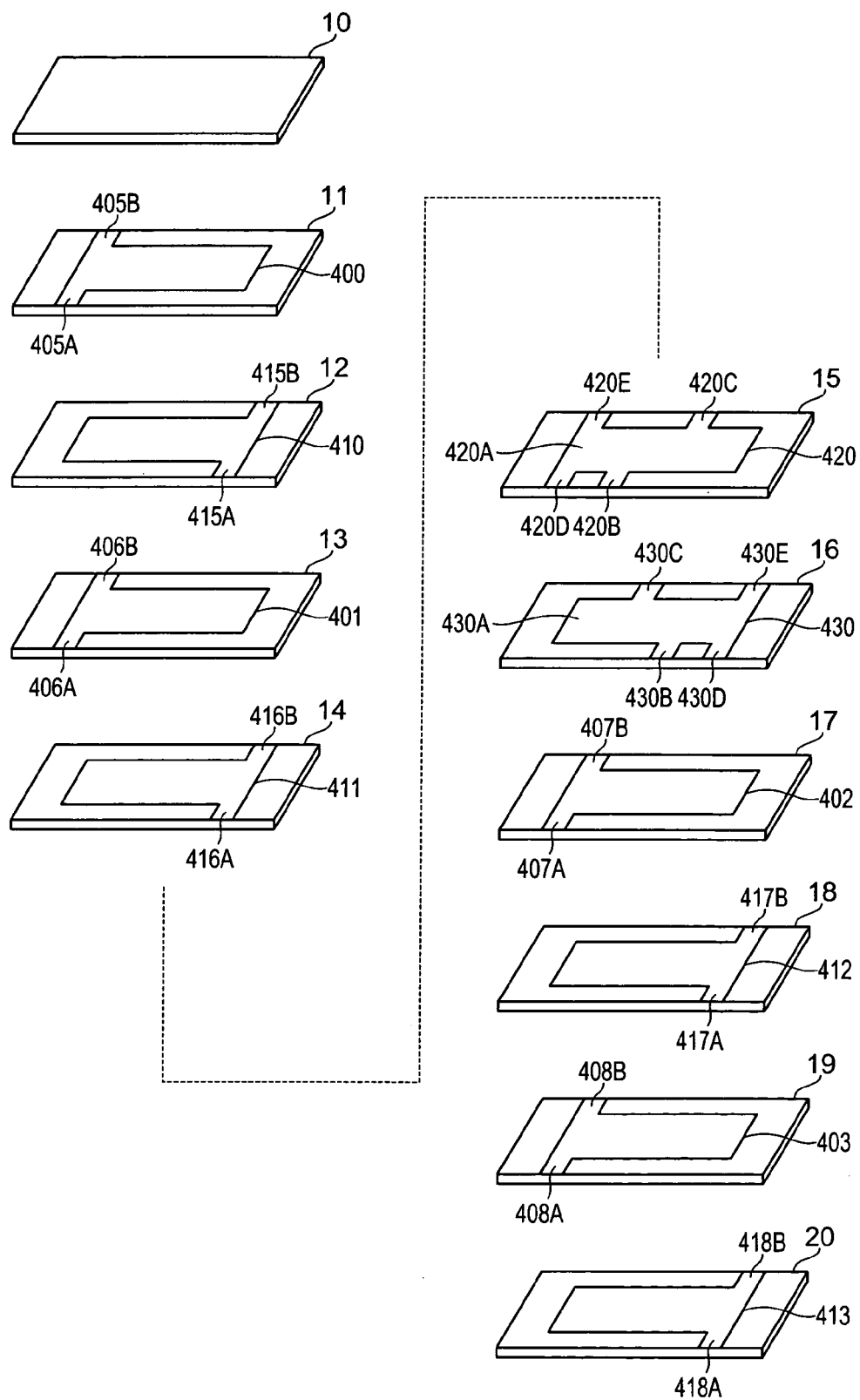
FIG. 27 is an exploded perspective view of the multilayer body included in the multilayer capacitor in accordance with a twentieth embodiment.

With reference to FIG. 27, the structure of the multilayer capacitor in accordance with a twentieth embodiment will be explained. The multilayer capacitor in accordance with the twentieth embodiment differs from the multilayer capacitor C16 in accordance with the nineteenth embodiment in terms of positions of inner connecting conductors 420, 430 in the laminating direction. FIG. 27 is an exploded perspective view of the multilayer body included in the multilayer capacitor in accordance with the twentieth embodiment.

In the multilayer capacitor in accordance with the twentieth embodiment, as shown in FIG. 27, one each of the first and second inner connecting conductors 420, 430 is laminated between two each of first and second inner electrodes 400, 401, 410, 411 and two each of first and second inner electrodes 402, 403, 412, 413. More specifically, the first inner connecting conductor 420 is positioned so as to be held between dielectric layers 14 and 15. The second inner connecting conductor 430 is positioned so as to be held between dielectric layers 15 and 16.

In the multilayer capacitor in accordance with the twentieth embodiment, terminal conductors 3A, 3B, 4A, 4B are connected to the inner electrodes 400 to 403, 410 to 413 not directly but electrically through the outer connecting conductors 5A, 5B, 6A, 6B and the inner connecting conductors 420, 430. Therefore, the multilayer capacitor in accordance with the twentieth embodiment can yield an equivalent series resistance greater than that of a conventional multilayer capacitor in which all the inner electrodes are connected to their corresponding terminal conductors through lead conductors.

When the first terminal conductors 3A, 3B are concerned, the multilayer capacitor in accordance with the twentieth embodiment differs from the multilayer capacitor C16 in accordance with the nineteenth embodiment in terms of the position of the first inner connecting conductor 420 and, consequently, in terms of how the respective resistance components of the first outer connecting conductors 5A, 5B are connected to the respective first terminal conductors 3A, 3B. Also, when the second terminal conductors 4A, 4B are concerned, the multilayer capacitor in accordance with the twentieth embodiment differs from the multilayer capacitor C16 in accordance with the nineteenth embodiment in terms of the position of the second inner connecting conductor 430 and, consequently, in terms of how the respective resistance components of the second outer connecting conductors 6A, 6B are connected to the respective second terminal conductors 4A, 4B.

Because of the difference in resistance components of the first and second outer connecting conductors 5A, 5B, 6A, 6B, the multilayer capacitor in accordance with the twentieth embodiment yields an equivalent series resistance smaller than that in the multilayer capacitor C16 in accordance with the nineteenth embodiment.

By adjusting positions of the first inner connecting conductors 420, 430 in the laminating direction as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors 420, 430, the multilayer capacitor in accordance with the twentieth embodiment can regulate the equivalent series resistance while attaining a desirable value (e.g., large value) of capacitance.

The first conductor portion 420A of the first inner connecting conductor 420 and the first conductor portion 430A of the second inner connecting conductor 430 oppose their corresponding inner electrodes with a dielectric layer in between respectively, and thus can contribute to forming a capacity component. Therefore, the multilayer capacitor in accordance with the twentieth embodiment can further increase its capacitance.

Since the outer conductors are arranged such as in the multilayer capacitor C16, the multilayer capacitor in accordance with the twentieth embodiment can be manufactured easily as with the multilayer capacitor C16. The multilayer capacitor in accordance with the twentieth embodiment can lower the equivalent series inductance as with the multilayer capacitor C16. Also, the multilayer capacitor in accordance with the twentieth embodiment can be mounted easily as with the multilayer capacitor C16.

Twenty-First Embodiment

Figure 28:
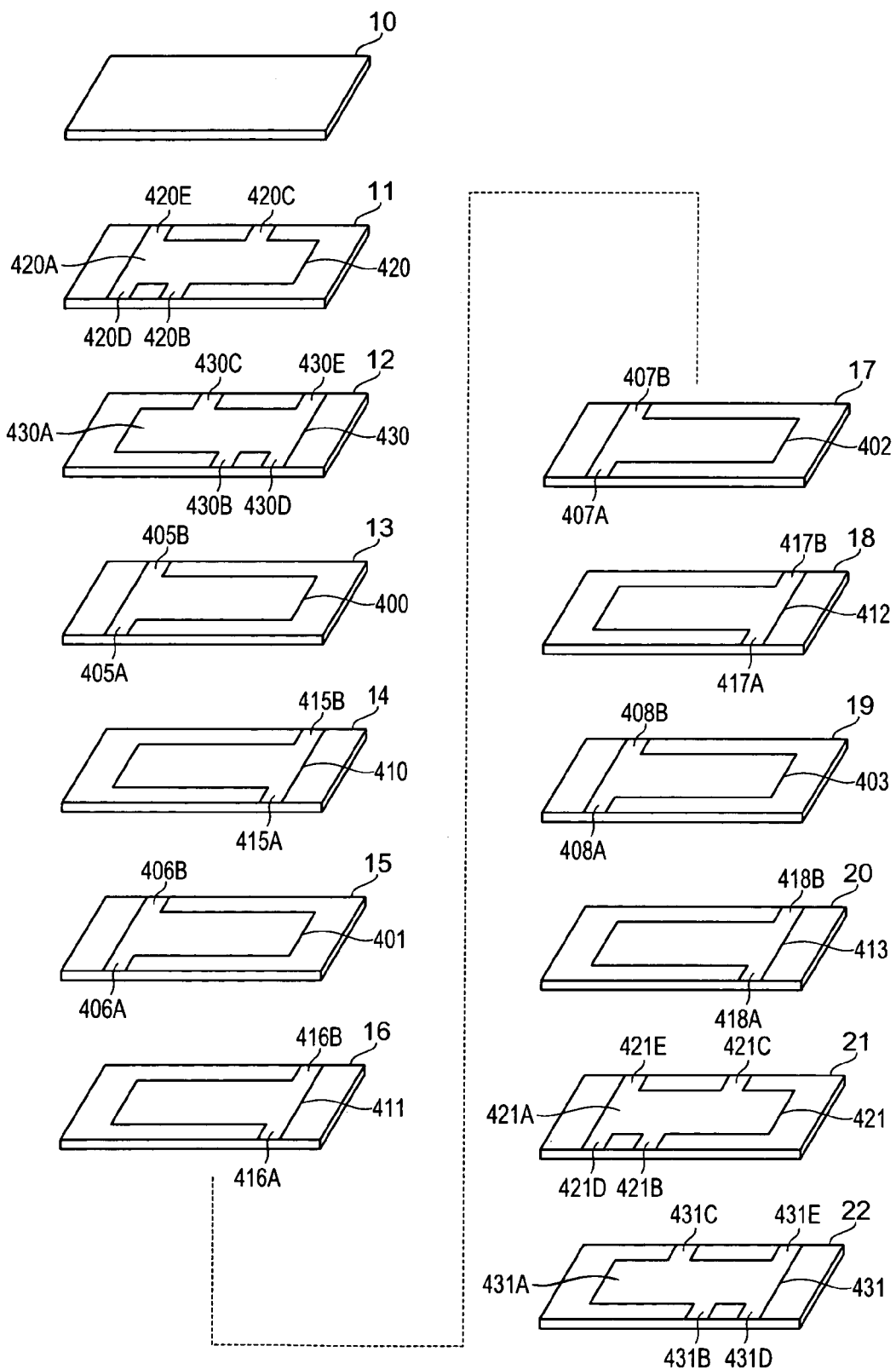
FIG. 28 is an exploded perspective view of the multilayer body included in the multilayer capacitor in accordance with a twenty-first embodiment.

With reference to FIG. 28, the structure of the multilayer capacitor in accordance with a twenty-first embodiment will be explained. The multilayer capacitor in accordance with the twenty-first embodiment differs from the multilayer capacitor C16 in accordance with the nineteenth embodiment in terms of the number of first and second inner connecting conductors. FIG. 28 is an exploded perspective view of the multilayer body included in the multilayer capacitor in accordance with the twenty-first embodiment.

As shown in FIG. 28, the multilayer body of the multilayer capacitor in accordance with the twenty-first embodiment is constructed by alternately laminating a plurality of (13 in this embodiment) dielectric layers 10 to 22 and a plurality of (4 each in this embodiment) first and second inner electrodes 400 to 403, 410 to 413.

In the multilayer body of the multilayer capacitor in accordance with the twenty-first embodiment, a plurality of (2 in this embodiment) first inner connecting conductors 420, 421 and a plurality of (2 in this embodiment) second inner connecting conductors 430, 431 are laminated. In the multilayer body of the multilayer capacitor in accordance with the twenty-first embodiment, the first inner electrodes 400 to 403 and second inner electrodes 410 to 413 are arranged between the first and second inner connecting conductors 420, 430 and the first and second inner connecting conductors 421, 431.

The first inner connecting conductor 420 is positioned so as to be held between the dielectric layers 10 and 11, whereas the first inner connecting conductor 421 is positioned so as to be held between the dielectric layers 20 and 21. The second inner connecting conductor 430 is positioned so as to be held between the dielectric layers 11 and 12, whereas the second inner connecting conductor 431 is positioned so as to be held between the dielectric layers 21 and 22.

In the multilayer capacitor in accordance with the twenty-first embodiment, terminal conductors 3A, 3B, 4A, 4B are connected to the inner electrodes 400 to 403, 410 to 413 not directly but electrically through outer connecting conductors 5A, 5B, 6A, 6B and the inner connecting conductors 420, 421, 430, 431. Therefore, the multilayer capacitor in accordance with the twenty-first embodiment yields an equivalent series resistance greater than that of a conventional multilayer capacitor in which all the inner electrodes are connected to their corresponding terminal conductors through lead conductors.

The number of first inner connecting conductors 420, 421 and second inner connecting conductors 430, 431 is greater in the multilayer capacitor in the twenty-first embodiment than in the multilayer capacitor C16, whereas the inner connecting conductors 420, 421, 430, 431 are connected in parallel to their corresponding terminal conductors 3A, 3B, 4A, 4B. Since the number of inner connecting conductors 420, 421, 430, 431 is greater, the number of current paths between the terminal conductors 3A, 3B, 4A, 4B and inner electrodes 400 to 403, 410 to 413 increases. Therefore, the multilayer capacitor in accordance with the twenty-first embodiment yields an equivalent series resistance smaller than that of the multilayer capacitor C16.

By adjusting the number of first inner connecting conductors 420, 421 and the number of second inner connecting conductors 430, 431 as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors, the multilayer capacitor in accordance with the twenty-first embodiment can regulate the equivalent series resistance while attaining a desirable value (e.g., large value) of capacitance.

The first conductor portion 421A of the first inner connecting conductor 421 and the first conductor portion 430A of the second inner connecting conductor 430 oppose their corresponding inner electrodes with a dielectric layer in between respectively, and thus can contribute to forming a capacity component. Therefore, the multilayer capacitor in accordance with the twenty-first embodiment can further increase its capacitance.

In the multilayer body of the multilayer capacitor in accordance with the twenty-first embodiment, a plurality of first and second inner electrodes 400 to 403, 410 to 413 are arranged between the first and second inner connecting conductors 420, 430 and the first and second inner connecting conductors 421, 431. Therefore, the multilayer capacitor in accordance with the twenty-first embodiment can set the equivalent series resistance with a favorable balance.

Since the outer conductors are arranged as in the multilayer capacitor C16, the multilayer capacitor in accordance with the twenty-first embodiment can be manufactured easily as with the multilayer capacitor C16. The multilayer capacitor in accordance with the twenty-first embodiment can lower the equivalent series inductance as with the multilayer capacitor C16. Also, the multilayer capacitor in accordance with the twenty-first embodiment can be mounted easily as with the multilayer capacitor C16.

Twenty-Second Embodiment

Figure 29:
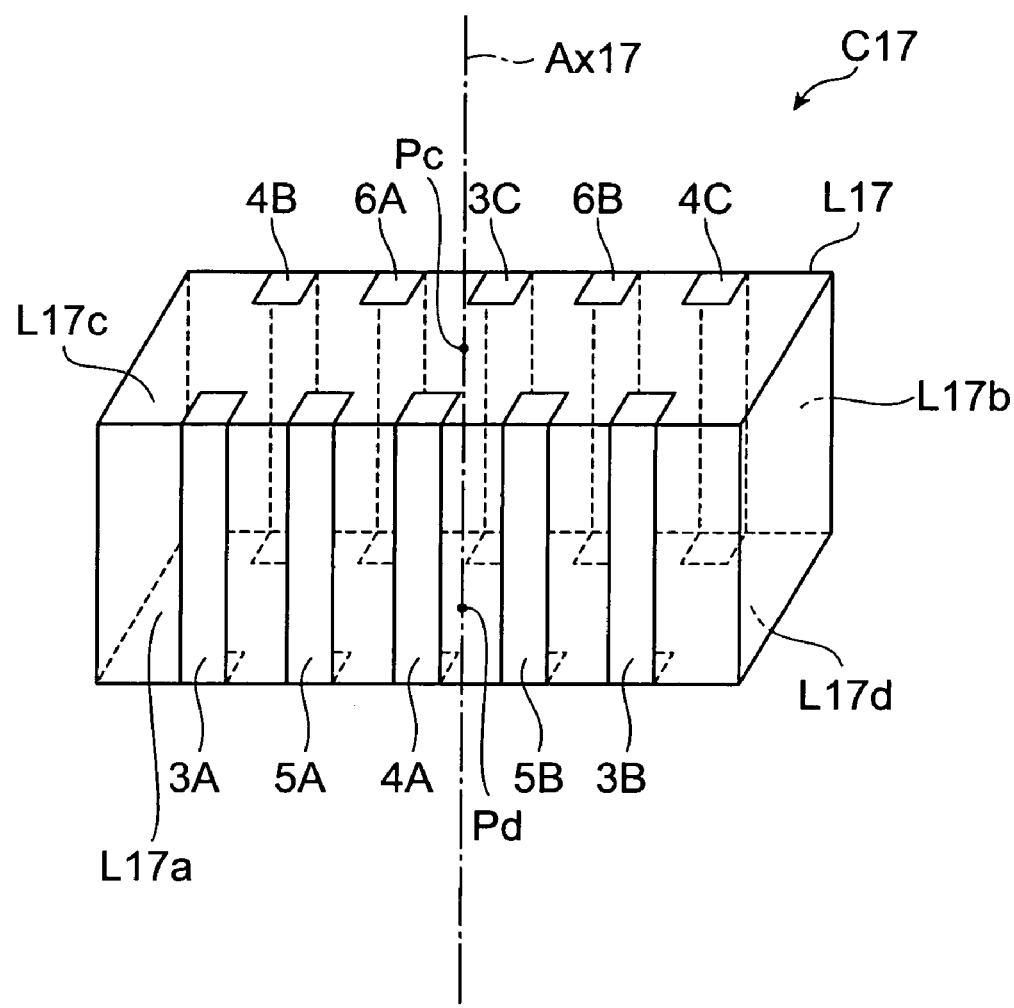
FIG. 29 is a perspective view of the multilayer capacitor in accordance with a twenty-second embodiment.
Figure 30:
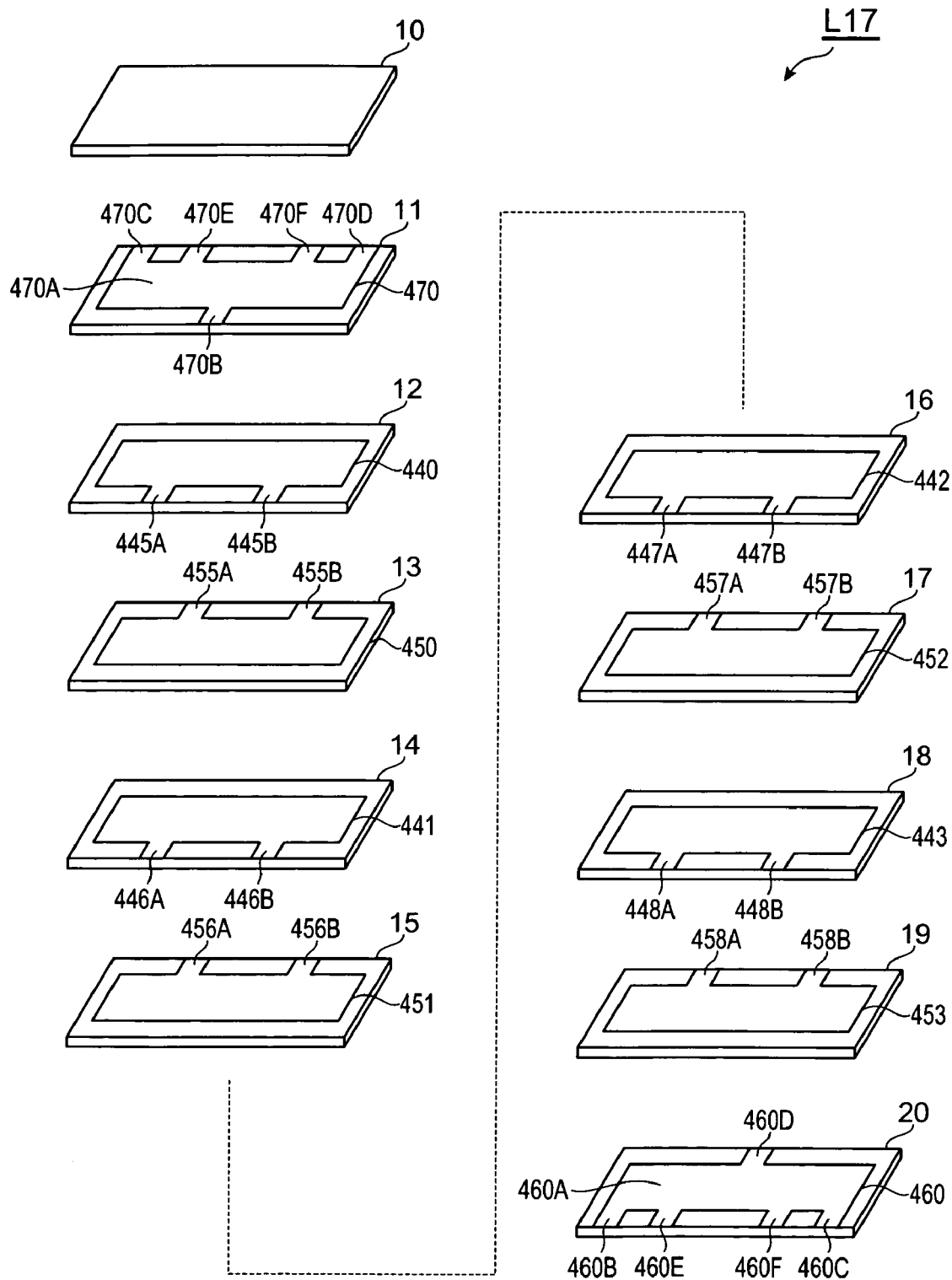
FIG. 30 is an exploded perspective view of the multilayer body included in the multilayer capacitor in accordance with the twenty-second embodiment.

With reference to FIGS. 29 and 30, the structure of the multilayer capacitor C17 in accordance with a twenty-second embodiment will be explained. FIG. 29 is a perspective view of the multilayer capacitor in accordance with the twenty-second embodiment. FIG. 30 is an exploded perspective view of the multilayer body included in the multilayer capacitor in accordance with the twenty-second embodiment.

As shown in FIG. 29, the multilayer capacitor C17 in accordance with the twenty-second embodiment comprises a multilayer body L17 having a substantially rectangular parallelepiped form, and a plurality of outer conductors formed on side faces of the multilayer body L17. The plurality of outer conductors include a plurality of (3 in this embodiment) first terminal conductors 3A, 3B, 3C; a plurality of (3 in this embodiment) second terminal conductors 4A, 4B, 4C; a plurality of (2 in this embodiment) first outer connecting conductors 5A, 5B; and a plurality of (2 in this embodiment) second outer connecting conductors 6A, 6B. The plurality of outer conductors are formed so as to be electrically insulated from each other on surfaces of the multilayer body L17.

Each of the first terminal conductors 3A, 3B, second terminal conductor 4A, and first outer connecting conductors 5A, 5B is positioned on a side face L17a among side faces parallel to the laminating direction of the multilayer body L17, i.e., on the first side face L17a that is a side face extending longitudinally of side faces orthogonal to the laminating direction of the multilayer body L17. The first terminal conductors 3A, 3B, second terminal conductor 4A, and first outer connecting conductors 5A, 5B are formed in the order of the first terminal conductor 3A, first outer connecting conductor 5A, second terminal conductor 4A, first outer connecting conductor 5B, and first terminal conductor 3B from the left side to right side in FIG. 29. Namely, the first outer connecting conductor 5A is formed so as to be positioned between the first terminal conductor 3A and second terminal conductor 4A on the first side face L17a. The first outer connecting conductor 5B is formed so as to be positioned between the first terminal conductor 3B and second terminal conductor 4A on the first side face L17a.

Each of the first terminal conductor 3C, second terminal conductors 4B, 4C, and second outer connecting conductors 6A, 6B is positioned on a side face L17b among side faces parallel to the laminating direction of the multilayer body L17, i.e., on the second side face L17b that is a side face extending longitudinally of side faces orthogonal to the laminating direction of the multilayer body L17 and opposing the first side face L17a. The first terminal conductor 3C, second terminal conductors 4B, 4C, and second outer connecting conductors 6A, 6B are formed in the order of the second terminal conductor 4B, second outer connecting conductor 6A, first terminal conductor 3C, second outer connecting conductor 6B, and second terminal conductor 4C from the left side to right side in FIG. 29. Namely, the second outer connecting conductor 6A is formed so as to be positioned between the first terminal conductor 3C and second terminal conductor 4B on the second side face L17b. The second outer connecting conductor 6B is formed so as to be positioned between the first terminal conductor 3C and second terminal conductor 4C on the second side face L17b.

The second terminal conductor 4C is located at a position symmetrical to the first terminal conductor 3A about a center axis Ax17 passing respective center positions Pc, Pd of two side faces L17c, L17d orthogonal to the laminating direction of the multilayer body L17 among center axes of the multilayer body L17. The second terminal conductor 4B is located at a position symmetrical to the first terminal conductor 3B about the center axis Ax17 of the multilayer body L17. The second terminal conductor 4A is located at a position symmetrical to the first terminal conductor 3C about the center axis Ax17 of the multilayer body L17. The second outer connecting conductor 6B is located at a position symmetrical to the first outer connecting conductor 5A about the center axis Ax17 of the multilayer body L17. The second outer connecting conductor 6A is located at a position symmetrical to the first outer connecting conductor 5B about the center axis Ax17 of the multilayer body L17.

The first terminal conductor 3A formed on the first side face L17a and the second terminal conductor 4B formed on the second side face L17b oppose each other along a direction in which the first side face L17a and second side face L17b oppose each other. The first terminal conductor 3B formed on the first side face L17a and the second terminal conductor 4C formed on the second side face L17b oppose each other along the direction in which the first side face L17a and second side face L17b oppose each other. The first terminal conductor 3C formed on the second side face L17b and the second terminal conductor 4A formed on the first side face L17a oppose each other along the direction in which the first side face L17a and second side face L17b oppose each other. The first outer connecting conductor 5A formed on the first side face L17a and the second outer connecting conductor 6A formed on the second side face L17b oppose each other along the direction in which the first side face L17a and second side face L17b oppose each other. The first outer connecting conductor 5B formed on the first side face L17a and the second outer connecting conductor 6B formed on the second side face L17b oppose each other along the direction in which the first side face L17a and second side face L17b oppose each other.

As shown in FIG. 30, the multilayer body L17 is constructed by alternately laminating a plurality of (11 in this embodiment) dielectric layers 10 to 20 with a plurality of (4 each in this embodiment) first and second inner electrodes 440 to 443, 450 to 453. In the actual multilayer capacitor C17, the dielectric layers 10 to 20 are integrated to such an extent that their boundaries are indiscernible.

Further, one first inner connecting conductor 460 and one second inner connecting conductor 470 are laminated in the multilayer body L17. In the multilayer body L17, a plurality of first inner electrodes 440 to 443 and a plurality of second inner electrodes 450 to 453 are arranged between one first inner connecting conductor 460 which is part of the two layers of inner connecting conductors 460, 470 and the remaining one second inner connecting conductor 470.

Each of the first inner electrodes 440 to 443 has a substantially rectangular form. The plurality of first inner electrodes 440 to 443 are formed at respective positions separated by a predetermined distance from a side face parallel to the laminating direction of the dielectric layers 10 to 20 (hereinafter simply referred to as "laminating direction") in the multilayer body L17. The first inner electrodes 440 to 443 are formed with lead conductors 445A to 448A, 445B to 448B extending so as to be led to the first side face L17a of the multilayer body L17.

The lead conductors 445A and 445B are integrally formed with the first inner electrode 440, and extend therefrom so as to reach the first side face L17a of the multilayer body L17. The lead conductors 446A and 446B are integrally formed with the first inner electrode 441, and extend therefrom so as to reach the first side face L17a of the multilayer body L17. The lead conductors 447A and 447B are integrally formed with the first inner electrode 442, and extend therefrom so as to reach the first side face L17a of the multilayer body L17. The lead conductors 448A and 448B are integrally formed with the first inner electrode 443, and extend therefrom so as to reach the first side face L17a of the multilayer body L17.

The first inner electrode 440 is electrically connected to the first outer connecting conductors 5A and 5B through the lead conductors 445A and 445B, respectively. The first inner electrode 441 is electrically connected to the first outer connecting conductors 5A and 5B through the lead conductors 446A and 446B, respectively. The first inner electrode 442 is electrically connected to the first outer connecting conductors 5A and 5B through the lead conductors 447A and 447B, respectively. The first inner electrode 443 is electrically connected to the first outer connecting conductors 5A and 5B through the lead conductors 448A and 448B, respectively. As a consequence, the plurality of first inner electrodes 440 to 443 are electrically connected to each other through the first outer connecting conductors 5A, 5B.

Each of the second inner electrodes 450 to 453 has a substantially rectangular form. The plurality of second inner electrodes 450 to 453 are formed at respective positions separated by a predetermined distance from a side face parallel to the laminating direction of the multilayer body L17. The second inner electrodes 450 to 453 are formed with lead conductors 455A to 458A, 455B to 458B extending so as to be led to the second side face L17b of the multilayer body L17.

The lead conductors 455A and 455B are integrally formed with the second inner electrode 450, and extend therefrom so as to reach the second side face L17b of the multilayer body L17. The lead conductors 456A and 456B are integrally formed with the second inner electrode 451, and extend therefrom so as to reach the second side face L17b of the multilayer body L17. The lead conductors 457A and 457B are integrally formed with the second inner electrode 452, and extend therefrom so as to reach the second side face L17b of the multilayer body L17. The lead conductors 458A and 458B are integrally formed with the second inner electrode 453, and extend therefrom so as to reach the second side face L17b of the multilayer body L17.

The second inner electrode 450 is electrically connected to the second outer connecting conductors 6A and 6B through the lead conductors 455A and 455B, respectively. The second inner electrode 451 is electrically connected to the second outer connecting conductors 6A and 6B through the lead conductors 456A and 456B, respectively. The second inner electrode 452 is electrically connected to the second outer connecting conductors 6A and 6B through the lead conductors 457A and 457B, respectively. The second inner electrode 453 is electrically connected to the second outer connecting conductors 6A and 6B through the lead conductors 458A and 458B, respectively. As a consequence, the plurality of first inner electrodes 450 to 453 are electrically connected to each other through the second outer connecting conductors 6A, 6B.

The first inner connecting conductor 460 is positioned so as to be held between the dielectric layers 19 and 20. The second inner connecting conductor 470 is positioned so as to be held between the dielectric layers 10 and 11. The first inner connecting conductor 460 and second inner connecting conductor 470 are electrically insulated from each other.

The first inner connecting conductor 460 includes a first conductor portion 460A having an oblong form; second, third, fifth, and sixth conductor portions 460B, 460C, 460E, 460F extending from the first conductor portion 460A so as to be led to the first side face L17a of the multilayer body L17; and a fourth conductor portion 460D extending from the first conductor portion 460A so as to be led to the second side face L17b of the multilayer body L17. The first conductor portion 460A is arranged such that its longitudinal axis is parallel to the first and second side faces L17a, L17b of the multilayer body L17.

The second, third, fifth, and sixth conductor portions 460B, 460C, 460E, 460F of the first inner connecting conductor 460 are positioned in the order of the second conductor portion 460B, fifth conductor portion 460E, sixth conductor portion 460F, and third conductor portion 460C from the left side to right side in FIG. 30. The second conductor portion 460B, third conductor portion 460C, fourth conductor portion 460D, fifth conductor portion 460E, and sixth conductor portion 460F are electrically connected to the first terminal conductor 3A, first terminal conductor 3B, first terminal conductor 3C, first outer connecting conductor 5A, and first outer connecting conductor 5B, respectively. As a consequence, the first inner connecting conductor 460 is electrically connected to the first terminal conductors 3A to 3C and first outer connecting conductors 5A, 5B.

The second inner connecting conductor 470 includes a first conductor portion 470A having an oblong form; a second conductor portion 470B extending from the first conductor portion 470A so as to be led to the first side face L17a of the multilayer body L17; and third to sixth conductor portions 470C to 470F extending from the first conductor portion 470A so as to be led to the second side face L17b of the multilayer body L17. The first conductor portion 470A is arranged such that its longitudinal axis is parallel to the first and second side faces L17a, L17b of the multilayer body L17.

The third to sixth conductor portions 470C to 470F of the second inner connecting conductor 470 are positioned in the order of the third conductor portion 470C, fifth conductor portion 470E, sixth conductor portion 470F, and fourth conductor portion 470D from the left side to right side in FIG. 30. The second conductor portion 470B, third conductor portion 470C, fourth conductor portion 470D, fifth conductor portion 470E, and sixth conductor portion 470F are electrically connected to the second terminal conductor 4A, second terminal conductor 4B, second terminal conductor 4C, second outer connecting conductor 6A, and second outer connecting conductor 6B, respectively. As a consequence, the second inner connecting conductor 470 is electrically connected to the second terminal conductors 4A to 4C and second outer connecting conductors 6A, 6B.

The first conductor portion 460A of the first inner connecting conductor 460 is a region opposing the second inner electrode 453 with the dielectric layer 19 in between. The first conductor portion 470A of the first inner connecting conductor 470 is a region opposing the first inner electrode 440 with the dielectric layer 11 in between.

The first and second inner connecting conductors 460, 470 are laminated in the multilayer body L17 such that the multilayer body L17 includes at least one set (four sets in this embodiment) of first and second inner electrodes neighboring each other with a dielectric layer in between in the laminating direction. Specifically, the first and second inner connecting conductors 460, 470 are laminated in the multilayer body L17 such that the multilayer body L17 includes the first inner electrode 440 and second inner electrode 450 neighboring each other with the dielectric layer 12 in between in the laminating direction, for example. Namely, in the multilayer body L17, the first and second inner connecting conductors 460, 470 are arranged on the outside of one set of first and second inner electrodes 440, 450.

In the multilayer capacitor C17, the first terminal conductors 3A to 3C are connected to the first inner electrodes 440 to 443 not directly but electrically through the first outer connecting conductors 5A, 5B and first inner connecting conductor 460. Also, in the multilayer capacitor C17, the second terminal conductors 4A to 4C are connected to the second inner electrodes 450 to 453 not directly but electrically through the second outer connecting conductors 6A, 6B and second inner connecting conductor 470. As a result, the multilayer capacitor C17 yields an equivalent series resistance greater than that of a conventional multilayer capacitor in which all the inner electrodes are connected to their corresponding terminal conductors through lead conductors.

By adjusting the number of first and second inner connecting conductors 460, 470 directly connected to the first terminal conductors 3A to 3C and second terminal conductors 4A to 4C in such a fashion, this embodiment sets the equivalent series resistance of the multilayer capacitor C17 to a desirable value, and thus can regulate the equivalent series resistance easily with a high precision. Since the equivalent series resistance is controlled by the first and second inner connecting conductors, the multilayer capacitor C17 can regulate the equivalent series resistance while attaining a desirable value (e.g., large value) of capacitance.

The first and second terminal conductors 3A to 3C, 4A to 4C and first and second outer connecting conductors 5A, 5B, 6A, 6B, which are outer conductors of the multilayer capacitor C17, are formed on any of the opposing first and second side faces L17a, L17b of the multilayer body L17. Thus, in the multilayer capacitor C17, all the outer connecting conductors (first terminal conductors 3A to 3C; second terminal conductors 4A to 4C; first outer connecting conductors 5A, 5B; and second outer connecting conductors 6A, 6B) are formed on the two opposing side faces L17a, L17b of the multilayer body L17. Consequently, the number of steps required for forming outer conductors can be made smaller in the multilayer capacitor C17 than in the case where terminal conductors are formed on three or more side faces (e.g., four side faces) of a multilayer body. Therefore, the multilayer capacitor C17 can be manufactured easily.

The first inner connecting conductor 460 has the first conductor portion 460A that is a region opposing the second inner electrode 453 with the dielectric layer 19 in between in the multilayer body L17 in the laminating direction. Therefore, the first inner connecting conductor 460 can also contribute to forming a capacity component of the multilayer capacitor C17. Consequently, the multilayer capacitor C17 can further increase its capacitance.

The second inner connecting conductor 470 has the first conductor portion 470A that is a region opposing the first inner electrode 440 with the dielectric layer 11 in between in the multilayer body L17 in the laminating direction. Therefore, the second inner connecting conductor 470 can also contribute to forming a capacity component of the multilayer capacitor C17. Consequently, the multilayer capacitor C17 can further increase its capacitance.

In the multilayer body L17 of the multilayer capacitor C17, a plurality of first inner electrodes 440 to 443 and a plurality of second inner electrodes 450 to 453 are arranged between part of the inner connecting conductors 460, 470 (first inner connecting conductor 460) and the rest (second inner connecting conductor 470). Therefore, the multilayer capacitor C17 can set the equivalent series resistance with a favorable balance.

The multilayer capacitor C17 can lower its equivalent series inductance. A reason therefore can be considered as follows. Namely, when the multilayer capacitor C17 is mounted to a substrate or the like such that the first terminal conductors 3A to 3C are directly connected to land patterns, the second terminal conductors 4A to 4C are directly connected to land patterns having a polarity different from that of the land patterns connected to the first terminal conductors 3A to 3C, and the first and second outer connecting conductors 5A, 5B, 6A, 6B are not directly connected to any land patterns, a current flowing between the first terminal conductor 3A and second terminal conductor 4B and a current flowing between the first terminal conductor 3C and second terminal conductor 4A are directed opposite to each other along the direction in which the first and second side faces L17a, L17b oppose each other. Therefore, a magnetic field caused by the current flowing between the first terminal conductor 3A and second terminal conductor 4B and a magnetic field caused by the current flowing between the first terminal conductor 3C and second terminal conductor 4A cancel each other out.

When the multilayer capacitor C17 is mounted to a substrate or the like as mentioned above, a current flowing between the first terminal conductor 3C and second terminal conductor 4A and a current flowing between the first terminal conductor 3B and second terminal conductor 4C are directed opposite to each other along the direction in which the first and second side faces L17a, L17b oppose each other. These seem to be the reason why the multilayer capacitor C17 can lower its equivalent series inductance.

In the multilayer capacitor C17, the first terminal conductor 3A and first outer connecting conductor 5A are formed adjacent to each other, and the first terminal conductor 3B and first outer connecting conductor 5B are formed adjacent to each other on the first side face L17a of the multilayer body L17. Therefore, the following effect is obtained when the multilayer capacitor C17 is mounted to a substrate or the like such that the first terminal conductors 3A to 3C are directly connected to land patterns while the first outer connecting conductors 5A, 5B are not directly connected to land patterns.

Namely, a magnetic field caused by a current flowing between the first terminal conductor 3A and the first inner connecting conductor 460 (the second conductor portion 460B of the first inner connecting conductor 460) and a magnetic field caused by a current flowing between the first outer connecting conductor 5A and the first inner connecting conductor 460 (the fifth conductor portion 460E of the first inner connecting conductor 460) cancel each other out. Further, a magnetic field caused by a current flowing between the first terminal conductor 3B and the first inner connecting conductor 460 (the third conductor portion 460C of the first inner connecting conductor 460) and a magnetic field caused by a current flowing between the first outer connecting conductor 5B and the first inner connecting conductor 460 (the sixth conductor portion 460F of the first inner connecting conductor 460) cancel each other out. As a result, the multilayer capacitor C17 can lower the equivalent series inductance. When there is at least one pair of first terminal conductor and first outer connecting conductor adjacent to each other, the equivalent series inductance can be lowered.

In the multilayer capacitor C17, the first terminal conductor 4B and second outer connecting conductor 6A are formed adjacent to each other, and the second terminal conductor 4C and second outer connecting conductor. 6B are formed adjacent to each other on the second side face L17b of the multilayer body L17. Therefore, the following effect is obtained when the multilayer capacitor C17 is mounted to a substrate or the like such that the second terminal conductors 4A to 4C are directly connected to land patterns while the second outer connecting conductors 6A, 6B are not directly connected to land patterns.

Namely, a magnetic field caused by a current flowing between the second terminal conductor 4B and the second inner connecting conductor 470 (the second conductor portion 470C of the second inner connecting conductor 470) and a magnetic field caused by a current flowing between the second outer connecting conductor 6A and the second inner connecting conductor 470 (the fifth conductor portion 470E of the second inner connecting conductor 470) cancel each other out. Further, a magnetic field caused by a current flowing between the second terminal conductor 4C and the second inner connecting conductor 470 (the fourth conductor portion 470D of the second inner connecting conductor 470) and a magnetic field caused by a current flowing between the second outer connecting conductor 6B and the second inner electrodes 450 to 453 (lead conductors 455B to 458B) and a current flowing between the second outer connecting conductor 6B and the second inner connecting conductor 470 (the sixth conductor portion 470F of the second inner connecting conductor 470) cancel each other out. As a result, the multilayer capacitor C17 can lower the equivalent series inductance. When there is at least one pair of second terminal conductor and second outer connecting conductor adjacent to each other, the equivalent series inductance can be lowered.

In the multilayer capacitor C17, each of pairs of the first terminal conductor 3A and second terminal conductor 4C, the first terminal conductor 3B and second terminal conductor 4B, the first terminal conductor 3C and second terminal conductor 4A, the first outer connecting conductor 5A and second outer connecting conductor 6B, and the first outer connecting conductor 5B and second outer connecting conductor 6A are formed at positions symmetrical to each other about the center axis Ax17 of the multilayer body L17. Therefore, even when the multilayer capacitor C17 is rotated by 180 degrees about the center axis Ax17 on a substrate or the like, the relationship of connections between the land patterns and the terminal conductors and outer connecting conductors is not changed.

Also, in the multilayer capacitor C17, each of pairs of the first terminal conductor 3A and second terminal conductor 4B, the first terminal conductor 3B and second terminal conductor 4C, the first terminal conductor 3C and second terminal conductor 4A, the first outer connecting conductor 5A and second outer connecting conductor 6A, and the first outer connecting conductor 5B and second outer connecting conductor 6B oppose each other along the direction in which the first side face L17a and second side face L17b oppose each other in the multilayer body L17. Therefore, even when the multilayer capacitor C17 is reversed so as to be mounted to a substrate or the like at the opposite side face, the relationship of connections between the land patterns and the terminal conductors and outer connecting conductors is not changed.

Even when the multilayer capacitor C17 is reversed about an axis orthogonal to the side faces L17a, L17b of the multilayer body L17, the relationship of connections between the land patterns and the terminal conductors and outer connecting conductors is not changed.

Since the terminal conductors 3A to 3C, 4A to 4C and outer connecting conductors 5A, 5B, 6A, 6B are arranged as mentioned above, the multilayer capacitor C17 can be mounted in conformity to various mounting directions. Therefore, the multilayer capacitor C17 can be mounted easily.

Twenty-Third Embodiment

Figure 31:
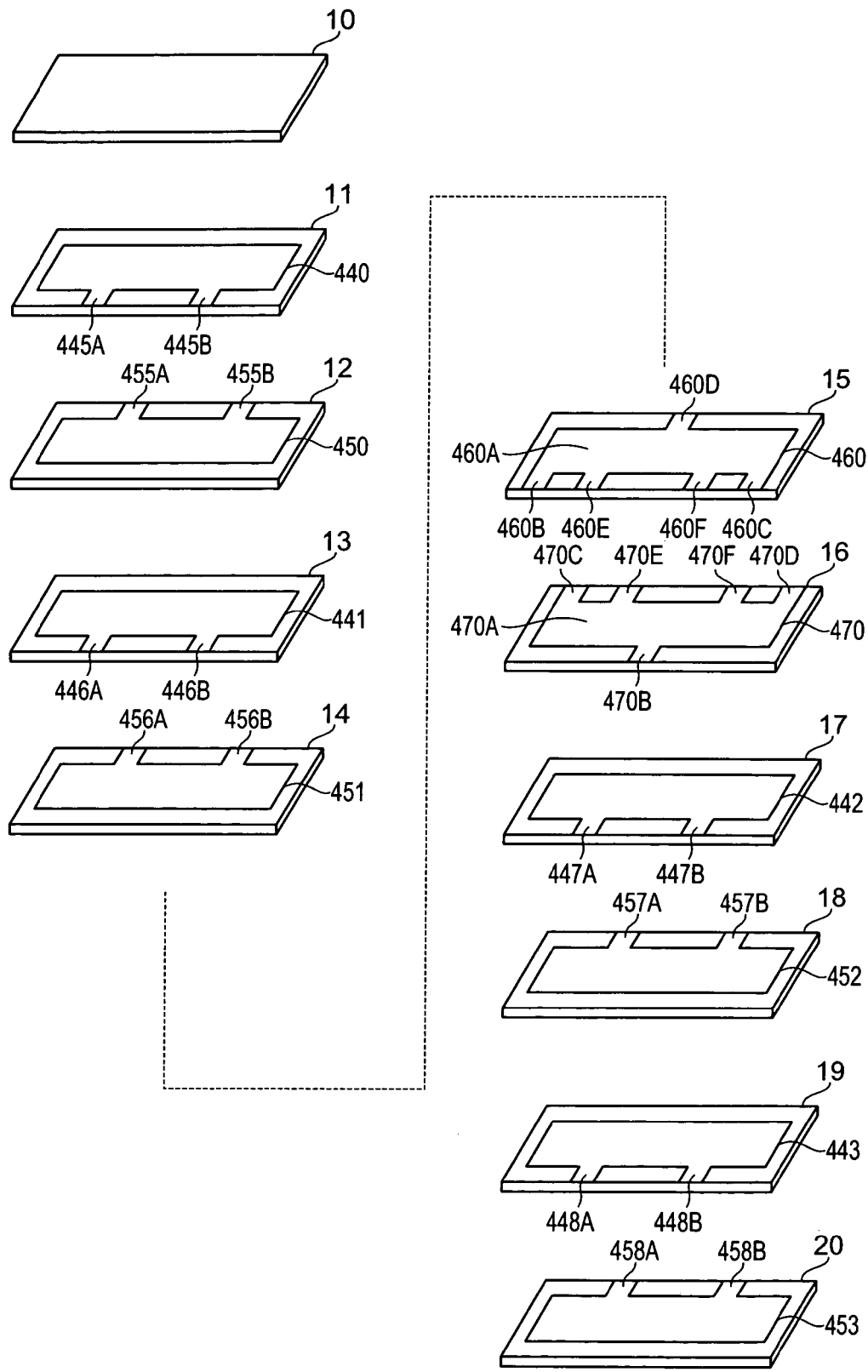
FIG. 31 is an exploded perspective view of the multilayer body included in the multilayer capacitor in accordance with a twenty-third embodiment.

With reference to FIG. 31, the structure of the multilayer capacitor in accordance with a twenty-third embodiment will be explained. The multilayer capacitor in accordance with the twenty-third embodiment differs from the multilayer capacitor C17 in accordance with the twenty-second embodiment in terms of positions of inner connecting conductors 460, 470 in the laminating direction. FIG. 31 is an exploded perspective view of the multilayer body included in the multilayer capacitor in accordance with the twenty-third embodiment.

As shown in FIG. 31, in the multilayer capacitor in accordance with the twenty-third embodiment, one each of first and second inner connecting conductors 460, 470 is laminated between two layers each of first and second inner electrodes 440, 441, 450, 451 and two layers each of first and second inner electrodes 442, 443, 452, 453. More specifically, the first inner connecting conductor 460 is positioned so as to be held between the dielectric layers 14 and 15. The second inner connecting conductor 470 is positioned so as to be held between the dielectric layers 15 and 16.

In the multilayer capacitor in accordance with the twenty-third embodiment, each of the first and second inner connecting conductors 460, 470 is laminated in the multilayer body such that the multilayer body includes at least one set of first and second inner electrodes neighboring each other (e.g., first and second inner electrodes 440, 450 with the dielectric layer 11 in between) with a dielectric layer in between in the laminating direction.

In the multilayer capacitor in accordance with the twenty-third embodiment, the first terminal conductors 3A to 3C are connected to the first inner electrodes 440 to 443 not directly but electrically through the first outer connecting conductors 5A, 5B and first inner connecting conductor 460. Also, in the multilayer capacitor in accordance with the twenty-third embodiment, the second terminal conductors 4A to 4C are connected to the second inner electrodes 450 to 453 not directly but electrically through the second outer connecting conductors 6A, 6B and second inner connecting conductor 470. These allow the multilayer capacitor in accordance with the twenty-third embodiment to yield an equivalent series resistance greater than that of a conventional multilayer capacitor in which all the inner electrodes are connected to their corresponding terminal conductors through lead conductors.

When the first terminal conductors 3A to 3C are concerned, the multilayer capacitor in accordance with the twenty-third embodiment differs from the multilayer capacitor C17 in accordance with the twenty-second embodiment in terms of how the respective resistance components of the first outer connecting conductors 5A, 5B are connected to the respective first terminal conductors 3A to 3C. Namely, the respective resistance components of the first outer connecting conductors 5A, 5B in the multilayer capacitor C17 in accordance with the twenty-second embodiment are connected in series to the first inner connecting conductor 460 so as to be connected to the respective first terminal conductors 3A to 3C. In multilayer capacitor in accordance with the twenty-third embodiment, by contrast, the respective resistance components of the first outer connecting conductors 5A, 5B are divided at the first inner connecting conductor 460 as a boundary so as to be connected in parallel to the respective first terminal conductors 3A to 3C.

When the second terminal conductors 4A to 4C are concerned, the multilayer capacitor in accordance with the twenty-third embodiment differs from the multilayer capacitor C17 in accordance with the twenty-second embodiment in terms of how the respective resistance components of the second outer connecting conductors 6A, 6B are connected to the respective second terminal conductors 4A to 4C. Namely, the respective resistance components of the second outer connecting conductors 6A, 6B in the multilayer capacitor C17 in accordance with the twenty-second embodiment are connected in series to the second inner connecting conductor 470, so as to be connected to the respective second terminal conductors 4A to 4C. In multilayer capacitor in accordance with the twenty-third embodiment, by contrast, the respective resistance components of the second outer connecting conductors 6A, 6B are divided at the second inner connecting conductor 470 as a boundary, so as to be connected in parallel to the respective second terminal conductors 4A to 4C.

Therefore, because of the difference in resistance components of the first and second outer connecting conductors 5A, 5B, 6A, 6B, the multilayer capacitor in accordance with the twenty-third embodiment yields an equivalent series resistance smaller than that of the multilayer capacitor C17 in accordance with the twenty-second embodiment.

By adjusting positions of the first inner connecting conductor 460 directly connected to the first terminal conductors 3A to 3C and the second inner connecting conductor 470 directly connected to the second terminal conductors 4A to 4C as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors, the multilayer capacitor in accordance with the twenty-third embodiment can regulate the equivalent series resistance while attaining a desirable value (e.g., large value) of capacitance.

All the outer conductors (first and second terminal conductors 3A to 3C, 4A to 4C and first and second outer connecting conductors 5A, 5B, 6A, 6B) of the multilayer capacitor in accordance with the twenty-third embodiment are formed on the opposing first and second side faces of the multilayer body. Consequently, the number of steps required for forming outer conductors can be made smaller in the multilayer capacitor in accordance with the twenty-third embodiment than in the case where outer conductors are formed on three or more side faces (e.g., four side faces) of a multilayer body, whereby the multilayer capacitor in accordance with the twenty-third embodiment can be manufactured easily.

The first conductor portion 460A of the first inner connecting conductor 460 opposes the second inner electrode 451 with the dielectric layer 14 in between. The first conductor portion 470A of the second inner connecting conductor 470 opposes the first inner electrode 442 with the dielectric layer 16 in between. Therefore, the first and second inner connecting conductors 460, 470 can also contribute to forming the capacity component in the multilayer capacitor in accordance with the twenty-third embodiment, whereby the capacitance in the multilayer capacitor can further be increased.

As with the multilayer capacitor C17, the multilayer capacitor in accordance with the twenty-third embodiment can lower the equivalent series inductance. As with the multilayer capacitor C17, the multilayer capacitor in accordance with the twenty-third embodiment can be mounted easily.

Twenty-Fourth Embodiment

Figure 32:
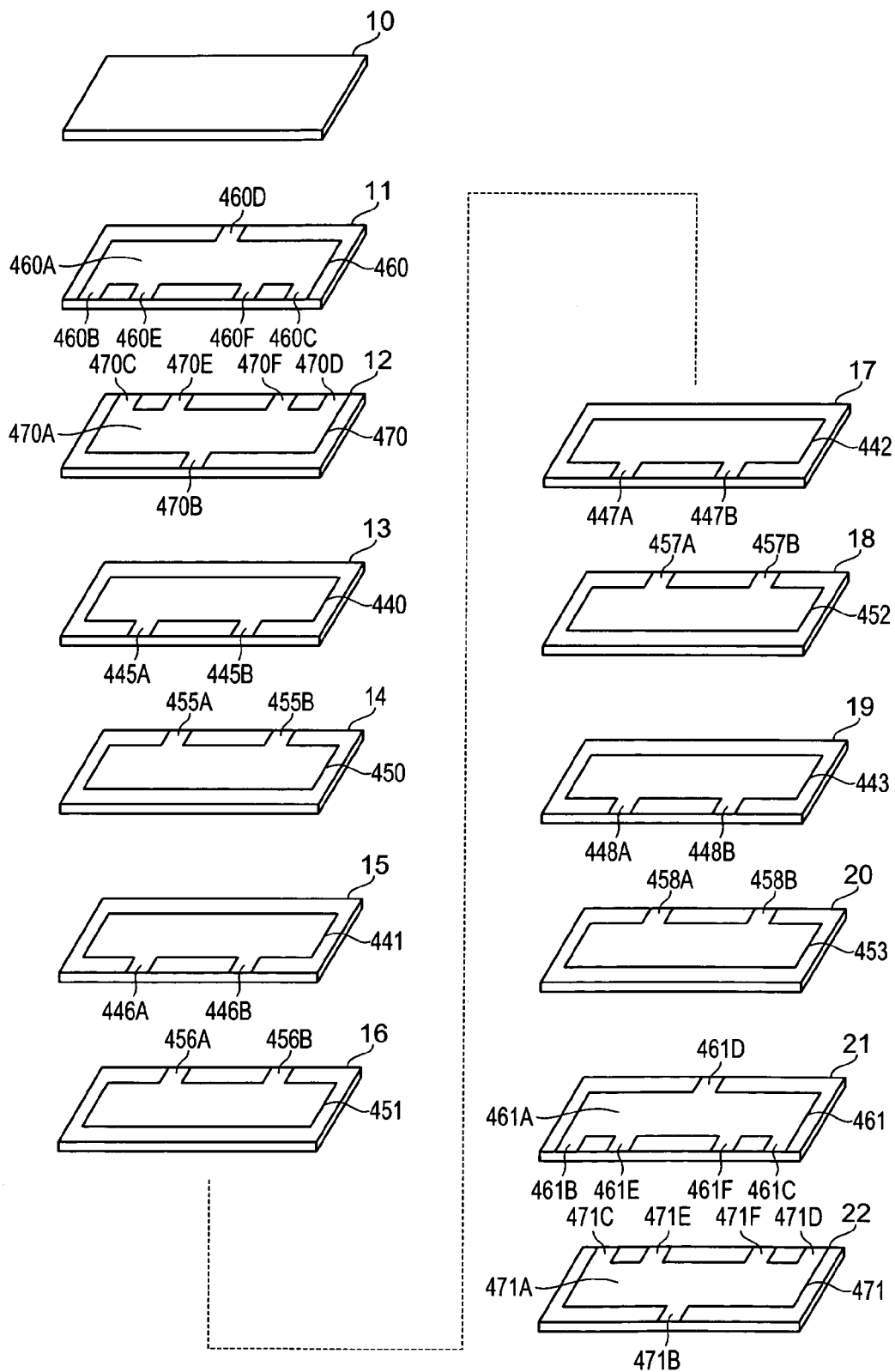
FIG. 32 is an exploded perspective view of the multilayer body included in the multilayer capacitor in accordance with a twenty-fourth embodiment.

With reference to FIG. 32, the structure of the multilayer capacitor in accordance with a twenty-fourth embodiment will be explained. The multilayer capacitor in accordance with the twenty-fourth embodiment differs from the multilayer capacitor C17 in accordance with the twenty-second embodiment in terms of the number of first and second inner connecting conductors. FIG. 32 is an exploded perspective view of the multilayer body included in the multilayer capacitor in accordance with the twenty-fourth embodiment.

As shown in FIG. 32, the multilayer body of the multilayer capacitor in accordance with the twenty-fourth embodiment is constructed by alternately laminating a plurality of (13 in this embodiment) dielectric layers 10 to 22 with a plurality of (4 each in this embodiment) first and second inner electrodes 440 to 443, 450 to 453.

In the multilayer body of the multilayer capacitor in accordance with the twenty-fourth embodiment, a plurality of (2 in this embodiment) first inner connecting conductors 460, 461 and a plurality of (2 in this embodiment) second inner connecting conductors 470, 471 are laminated. In the multilayer body of the multilayer capacitor in accordance with the twenty-fourth embodiment, four layers of first inner electrodes 440 to 443 and four layers of second inner electrodes 450 to 453 are arranged between one each of the first and second inner connecting conductors 460, 470, which are part of the plurality of inner connecting conductors 460, 461, 470, 471, and the remaining first and second connecting conductors 461, 471.

The first inner connecting conductor 460 is positioned so as to be held between the dielectric layers 10 and 11. The first inner connecting conductor 461 is positioned so as to be held between the dielectric layers 20 and 21. The second inner connecting conductor 470 is positioned so as to be held between the dielectric layers 11 and 12. The second inner connecting conductor 471 is positioned so as to be held between the dielectric layers 21 and 22.

The first inner connecting conductor 461 includes a first conductor portion 461A having an oblong form, and second to sixth conductor portions 461B to 461F extending from the first conductor portion 461A so as to be led to side faces of the multilayer body. The second to sixth conductor portions 461B to 461F of the first inner connecting conductor 461 extend so as to be led to side faces corresponding to respective side faces where the second to sixth conductor portions 460B to 460F of the first inner connecting conductor 460 are led.

The second conductor portion 461B, third conductor portion 461C, fourth conductor portion 461D, fifth conductor portion 461E, and sixth conductor portion 461F are electrically connected to the first terminal conductor 3A, first terminal conductor 3B, first terminal conductor 3C, first outer connecting conductor 5A, and first outer connecting conductor 5B, respectively. As a consequence, the first inner connecting conductor 461 is electrically connected to the first terminal conductors 3A to 3C and first outer connecting conductors 5A, 5B.

The second inner connecting conductor 471 includes a first conductor portion 471A having an oblong form, and second to sixth conductor portions 471B to 471F extending from the first conductor portion 471A so as to be led to side faces of the multilayer body. The second to sixth conductor portions 471B to 471F of the second inner connecting conductor 471 extend so as to be led to side faces corresponding to respective side faces where the second to sixth conductor portions 470B to 470F of the second inner connecting conductor 470 are led.

The second conductor portion 471B, third conductor portion 471C, fourth conductor portion 471D, fifth conductor portion 471E, and sixth conductor portion 471F are electrically connected to the second terminal conductor 4A, second terminal conductor 4B, the second terminal conductor 4C, second outer connecting conductor 6A, and second outer connecting conductor 6B, respectively. As a consequence, the second inner connecting conductor 471 is electrically connected to the second terminal conductors 4A to 4C and second outer connecting conductors 6A, 6B.

In the multilayer capacitor in accordance with the twenty-fourth embodiment, the first and second inner connecting conductors 460, 461, 470, 471 are laminated in the multilayer body such that the multilayer body includes at least one set (four sets in this embodiment) of first and second inner electrodes neighboring each other with a dielectric layer in between in the laminating direction.

In the multilayer capacitor in accordance with the twenty-fourth embodiment, the first terminal conductors 3A to 3C are connected to the first inner electrodes 440 to 443 not directly but electrically through the first outer connecting conductors 5A, 5B and first inner connecting conductors 460, 461. Also, in the multilayer capacitor in accordance with the twenty-fourth embodiment, the second terminal conductors 4A to 4C are connected to the second inner electrodes 450 to 453 not directly but electrically through the second outer connecting conductors 6A, 6B and second inner connecting conductors 470, 471. Consequently, the multilayer capacitor in accordance with the twenty-fourth embodiment yields an equivalent series resistance greater than that of a conventional multilayer capacitor in which all the inner electrodes are connected to their corresponding terminal conductors through lead conductors.

The number of first inner connecting conductors 460, 461 is greater in the multilayer capacitor in accordance with the twenty-fourth embodiment than in the multilayer capacitor C17, whereas the first inner connecting conductors 460, 461 are connected in parallel to their corresponding first terminal conductors 3A to 3C. Since the number of first inner connecting conductors 460, 461 is greater, the number of current paths between the first terminal conductors 3A to 3C and first inner electrodes 440 to 443 increases. On the other hand, the number of second inner connecting conductors 470, 471 is greater in the multilayer capacitor in accordance with the twenty-fourth embodiment than in the multilayer capacitor C17, whereas the second inner connecting conductors 470, 471 are connected in parallel to their corresponding second terminal conductors 4A to 4C. Since the number of second inner connecting conductors 470, 471 is greater, the number of current paths between the second terminal conductors 4A to 4C and second inner electrodes 450 to 453 increases. Consequently, the multilayer capacitor in accordance with the twenty-fourth embodiment yields an equivalent series resistance smaller than that of the multilayer capacitor C17.

By adjusting the number of first inner connecting conductors 460, 461 directly connected to the first terminal conductors 3A to 3C and the number of second inner connecting conductors 470, 471 directly connected to the second terminal conductors 4A to 4C as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors, the multilayer capacitor in accordance with the twenty-fourth embodiment can regulate the equivalent series resistance while attaining a desirable value (e.g., large value) of capacitance.

All the outer conductors (first and second terminal conductors 3A to 3C, 4A to 4C and first and second outer connecting conductors 5A, 5B, 6A, 6B) of the multilayer capacitor in accordance with the twenty-fourth embodiment are formed on the opposing first and second side faces of the multilayer body. Consequently, the multilayer capacitor in accordance with the twenty-fourth embodiment can be manufactured more easily than in the case where outer conductors are formed on three or more side faces (e.g., four side faces) of a multilayer body.

The first conductor portion 461A of the first inner connecting conductor 461 opposes the second inner electrode 453 with the dielectric layer 20 in between. The first conductor portion 470A of the second inner connecting conductor 470 opposes the first inner electrode 440 with the dielectric layer 12 in between. Therefore, the first and second inner connecting conductors 461, 470 can also contribute to forming the capacity component in the multilayer capacitor in accordance with the twenty-fourth embodiment, whereby the capacitance in the multilayer capacitor can further be increased.

In the multilayer body of the multilayer capacitor in accordance with the twenty-fourth embodiment, a plurality of first and second inner electrodes 440 to 443, 450 to 453 are arranged between the first and second inner connecting conductors 460, 470 and the first and second inner connecting conductors 461, 471. Therefore, the multilayer capacitor in accordance with the twenty-fourth embodiment can set the equivalent series resistance with a favorable balance.

As with the multilayer capacitor C17, the multilayer capacitor in accordance with the twenty-fourth embodiment can lower the equivalent series inductance. Also, the multilayer capacitor in accordance with the twenty-fourth embodiment can be mounted easily as with the multilayer capacitor C17.

Twenty-Fifth Embodiment

Figure 33:
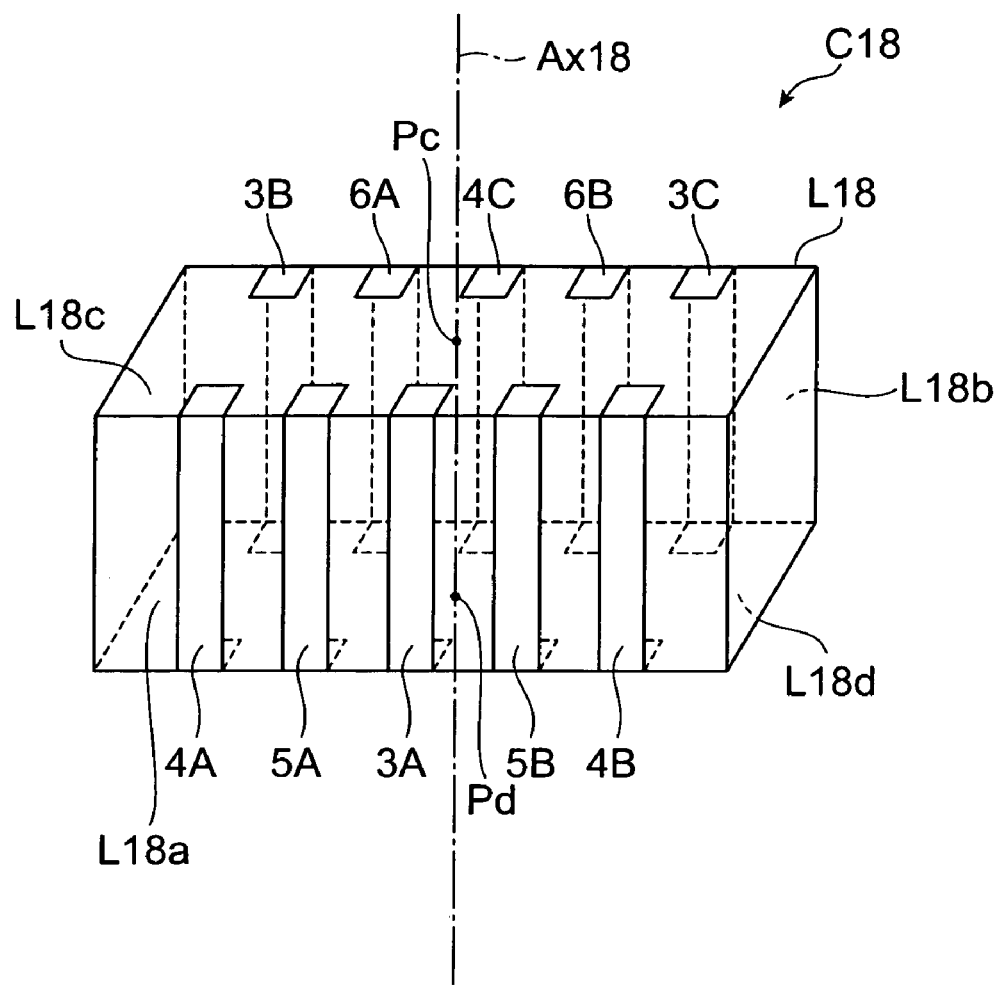
FIG. 33 is a perspective view of the multilayer capacitor in accordance with a twenty-fifth embodiment.
Figure 34:
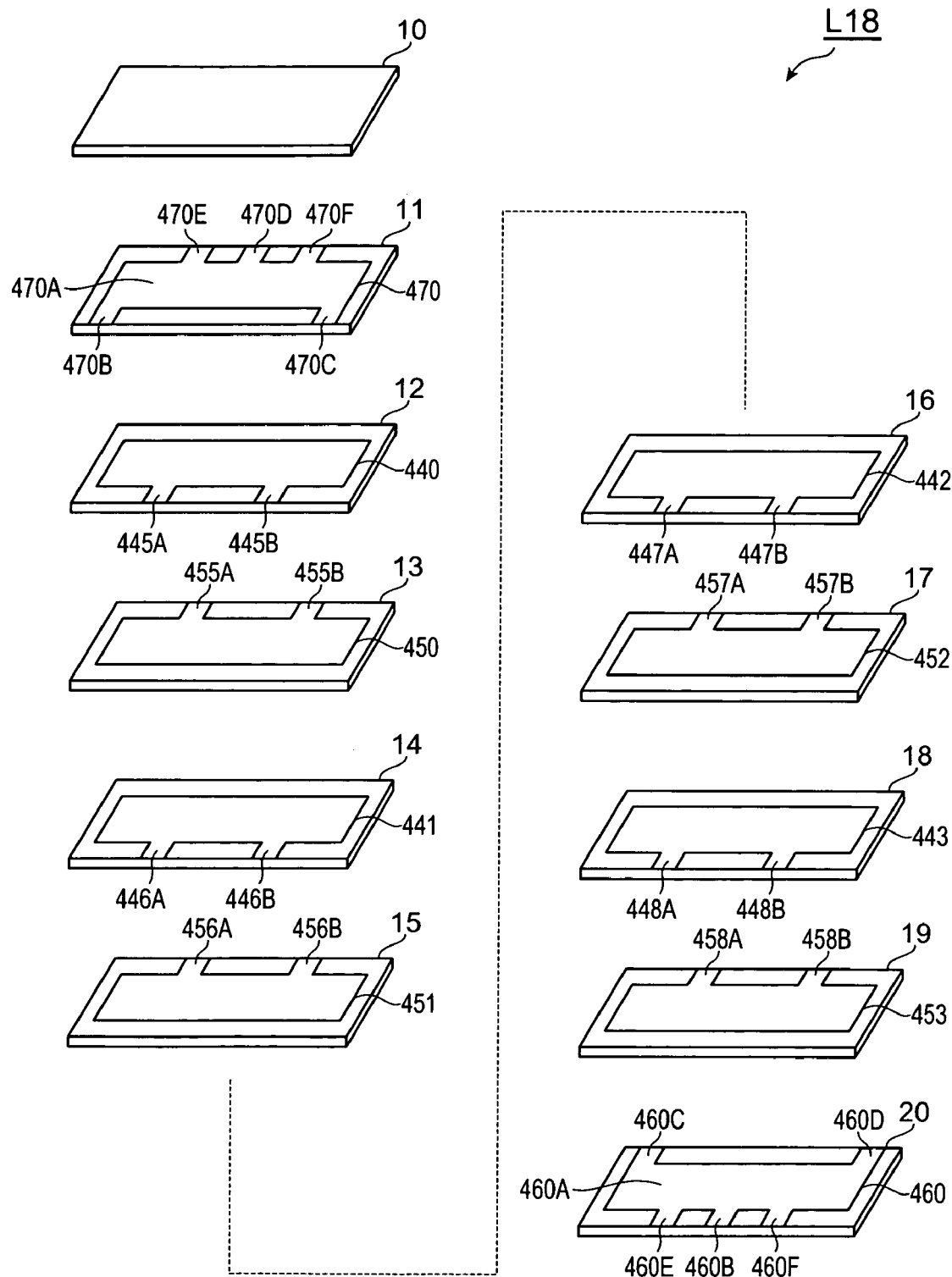
FIG. 34 is an exploded perspective view of the multilayer body included in the multilayer capacitor in accordance with the twenty-fifth embodiment.

With reference to FIGS. 33 and 34, the structure of the multilayer capacitor C18 in accordance with a twenty-fifth embodiment will be explained. The multilayer capacitor C18 in accordance with the twenty-fifth embodiment differs from the multilayer capacitor C17 in accordance with the twenty-second embodiment in terms of arrangement of outer conductors formed on the multilayer body. FIG. 33 is a perspective view of the multilayer capacitor in accordance with the twenty-fifth embodiment. FIG. 34 is an exploded perspective view of the multilayer body included in the multilayer capacitor in accordance with the twenty-fifth embodiment.

A second terminal conductor 4A, a first outer connecting conductor 5A, a first terminal conductor 3A, a first outer connecting conductor 5B, and a second terminal conductor 4B are formed in this order from the left side to right side in FIG. 33 on a first side face L18$a$ which is a side face extending longitudinally of faces L18$c$, L18$d$ orthogonal to the laminating direction of the multilayer body L18 among side faces parallel to the laminating direction of the multilayer body L18. Namely, on the first side face L18$a$, the first outer connecting conductor 5A is formed so as to be positioned between the first terminal conductor 3A and second terminal conductor 4A, whereas the first outer connecting conductor 5B is formed so as to be positioned between the first terminal conductor 3A and second terminal conductor 4B.

On a second side face L18$b$ which opposes the first side face L18$a$ and which is a side face extending longitudinally of the faces L18$c$ and L18$d$ orthogonal to the laminating direction of the multilayer body L18 among the side faces parallel to the laminating direction of the multilayer body L18, a first terminal conductor 3B, a second outer connecting conductor 6A, a second terminal conductor 4C, a second outer connecting conductor 6B, and a first terminal conductor 3C are formed in this order from the left side to right side in FIG. 33. Namely, on the second side face L18$b$, the second outer connecting conductor 6A is formed so as to be positioned between the first terminal conductor 3B and second terminal conductor 4C, whereas the second outer connecting conductor 6B is formed so as to be positioned between the first terminal conductor 3C and second terminal conductor 4C.

Therefore, each of pairs of the first terminal conductor 3A and first outer connecting conductor 5A and the first terminal conductor 3A and first outer connecting conductor 5B are formed adjacent to each other on the same side face, i.e., first side face L18$a$, of the multilayer body L18. Each of pairs of the second terminal conductor 4C and second outer connecting conductor 6A and the second terminal conductor 4C and second outer connecting conductor 6B are formed adjacent to each other on the same side face, i.e., second side face L18$b$, of the multilayer body L18.

Each of pairs of the first terminal conductor 3A and second terminal conductor 4C, the first terminal conductor 3B and second terminal conductor 4B, the first terminal conductor 3C and second terminal conductor 4A, the first outer connecting conductor 5A and second outer connecting conductor 6B, and the first outer connecting conductor 5B and second outer connecting conductor 6A are symmetrical to each other about a center axis Ax18 passing respective center positions Pc, Pd of the two side faces L18$c$, L18$d$ orthogonal to the laminating direction of the multilayer body L18 among center axes of the multilayer body L18. Each of pairs of the first terminal conductor 3A and second terminal conductor 4C, the first terminal conductor 3B and second terminal conductor 4A, the first terminal conductor 3C and second terminal conductor 4B, the first outer connecting conductor 5A and second outer connecting conductor 6A, and the first outer connecting conductors 5B and second outer connecting conductor 6B oppose each other along a direction in which the first side face L18$a$ and second side face L18$b$ of the multilayer body L18 oppose each other.

As shown in FIG. 34, the multilayer body L18 is constructed by alternately laminating a plurality of (11 in this embodiment) dielectric layers 10 to 20 with a plurality of (4 each in this embodiment) first and second inner electrodes 440 to 443, 450 to 453. Further, one first inner connecting conductor 420 and one second inner connecting conductor 470 are laminated in the multilayer body L18.

Lead conductors 445A to 448A extend from their corresponding first inner electrodes 440 to 443 so as to reach the first side face L18a of the multilayer body L18. Lead conductors 445B to 448B extend from their corresponding first inner electrodes 440 to 443 so as to reach the first side face L18a of the multilayer body L18.

Lead conductors 455A to 458A extend from their corresponding second inner electrodes 450 to 453 so as to reach the second side face L18b of the multilayer body L18. Lead conductors 455B to 458B extend from their corresponding second inner electrodes 450 to 453 so as to reach the second side face L18b of the multilayer body L18.

The first inner connecting conductor 460 includes a first conductor portion 460A having an oblong form; second, fifth and sixth conductor portions 460B, 460E, 460F extending from the first conductor portion 460A so as to be led to the first side face L18a of the multilayer body L18; and third and fourth conductor portions 460C, 460D extending from the first conductor portion 460A so as to be led to the second side face L18b of the multilayer body L18.

The second inner connecting conductor 470 includes a first conductor portion 470A having an oblong form; second and third conductor portions 470B, 470C extending from the first conductor portion 470A so as to be led to the first side face L18a of the multilayer body L18; and fourth, fifth and sixth conductor portions 470D, 470E, 470F extending from the first conductor portion 470A so as to be led to the second side face L18b of the multilayer body L18.

In the multilayer capacitor C18, the first terminal conductors 3A to 3C are connected to the first inner electrodes 440 to 443 not directly but electrically through the first outer connecting conductors 5A, 5B and first inner connecting conductor 460. Also, in the multilayer capacitor C18, the second terminal conductors 4A to 4C are connected to the second inner electrodes 450 to 453 not directly but electrically through the second outer connecting conductors 6A, 6B and second inner connecting conductor 470. These allow the multilayer capacitor C18 to yield an equivalent series resistance greater than that of a conventional multilayer capacitor in which all the inner electrodes are connected to their corresponding terminal conductors through lead conductors.

By adjusting the number of first inner connecting conductor 460 directly connected to the first terminal conductors 3A to 3C and the number of second inner connecting conductor 470 directly connected to the second terminal conductors 4A to 4C in such a fashion, this embodiment sets the equivalent series resistance of the multilayer capacitor C18 to a desirable value, and thus can regulate the equivalent series resistance easily with a high precision. Since the equivalent series resistance is controlled by the first and second inner connecting conductors, the multilayer capacitor C18 can regulate the equivalent series resistance while attaining a desirable value (e.g., large value) of capacitance.

All of the first and second terminal conductors 3A to 3C, 4A to 4C and first and second outer connecting conductors 5A, 5B, 6A, 6B, which are outer conductors of the multilayer capacitor C18, are formed on the opposing first and second side faces L18a, L18b of the multilayer body L18. Consequently, the number of steps required for forming outer conductors can be made smaller in the multilayer capacitor C18 than in the case where terminal conductors are formed on four side faces of the multilayer body L18. Therefore, the multilayer capacitor C18 can be manufactured easily.

The first conductor portion 460A of the first inner connecting conductor 460 and the first conductor portion 470A of the second inner connecting conductor 470 oppose their corresponding inner electrodes with a dielectric layer in between respectively, and thus can contribute to forming a capacity component. Therefore, the multilayer capacitor C18 can further increase its capacitance.

Since a plurality of first and second inner electrodes 440 to 443, 450 to 453 are arranged between the first inner connecting conductor 460 and second inner connecting conductor 470 in the multilayer body L18 of the multilayer capacitor C18, the equivalent series resistance can be set with a favorable balance.

The multilayer capacitor C18 can lower its equivalent series inductance. A reason therefore can be considered as follows. Namely, when the multilayer capacitor C18 is mounted to a substrate or the like such that the first terminal conductors 3A to 3C and second terminal conductors 4A to 4C are directly connected to their corresponding land patterns having polarities different from each other, a magnetic field caused by a current flowing between the first terminal conductor 3A and second terminal conductor 4C and a magnetic field caused by a current flowing between the first terminal conductor 3B and second terminal conductor 4A cancel each other out. Further, when the multilayer capacitor C18 is mounted to a substrate or the like as mentioned above, a magnetic field caused by a current flowing between the first terminal conductor 3A and second terminal conductor 4C and a magnetic field caused by a current flowing between the first terminal conductor 3C and second terminal conductor 4B cancel each other out. These seem to be the reason why the multilayer capacitor C18 can lower its equivalent series inductance.

In the multilayer capacitor C18, the first terminal conductor 3A and first outer connecting conductors 5A, 5B are formed adjacent to each other on the first side face L18a of the multilayer body L18. Also, in the multilayer capacitor C18, the second terminal conductor 4C and second outer connecting conductors 6A, 6B are formed adjacent to each other on the second side face L18b of the multilayer body L18. Therefore, when the multilayer capacitor C18 is mounted to a substrate or the like such that the terminal conductors 3A to 3C, 4A to 4C are directly connected to land patterns, whereas the outer connecting conductors 5A, 5B, 6A, 6B are not directly connected to land patterns, magnetic fields caused by currents flowing through the multilayer body L18 cancel each other out, thereby lowering the equivalent series inductance of the multilayer capacitor C18.

The multilayer capacitor C18 can be mounted easily because of positional relationships of the outer conductors 3A to 6A, 3B to 6B, 3C, 4C with the center axis Ax18, and positional relationships among the outer conductors 3A to 6A, 3B to 6B, 3C, 4C in the opposing direction of the first side face L18a and second side face L18b of the multilayer body L18.

Twenty-Sixth Embodiment

Figure 35:
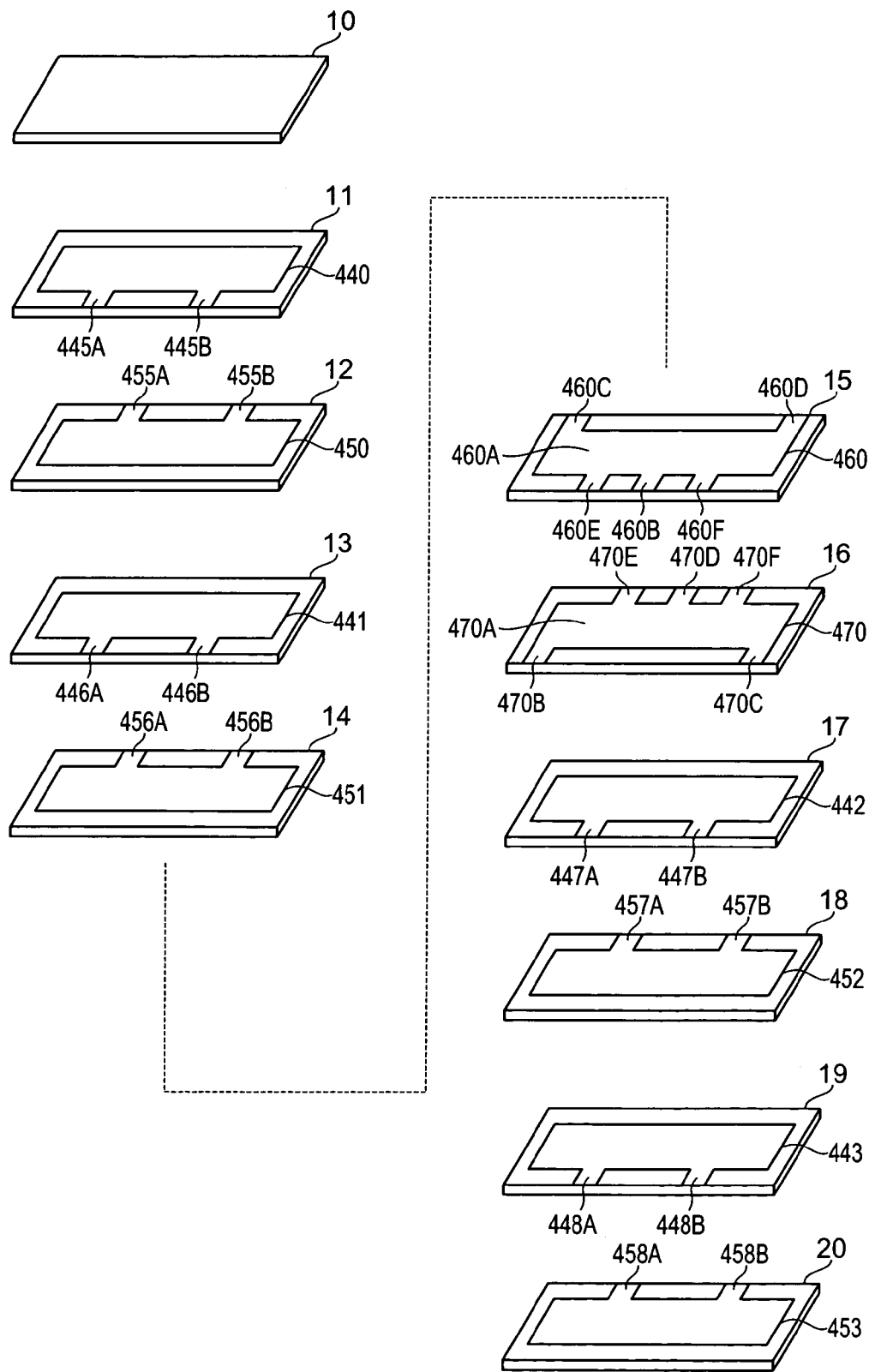
FIG. 35 is an exploded perspective view of the multilayer body included in the multilayer capacitor in accordance with a twenty-sixth embodiment.

With reference to FIG. 35, the structure of the multilayer capacitor in accordance with a twenty-sixth embodiment will be explained. The multilayer capacitor in accordance with the twenty-sixth embodiment differs from the multilayer capacitor C18 in accordance with the twenty-fifth embodiment in terms of positions of inner connecting conductors 460, 470 in the laminating direction. FIG. 35 is an exploded perspective view of the multilayer body included in the multilayer capacitor in accordance with the twenty-sixth embodiment.

In the multilayer capacitor in accordance with the twenty-sixth embodiment, as shown in FIG. 35, one each of the first and second inner connecting conductors 460, 470 is laminated between two each of first and second inner electrodes 440, 441, 450, 451 and two each of first and second inner electrodes 442, 443, 452, 453. More specifically, the first inner connecting conductor 460 is positioned so as to be held between dielectric layers 14 and 15. The second inner connecting conductor 470 is positioned so as to be held between dielectric layers 15 and 16.

In the multilayer capacitor in accordance with the twenty-sixth embodiment, terminal conductors 3A to 3C, 4A to 4C are connected to the inner electrodes 440 to 443, 450 to 453 not directly but electrically through the outer connecting conductors 5A, 5B, 6A, 6B and the inner connecting conductors 460, 470. Therefore, the multilayer capacitor in accordance with the twenty-sixth embodiment can yield an equivalent series resistance greater than that of a conventional multilayer capacitor in which all the inner electrodes are connected to their corresponding terminal conductors through lead conductors.

When the first terminal conductors 3A to 3C are concerned, the multilayer capacitor in accordance with the twenty-sixth embodiment differs from the multilayer capacitor C18 in accordance with the twenty-fifth embodiment in terms of the position of the first inner connecting conductor 460 and, consequently, in terms of how the respective resistance components of the first outer connecting conductors 5A, 5B are connected to the respective first terminal conductors 3A to 3C. Also, when the second terminal conductors 4A to 4C are concerned, the multilayer capacitor in accordance with the twenty-sixth embodiment differs from the multilayer capacitor C18 in accordance with the twenty-fifth embodiment in terms of the position of the second inner connecting conductor 470 and, consequently, in terms of how the respective resistance components of the second outer connecting conductors 6A, 6B are connected to the respective second terminal conductors 4A to 4C.

Because of the difference in resistance components of the first and second outer connecting conductors 5A, 5B, 6A, 6B, the multilayer capacitor in accordance with the twenty-sixth embodiment yields an equivalent series resistance smaller than that in the multilayer capacitor C18 in accordance with the twenty-fifth embodiment.

By adjusting positions of the first inner connecting conductors 460, 470 in the laminating direction as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors 460, 470, the multilayer capacitor in accordance with the twenty-sixth embodiment can regulate the equivalent series resistance while attaining a desirable value (e.g., large value) of capacitance.

The first conductor portion 460A of the first inner connecting conductor 460 and the first conductor portion 470A of the second inner connecting conductor 470 oppose their corresponding inner electrodes with a dielectric layer in between respectively, and thus can contribute to forming a capacity component. Therefore, the multilayer capacitor in accordance with the twenty-sixth embodiment can further increase its capacitance.

Since the outer conductors are arranged such as in the multilayer capacitor C18, the multilayer capacitor in accordance with the twenty-sixth embodiment can be manufactured easily as with the multilayer capacitor C18. The multilayer capacitor in accordance with the twenty-sixth embodiment can lower the equivalent series inductance as with the multilayer capacitor C18. Also, the multilayer capacitor in accordance with the twenty-sixth embodiment can be mounted easily as with the multilayer capacitor C18.

Twenty-Seventh Embodiment

Figure 36:
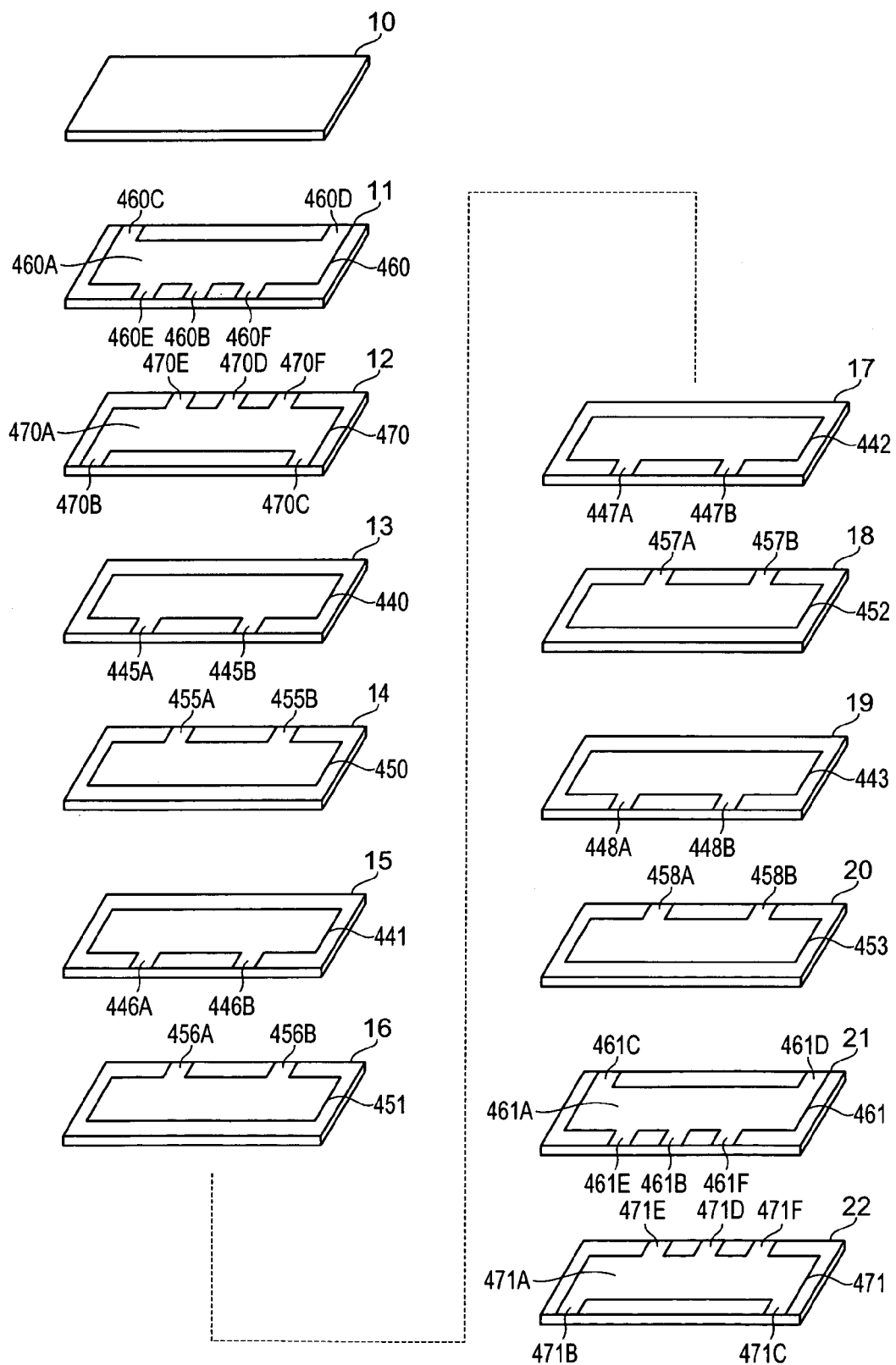
FIG. 36 is an exploded perspective view of the multilayer body included in the multilayer capacitor in accordance with a twenty-seventh embodiment.

With reference to FIG. 36, the structure of the multilayer capacitor in accordance with a twenty-seventh embodiment will be explained. The multilayer capacitor in accordance with the twenty-seventh embodiment differs from the multilayer capacitor C18 in accordance with the twenty-fifth embodiment in terms of the number of first and second inner connecting conductors. FIG. 36 is an exploded perspective view of the multilayer body included in the multilayer capacitor in accordance with the twenty-seventh embodiment.

As shown in FIG. 36, the multilayer body of the multilayer capacitor in accordance with the twenty-seventh embodiment is constructed by alternately laminating a plurality of (13 in this embodiment) dielectric layers 10 to 22 and a plurality of (4 each in this embodiment) first and second inner electrodes 440 to 443, 450 to 453.

In the multilayer body of the multilayer capacitor in accordance with the twenty-seventh embodiment, a plurality of (2 in this embodiment) first inner connecting conductors 460, 461 and a plurality of (2 in this embodiment) second inner connecting conductors 470, 471 are laminated. In the multilayer body of the multilayer capacitor in accordance with the twenty-seventh embodiment, the first inner electrodes 440 to 443 and second inner electrodes 450 to 453 are arranged between the first and second inner connecting conductors 460, 470 and the first and second inner connecting conductors 461, 471.

The first inner connecting conductor 460 is positioned so as to be held between the dielectric layers 10 and 11, whereas the first inner connecting conductor 461 is positioned so as to be held between the dielectric layers 20 and 21. The second inner connecting conductor 470 is positioned so as to be held between the dielectric layers 11 and 12, whereas the second inner connecting conductor 471 is positioned so as to be held between the dielectric layers 21 and 22.

In the multilayer capacitor in accordance with the twenty-seventh embodiment, terminal conductors 3A to 3C, 4A to 4C are connected to the inner electrodes 440 to 443, 450 to 453 not directly but electrically through outer connecting conductors 5A, 5B, 6A, 6B and the inner connecting conductors 460, 461, 470, 471. Therefore, the multilayer capacitor in accordance with the twenty-seventh embodiment yields an equivalent series resistance greater than that of a conventional multilayer capacitor in which all the inner electrodes are connected to their corresponding terminal conductors through lead conductors.

The number of first inner connecting conductors 460, 461 and second inner connecting conductors 470, 471 is greater in the multilayer capacitor in the twenty-seventh embodiment than in the multilayer capacitor C18, whereas the inner connecting conductors 460, 461, 470, 471 are connected in parallel to their corresponding terminal conductors 3A to 3C, 4A to 4C. Since the number of inner connecting conductors 460, 461, 470, 471 is greater, the number of current paths between the terminal conductors 3A to 3C, 4A to 4C and inner electrodes 440 to 443, 450 to 453 increases. Therefore, the multilayer capacitor in accordance with the twenty-seventh embodiment yields an equivalent series resistance smaller than that of the multilayer capacitor C18.

By adjusting the number of first inner connecting conductors 460, 461 and the number of second inner connecting conductors 470, 471 as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors, the multilayer capacitor in accordance with the twenty-seventh embodiment can regulate the equivalent series resistance while attaining a desirable value (e.g., large value) of capacitance.

The first conductor portion 461A of the first inner connecting conductor 461 and the first conductor portion 470A of the second inner connecting conductor 470 oppose their corresponding inner electrodes with a dielectric layer in between respectively, and thus can contribute to forming a capacity component. Therefore, the multilayer capacitor in accordance with the twenty-seventh embodiment can further increase its capacitance.

In the multilayer body of the multilayer capacitor in accordance with the twenty-seventh embodiment, a plurality of first and second inner electrodes 440 to 443, 450 to 453 are arranged between the first and second inner connecting conductors 460, 470 and the first and second inner connecting conductors 461, 471. Therefore, the multilayer capacitor in accordance with the twenty-seventh embodiment can set the equivalent series resistance with a favorable balance.

Since the outer conductors are arranged as in the multilayer capacitor C18, the multilayer capacitor in accordance with the twenty-seventh embodiment can be manufactured easily as with the multilayer capacitor C18. The multilayer capacitor in accordance with the twenty-seventh embodiment can lower the equivalent series inductance as with the multilayer capacitor C18. Also, the multilayer capacitor in accordance with the twenty-seventh embodiment can be mounted easily as with the multilayer capacitor C18.

Twenty-Eighth Embodiment

Figure 37:
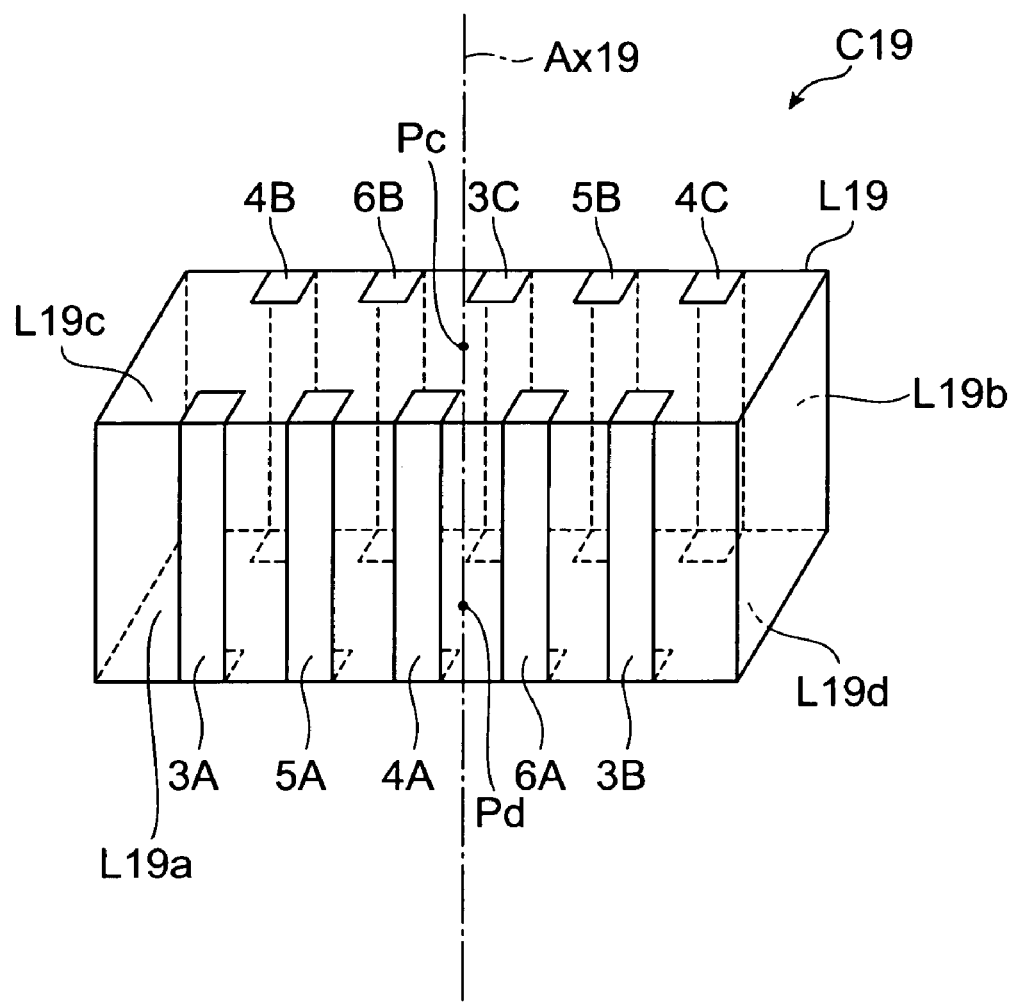
FIG. 37 is a perspective view of the multilayer capacitor in accordance with a twenty-eighth embodiment.
Figure 38:
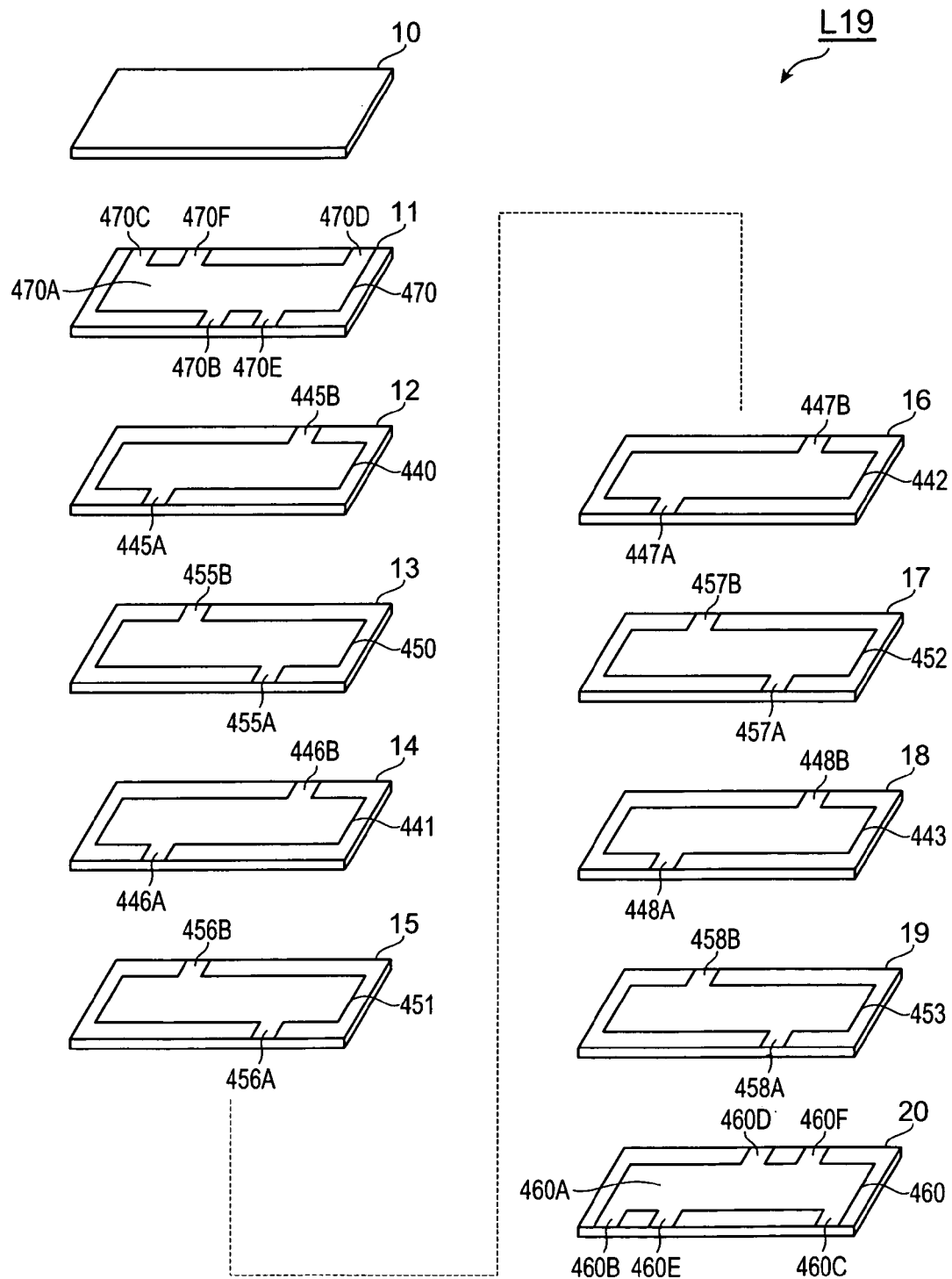
FIG. 38 is an exploded perspective view of the multilayer body included in the multilayer capacitor in accordance with the twenty-eighth embodiment.

With reference to FIGS. 37 and 38, the structure of the multilayer capacitor C19 in accordance with a twenty-eighth embodiment will be explained. The multilayer capacitor C19 in accordance with the twenty-eighth embodiment differs from the multilayer capacitor C17 in accordance with the twenty-second embodiment in terms of arrangement of outer conductors formed on the multilayer body. FIG. 37 is a perspective view of the multilayer capacitor in accordance with the twenty-eighth embodiment. FIG. 38 is an exploded perspective view of the multilayer body included in the multilayer capacitor in accordance with the twenty-eighth embodiment.

A first terminal conductor 3A, a first outer connecting conductor 5A, a second terminal conductor 4A, a second outer connecting conductor 6A, and a first terminal conductor 3B are formed in this order from the left side to right side in FIG. 37 on a first side face L19a which is a side face extending longitudinally of faces L19c, L19d orthogonal to the laminating direction of the multilayer body L19 among side faces parallel to the laminating direction of the multilayer body L19. Namely, on the first side face L19a, the first outer connecting conductor 5A is formed so as to be positioned between the first terminal conductor 3A and second terminal conductor 4A, whereas the second outer connecting conductor 6A is formed so as to be positioned between the first terminal conductor 3B and second terminal conductor 4A.

On a second side face L19b which opposes the first side face L19a and which is a side face extending longitudinally of the faces L19c and L19d orthogonal to the laminating direction of the multilayer body L19 among the side faces parallel to the laminating direction of the multilayer body L19, a second terminal conductor 4B, a second outer connecting conductor 6B, a first terminal conductor 3C, a first outer connecting conductor 5B, and a second terminal conductor 4C are formed in this order from the left side to right side in FIG. 37. Namely, on the second side face L19b, the first outer connecting conductor 5B is formed so as to be positioned between the first terminal conductor 3C and second terminal conductor 4C, whereas the second outer connecting conductor 6B is formed so as to be positioned between the first terminal conductor 3C and second terminal conductor 4B.

Therefore, a pair of the first terminal conductor 3A and first outer connecting conductor 5A are formed adjacent to each other on the same side face, i.e., first side face L19a, of the multilayer body L19. A pair of the first terminal conductor 3C and first outer connecting conductor 5B are formed adjacent to each other on the same side face, i.e., second side face L19b, of the multilayer body L19. A pair of the second terminal conductor 4A and second outer connecting conductor 6A is formed adjacent to each other on the same side face, i.e., first side face L19a, of the multilayer body L19. A pair of the second terminal conductor 4B and second outer connecting conductor 6B is formed adjacent to each other on the same side face, i.e., second side face L19b, of the multilayer body L19.

Each of pairs of the first terminal conductor 3A and second terminal conductor 4C, the first terminal conductor 3B and second terminal conductor 4B, the first terminal conductor 3C and second terminal conductor 4A, the first outer connecting conductors 5A and 5B, and the second outer connecting conductor 6A and 6B are symmetrical to each other about a center axis Ax19 passing respective center positions Pc, Pd of the two side faces L19c, L19d orthogonal to the laminating direction of the multilayer body L19 among center axes of the multilayer body L19. Each of pairs of the first terminal conductor 3A and second terminal conductor 4B, the first terminal conductor 3B and second terminal conductor 4C, the first terminal conductor 3C and second terminal conductor 4A, the first outer connecting conductor 5A and second outer connecting conductor 6B, and the first outer connecting conductors 5B and second outer connecting conductor 6A oppose each other along a direction in which the first side face L19a and second side face L19b of the multilayer body L19 oppose each other.

As shown in FIG. 38, the multilayer body L19 is constructed by alternately laminating a plurality of (11 in this embodiment) dielectric layers 10 to 20 with a plurality of (4 each in this embodiment) first and second inner electrodes 440 to 443, 450 to 453. Further, one first inner connecting conductor 420 and one second inner connecting conductor 470 are laminated in the multilayer body L19.

Lead conductors 445A to 448A extend from their corresponding first inner electrodes 440 to 443 so as to reach the first side face L19a of the multilayer body L19. Lead conductors 445B to 448B extend from second side face L19b of the multilayer body L19.

Lead conductors 455A to 458A extend from their corresponding second inner electrodes 450 to 453 so as to reach the first side face L19a of the multilayer body L19. Lead conductors 455B to 458B extend from their corresponding second inner electrodes 450 to 453 so as to reach the second side face L19b of the multilayer body L19.

The first inner connecting conductor 460 includes a first conductor portion 460A having an oblong form; second, third and fifth conductor portions 460B, 460C, 460E extending from the first conductor portion 460A so as to be led to the first side face L19a of the multilayer body L19; and fourth and sixth conductor portions 460D, 460F extending from the first conductor portion 460A so as to be led to the second side face L19b of the multilayer body L19.

The second inner connecting conductor 470 includes a first conductor portion 470A having an oblong form; second and fifth conductor portions 470B, 470E extending from the first conductor portion 470A so as to be led to the first side face L19a of the multilayer body L19; and third, fourth and sixth conductor portions 470C, 470D, 470F extending from the first conductor portion 470A so as to be led to the second side face L19b of the multilayer body L19.

In the multilayer capacitor C19, the first terminal conductors 3A to 3C are connected to the first inner electrodes 440 to 443 not directly but electrically through the first outer connecting conductors 5A, 5B and first inner connecting conductor 460. Also, in the multilayer capacitor C19, the second terminal conductors 4A to 4C are connected to the second inner electrodes 450 to 453 not directly but electrically through the second outer connecting conductors 6A, 6B and second inner connecting conductor 470. These allow the multilayer capacitor C19 to yield an equivalent series resistance greater than that of a conventional multilayer capacitor in which all the inner electrodes are connected to their corresponding terminal conductors through lead conductors.

By adjusting the number of first inner connecting conductor 460 directly connected to the first terminal conductors 3A to 3C and the number of second inner connecting conductor 470 directly connected to the second terminal conductors 4A to 4C in such a fashion, this embodiment sets the equivalent series resistance of the multilayer capacitor C19 to a desirable value, and thus can regulate the equivalent series resistance easily with a high precision. Since the equivalent series resistance is controlled by the first and second inner connecting conductors, the multilayer capacitor C19 can regulate the equivalent series resistance while attaining a desirable value (e.g., large value) of capacitance.

All of the first and second terminal conductors 3A to 3C, 4A to 4C and first and second outer connecting conductors 5A, 5B, 6A, 6B, which are outer conductors of the multilayer capacitor C19, are formed on the opposing first and second side faces L19a, L19b of the multilayer body L19. Consequently, the number of steps required for forming outer conductors can be made smaller in the multilayer capacitor C19 than in the case where terminal conductors are formed on four side faces of the multilayer body L19. Therefore, the multilayer capacitor C19 can be manufactured easily.

The first conductor portion 460A of the first inner connecting conductor 460 and the first conductor portion 470A of the second inner connecting conductor 470 oppose their corresponding inner electrodes with a dielectric layer in between respectively, and thus can contribute to forming a capacity component. Therefore, the multilayer capacitor C19 can further increase its capacitance.

Since a plurality of first and second inner electrodes 440 to 443, 450 to 453 are arranged between the first inner connecting conductor 460 and second inner connecting conductor 470 in the multilayer body L19 of the multilayer capacitor C19, the equivalent series resistance can be set with a favorable balance.

The multilayer capacitor C19 can lower its equivalent series inductance. A reason therefore can be considered as follows. Namely, when the multilayer capacitor C19 is mounted to a substrate or the like such that the first terminal conductors 3A to 3C and second terminal conductors 4A to 4C are directly connected to their corresponding land patterns having polarities different from each other, a magnetic field caused by a current flowing between the first terminal conductor 3A and second terminal conductor 4B and a magnetic field caused by a current flowing between the first terminal conductor 3C and second terminal conductor 4A cancel each other out. Further, when the multilayer capacitor C19 is mounted to a substrate or the like as mentioned above, a magnetic field caused by a current flowing between the first terminal conductor 3B and second terminal conductor 4C and a magnetic field caused by a current flowing between the first terminal conductor 3C and second terminal conductor 4A cancel each other out. These seem to be the reason why the multilayer capacitor C19 can lower its equivalent series inductance.

In the multilayer capacitor C19, the first terminal conductor 3A and first outer connecting conductor 5A are formed adjacent to each other on the first side face L19a of the multilayer body L19. The first terminal conductor 3C and first outer connecting conductor 5B are formed adjacent to each other on the second side face L19b of the multilayer body L19. Also, in the multilayer capacitor C19, the second terminal conductor 4A and second outer connecting conductor 6A are formed adjacent to each other on the first side face L19a of the multilayer body L19. The second terminal conductor 4B and second outer connecting conductor 6B are formed adjacent to each other on the second side face L19b of the multilayer body L19. Therefore, when the multilayer capacitor C19 is mounted to a substrate or the like such that the terminal conductors 3A to 3C, 4A to 4C are directly connected to land patterns, whereas the outer connecting conductors 5A, 5B, 6A, 6B are not directly connected to land patterns, magnetic fields caused by currents flowing through the multilayer body L19 cancel each other out, thereby lowering the equivalent series inductance of the multilayer capacitor C19.

The multilayer capacitor C19 can be mounted easily because of positional relationships of the outer conductors 3A to 6A, 3B to 6B, 3C, 4C with the center axis Ax19, and positional relationships among the outer conductors 3A to 6A, 3B to 6B, 3C, 4C in the opposing direction of the first side face L19a and second side face L19b of the multilayer body L19.

Twenty-Ninth Embodiment

Figure 39:
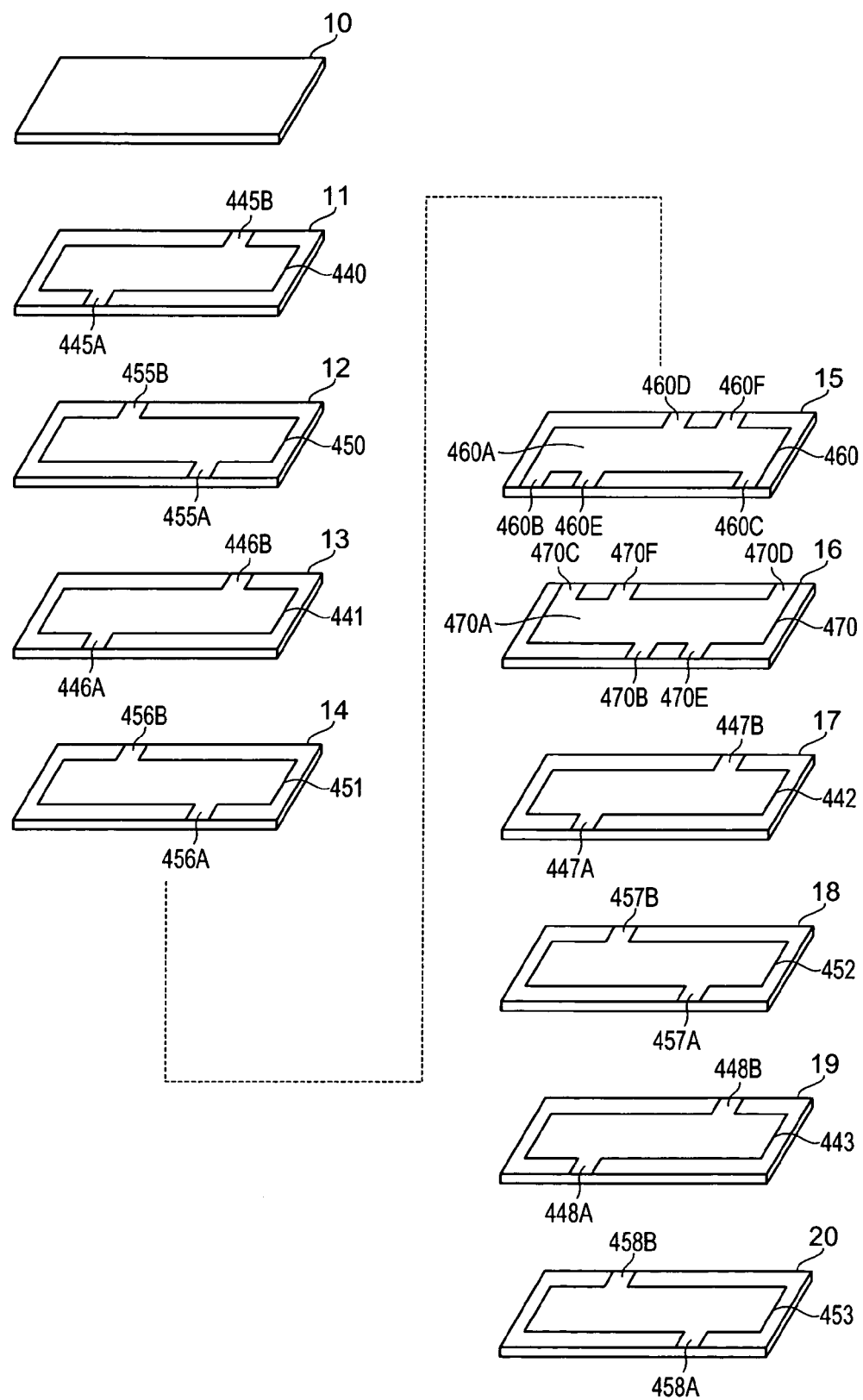
FIG. 39 is an exploded perspective view of the multilayer body included in the multilayer capacitor in accordance with a twenty-ninth embodiment.

With reference to FIG. 39, the structure of the multilayer capacitor in accordance with a twenty-ninth embodiment will be explained. The multilayer capacitor in accordance with the twenty-ninth embodiment differs from the multilayer capacitor C19 in accordance with the twenty-eighth embodiment in terms of positions of inner connecting conductors 460, 470 in the laminating direction. FIG. 39 is an exploded perspective view of the multilayer body included in the multilayer capacitor in accordance with the twenty-ninth embodiment.

In the multilayer capacitor in accordance with the twenty-ninth embodiment, as shown in FIG. 39, one each of the first and second inner connecting conductors 460, 470 is laminated between two each of first and second inner electrodes 440, 441, 450, 451 and two each of first and second inner electrodes 442, 443, 452, 453. More specifically, the first inner connecting conductor 460 is positioned so as to be held between dielectric layers 14 and 15. The second inner connecting conductor 470 is positioned so as to be held between dielectric layers 15 and 16.

In the multilayer capacitor in accordance with the twenty-ninth embodiment, terminal conductors 3A to 3C, 4A to 4C are connected to the inner electrodes 440 to 443, 450 to 453 not directly but electrically through the outer connecting conductors 5A, 5B, 6A, 6B and the inner connecting conductors 460, 470. Therefore, the multilayer capacitor in accordance with the twenty-ninth embodiment can yield an equivalent series resistance greater than that of a conventional multilayer capacitor in which all the inner electrodes are connected to their corresponding terminal conductors through lead conductors.

When the first terminal conductors 3A to 3C are concerned, the multilayer capacitor in accordance with the twenty-ninth embodiment differs from the multilayer capacitor C19 in accordance with the twenty-eighth embodiment in terms of the position of the first inner connecting conductor 460 and, consequently, in terms of how the respective resistance components of the first outer connecting conductors 5A, 5B are connected to the respective first terminal conductors 3A to 3C. Also, when the second terminal conductors 4A to 4C are concerned, the multilayer capacitor in accordance with the twenty-ninth embodiment differs from the multilayer capacitor C19 in accordance with the twenty-eighth embodiment in terms of the position of the second inner connecting conductor 470 and, consequently, in terms of how the respective resistance components of the second outer connecting conductors 6A, 6B are connected to the respective second terminal conductors 4A to 4C.

Because of the difference in resistance components of the first and second outer connecting conductors 5A, 5B, 6A, 6B, the multilayer capacitor in accordance with the twenty-ninth embodiment yields an equivalent series resistance smaller than that in the multilayer capacitor C19 in accordance with the twenty-eighth embodiment.

By adjusting positions of the first inner connecting conductors 460, 470 in the laminating direction as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors 460, 470, the multilayer capacitor in accordance with the twenty-ninth embodiment can regulate the equivalent series resistance while attaining a desirable value (e.g., large value) of capacitance.

The first conductor portion 460A of the first inner connecting conductor 460 and the first conductor portion 470A of the second inner connecting conductor 470 oppose their corresponding inner electrodes with a dielectric layer in between respectively, and thus can contribute to forming a capacity component. Therefore, the multilayer capacitor in accordance with the twenty-ninth embodiment can further increase its capacitance.

Since the outer conductors are arranged such as in the multilayer capacitor C19, the multilayer capacitor in accordance with the twenty-ninth embodiment can be manufactured easily as with the multilayer capacitor C19. The multilayer capacitor in accordance with the twenty-ninth embodiment can lower the equivalent series inductance as with the multilayer capacitor C19. Also, the multilayer capacitor in accordance with the twenty-ninth embodiment can be mounted easily as with the multilayer capacitor C19.

Thirtieth Embodiment

Figure 40:
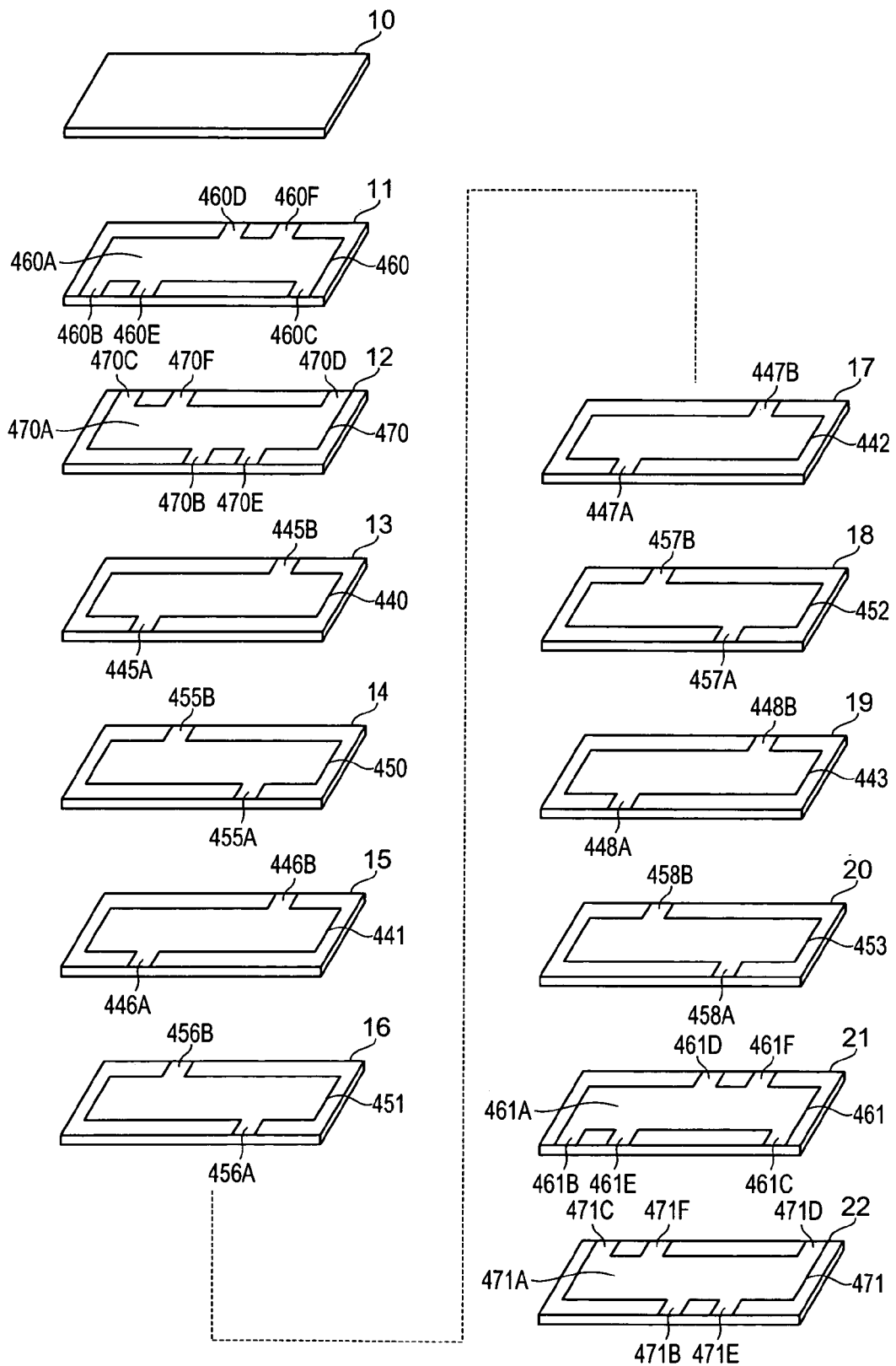
FIG. 40 is an exploded perspective view of the multilayer body included in the multilayer capacitor in accordance with a thirtieth embodiment.

With reference to FIG. 40, the structure of the multilayer capacitor in accordance with a thirtieth embodiment will be explained. The multilayer capacitor in accordance with the thirtieth embodiment differs from the multilayer capacitor C19 in accordance with the twenty-eighth embodiment in terms of the number of first and second inner connecting conductors. FIG. 40 is an exploded perspective view of the multilayer body included in the multilayer capacitor in accordance with the thirtieth embodiment.

As shown in FIG. 40, the multilayer body of the multilayer capacitor in accordance with the thirtieth embodiment is constructed by alternately laminating a plurality of (13 in this embodiment) dielectric layers 10 to 22 and a plurality of (4 each in this embodiment) first and second inner electrodes 440 to 443, 450 to 453.

In the multilayer body of the multilayer capacitor in accordance with the thirtieth embodiment, a plurality of (2 in this embodiment) first inner connecting conductors 460, 461 and a plurality of (2 in this embodiment) second inner connecting conductors 470, 471 are laminated. In the multilayer body of the multilayer capacitor in accordance with the thirtieth embodiment, the first inner electrodes 440 to 443 and second inner electrodes 450 to 453 are arranged between the first and second inner connecting conductors 460, 470 and the first and second inner connecting conductors 461, 471.

The first inner connecting conductor 460 is positioned so as to be held between the dielectric layers 10 and 11, whereas the first inner connecting conductor 461 is positioned so as to be held between the dielectric layers 20 and 21. The second inner connecting conductor 470 is positioned so as to be held between the dielectric layers 11 and 12, whereas the second inner connecting conductor 471 is positioned so as to be held between the dielectric layers 21 and 22.

In the multilayer capacitor in accordance with the thirtieth embodiment, terminal conductors 3A to 3C, 4A to 4C are connected to the inner electrodes 440 to 443, 450 to 453 not directly but electrically through outer connecting conductors 5A, 5B, 6A, 6B and the inner connecting conductors 460, 461, 470, 471. Therefore, the multilayer capacitor in accordance with the thirtieth embodiment yields an equivalent series resistance greater than that of a conventional multilayer capacitor in which all the inner electrodes are connected to their corresponding terminal conductors through lead conductors.

The number of first inner connecting conductors 460, 461 and second inner connecting conductors 470, 471 is greater in the multilayer capacitor in the thirtieth embodiment than in the multilayer capacitor C19, whereas the inner connecting conductors 460, 461, 470, 471 are connected in parallel to their corresponding terminal conductors 3A to 3C, 4A to 4C. Since the number of inner connecting conductors 460, 461, 470, 471 is greater, the number of current paths between the terminal conductors 3A to 3C, 4A to 4C and inner electrodes 440 to 443, 450 to 453 increases. Therefore, the multilayer capacitor in accordance with the thirtieth embodiment yields an equivalent series resistance smaller than that of the multilayer capacitor C19.

By adjusting the number of first inner connecting conductors 460, 461 and the number of second inner connecting conductors 470, 471 as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors, the multilayer capacitor in accordance with the thirtieth embodiment can regulate the equivalent series resistance while attaining a desirable value (e.g., large value) of capacitance.

The first conductor portion 461A of the first inner connecting conductor 461 and the first conductor portion 470A of the second inner connecting conductor 470 oppose their corresponding inner electrodes with a dielectric layer in between respectively, and thus can contribute to forming a capacity component. Therefore, the multilayer capacitor in accordance with the thirtieth embodiment can further increase its capacitance.

In the multilayer body of the multilayer capacitor in accordance with the thirtieth embodiment, a plurality of first and second inner electrodes 440 to 443, 450 to 453 are arranged between the first and second inner connecting conductors 460, 470 and the first and second inner connecting conductors 461, 471. Therefore, the multilayer capacitor in accordance with the thirtieth embodiment can set the equivalent series resistance with a favorable balance.

Since the outer conductors are arranged as in the multilayer capacitor C19, the multilayer capacitor in accordance with the thirtieth embodiment can be manufactured easily as with the multilayer capacitor C19. The multilayer capacitor in accordance with the thirtieth embodiment can lower the equivalent series inductance as with the multilayer capacitor C19. Also, the multilayer capacitor in accordance with the thirtieth embodiment can be mounted easily as with the multilayer capacitor C19.

Thirty-First Embodiment

Figure 41:
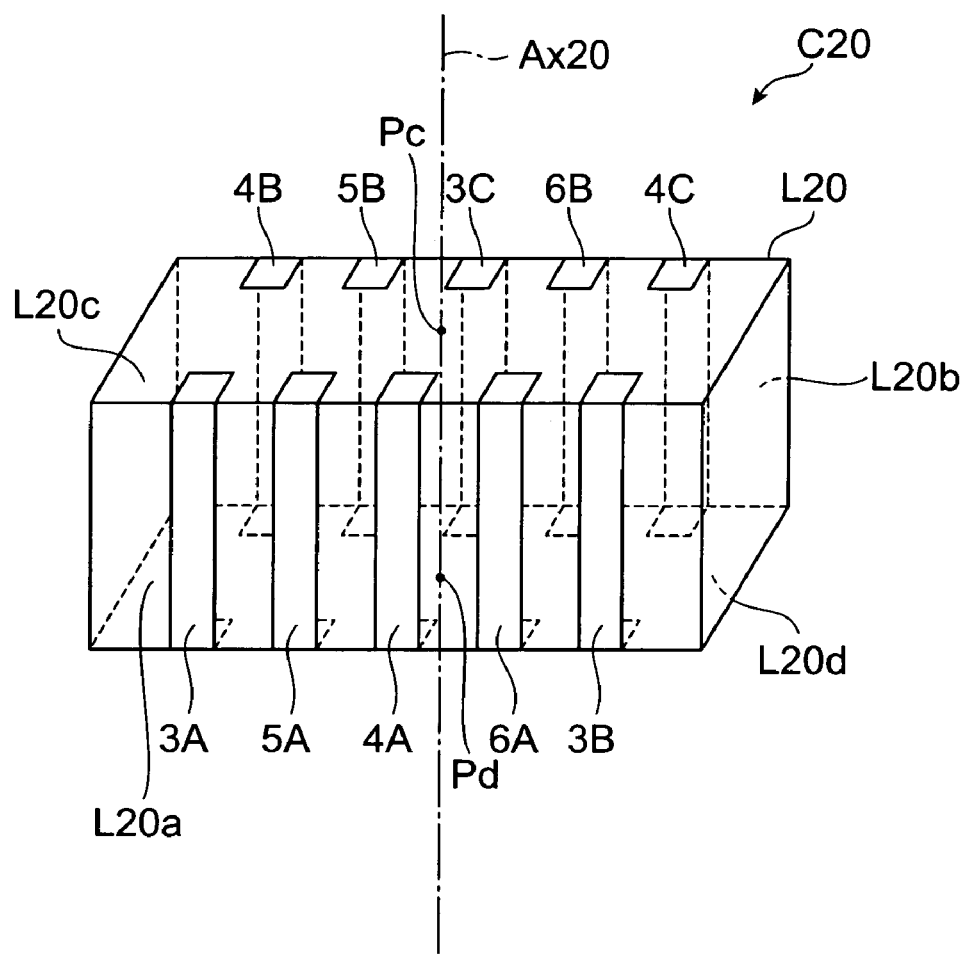
FIG. 41 is a perspective view of the multilayer capacitor in accordance with an thirty-first embodiment.
Figure 42:
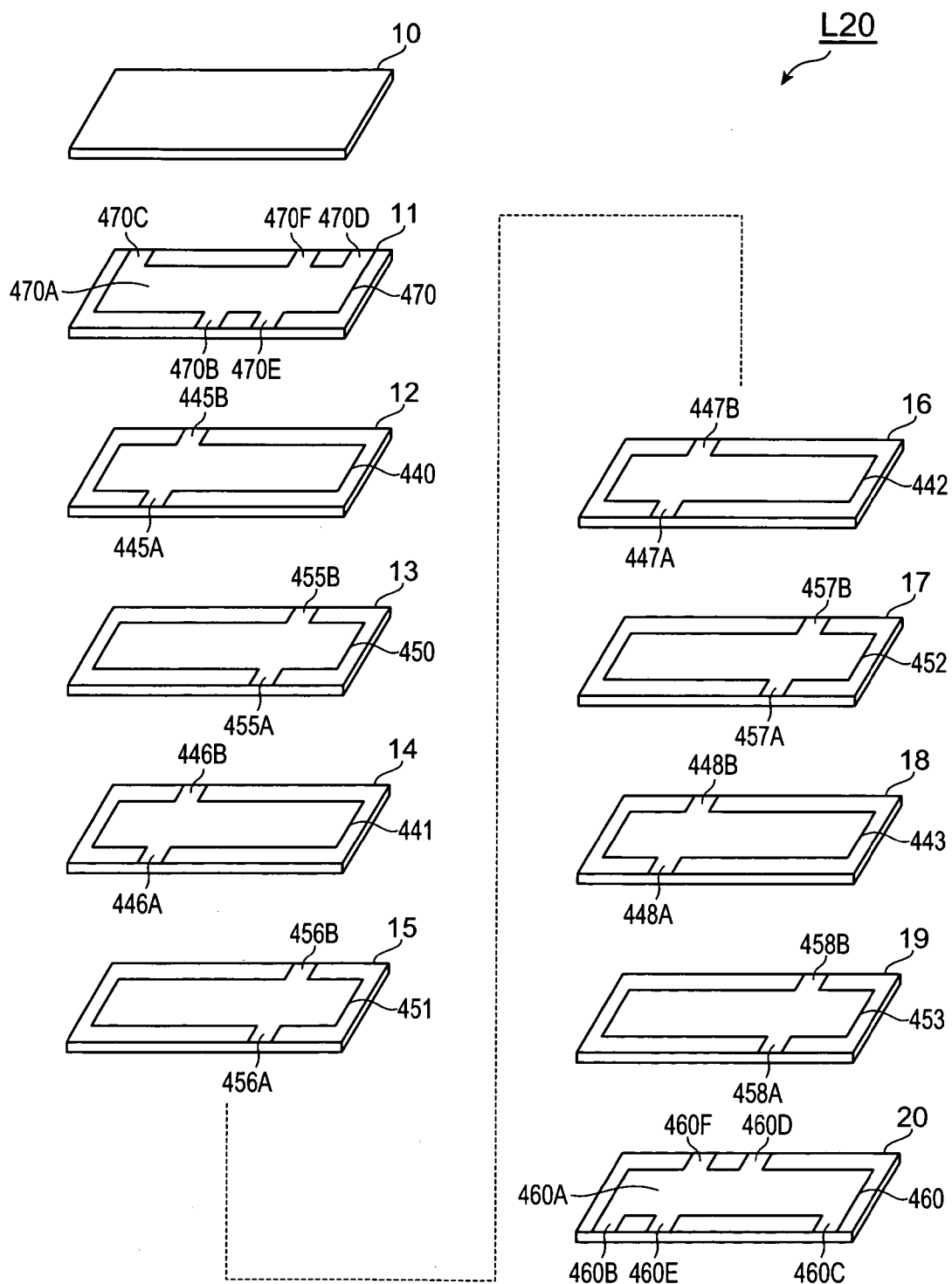
FIG. 42 is an exploded perspective view of the multilayer body included in the multilayer capacitor in accordance with the thirty-first embodiment.

With reference to FIGS. 41 and 42, the structure of the multilayer capacitor C20 in accordance with a thirty-first embodiment will be explained. The multilayer capacitor C20 in accordance with the thirty-first embodiment differs from the multilayer capacitor C17 in accordance with the twenty-second embodiment in terms of arrangement of outer conductors formed on the multilayer body. FIG. 41 is a perspective view of the multilayer capacitor in accordance with the thirty-first embodiment. FIG. 42 is an exploded perspective view of the multilayer body included in the multilayer capacitor in accordance with the thirty-first embodiment.

A first terminal conductor 3A, a first outer connecting conductor 5A, a second terminal conductor 4A, a second outer connecting conductor 6A, and a first terminal conductor 3B are formed in this order from the left side to right side in FIG. 41 on a first side face L20a which is a side face extending longitudinally of faces L20c, L20d orthogonal to the laminating direction of the multilayer body L20 among side faces parallel to the laminating direction of the multilayer body L20. Namely, on the first side face L20a, the first outer connecting conductor 5A is formed so as to be positioned between the first terminal conductor 3A and second terminal conductor 4A, whereas the second outer connecting conductor 6A is formed so as to be positioned between the first terminal conductor 3B and second terminal conductor 4A.

On a second side face L20b which opposes the first side face L20a and which is a side face extending longitudinally of the faces L20c and L20d orthogonal to the laminating direction of the multilayer body L20 among the side faces parallel to the laminating direction of the multilayer body L20, a second terminal conductor 4B, a first outer connecting conductor 5B, a first terminal conductor 3C, a second outer connecting conductor 6B, and a second terminal conductor 4C are formed in this order from the left side to right side in FIG. 41. Namely, on the second side face L20b, the first outer connecting conductor 5B is formed so as to be positioned between the first terminal conductor 3C and second terminal conductor 4B, whereas the second outer connecting conductor 6B is formed so as to be positioned between the first terminal conductor 3C and second terminal conductor 4C.

Therefore, each of pairs of the first terminal conductor 3A and first outer connecting conductor 5A and the second terminal conductor 4A and second outer connecting conductor 6A are formed adjacent to each other on the same side face, i.e., first side face L20a, of the multilayer body L20. Each of pairs of the first terminal conductor 3C and first outer connecting conductor 5B and the second terminal conductor 4C and second outer connecting conductor 6B are formed adjacent to each other on the same side face, i.e., second side face L20b, of the multilayer body L20.

Each of pairs of the first terminal conductor 3A and second terminal conductor 4C, the first terminal conductor 3B and second terminal conductor 4B, the first terminal conductor 3C and second terminal conductor 4A, the first outer connecting conductor 5A and second outer connecting conductor 6B, and the first outer connecting conductor 5B and second outer connecting conductor 6A are symmetrical to each other about a center axis Ax20 passing respective center positions Pc, Pd of the two side faces L20c, L20d orthogonal to the laminating direction of the multilayer body L20 among center axes of the multilayer body L20. Each of pairs of the first terminal conductor 3A and second terminal conductor 4B, the first terminal conductor 3B and second terminal conductor 4C, the first terminal conductor 3C and second terminal conductor 4A, the first outer connecting conductors 5A and 5B, and the second outer connecting conductors 6A and 6B oppose each other along a direction in which the first side face L20a and second side face L20b of the multilayer body L20 oppose each other.

As shown in FIG. 42, the multilayer body L20 is constructed by alternately laminating a plurality of (11 in this embodiment) dielectric layers 10 to 20 with a plurality of (4 each in this embodiment) first and second inner electrodes 440 to 443, 450 to 453. Further, one first inner connecting conductor 420 and one second inner connecting conductor 470 are laminated in the multilayer body L20.

Lead conductors 445A to 448A extend from their corresponding first inner electrodes 440 to 443 so as to reach the first side face L20a of the multilayer body L20. Lead conductors 445B to 448B extend from their corresponding first inner electrodes 440 to 443 so as to reach the second side face L20b of the multilayer body L20.

Lead conductors 455A to 458A extend from their corresponding second inner electrodes 450 to 453 so as to reach the first side face L20a of the multilayer body L20. Lead conductors 455B to 458B extend from their corresponding second inner electrodes 450 to 453 so as to reach the second side face L20b of the multilayer body L20.

The first inner connecting conductor 460 includes a first conductor portion 460A having an oblong form; second, third and fifth conductor portions 460B, 460C, 460E extending from the first conductor portion 460A so as to be led to the first side face L20a of the multilayer body L20; and fourth and sixth conductor portions 460D, 460F extending from the first conductor portion 460A so as to be led to the second side face L20b of the multilayer body L20.

The second inner connecting conductor 470 includes a first conductor portion 470A having an oblong form; second and sixth conductor portions 470B, 470E extending from the first conductor portion 470A so as to be led to the first side face L20a of the multilayer body L20; and third, fourth and sixth conductor portions 470C, 470D, 470F extending from the first conductor portion 470A so as to be led to the second side face L20b of the multilayer body L20.

In the multilayer capacitor C20, the first terminal conductors 3A to 3C are connected to the first inner electrodes 440 to 443 not directly but electrically through the first outer connecting conductors 5A, 5B and first inner connecting conductor 460. Also, in the multilayer capacitor C20, the second terminal conductors 4A to 4C are connected to the second inner electrodes 450 to 453 not directly but electrically through the second outer connecting conductors 6A, 6B and second inner connecting conductor 470. These allow the multilayer capacitor C20 to yield an equivalent series resistance greater than that of a conventional multilayer capacitor in which all the inner electrodes are connected to their corresponding terminal conductors through lead conductors.

By adjusting the number of first inner connecting conductor 460 directly connected to the first terminal conductors 3A to 3C and the number of second inner connecting conductor 470 directly connected to the second terminal conductors 4A to 4C in such a fashion, this embodiment sets the equivalent series resistance of the multilayer capacitor C20 to a desirable value, and thus can regulate the equivalent series resistance easily with a high precision. Since the equivalent series resistance is controlled by the first and second inner connecting conductors, the multilayer capacitor C20 can regulate the equivalent series resistance while attaining a desirable value (e.g., large value) of capacitance.

All of the first and second terminal conductors 3A to 3C, 4A to 4C and first and second outer connecting conductors 5A, 5B, 6A, 6B, which are outer conductors of the multilayer capacitor C20, are formed on the opposing first and second side faces L20a, L20b of the multilayer body L20. Consequently, the number of steps required for forming outer conductors can be made smaller in the multilayer capacitor C20 than in the case where terminal conductors are formed on four side faces of the multilayer body L20. Therefore, the multilayer capacitor C20 can be manufactured easily.

The first conductor portion 460A of the first inner connecting conductor 460 and the first conductor portion 470A of the second inner connecting conductor 470 oppose their corresponding inner electrodes with a dielectric layer in between respectively, and thus can contribute to forming a capacity component. Therefore, the multilayer capacitor C20 can further increase its capacitance.

Since a plurality of first and second inner electrodes 440 to 443, 450 to 453 are arranged between the first inner connecting conductor 460 and second inner connecting conductor 470 in the multilayer body L20 of the multilayer capacitor C20, the equivalent series resistance can be set with a favorable balance.

The multilayer capacitor C20 can lower its equivalent series inductance. A reason therefore can be considered as follows. Namely, when the multilayer capacitor C20 is mounted to a substrate or the like such that the first terminal conductors 3A to 3C and second terminal conductors 4A to 4C are directly connected to their corresponding land patterns having polarities different from each other, a magnetic field caused by a current flowing between the first terminal conductor 3A and second terminal conductor 4B and a magnetic field caused by a current flowing between the first terminal conductor 3C and second terminal conductor 4A cancel each other out. Further, when the multilayer capacitor C20 is mounted to a substrate or the like as mentioned above, a magnetic field caused by a current flowing between the first terminal conductor 3B and second terminal conductor 4C and a magnetic field caused by a current flowing between the first terminal conductor 3C and second terminal conductor 4A cancel each other out. These seem to be the reason why the multilayer capacitor C20 can lower its equivalent series inductance.

In the multilayer capacitor C20, the first terminal conductor 3A and first outer connecting conductor 5A are formed adjacent to each other on the first side face L20a of the multilayer body L20. The first terminal conductor 3C and first outer connecting conductor 5B are formed adjacent to each other on the second side face L20b of the multilayer body L20. Also, in the multilayer capacitor C20, the second terminal conductor 4A and second outer connecting conductor 6A are formed adjacent to each other on the first side face L20a of the multilayer body L20. The second terminal conductor 4C and second outer connecting conductor 6B are formed adjacent to each other on the second side face L20b of the multilayer body L20. Therefore, when the multilayer capacitor C20 is mounted to a substrate or the like such that the terminal conductors 3A to 3C, 4A to 4C are directly connected to land patterns, whereas the outer connecting conductors 5A, 5B, 6A, 6B are not directly connected to land patterns, magnetic fields caused by currents flowing through the multilayer body L20 cancel each other out, thereby lowering the equivalent series inductance of the multilayer capacitor C20.

The multilayer capacitor C20 can be mounted easily because of positional relationships of the outer conductors 3A to 6A, 3B to 6B, 3C, 4C with the center axis Ax20, and positional relationships among the outer conductors 3A to 6A, 3B to 6B, 3C, 4C in the opposing direction of the first side face L20a and second side face L20b of the multilayer body L20.

Thirty-Second Embodiment

Figure 43:
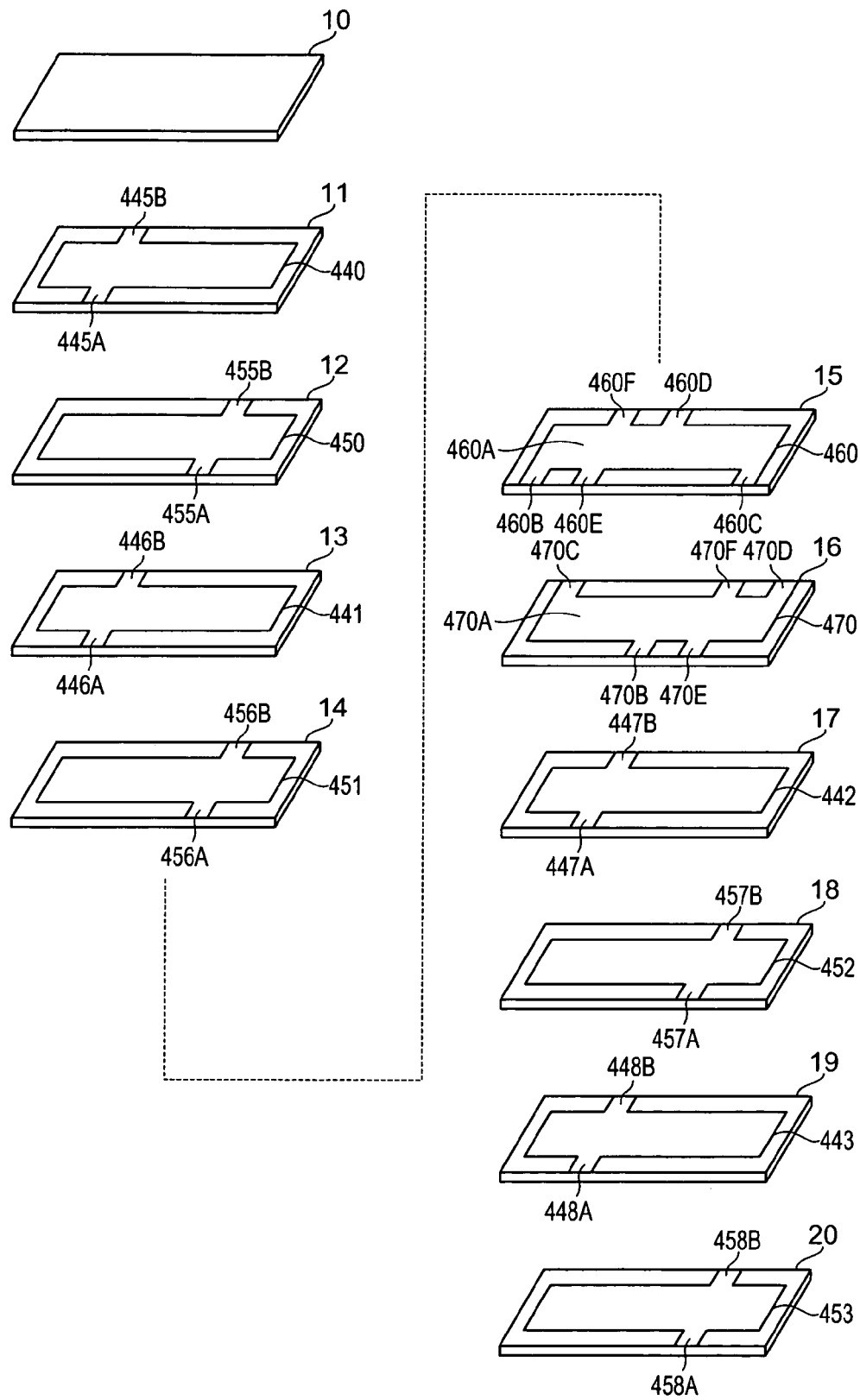
FIG. 43 is an exploded perspective view of the multilayer body included in the multilayer capacitor in accordance with a thirty-second embodiment.

With reference to FIG. 43, the structure of the multilayer capacitor in accordance with a thirty-second embodiment will be explained. The multilayer capacitor in accordance with the thirty-second embodiment differs from the multilayer capacitor C20 in accordance with the thirty-first embodiment in terms of positions of inner connecting conductors 460, 470 in the laminating direction. FIG. 43 is an exploded perspective view of the multilayer body included in the multilayer capacitor in accordance with the thirty-second embodiment.

In the multilayer capacitor in accordance with the thirty-second embodiment, as shown in FIG. 43, one each of the first and second inner connecting conductors 460, 470 is laminated between two each of first and second inner electrodes 440, 441, 450, 451 and two each of first and second inner electrodes 442, 443, 452, 453. More specifically, the first inner connecting conductor 460 is positioned so as to be held between dielectric layers 14 and 15. The second inner connecting conductor 470 is positioned so as to be held between dielectric layers 15 and 16.

In the multilayer capacitor in accordance with the thirty-second embodiment, terminal conductors 3A to 3C, 4A to 4C are connected to the inner electrodes 440 to 443, 450 to 453 not directly but electrically through the outer connecting conductors 5A, 5B, 6A, 6B and the inner connecting conductors 460, 470. Therefore, the multilayer capacitor in accordance with the thirty-second embodiment can yield an equivalent series resistance greater than that of a conventional multilayer capacitor in which all the inner electrodes are connected to their corresponding terminal conductors through lead conductors.

When the first terminal conductors 3A to 3C are concerned, the multilayer capacitor in accordance with the thirty-second embodiment differs from the multilayer capacitor C20 in accordance with the thirty-first embodiment in terms of the position of the first inner connecting conductor 460 and, consequently, in terms of how the respective resistance components of the first outer connecting conductors 5A, 5B are connected to the respective first terminal conductors 3A to 3C. Also, when the second terminal conductors 4A to 4C are concerned, the multilayer capacitor in accordance with the thirty-second embodiment differs from the multilayer capacitor C20 in accordance with the thirty-first embodiment in terms of the position of the second inner connecting conductor 470 and, consequently, in terms of how the respective resistance components of the second outer connecting conductors 6A, 6B are connected to the respective second terminal conductors 4A to 4C.

Because of the difference in resistance components of the first and second outer connecting conductors 5A, 5B, 6A, 6B, the multilayer capacitor in accordance with the thirty-second embodiment yields an equivalent series resistance smaller than that in the multilayer capacitor C20 in accordance with the thirty-first embodiment.

By adjusting positions of the first inner connecting conductors 460, 470 in the laminating direction as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors 460, 470, the multilayer capacitor in accordance with the thirty-second embodiment can regulate the equivalent series resistance while attaining a desirable value (e.g., large value) of capacitance.

The first conductor portion 460A of the first inner connecting conductor 460 and the first conductor portion 470A of the second inner connecting conductor 470 oppose their corresponding inner electrodes with a dielectric layer in between respectively, and thus can contribute to forming a capacity component. Therefore, the multilayer capacitor in accordance with the thirty-second embodiment can further increase its capacitance.

Since the outer conductors are arranged such as in the multilayer capacitor C20, the multilayer capacitor in accordance with the thirty-second embodiment can be manufactured easily as with the multilayer capacitor C20. The multilayer capacitor in accordance with the thirty-second embodiment can lower the equivalent series inductance as with the multilayer capacitor C20. Also, the multilayer capacitor in accordance with the thirty-second embodiment can be mounted easily as with the multilayer capacitor C20.

Thirty-Third Embodiment

Figure 44:
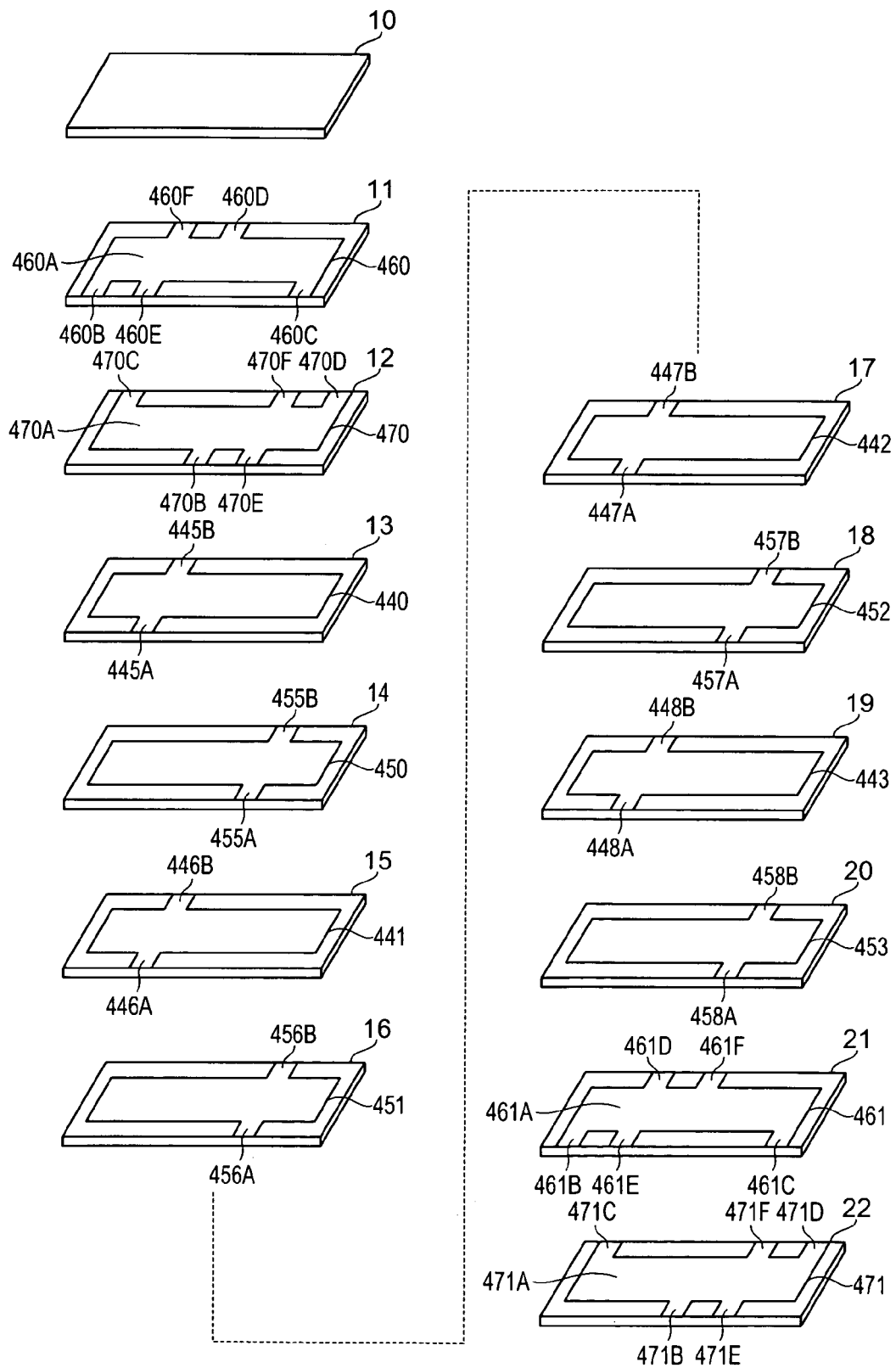
FIG. 44 is an exploded perspective view of the multilayer body included in the multilayer capacitor in accordance with a thirty-third embodiment.

With reference to FIG. 44, the structure of the multilayer capacitor in accordance with a thirty-third embodiment will be explained. The multilayer capacitor in accordance with the thirty-third embodiment differs from the multilayer capacitor C20 in accordance with the thirty-first embodiment in terms of the number of first and second inner connecting conductors. FIG. 44 is an exploded perspective view of the multilayer body included in the multilayer capacitor in accordance with the thirty-third embodiment.

As shown in FIG. 44, the multilayer body of the multilayer capacitor in accordance with the thirty-third embodiment is constructed by alternately laminating a plurality of (13 in this embodiment) dielectric layers 10 to 22 and a plurality of (4 each in this embodiment) first and second inner electrodes 440 to 443, 450 to 453.

In the multilayer body of the multilayer capacitor in accordance with the thirty-third embodiment, a plurality of (2 in this embodiment) first inner connecting conductors 460, 461 and a plurality of (2 in this embodiment) second inner connecting conductors 470, 471 are laminated. In the multilayer body of the multilayer capacitor in accordance with the thirty-third embodiment, the first inner electrodes 440 to 443 and second inner electrodes 450 to 453 are arranged between the first and second inner connecting conductors 460, 470 and the first and second inner connecting conductors 461, 471.

The first inner connecting conductor 460 is positioned so as to be held between the dielectric layers 10 and 11, whereas the first inner connecting conductor 461 is positioned so as to be held between the dielectric layers 20 and 21. The second inner connecting conductor 470 is positioned so as to be held between the dielectric layers 11 and 12, whereas the second inner connecting conductor 471 is positioned so as to be held between the dielectric layers 21 and 22.

In the multilayer capacitor in accordance with the thirty-third embodiment, terminal conductors 3A to 3C, 4A to 4C are connected to the inner electrodes 440 to 443, 450 to 453 not directly but electrically through outer connecting conductors 5A, 5B, 6A, 6B and the inner connecting conductors 460, 461, 470, 471. Therefore, the multilayer capacitor in accordance with the thirty-third embodiment yields an equivalent series resistance greater than that of a conventional multilayer capacitor in which all the inner electrodes are connected to their corresponding terminal conductors through lead conductors.

The number of first inner connecting conductors 460, 461 and second inner connecting conductors 470, 471 is greater in the multilayer capacitor in the thirty-third embodiment than in the multilayer capacitor C20, whereas the inner connecting conductors 460, 461, 470, 471 are connected in parallel to their corresponding terminal conductors 3A to 3C, 4A to 4C. Since the number of inner connecting conductors 460, 461, 470, 471 is greater, the number of current paths between the terminal conductors 3A to 3C, 4A to 4C and inner electrodes 440 to 443, 450 to 453 increases. Therefore, the multilayer capacitor in accordance with the thirty-third embodiment yields an equivalent series resistance smaller than that of the multilayer capacitor C20.

By adjusting the number of first inner connecting conductors 460, 461 and the number of second inner connecting conductors 470, 471 as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors, the multilayer capacitor in accordance with the thirty-third embodiment can regulate the equivalent series resistance while attaining a desirable value (e.g., large value) of capacitance.

The first conductor portion 461A of the first inner connecting conductor 461 and the first conductor portion 470A of the second inner connecting conductor 470 oppose their corresponding inner electrodes with a dielectric layer in between respectively, and thus can contribute to forming a capacity component. Therefore, the multilayer capacitor in accordance with the thirty-third embodiment can further increase its capacitance.

In the multilayer body of the multilayer capacitor in accordance with the thirty-third embodiment, a plurality of first and second inner electrodes 440 to 443, 450 to 453 are arranged between the first and second inner connecting conductors 460, 470 and the first and second inner connecting conductors 461, 471. Therefore, the multilayer capacitor in accordance with the thirty-third embodiment can set the equivalent series resistance with a favorable balance.

Since the outer conductors are arranged as in the multilayer capacitor C20, the multilayer capacitor in accordance with the thirty-third embodiment can be manufactured easily as with the multilayer capacitor C20. The multilayer capacitor in accordance with the thirty-third embodiment can lower the equivalent series inductance as with the multilayer capacitor C20. Also, the multilayer capacitor in accordance with the thirty-third embodiment can be mounted easily as with the multilayer capacitor C20.

Thirty-Fourth Embodiment

Figure 45:
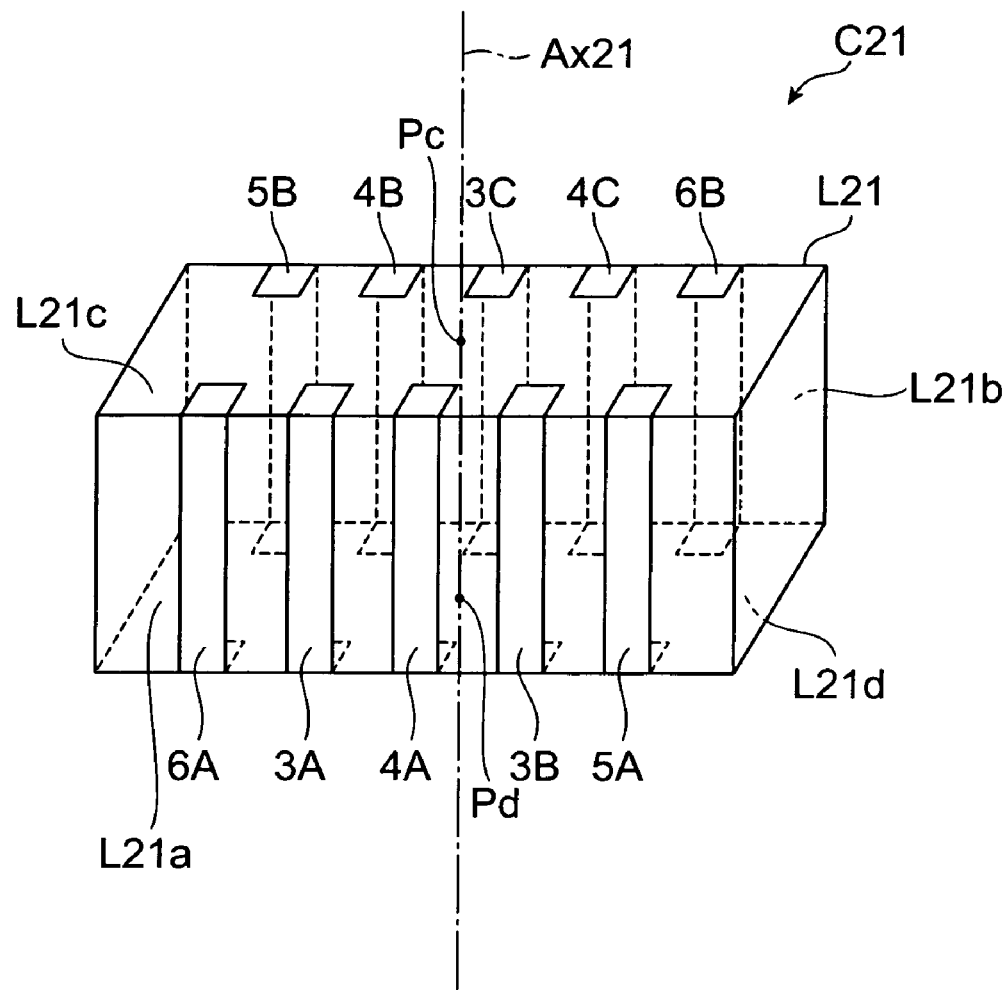
FIG. 45 is a perspective view of the multilayer capacitor in accordance with a thirty-fourth embodiment.
Figure 46:
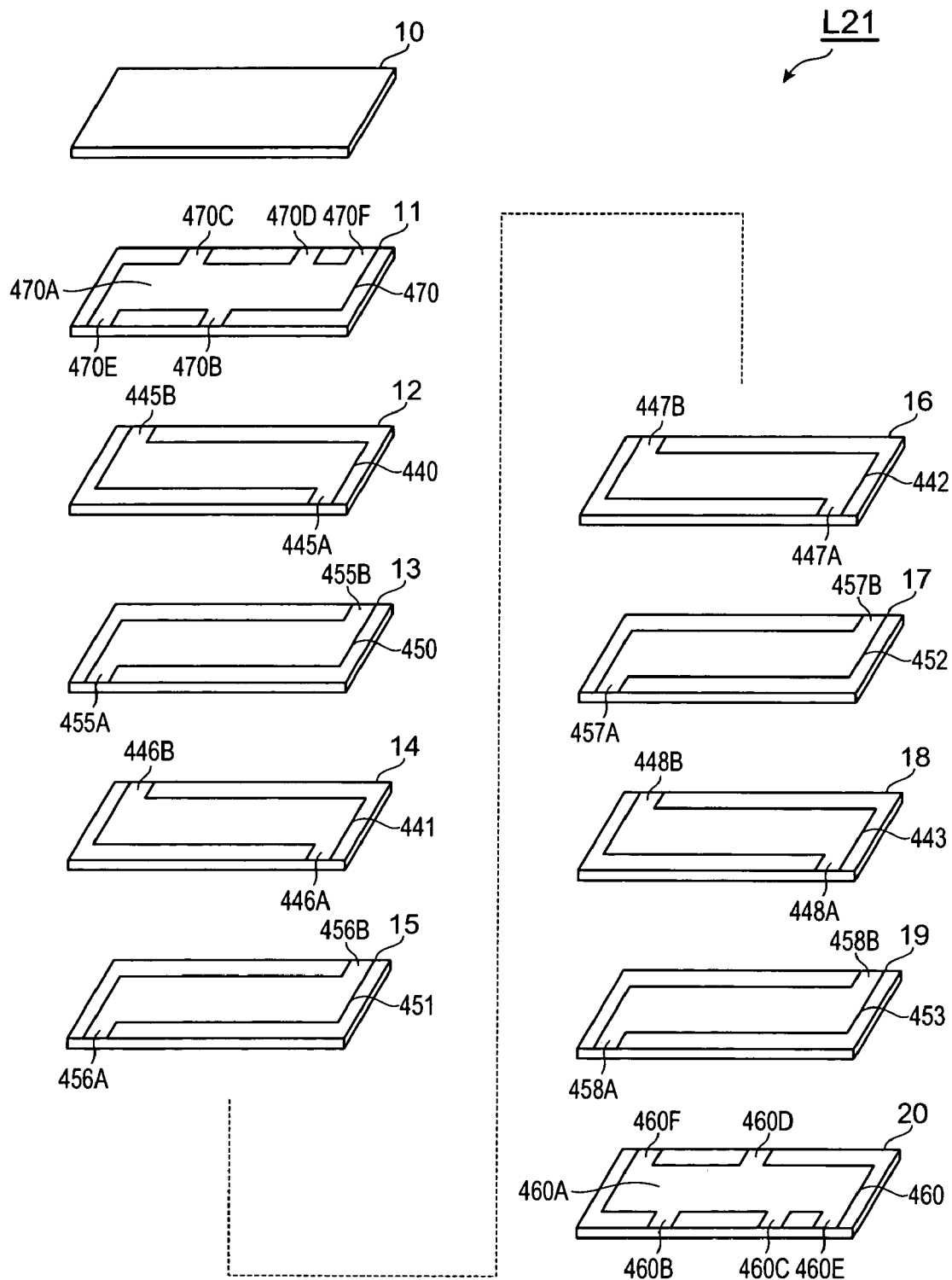
FIG. 46 is an exploded perspective view of the multilayer body included in the multilayer capacitor in accordance with the thirty-fourth embodiment.

With reference to FIGS. 45 and 46, the structure of the multilayer capacitor C21 in accordance with a thirty-fourth embodiment will be explained. The multilayer capacitor C21 in accordance with the thirty-fourth embodiment differs from the multilayer capacitor C17 in accordance with the twenty-second embodiment in terms of arrangement of outer conductors formed on the multilayer body. FIG. 45 is a perspective view of the multilayer capacitor in accordance with the thirty-fourth embodiment. FIG. 46 is an exploded perspective view of the multilayer body included in the multilayer capacitor in accordance with the thirty-fourth embodiment.

A second outer connecting conductor 6A, a first terminal conductor 3A, a second terminal conductor 4A, a first terminal conductor 3B, and a first outer connecting conductor 5A are formed in this order from the left side to right side in FIG. 45 on a first side face L21a which is a side face extending longitudinally of faces L21c, L21d orthogonal to the laminating direction of the multilayer body L21 among side faces parallel to the laminating direction of the multilayer body L21.

On a second side face L21b which opposes the first side face L21a and which is a side face extending longitudinally of the faces L21c and L21d orthogonal to the laminating direction of the multilayer body L21 among the side faces parallel to the laminating direction of the multilayer body L21, a first outer connecting conductor 5B, a second terminal conductor 4B, a first terminal conductor 3C, a second terminal conductor 4C, and a second outer connecting conductor 6B are formed in this order from the left side to right side in FIG. 45.

Therefore, a pair of the first terminal conductor 3B and first outer connecting conductor 5A are formed adjacent to each other on the same side face, i.e., first side face L21a, of the multilayer body L21. A pair of the second terminal conductor 4C and second outer connecting conductor 6B are formed adjacent to each other on the same side face, i.e., second side face L21b, of the multilayer body L21.

Each of pairs of the first terminal conductor 3A and second terminal conductor 4C, the first terminal conductor 3B and second terminal conductor 4B, the first terminal conductor 3C and second terminal conductor 4A, the first outer connecting conductors 5A and 5B, and the second outer connecting conductors 6A and 6B are symmetrical to each other about a center axis Ax21 passing respective center positions Pc, Pd of the two side faces L21c, L21d orthogonal to the laminating direction of the multilayer body L21 among center axes of the multilayer body L21. Each of pairs of the first terminal conductor 3A and second terminal conductor 4B, the first terminal conductor 3B and second terminal conductor 4C, the first terminal conductor 3C and second terminal conductor 4A, the first outer connecting conductor 5A and second outer connecting conductor 6B, and the first outer connecting conductors 5B and second outer connecting conductor 6A oppose each other along a direction in which the first side face L21a and second side face L21b of the multilayer body L21 oppose each other.

As shown in FIG. 46, the multilayer body L21 is constructed by alternately laminating a plurality of (11 in this embodiment) dielectric layers 10 to 20 with a plurality of (4 each in this embodiment) first and second inner electrodes 440 to 443, 450 to 453. Further, one first inner connecting conductor 420 and one second inner connecting conductor 470 are laminated in the multilayer body L21.

Lead conductors 445A to 448A extend from their corresponding first inner electrodes 440 to 443 so as to reach the first side face L21a of the multilayer body L21. Lead conductors 445B to 448B extend from their corresponding first inner electrodes 440 to 443 so as to reach the second side face L21b of the multilayer body L21.

Lead conductors 455A to 458A extend from their corresponding second inner electrodes 450 to 453 so as to reach the first side face L21a of the multilayer body L21. Lead conductors 455B to 458B extend from their corresponding second inner electrodes 450 to 453 so as to reach the second side face L21b of the multilayer body L21.

The first inner connecting conductor 460 includes a first conductor portion 460A having an oblong form; second, third and fifth conductor portions 460B, 460C, 460E extending from the first conductor portion 460A so as to be led to the first side face L21a of the multilayer body L21; and fourth and sixth conductor portions 460D, 460F extending from the first conductor portion 460A so as to be led to the second side face L21b of the multilayer body L21.

The second inner connecting conductor 470 includes a first conductor portion 470A having an oblong form; second and fifth conductor portions 470B, 470E extending from the first conductor portion 470A so as to be led to the first side face L21a of the multilayer body L21; and third, fourth and sixth conductor portions 470C, 470D, 470F extending from the first conductor portion 470A so as to be led to the second side face L21b of the multilayer body L21.

In the multilayer capacitor C21, the first terminal conductors 3A to 3C are connected to the first inner electrodes 440 to 443 not directly but electrically through the first outer connecting conductors 5A, 5B and first inner connecting conductor 460. Also, in the multilayer capacitor C21, the second terminal conductors 4A to 4C are connected to the second inner electrodes 450 to 453 not directly but electrically through the second outer connecting conductors 6A, 6B and second inner connecting conductor 470. These allow the multilayer capacitor C21 to yield an equivalent series resistance greater than that of a conventional multilayer capacitor in which all the inner electrodes are connected to their corresponding terminal conductors through lead conductors.

By adjusting the number of first inner connecting conductor 460 directly connected to the first terminal conductors 3A to 3C and the number of second inner connecting conductor 470 directly connected to the second terminal conductors 4A to 4C in such a fashion, this embodiment sets the equivalent series resistance of the multilayer capacitor C21 to a desirable value, and thus can regulate the equivalent series resistance easily with a high precision. Since the equivalent series resistance is controlled by the first and second inner connecting conductors, the multilayer capacitor C21 can regulate the equivalent series resistance while attaining a desirable value (e.g., large value) of capacitance.

All of the first and second terminal conductors 3A to 3C, 4A to 4C and first and second outer connecting conductors 5A, 5B, 6A, 6B, which are outer conductors of the multilayer capacitor C21, are formed on the opposing first and second side faces L21a, L21b of the multilayer body L21. Consequently, the number of steps required for forming outer conductors can be made smaller in the multilayer capacitor C21 than in the case where terminal conductors are formed on four side faces of the multilayer body L21. Therefore, the multilayer capacitor C21 can be manufactured easily.

The first conductor portion 460A of the first inner connecting conductor 460 and the first conductor portion 470A of the second inner connecting conductor 470 oppose their corresponding inner electrodes with a dielectric layer in between respectively, and thus can contribute to forming a capacity component. Therefore, the multilayer capacitor C21 can further increase its capacitance.

Since a plurality of first and second inner electrodes 440 to 443, 450 to 453 are arranged between the first inner connecting conductor 460 and second inner connecting conductor 470 in the multilayer body L21 of the multilayer capacitor C21, the equivalent series resistance can be set with a favorable balance.

The multilayer capacitor C21 can lower its equivalent series inductance. A reason therefore can be considered as follows. Namely, when the multilayer capacitor C21 is mounted to a substrate or the like such that the first terminal conductors 3A to 3C and second terminal conductors 4A to 4C are directly connected to their corresponding land patterns having polarities different from each other, a magnetic field caused by a current flowing between the first terminal conductor 3A and second terminal conductor 4B and a magnetic field caused by a current flowing between the first terminal conductor 3C and second terminal conductor 4A cancel each other out. Further, when the multilayer capacitor C21 is mounted to a substrate or the like as mentioned above, a magnetic field caused by a current flowing between the first terminal conductor 3B and second terminal conductor 4C and a magnetic field caused by a current flowing between the first terminal conductor 3C and second terminal conductor 4A cancel each other out. These seem to be the reason why the multilayer capacitor C21 can lower its equivalent series inductance.

In the multilayer capacitor C21, the first terminal conductor 3B and first outer connecting conductor 5A are formed adjacent to each other on the first side face L21a of the multilayer body L21. Also, in the multilayer capacitor C21, the second terminal conductor 4C and second outer connecting conductor 6B are formed adjacent to each other on the second side face L21b of the multilayer body L21. Therefore, when the multilayer capacitor C21 is mounted to a substrate or the like such that the terminal conductors 3A to 3C, 4A to 4C are directly connected to land patterns, whereas the outer connecting conductors 5A, 5B, 6A, 6B are not directly connected to land patterns, magnetic fields caused by currents flowing through the multilayer body L21 cancel each other out, thereby lowering the equivalent series inductance of the multilayer capacitor C21.

The multilayer capacitor C21 can be mounted easily because of positional relationships of the outer conductors 3A to 6A, 3B to 6B, 3C, 4C with the center axis Ax21, and positional relationships among the outer conductors 3A to 6A, 3B to 6B, 3C, 4C in the opposing direction of the first side face L21a and second side face L21b of the multilayer body L21.

Thirty-Fifth Embodiment

Figure 47:
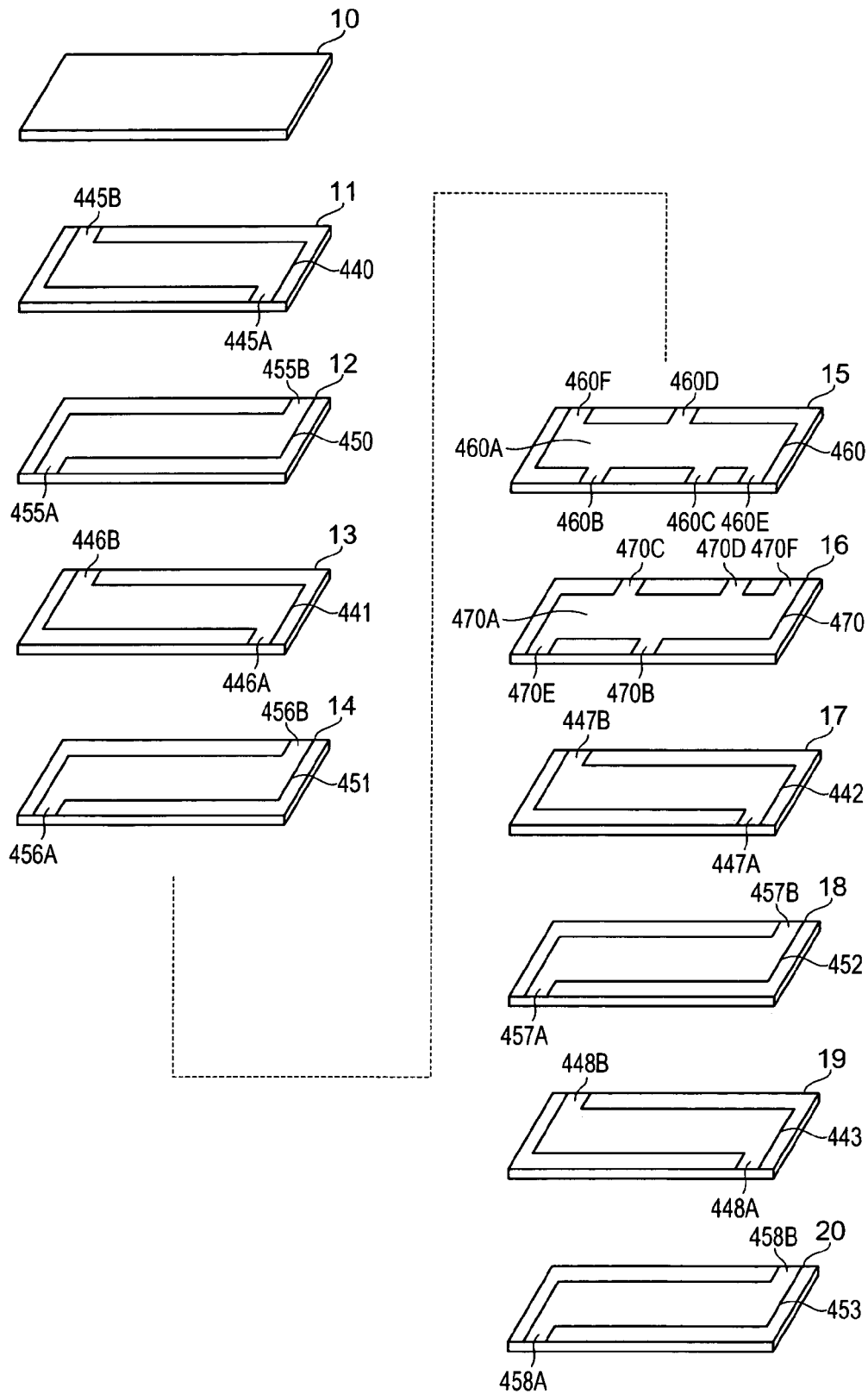
FIG. 47 is an exploded perspective view of the multilayer body included in the multilayer capacitor in accordance with a thirty-fifth embodiment.

With reference to FIG. 47, the structure of the multilayer capacitor in accordance with a thirty-fifth embodiment will be explained. The multilayer capacitor in accordance with the thirty-fifth embodiment differs from the multilayer capacitor C21 in accordance with the thirty-fourth embodiment in terms of positions of inner connecting conductors 460, 470 in the laminating direction. FIG. 47 is an exploded perspective view of the multilayer body included in the multilayer capacitor in accordance with the thirty-fifth embodiment.

In the multilayer capacitor in accordance with the thirty-fifth embodiment, as shown in FIG. 47, one each of the first and second inner connecting conductors 460, 470 is laminated between two each of first and second inner electrodes 440, 441, 450, 451 and two each of first and second inner electrodes 442, 443, 452, 453. More specifically, the first inner connecting conductor 460 is positioned so as to be held between dielectric layers 14 and 15. The second inner connecting conductor 470 is positioned so as to be held between dielectric layers 15 and 16.

In the multilayer capacitor in accordance with the thirty-fifth embodiment, terminal conductors 3A to 3C, 4A to 4C are connected to the inner electrodes 440 to 443, 450 to 453 not directly but electrically through the outer connecting conductors 5A, 5B, 6A, 6B and the inner connecting conductors 460, 470. Therefore, the multilayer capacitor in accordance with the thirty-fifth embodiment can yield an equivalent series resistance greater than that of a conventional multilayer capacitor in which all the inner electrodes are connected to their corresponding terminal conductors through lead conductors.

When the first terminal conductors 3A to 3C are concerned, the multilayer capacitor in accordance with the thirty-fifth embodiment differs from the multilayer capacitor C21 in accordance with the thirty-fourth embodiment in terms of the position of the first inner connecting conductor 460 and, consequently, in terms of how the respective resistance components of the first outer connecting conductors 5A, 5B are connected to the respective first terminal conductors 3A to 3C. Also, when the second terminal conductors 4A to 4C are concerned, the multilayer capacitor in accordance with the thirty-fifth embodiment differs from the multilayer capacitor C21 in accordance with the thirty-fourth embodiment in terms of the position of the second inner connecting conductor 470 and, consequently, in terms of how the respective resistance components of the second outer connecting conductors 6A, 6B are connected to the respective second terminal conductors 4A to 4C.

Because of the difference in resistance components of the first and second outer connecting conductors 5A, 5B, 6A, 6B, the multilayer capacitor in accordance with the thirty-fifth embodiment yields an equivalent series resistance smaller than that in the multilayer capacitor C21 in accordance with the thirty-fourth embodiment.

By adjusting positions of the first inner connecting conductors 460, 470 in the laminating direction as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors 460, 470, the multilayer capacitor in accordance with the thirty-fifth embodiment can regulate the equivalent series resistance while attaining a desirable value (e.g., large value) of capacitance.

The first conductor portion 460A of the first inner connecting conductor 460 and the first conductor portion 470A of the second inner connecting conductor 470 oppose their corresponding inner electrodes with a dielectric layer in between respectively, and thus can contribute to forming a capacity component. Therefore, the multilayer capacitor in accordance with the thirty-fifth embodiment can further increase its capacitance.

Since the outer conductors are arranged such as in the multilayer capacitor C21, the multilayer capacitor in accordance with the thirty-fifth embodiment can be manufactured easily as with the multilayer capacitor C21. The multilayer capacitor in accordance with the thirty-fifth embodiment can lower the equivalent series inductance as with the multilayer capacitor C21. Also, the multilayer capacitor in accordance with the thirty-fifth embodiment can be mounted easily as with the multilayer capacitor C21.

Thirty-Sixth Embodiment

Figure 48:
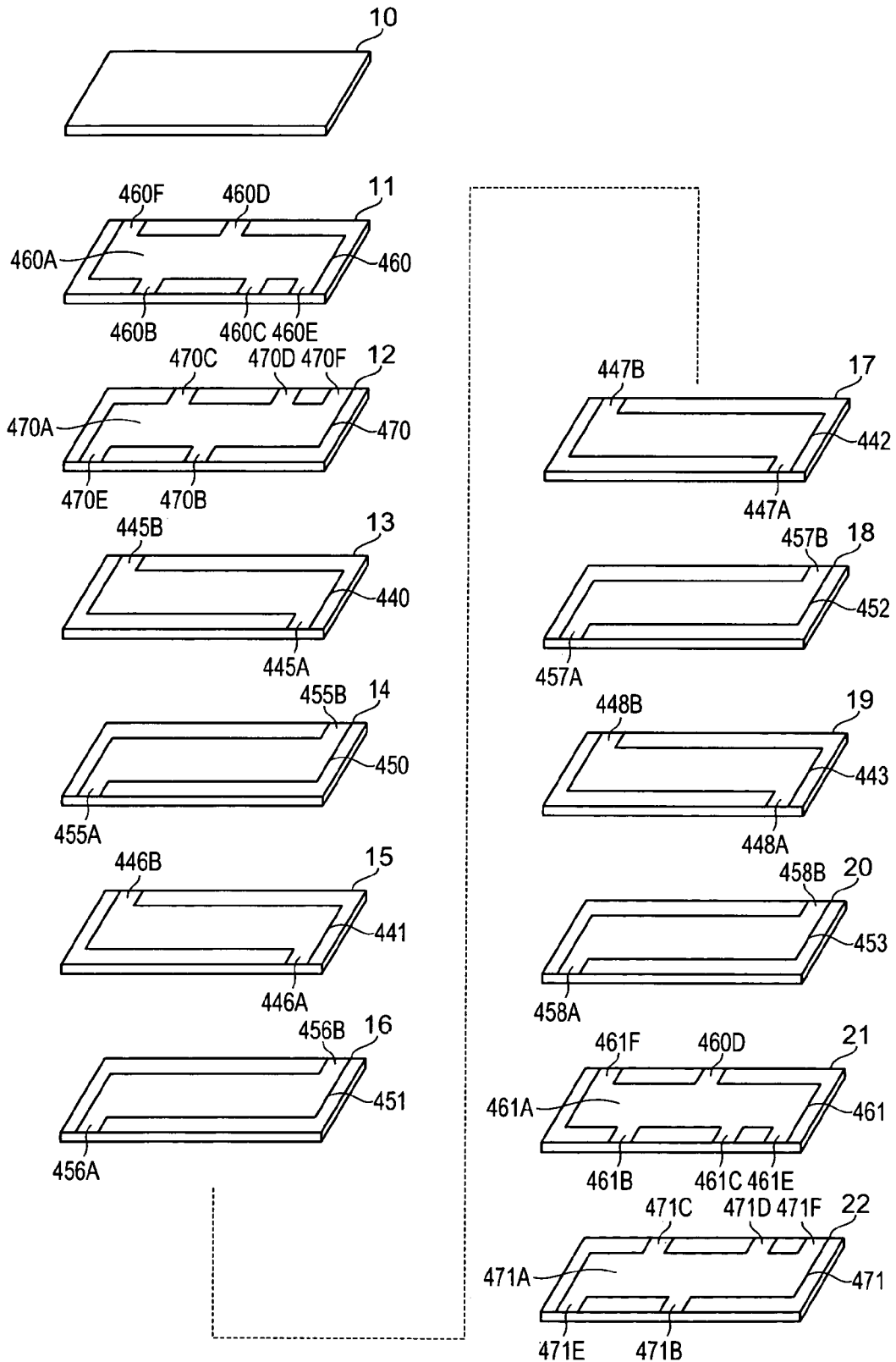
FIG. 48 is an exploded perspective view of the multilayer body included in the multilayer capacitor in accordance with a thirty-sixth embodiment.

With reference to FIG. 48, the structure of the multilayer capacitor in accordance with a thirty-sixth embodiment will be explained. The multilayer capacitor in accordance with the thirty-sixth embodiment differs from the multilayer capacitor C21 in accordance with the thirty-fourth embodiment in terms of the number of first and second inner connecting conductors. FIG. 48 is an exploded perspective view of the multilayer body included in the multilayer capacitor in accordance with the thirty-sixth embodiment.

As shown in FIG. 48, the multilayer body of the multilayer capacitor in accordance with the thirty-sixth embodiment is constructed by alternately laminating a plurality of (13 in this embodiment) dielectric layers 10 to 22 and a plurality of (4 each in this embodiment) first and second inner electrodes 440 to 443, 450 to 453.

In the multilayer body of the multilayer capacitor in accordance with the thirty-sixth embodiment, a plurality of (2 in this embodiment) first inner connecting conductors 460, 461 and a plurality of (2 in this embodiment) second inner connecting conductors 470, 471 are laminated. In the multilayer body of the multilayer capacitor in accordance with the thirty-sixth embodiment, the first inner electrodes 440 to 443 and second inner electrodes 450 to 453 are arranged between the first and second inner connecting conductors 460, 470 and the first and second inner connecting conductors 461, 471.

The first inner connecting conductor 460 is positioned so as to be held between the dielectric layers 10 and 11, whereas the first inner connecting conductor 461 is positioned so as to be held between the dielectric layers 20 and 21. The second inner connecting conductor 470 is positioned so as to be held between the dielectric layers 11 and 12, whereas the second inner connecting conductor 471 is positioned so as to be held between the dielectric layers 21 and 22.

In the multilayer capacitor in accordance with the thirty-sixth embodiment, terminal conductors 3A to 3C, 4A to 4C are connected to the inner electrodes 440 to 443, 450 to 453 not directly but electrically through outer connecting conductors 5A, 5B, 6A, 6B and the inner connecting conductors 460, 461, 470, 471. Therefore, the multilayer capacitor in accordance with the thirty-sixth embodiment yields an equivalent series resistance greater than that of a conventional multilayer capacitor in which all the inner electrodes are connected to their corresponding terminal conductors through lead conductors.

The number of first inner connecting conductors 460, 461 and second inner connecting conductors 470, 471 is greater in the multilayer capacitor in the thirty-sixth embodiment than in the multilayer capacitor C21, whereas the inner connecting conductors 460, 461, 470, 471 are connected in parallel to their corresponding terminal conductors 3A to 3C, 4A to 4C. Since the number of inner connecting conductors 460, 461, 470, 471 is greater, the number of current paths between the terminal conductors 3A to 3C, 4A to 4C and inner electrodes 440 to 443, 450 to 453 increases. Therefore, the multilayer capacitor in accordance with the thirty-sixth embodiment yields an equivalent series resistance smaller than that of the multilayer capacitor C21.

By adjusting the number of first inner connecting conductors 460, 461 and the number of second inner connecting conductors 470, 471 as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors, the multilayer capacitor in accordance with the thirty-sixth embodiment can regulate the equivalent series resistance while attaining a desirable value (e.g., large value) of capacitance.

The first conductor portion 461A of the first inner connecting conductor 461 and the first conductor portion 470A of the second inner connecting conductor 470 oppose their corresponding inner electrodes with a dielectric layer in between respectively, and thus can contribute to forming a capacity component. Therefore, the multilayer capacitor in accordance with the thirty-sixth embodiment can further increase its capacitance.

In the multilayer body of the multilayer capacitor in accordance with the thirty-sixth embodiment, a plurality of first and second inner electrodes 440 to 443, 450 to 453 are arranged between the first and second inner connecting conductors 460, 470 and the first and second inner connecting conductors 461, 471. Therefore, the multilayer capacitor in accordance with the thirty-sixth embodiment can set the equivalent series resistance with a favorable balance.

Since the outer conductors are arranged as in the multilayer capacitor C21, the multilayer capacitor in accordance with the thirty-sixth embodiment can be manufactured easily as with the multilayer capacitor C21. The multilayer capacitor in accordance with the thirty-sixth embodiment can lower the equivalent series inductance as with the multilayer capacitor C21. Also, the multilayer capacitor in accordance with the thirty-sixth embodiment can be mounted easily as with the multilayer capacitor C21.

Thirty-Seventh Embodiment

Figure 49:
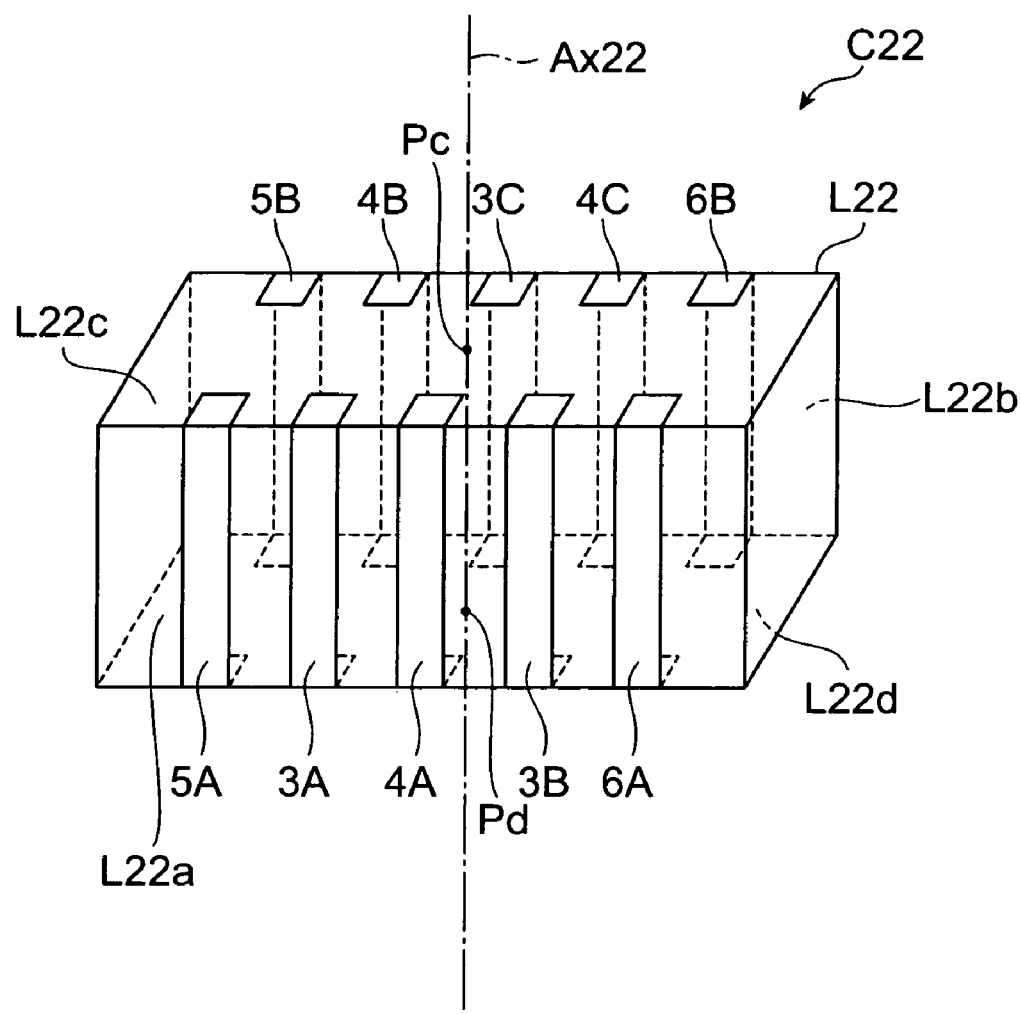
FIG. 49 is a perspective view of the multilayer capacitor in accordance with an thirty-seventh embodiment.
Figure 50:
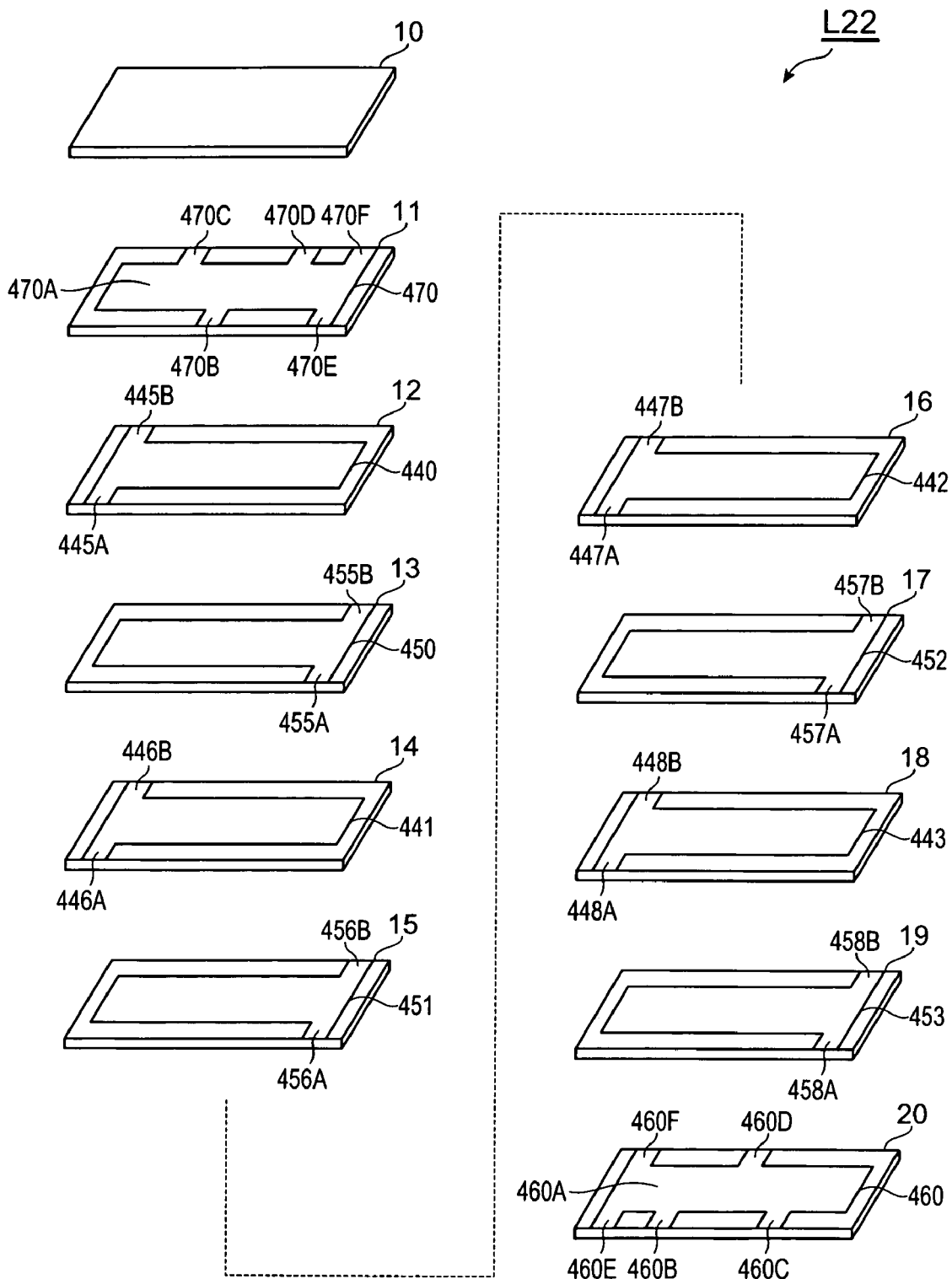
FIG. 50 is an exploded perspective view of the multilayer body included in the multilayer capacitor in accordance with the thirty-seventh embodiment.

With reference to FIGS. 49 and 50, the structure of the multilayer capacitor C22 in accordance with a thirty-seventh embodiment will be explained. The multilayer capacitor C22 in accordance with the thirty-seventh embodiment differs from the multilayer capacitor C17 in accordance with the twenty-second embodiment in terms of arrangement of outer conductors formed on the multilayer body. FIG. 49 is a perspective view of the multilayer capacitor in accordance with the thirty-seventh embodiment. FIG. 50 is an exploded perspective view of the multilayer body included in the multilayer capacitor in accordance with the thirty-seventh embodiment.

A first outer connecting conductor 5A, a first terminal conductor 3A, a second terminal conductor 4A, a first terminal conductor 3B, and a second outer connecting conductor 6A are formed in this order from the left side to right side in FIG. 49 on a first side face L22a which is a side face extending longitudinally of faces L22c, L22d orthogonal to the laminating direction of the multilayer body L22 among side faces parallel to the laminating direction of the multilayer body L22.

On a second side face L22b which opposes the first side face L22a and which is a side face extending longitudinally of the faces L22c and L22d orthogonal to the laminating direction of the multilayer body L22 among the side faces parallel to the laminating direction of the multilayer body L22, a first outer connecting conductor 5B, a second terminal conductor 4B, a first terminal conductor 3C, a second terminal conductor 4C, and a second outer connecting conductor 6B are formed in this order from the left side to right side in FIG. 49.

Therefore, a pair of the first terminal conductor 3A and first outer connecting conductor 5A are formed adjacent to each other on the same side face, i.e., first side face L22a, of the multilayer body L22. A pair of the second terminal conductor 4C and second outer connecting conductor 6B are formed adjacent to each other on the same side face, i.e., second side face L22b, of the multilayer body L22.

Each of pairs of the first terminal conductor 3A and second terminal conductor 4C, the first terminal conductor 3B and second terminal conductor 4B, the first terminal conductor 3C and second terminal conductor 4A, the first outer connecting conductor 5A and second outer connecting conductor 6B, and the first outer connecting conductor 5B and second outer connecting conductor 6A are symmetrical to each other about a center axis Ax22 passing respective center positions Pc, Pd of the two side faces L22c, L22d orthogonal to the laminating direction of the multilayer body L22 among center axes of the multilayer body L22. Each of pairs of the first terminal conductor 3A and second terminal conductor 4B, the first terminal conductor 3B and second terminal conductor 4C, the first terminal conductor 3C and second terminal conductor 4A, the first outer connecting conductors 5A and 5B, and the second outer connecting conductors 6A and 6B oppose each other along a direction in which the first side face L22a and second side face L22b of the multilayer body L22 oppose each other.

As shown in FIG. 50, the multilayer body L22 is constructed by alternately laminating a plurality of (11 in this embodiment) dielectric layers 10 to 20 with a plurality of (4 each in this embodiment) first and second inner electrodes 440 to 443, 450 to 453. Further, one first inner connecting conductor 420 and one second inner connecting conductor 470 are laminated in the multilayer body L22.

Lead conductors 445A to 448A extend from their corresponding first inner electrodes 440 to 443 so as to reach the first side face L22a of the multilayer body L22. Lead conductors 445B to 448B extend from their corresponding first inner electrodes 440 to 443 so as to reach the second side face L22b of the multilayer body L22.

Lead conductors 455A to 458A extend from their corresponding second inner electrodes 450 to 453 so as to reach the first side face L22a of the multilayer body L22. Lead conductors 455B to 458B extend from their corresponding second inner electrodes 450 to 453 so as to reach the second side face L22b of the multilayer body L22.

The first inner connecting conductor 460 includes a first conductor portion 460A having an oblong form; second, third and fifth conductor portions 460B, 460C, 460E extending from the first conductor portion 460A so as to be led to the first side face L22a of the multilayer body L22; and fourth and sixth conductor portions 460D, 460F extending from the first conductor portion 460A so as to be led to the second side face L22b of the multilayer body L22.

The second inner connecting conductor 470 includes a first conductor portion 470A having an oblong form; second and fifth conductor portions 470B, 470E extending from the first conductor portion 470A so as to be led to the first side face L22a of the multilayer body L22; and third, fourth and sixth conductor portions 470C, 470D, 470F extending from the first conductor portion 470A so as to be led to the second side face L22b of the multilayer body L22.

In the multilayer capacitor C22, the first terminal conductors 3A to 3C are connected to the first inner electrodes 440 to 443 not directly but electrically through the first outer connecting conductors 5A, 5B and first inner connecting conductor 460. Also, in the multilayer capacitor C22, the second terminal conductors 4A to 4C are connected to the second inner electrodes 450 to 453 not directly but electrically through the second outer connecting conductors 6A, 6B and second inner connecting conductor 470. These allow the multilayer capacitor C22 to yield an equivalent series resistance greater than that of a conventional multilayer capacitor in which all the inner electrodes are connected to their corresponding terminal conductors through lead conductors.

By adjusting the number of first inner connecting conductor 460 directly connected to the first terminal conductors 3A to 3C and the number of second inner connecting conductor 470 directly connected to the second terminal conductors 4A to 4C in such a fashion, this embodiment sets the equivalent series resistance of the multilayer capacitor C22 to a desirable value, and thus can regulate the equivalent series resistance easily with a high precision. Since the equivalent series resistance is controlled by the first and second inner connecting conductors, the multilayer capacitor C22 can regulate the equivalent series resistance while attaining a desirable value (e.g., large value) of capacitance.

All of the first and second terminal conductors 3A to 3C, 4A to 4C and first and second outer connecting conductors 5A, 5B, 6A, 6B, which are outer conductors of the multilayer capacitor C22, are formed on the opposing first and second side faces L22a, L22b of the multilayer body L22. Consequently, the number of steps required for forming outer conductors can be made smaller in the multilayer capacitor C22 than in the case where terminal conductors are formed on four side faces of the multilayer body L22. Therefore, the multilayer capacitor C22 can be manufactured easily.

The first conductor portion 460A of the first inner connecting conductor 460 and the first conductor portion 470A of the second inner connecting conductor 470 oppose their corresponding inner electrodes with a dielectric layer in between respectively, and thus can contribute to forming a capacity component. Therefore, the multilayer capacitor C22 can further increase its capacitance.

Since a plurality of first and second inner electrodes 440 to 443, 450 to 453 are arranged between the first inner connecting conductor 460 and second inner connecting conductor 470 in the multilayer body L22 of the multilayer capacitor C22, the equivalent series resistance can be set with a favorable balance.

The multilayer capacitor C22 can lower its equivalent series inductance. A reason therefore can be considered as follows. Namely, when the multilayer capacitor C22 is mounted to a substrate or the like such that the first terminal conductors 3A to 3C and second terminal conductors 4A to 4C are directly connected to their corresponding land patterns having polarities different from each other, a magnetic field caused by a current flowing between the first terminal conductor 3A and second terminal conductor 4B and a magnetic field caused by a current flowing between the first terminal conductor 3C and second terminal conductor 4A cancel each other out. Further, when the multilayer capacitor C22 is mounted to a substrate or the like as mentioned above, a magnetic field caused by a current flowing between the first terminal conductor 3B and second terminal conductor 4C and a magnetic field caused by a current flowing between the first terminal conductor 3C and second terminal conductor 4A cancel each other out. These seem to be the reason why the multilayer capacitor C22 can lower its equivalent series inductance.

In the multilayer capacitor C22, the first terminal conductor 3A and first outer connecting conductor 5A are formed adjacent to each other on the first side face L22a of the multilayer body L22. Also, in the multilayer capacitor C22, the second terminal conductor 4C and second outer connecting conductor 6B are formed adjacent to each other on the second side face L22b of the multilayer body L22. Therefore, when the multilayer capacitor C22 is mounted to a substrate or the like such that the terminal conductors 3A to 3C, 4A to 4C are directly connected to land patterns, whereas the outer connecting conductors 5A, 5B, 6A, 6B are not directly connected to land patterns, magnetic fields caused by currents flowing through the multilayer body L22 cancel each other out, thereby lowering the equivalent series inductance of the multilayer capacitor C22.

The multilayer capacitor C22 can be mounted easily because of positional relationships of the outer conductors 3A to 6A, 3B to 6B, 3C, 4C with the center axis Ax22, and positional relationships among the outer conductors 3A to 6A, 3B to 6B, 3C, 4C in the opposing direction of the first side face L22a and second side face L22b of the multilayer body L22.

Thirty-Eighth Embodiment

Figure 51:
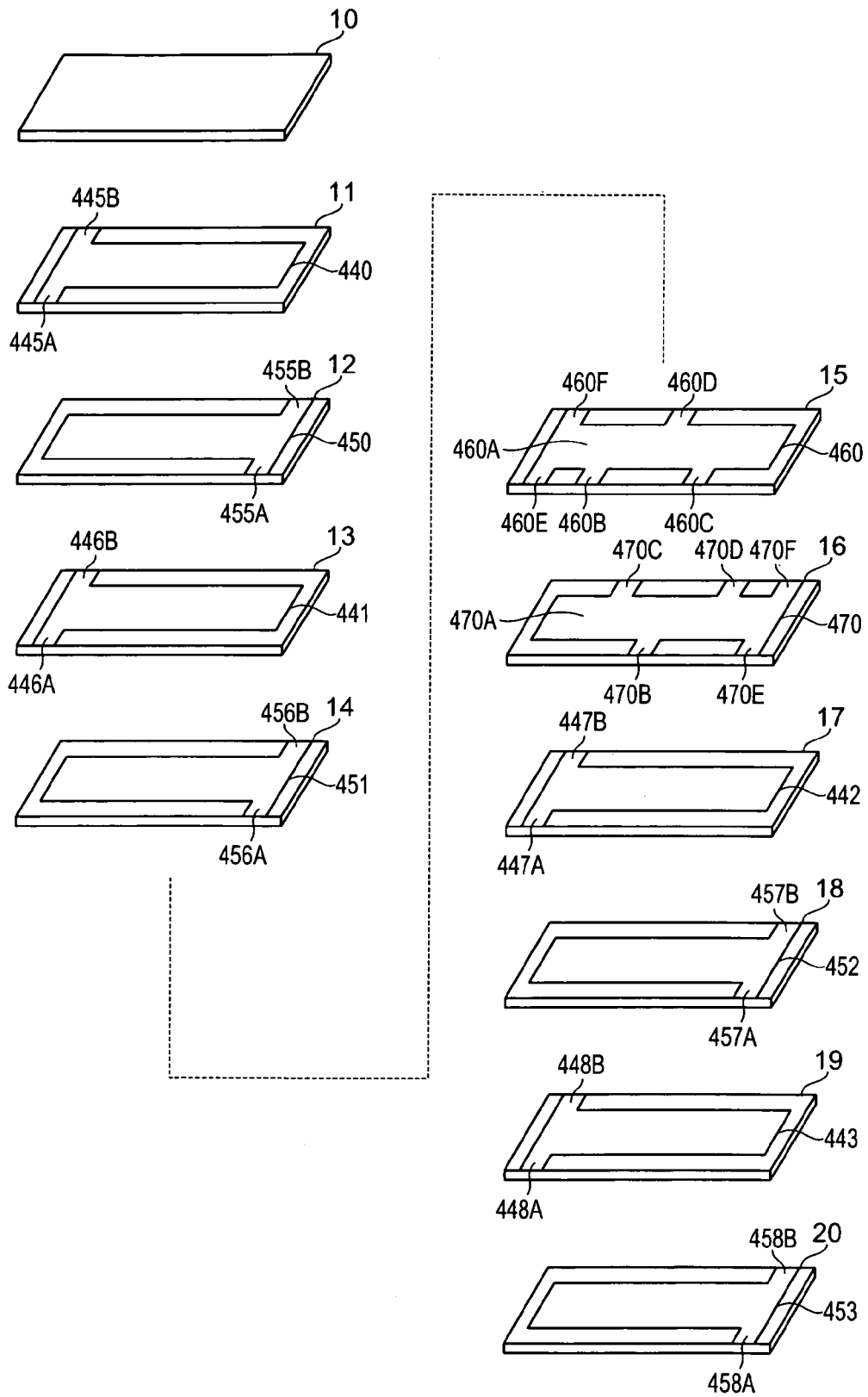
FIG. 51 is an exploded perspective view of the multilayer body included in the multilayer capacitor in accordance with a thirty-eighth embodiment.

With reference to FIG. 51, the structure of the multilayer capacitor in accordance with a thirty-eighth embodiment will be explained. The multilayer capacitor in accordance with the thirty-eighth embodiment differs from the multilayer capacitor C22 in accordance with the thirty-seventh embodiment in terms of positions of inner connecting conductors 460, 470 in the laminating direction. FIG. 51 is an exploded perspective view of the multilayer body included in the multilayer capacitor in accordance with the thirty-eighth embodiment.

In the multilayer capacitor in accordance with the thirty-eighth embodiment, as shown in FIG. 51, one each of the first and second inner connecting conductors 460, 470 is laminated between two each of first and second inner electrodes 440, 441, 450, 451 and two each of first and second inner electrodes 442, 443, 452, 453. More specifically, the first inner connecting conductor 460 is positioned so as to be held between dielectric layers 14 and 15. The second inner connecting conductor 470 is positioned so as to be held between dielectric layers 15 and 16.

In the multilayer capacitor in accordance with the thirty-eighth embodiment, terminal conductors 3A to 3C, 4A to 4C are connected to the inner electrodes 440 to 443, 450 to 453 not directly but electrically through the outer connecting conductors 5A, 5B, 6A, 6B and the inner connecting conductors 460, 470. Therefore, the multilayer capacitor in accordance with the thirty-eighth embodiment can yield an equivalent series resistance greater than that of a conventional multilayer capacitor in which all the inner electrodes are connected to their corresponding terminal conductors through lead conductors.

When the first terminal conductors 3A to 3C are concerned, the multilayer capacitor in accordance with the thirty-eighth embodiment differs from the multilayer capacitor C22 in accordance with the thirty-seventh embodiment in terms of the position of the first inner connecting conductor 460 and, consequently, in terms of how the respective resistance components of the first outer connecting conductors 5A, 5B are connected to the respective first terminal conductors 3A to 3C. Also, when the second terminal conductors 4A to 4C are concerned, the multilayer capacitor in accordance with the thirty-eighth embodiment differs from the multilayer capacitor C22 in accordance with the thirty-seventh embodiment in terms of the position of the second inner connecting conductor 470 and, consequently, in terms of how the respective resistance components of the second outer connecting conductors 6A, 6B are connected to the respective second terminal conductors 4A to 4C.

Because of the difference in resistance components of the first and second outer connecting conductors 5A, 5B, 6A, 6B, the multilayer capacitor in accordance with the thirty-eighth embodiment yields an equivalent series resistance smaller than that in the multilayer capacitor C22 in accordance with the thirty-seventh embodiment.

By adjusting positions of the first inner connecting conductors 460, 470 in the laminating direction as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors 460, 470, the multilayer capacitor in accordance with the thirty-eighth embodiment can regulate the equivalent series resistance while attaining a desirable value (e.g., large value) of capacitance.

The first conductor portion 460A of the first inner connecting conductor 460 and the first conductor portion 470A of the second inner connecting conductor 470 oppose their corresponding inner electrodes with a dielectric layer in between respectively, and thus can contribute to forming a capacity component. Therefore, the multilayer capacitor in accordance with the thirty-eighth embodiment can further increase its capacitance.

Since the outer conductors are arranged such as in the multilayer capacitor C22, the multilayer capacitor in accordance with the thirty-eighth embodiment can be manufactured easily as with the multilayer capacitor C22. The multilayer capacitor in accordance with the thirty-eighth embodiment can lower the equivalent series inductance as with the multilayer capacitor C22. Also, the multilayer capacitor in accordance with the thirty-eighth embodiment can be mounted easily as with the multilayer capacitor C22.

Thirty-Ninth Embodiment

Figure 52:
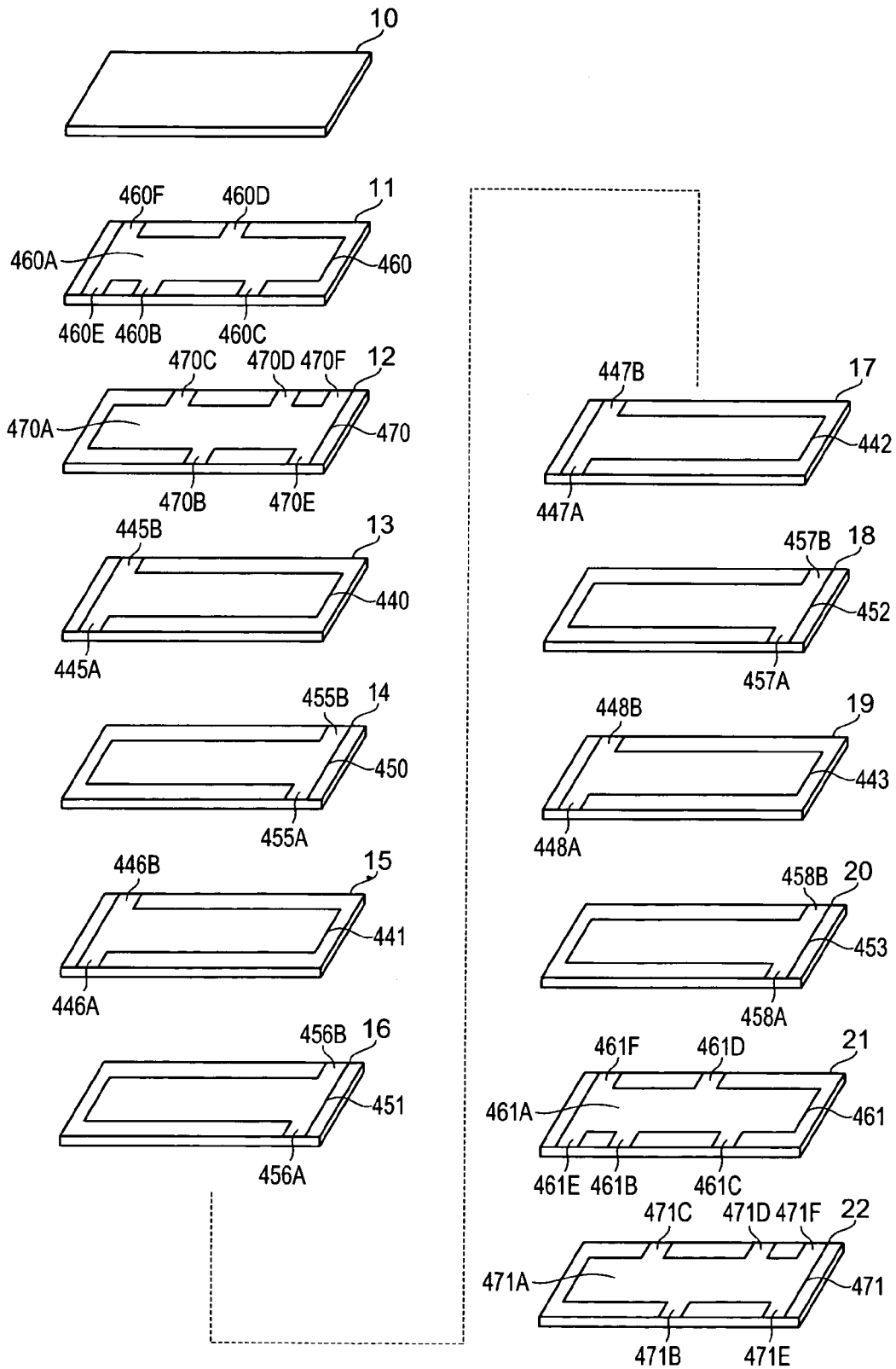
FIG. 52 is an exploded perspective view of the multilayer body included in the multilayer capacitor in accordance with a thirty-ninth embodiment.

With reference to FIG. 52, the structure of the multilayer capacitor in accordance with a thirty-ninth embodiment will be explained. The multilayer capacitor in accordance with the thirty-ninth embodiment differs from the multilayer capacitor C22 in accordance with the thirty-seventh embodiment in terms of the number of first and second inner connecting conductors. FIG. 52 is an exploded perspective view of the multilayer body included in the multilayer capacitor in accordance with the thirty-ninth embodiment.

As shown in FIG. 52, the multilayer body of the multilayer capacitor in accordance with the thirty-ninth embodiment is constructed by alternately laminating a plurality of (13 in this embodiment) dielectric layers 10 to 22 and a plurality of (4 each in this embodiment) first and second inner electrodes 440 to 443, 450 to 453.

In the multilayer body of the multilayer capacitor in accordance with the thirty-ninth embodiment, a plurality of (2 in this embodiment) first inner connecting conductors 460, 461 and a plurality of (2 in this embodiment) second inner connecting conductors 470, 471 are laminated. In the multilayer body of the multilayer capacitor in accordance with the thirty-ninth embodiment, the first inner electrodes 440 to 443 and second inner electrodes 450 to 453 are arranged between the first and second inner connecting conductors 460, 470 and the first and second inner connecting conductors 461, 471.

The first inner connecting conductor 460 is positioned so as to be held between the dielectric layers 10 and 11, whereas the first inner connecting conductor 461 is positioned so as to be held between the dielectric layers 20 and 21. The second inner connecting conductor 470 is positioned so as to be held between the dielectric layers 11 and 12, whereas the second inner connecting conductor 471 is positioned so as to be held between the dielectric layers 21 and 22.

In the multilayer capacitor in accordance with the thirty-ninth embodiment, terminal conductors 3A to 3C, 4A to 4C are connected to the inner electrodes 440 to 443, 450 to 453 not directly but electrically through outer connecting conductors 5A, 5B, 6A, 6B and the inner connecting conductors 460, 461, 470, 471. Therefore, the multilayer capacitor in accordance with the thirty-ninth embodiment yields an equivalent series resistance greater than that of a conventional multilayer capacitor in which all the inner electrodes are connected to their corresponding terminal conductors through lead conductors.

The number of first inner connecting conductors 460, 461 and second inner connecting conductors 470, 471 is greater in the multilayer capacitor in the thirty-ninth embodiment than in the multilayer capacitor C22, whereas the inner connecting conductors 460, 461, 470, 471 are connected in parallel to their corresponding terminal conductors 3A to 3C, 4A to 4C. Since the number of inner connecting conductors 460, 461, 470, 471 is greater, the number of current paths between the terminal conductors 3A to 3C, 4A to 4C and inner electrodes 440 to 443, 450 to 453 increases. Therefore, the multilayer capacitor in accordance with the thirty-ninth embodiment yields an equivalent series resistance smaller than that of the multilayer capacitor C22.

By adjusting the number of first inner connecting conductors 460, 461 and the number of second inner connecting conductors 470, 471 as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors, the multilayer capacitor in accordance with the thirty-ninth embodiment can regulate the equivalent series resistance while attaining a desirable value (e.g., large value) of capacitance.

The first conductor portion 461A of the first inner connecting conductor 461 and the first conductor portion 470A of the second inner connecting conductor 470 oppose their corresponding inner electrodes with a dielectric layer in between respectively, and thus can contribute to forming a capacity component. Therefore, the multilayer capacitor in accordance with the thirty-ninth embodiment can further increase its capacitance.

In the multilayer body of the multilayer capacitor in accordance with the thirty-ninth embodiment, a plurality of first and second inner electrodes 440 to 443, 450 to 453 are arranged between the first and second inner connecting conductors 460, 470 and the first and second inner connecting conductors 461, 471. Therefore, the multilayer capacitor in accordance with the thirty-ninth embodiment can set the equivalent series resistance with a favorable balance.

Since the outer conductors are arranged as in the multilayer capacitor C22, the multilayer capacitor in accordance with the thirty-ninth embodiment can be manufactured easily as with the multilayer capacitor C22. The multilayer capacitor in accordance with the thirty-ninth embodiment can lower the equivalent series inductance as with the multilayer capacitor C22. Also, the multilayer capacitor in accordance with the thirty-ninth embodiment can be mounted easily as with the multilayer capacitor C22.

Fortieth Embodiment

Figure 53:
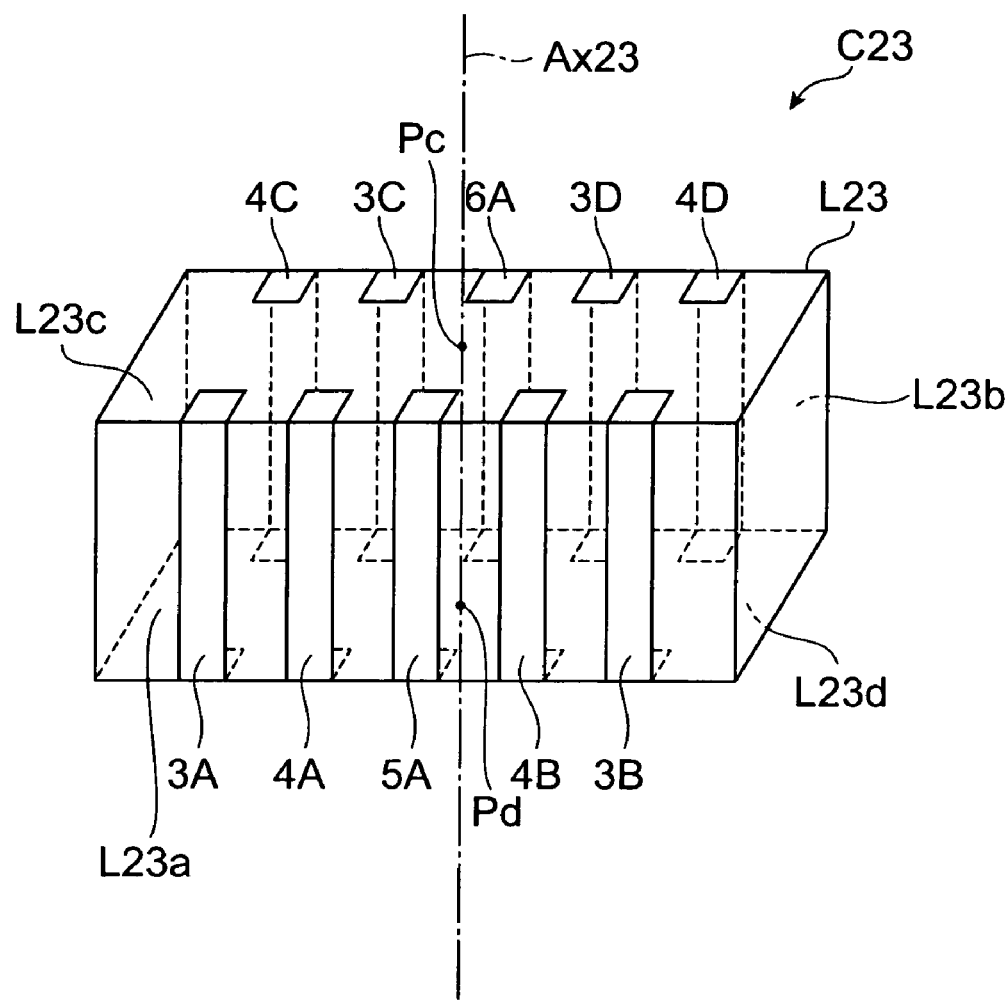
FIG. 53 is a perspective view of the multilayer capacitor in accordance with an fortieth embodiment.
Figure 54:
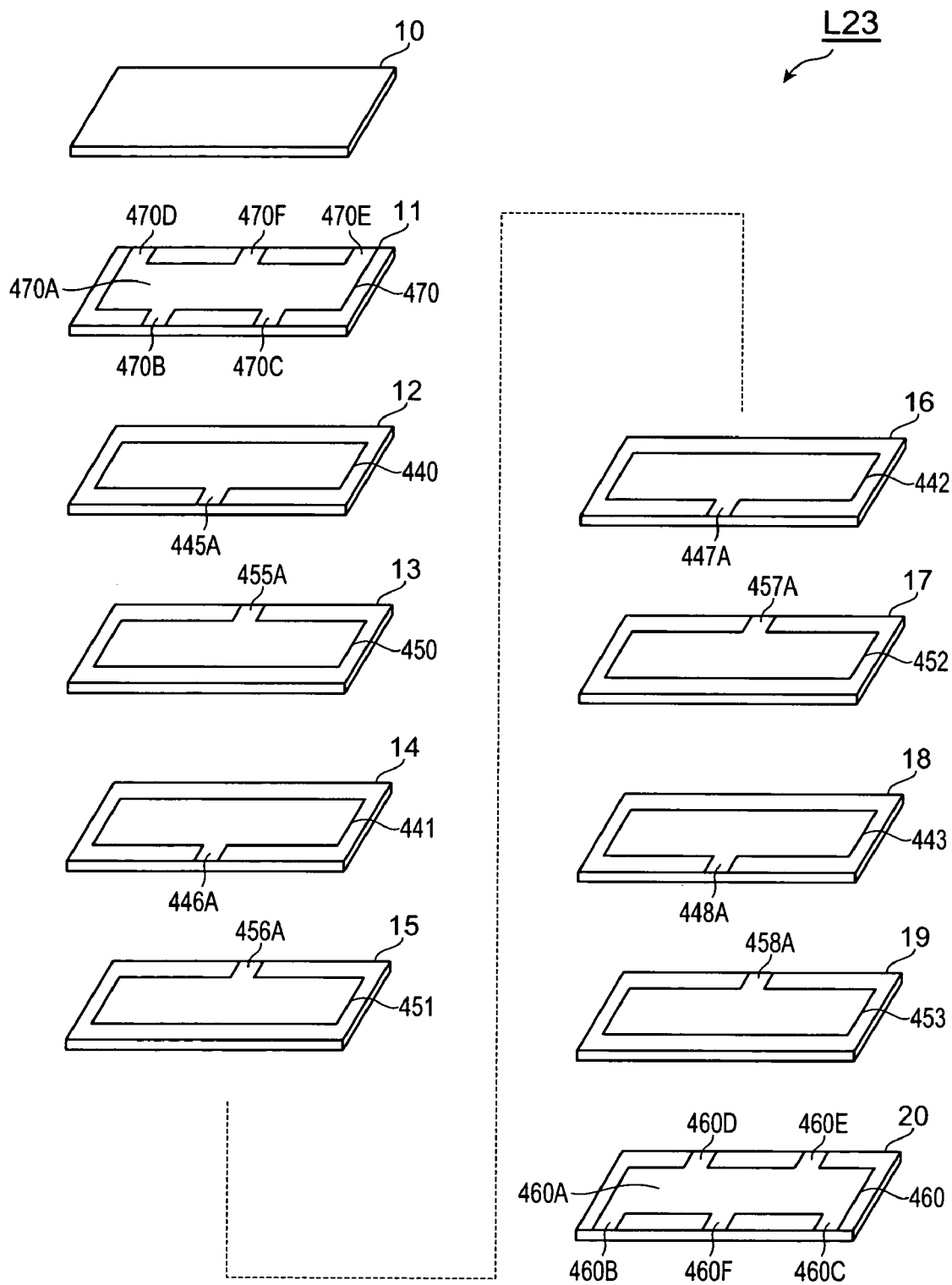
FIG. 54 is an exploded perspective view of the multilayer body included in the multilayer capacitor in accordance with the fortieth embodiment.
Figure 55:
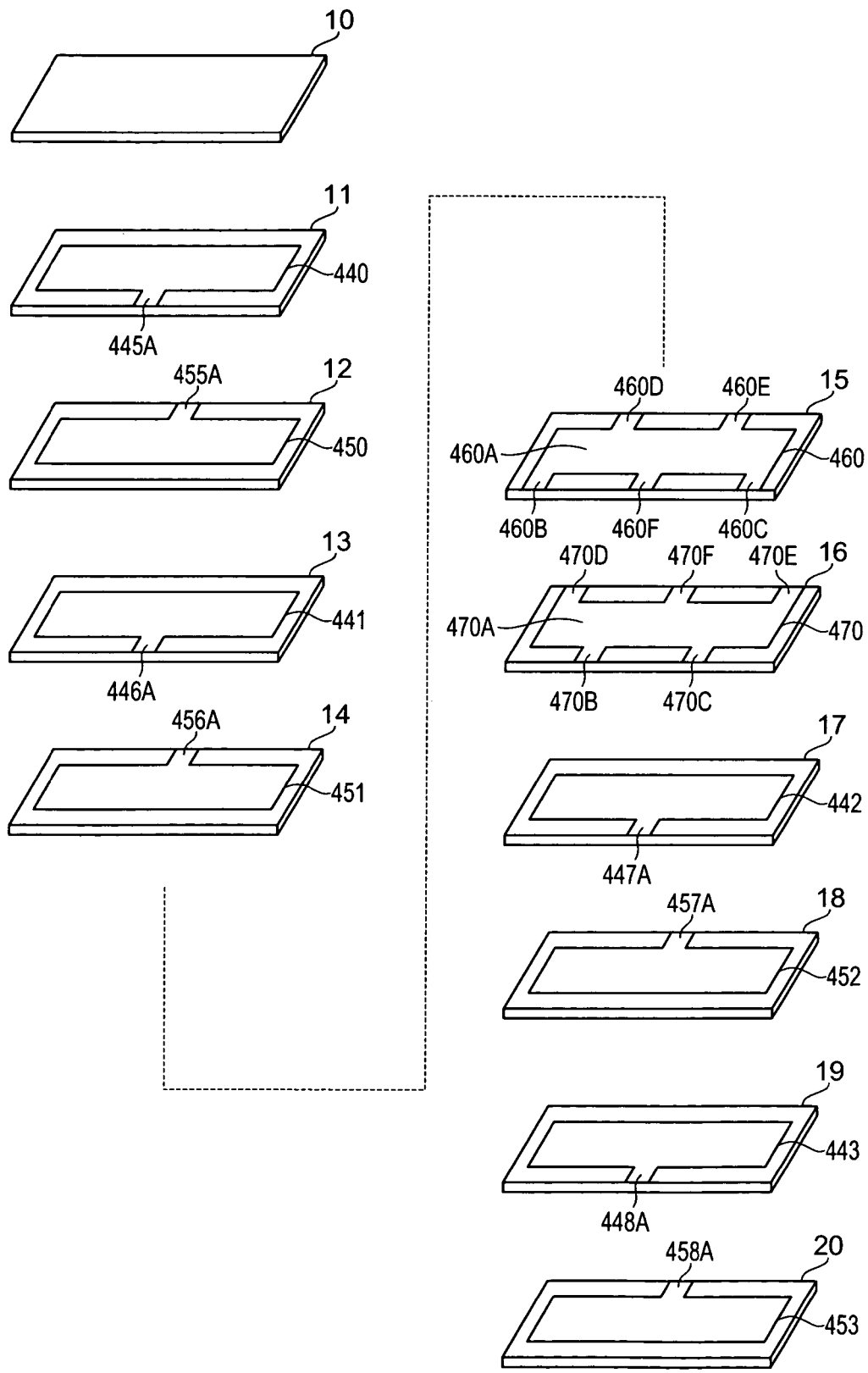
FIG. 55 is an exploded perspective view of the multilayer body included in the multilayer capacitor in accordance with a forty-first embodiment.
Figure 56:
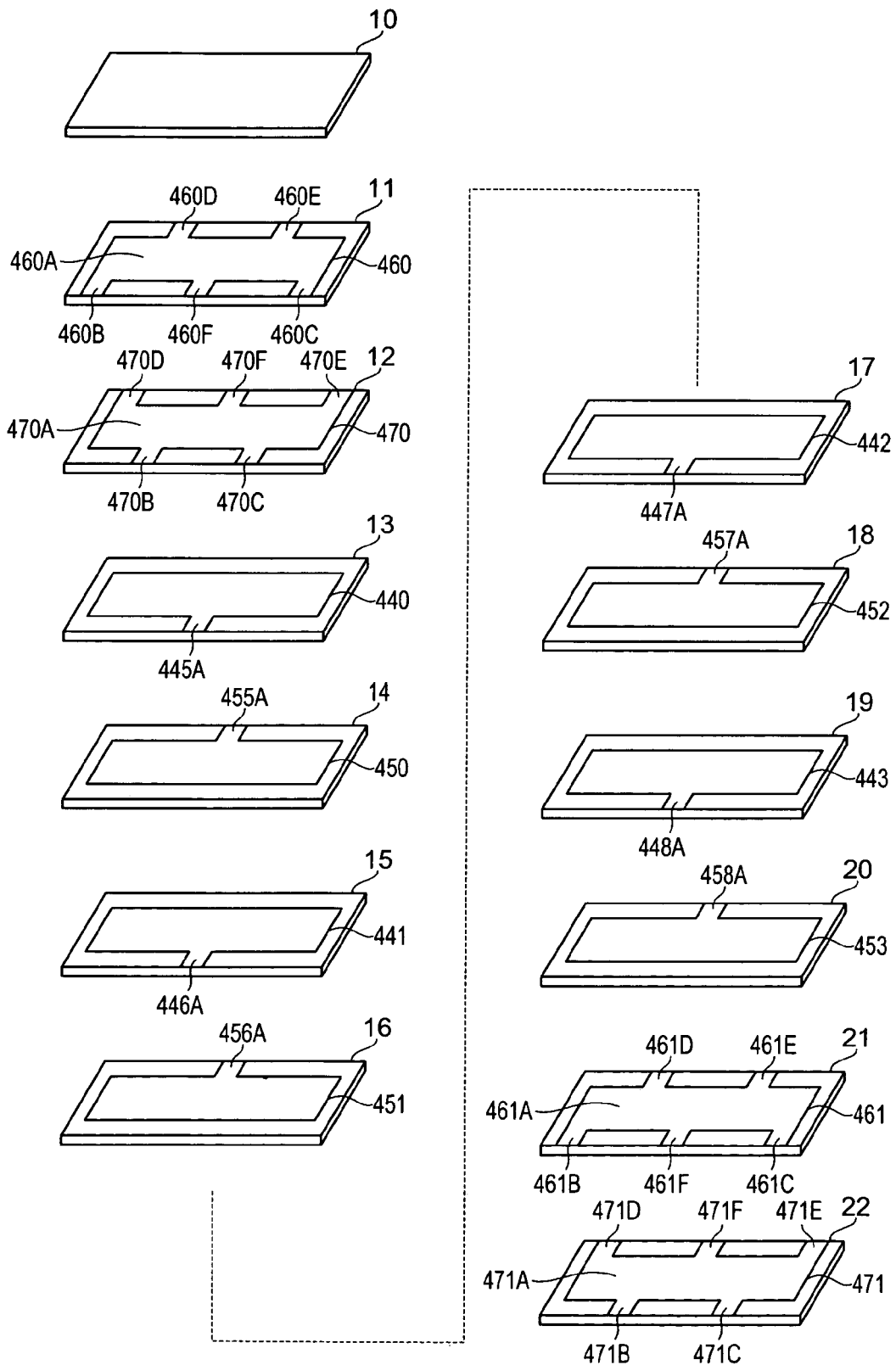
FIG. 56 is an exploded perspective view of the multilayer body included in the multilayer capacitor in accordance with a forty-second embodiment.

With reference to FIGS. 53 and 54, the structure of the multilayer capacitor C23 in accordance with a fortieth embodiment will be explained. The multilayer capacitor C23 in accordance with the fortieth embodiment differs from the multilayer capacitor C17 in accordance with the twenty-second embodiment in terms of arrangement of outer conductors formed on the multilayer body. FIG. 53 is a perspective view of the multilayer capacitor in accordance with the fortieth embodiment. FIG. 54 is an exploded perspective view of the multilayer body included in the multilayer capacitor in accordance with the fortieth embodiment.

As shown in FIG. 53, the multilayer capacitor C23 in accordance with the twenty-second embodiment comprises a multilayer body L23 having a substantially rectangular parallelepiped form, and a plurality of outer conductors formed on side faces of the multilayer body L23. The plurality of outer conductors include a plurality of (4 in this embodiment) first terminal conductors 3A, 3B, 3C, 3D; a plurality of (4 in this embodiment) second terminal conductors 4A, 4B, 4C, 4D; a first outer connecting conductor 5A; and a second outer connecting conductor 6A. The plurality of outer conductors are formed so as to be electrically insulated from each other on surfaces of the multilayer body L23.

A first terminal conductor 3A, a second terminal conductor 4A, a first outer connecting conductor 5A, a second terminal conductor 4B, and a first terminal conductor 3B are formed in this order from the left side to right side in FIG. 53 on a first side face L23a which is a side face extending longitudinally of faces L23c, L23d orthogonal to the laminating direction of the multilayer body L23 among side faces parallel to the laminating direction of the multilayer body L23.

On a second side face L23b which opposes the first side face L23a and which is a side face extending longitudinally of the faces L23c and L23d orthogonal to the laminating direction of the multilayer body L23 among the side faces parallel to the laminating direction of the multilayer body L23, a second terminal conductor 4C, a first terminal conductor 3C, a second outer connecting conductor 6A, a first terminal conductor 3D, and a second terminal conductor 4D are formed in this order from the left side to right side in FIG. 53.

Each of pairs of the first terminal conductor 3A and second terminal conductor 4D, the first terminal conductor 3B and second terminal conductor 4C, the first terminal conductor 3C and second terminal conductor 4B, the first terminal conductor 3D and second terminal conductor 4A, and the first outer connecting conductor 5A and second outer connecting conductor 6A are symmetrical to each other about a center axis Ax23 passing respective center positions Pc, Pd of the two side faces L23c, L23d orthogonal to the laminating direction of the multilayer body L23 among center axes of the multilayer body L23. Each of pairs of the first terminal conductor 3A and second terminal conductor 4C, the first terminal conductor 3B and second terminal conductor 4D, the first terminal conductor 3C and second terminal conductor 4A, the first terminal conductor 3D and second terminal conductor 4B, and the first outer connecting conductors 5A and second outer connecting conductor 6A oppose each other along a direction in which the first side face L23a and second side face L23b of the multilayer body L23 oppose each other.

As shown in FIG. 54, the multilayer body L23 is constructed by alternately laminating a plurality of (11 in this embodiment) dielectric layers 10 to 20 with a plurality of (4 each in this embodiment) first and second inner electrodes 440 to 443, 450 to 453. Further, one first inner connecting conductor 420 and one second inner connecting conductor 470 are laminated in the multilayer body L23.

Lead conductors 445A to 448A extend from their corresponding first inner electrodes 440 to 443 so as to reach the first side face L23a of the multilayer body L23. Lead conductors 455A to 458A extend from their corresponding second inner electrodes 450 to 453 so as to reach the second side face L23*b* of the multilayer body L23.

The first inner electrode 440 is electrically connected to the first outer connecting conductor 5A through the lead conductors 445A. The first inner electrode 441 is electrically connected to the first outer connecting conductor 5A through the lead conductor 446A. The first inner electrode 442 is electrically connected to the first outer connecting conductor 5A through the lead conductor 447A. The first inner electrode 443 is electrically connected to the first outer connecting conductor 5A through the lead conductor 448A. As a consequence, the plurality of first inner electrodes 440 to 443 are electrically connected to each other through the first outer connecting conductor 5A.

The second inner electrode 450 is electrically connected to the second outer connecting conductor 6A through the lead conductor 455A. The second inner electrode 451 is electrically connected to the second outer connecting conductor 6A through the lead conductor 456A. The second inner electrode 452 is electrically connected to the second outer connecting conductor 6A through the lead conductor 457A. The second inner electrode 453 is electrically connected to the second outer connecting conductor 6A through the lead conductor 458A. As a consequence, the plurality of first inner electrodes 450 to 453 are electrically connected to each other through the second outer connecting conductor 6A.

The first inner connecting conductor 460 includes a first conductor portion 460A having an oblong form; second, third and sixth conductor portions 460B, 460C, 460F extending from the first conductor portion 460A so as to be led to the first side face L23*a* of the multilayer body L23; and fourth and fifth conductor portions 460D, 460E extending from the first conductor portion 460A so as to be led to the second side face L23*b* of the multilayer body L23.

The second, third, and sixth conductor portions 460B, 460C, 460F of the first inner connecting conductor 460 are positioned in the order of the second conductor portion 460B, sixth conductor portion 460F, and third conductor portion 460C from the left side to right side in FIG. 54. The fourth and fifth conductor portions 460D, 460E of the first inner connecting conductor 460 are positioned in the order of the fourth conductor portion 460D and fifth conductor portion 460E from the left side to right side in FIG. 54. The second conductor portion 460B, third conductor portion 460C, fourth conductor portion 460D, fifth conductor portion 460E, and sixth conductor portion 460F are electrically connected to the first terminal conductor 3A, first terminal conductor 3B, first terminal conductor 3C, first terminal conductor 3D, and first outer connecting conductor 5A, respectively. Therefore, the first inner connecting conductor 460 is electrically connected to the first terminal conductors 3A to 3D and first outer connecting conductor 5A.

The second inner connecting conductor 470 includes a first conductor portion 470A having an oblong form; second and third conductor portions 470B, 470C extending from the first conductor portion 470A so as to be led to the first side face L23*a* of the multilayer body L23; and fourth, fifth and sixth conductor portions 470D, 470E, 470F extending from the first conductor portion 470A so as to be led to the second side face L23*b* of the multilayer body L23.

The second and third conductor portions 470B, 470C of the second inner connecting conductor 470 are positioned in the order of the second conductor portion 470B and third conductor portion 470C from the left side to right side in FIG. 54. The fourth to sixth conductor portions 470D to 470F of the second inner connecting conductor 470 are positioned in the order of the fourth conductor portion 470D, sixth conductor portion 470F, and fifth conductor portion 470E from the left side to right side in FIG. 54. The second conductor portion 470B, third conductor portion 470C, fourth conductor portion 470D, fifth conductor portion 470E, and sixth conductor portion 470F are electrically connected to the second terminal conductor 4A, second terminal conductor 4B, second terminal conductor 4C, second terminal conductor 4D, and second outer connecting conductor 6A, respectively. As a consequence, the second inner connecting conductor 470 is electrically connected to the second terminal conductors 4A to 4D and second outer connecting conductor 6A.

In the multilayer capacitor C23, the first terminal conductors 3A to 3D are connected to the first inner electrodes 440 to 443 not directly but electrically through the first outer connecting conductor 5A and first inner connecting conductor 460. Also, in the multilayer capacitor C23, the second terminal conductors 4A to 4D are connected to the second inner electrodes 450 to 453 not directly but electrically through the second outer connecting conductor 6A and second inner connecting conductor 470. These allow the multilayer capacitor C23 to yield an equivalent series resistance greater than that of a conventional multilayer capacitor in which all the inner electrodes are connected to their corresponding terminal conductors through lead conductors.

By adjusting the number of first inner connecting conductor 460 directly connected to the first terminal conductors 3A to 3D and the number of second inner connecting conductor 470 directly connected to the second terminal conductors 4A to 4D in such a fashion, this embodiment sets the equivalent series resistance of the multilayer capacitor C23 to a desirable value, and thus can regulate the equivalent series resistance easily with a high precision. Since the equivalent series resistance is controlled by the first and second inner connecting conductors, the multilayer capacitor C23 can regulate the equivalent series resistance while attaining a desirable value (e.g., large value) of capacitance.

All of the first and second terminal conductors 3A to 3D, 4A to 4D and first and second outer connecting conductors 5A, 6A, which are outer conductors of the multilayer capacitor C23; are formed on the opposing first and second side faces L23*a*, L23*b* of the multilayer body L23. Consequently, the number of steps required for forming outer conductors can be made smaller in the multilayer capacitor C23 than in the case where terminal conductors are formed on four side faces of the multilayer body L23. Therefore, the multilayer capacitor C23 can be manufactured easily.

The first conductor portion 460A of the first inner connecting conductor 460 and the first conductor portion 470A of the second inner connecting conductor 470 oppose their corresponding inner electrodes with a dielectric layer in between respectively, and thus can contribute to forming a capacity component. Therefore, the multilayer capacitor C23 can further increase its capacitance.

Since a plurality of first and second inner electrodes 440 to 443, 450 to 453 are arranged between the first inner connecting conductor 460 and second inner connecting conductor 470 in the multilayer body L23 of the multilayer capacitor C23, the equivalent series resistance can be set with a favorable balance.

The multilayer capacitor C23 can lower its equivalent series inductance. A reason therefore can be considered as follows. Namely, when the multilayer capacitor C23 is mounted to a substrate or the like such that the first terminal conductors 3A to 3D and second terminal conductors 4A to 4D are directly connected to their corresponding land patterns having polarities different from each other, a magnetic field caused by a current flowing between the first terminal conductor 3A and second terminal conductor 4C and a magnetic field caused by a current flowing between the first terminal conductor 3C and second terminal conductor 4A cancel each other out. This seems to be the reason why the multilayer capacitor C23 can lower its equivalent series inductance.

When the multilayer capacitor C23 is mounted to a substrate or the like as mentioned above, a magnetic field caused by a current flowing between the first terminal conductor 3B and second terminal conductor 4D and a magnetic field caused by a current flowing between the first terminal conductor 3D and second terminal conductor 4B cancel each other out. This also seems to be the reason why the multilayer capacitor C23 can lower its equivalent series inductance.

The multilayer capacitor C23 can be mounted easily because of positional relationships of the outer conductors 3A to 3D, 4A to 4D, 5A, 6A with the center axis Ax23, and positional relationships among the outer conductors 3A to 3D, 4A to 4D, 5A, 6A in the opposing direction of the first side face L23a and second side face L23b of the multilayer body L23.

Forty-First Embodiment

With reference to FIG. 53, the structure of the multilayer capacitor in accordance with a forty-first embodiment will be explained. The multilayer capacitor in accordance with the forty-first embodiment differs from the multilayer capacitor C23 in accordance with the fortieth embodiment in terms of positions of inner connecting conductors 460, 470 in the laminating direction. FIG. 53 is an exploded perspective view of the multilayer body included in the multilayer capacitor in accordance with the forty-first embodiment.

In the multilayer capacitor in accordance with the forty-first embodiment, as shown in FIG. 53, one each of the first and second inner connecting conductors 460, 470 is laminated between two each of first and second inner electrodes 440, 441, 450, 451 and two each of first and second inner electrodes 442, 443, 452, 453. More specifically, the first inner connecting conductor 460 is positioned so as to be held between dielectric layers 14 and 15. The second inner connecting conductor 470 is positioned so as to be held between dielectric layers 15 and 16.

In the multilayer capacitor in accordance with the forty-first embodiment, terminal conductors 3A to 3D, 4A to 4D are connected to the inner electrodes 440 to 443, 450 to 453 not directly but electrically through the outer connecting conductors 5A, 6A and the inner connecting conductors 460, 470. Therefore, the multilayer capacitor in accordance with the forty-first embodiment can yield an equivalent series resistance greater than that of a conventional multilayer capacitor in which all the inner electrodes are connected to their corresponding terminal conductors through lead conductors.

When the first terminal conductors 3A to 3D are concerned, the multilayer capacitor in accordance with the forty-first embodiment differs from the multilayer capacitor C23 in accordance with the fortieth embodiment in terms of the position of the first inner connecting conductor 460 and, consequently, in terms of how the resistance component of the first outer connecting conductor 5A is connected to the first terminal conductors 3A to 3D. When the second terminal conductors 4A to 4D are concerned, the multilayer capacitor in accordance with the forty-first embodiment differs from the multilayer capacitor C23 in accordance with the fortieth embodiment in terms of the position of the second inner connecting conductor 470 and, consequently, in terms of how the resistance component of the second outer connecting conductor 6A is connected to the second terminal conductors 4A to 4D.

Because of the difference in resistance components of the first and second outer connecting conductors 5A, 6A the multilayer capacitor in accordance with the forty-first embodiment yields an equivalent series resistance smaller than that in the multilayer capacitor C23 in accordance with the fortieth embodiment.

By adjusting positions of the first inner connecting conductors 460, 470 in the laminating direction as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors 460, 470, the multilayer capacitor in accordance with the forty-first embodiment can regulate the equivalent series resistance while attaining a desirable value (e.g., large value) of capacitance.

The first conductor portion 460A of the first inner connecting conductor 460 and the first conductor portion 470A of the second inner connecting conductor 470 oppose their corresponding inner electrodes with a dielectric layer in between respectively, and thus can contribute to forming a capacity component. Therefore, the multilayer capacitor in accordance with the forty-first embodiment can further increase its capacitance.

Since the outer conductors are arranged such as in the multilayer capacitor C23, the multilayer capacitor in accordance with the forty-first embodiment can be manufactured easily as with the multilayer capacitor C23. The multilayer capacitor in accordance with the forty-first embodiment can lower the equivalent series inductance as with the multilayer capacitor C23. Also, the multilayer capacitor in accordance with the forty-first embodiment can be mounted easily as with the multilayer capacitor C23.

Forty-Second Embodiment

With reference to FIG. 53, the structure of the multilayer capacitor in accordance with a forty-second embodiment will be explained. The multilayer capacitor in accordance with the forty-second embodiment differs from the multilayer capacitor C23 in accordance with the fortieth embodiment in terms of the number of first and second inner connecting conductors. FIG. 53 is an exploded perspective view of the multilayer body included in the multilayer capacitor in accordance with the forty-second embodiment.

As shown in FIG. 53, the multilayer body of the multilayer capacitor in accordance with the forty-second embodiment is constructed by alternately laminating a plurality of (13 in this embodiment) dielectric layers 10 to 22 and a plurality of (4 each in this embodiment) first and second inner electrodes 440 to 443, 450 to 453.

In the multilayer body of the multilayer capacitor in accordance with the forty-second embodiment, a plurality of (2 in this embodiment) first inner connecting conductors 460, 461 and a plurality of (2 in this embodiment) second inner connecting conductors 470, 471 are laminated. In the multilayer body of the multilayer capacitor in accordance with the forty-second embodiment, the first inner electrodes 440 to 443 and second inner electrodes 450 to 453 are arranged between the first and second inner connecting conductors 460, 470 and the first and second inner connecting conductors 461, 471.

The first inner connecting conductor 460 is positioned so as to be held between the dielectric layers 10 and 11, whereas the first inner connecting conductor 461 is positioned so as to be held between the dielectric layers 20 and 21. The second inner connecting conductor 470 is positioned so as to be held between the dielectric layers 11 and 12, whereas the second inner connecting conductor 471 is positioned so as to be held between the dielectric layers 21 and 22.

In the multilayer capacitor in accordance with the forty-second embodiment, terminal conductors 3A to 3D, 4A to 4D are connected to the inner electrodes 440 to 443, 450 to 453 not directly but electrically through outer connecting conductors 5A, 6A and the inner connecting conductors 460, 461, 470, 471. Therefore, the multilayer capacitor in accordance with the forty-second embodiment yields an equivalent series resistance greater than that of a conventional multilayer capacitor in which all the inner electrodes are connected to their corresponding terminal conductors through lead conductors.

The number of first inner connecting conductors 460, 461 and second inner connecting conductors 470, 471 is greater in the multilayer capacitor in the forty-second embodiment than in the multilayer capacitor C23, whereas the inner connecting conductors 460, 461, 470, 471 are connected in parallel to their corresponding terminal conductors 3A to 3D, 4A to 4D. Since the number of inner connecting conductors 460, 461, 470, 471 is greater, the number of current paths between the terminal conductors 3A to 3D, 4A to 4D and inner electrodes 440 to 443, 450 to 453 increases. Therefore, the multilayer capacitor in accordance with the forty-second embodiment yields an equivalent series resistance smaller than that of the multilayer capacitor C23.

By adjusting the number of first inner connecting conductors 460, 461 and the number of second inner connecting conductors 470, 471 as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors, the multilayer capacitor in accordance with the forty-second embodiment can regulate the equivalent series resistance while attaining a desirable value (e.g., large value) of capacitance.

The first conductor portion 461A of the first inner connecting conductor 461 and the first conductor portion 470A of the second inner connecting conductor 470 oppose their corresponding inner electrodes with a dielectric layer in between respectively, and thus can contribute to forming a capacity component. Therefore, the multilayer capacitor in accordance with the forty-second embodiment can further increase its capacitance.

In the multilayer body of the multilayer capacitor in accordance with the forty-second embodiment, a plurality of first and second inner electrodes 440 to 443, 450 to 453 are arranged between the first and second inner connecting conductors 460, 470 and the first and second inner connecting conductors 461, 471. Therefore, the multilayer capacitor in accordance with the forty-second embodiment can set the equivalent series resistance with a favorable balance.

Since the outer conductors are arranged as in the multilayer capacitor C23, the multilayer capacitor in accordance with the forty-second embodiment can be manufactured easily as with the multilayer capacitor C23. The multilayer capacitor in accordance with the forty-second embodiment can lower the equivalent series inductance as with the multilayer capacitor C23. Also, the multilayer capacitor in accordance with the forty-second embodiment can be mounted easily as with the multilayer capacitor C23.

Forty-Third Embodiment

Figure 57:
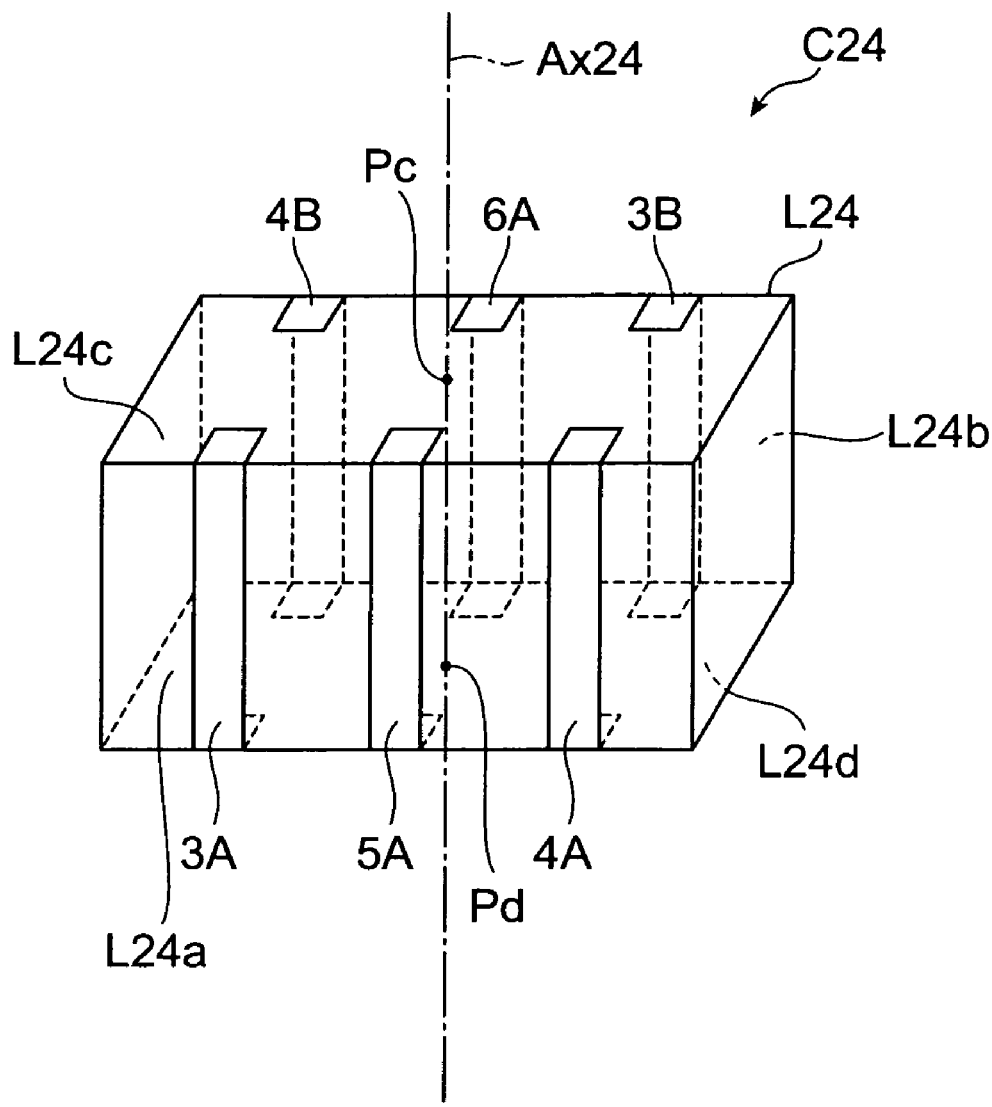
FIG. 57 is a perspective view of the multilayer capacitor in accordance with an forty-third embodiment.
Figure 58:
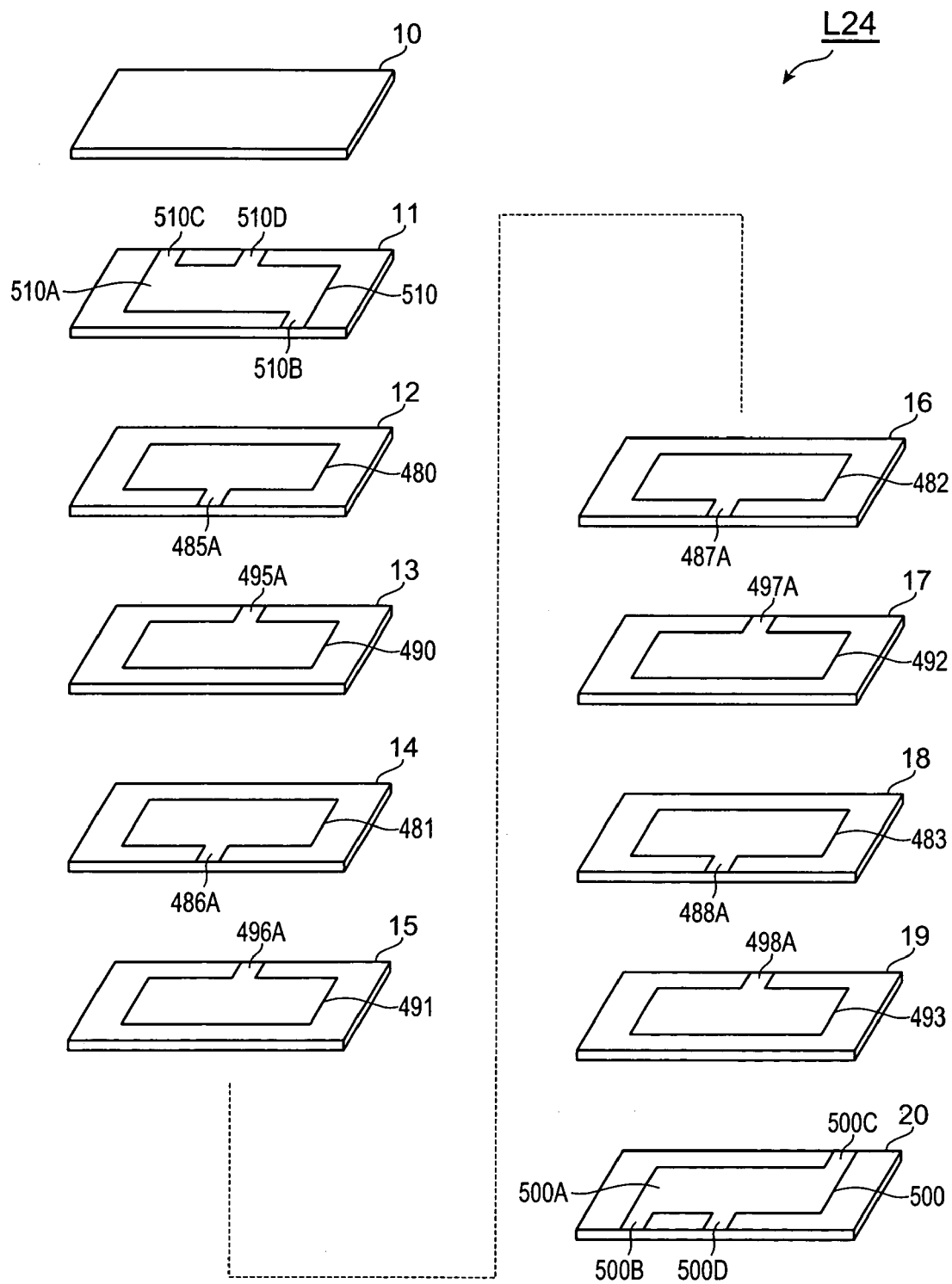
FIG. 58 is an exploded perspective view of the multilayer body included in the multilayer capacitor in accordance with the forty-third embodiment.

With reference to FIGS. 57 and 58, the structure of the multilayer capacitor C24 in accordance with a forty-third embodiment will be explained. FIG. 57 is a perspective view of the multilayer capacitor in accordance with the forty-third embodiment. FIG. 58 is an exploded perspective view of the multilayer body included in the multilayer capacitor in accordance with the forty-third embodiment.

As shown in FIG. 57, the multilayer capacitor C24 in accordance with the forty-third embodiment comprises a multilayer body L24 having a substantially rectangular parallelepiped form, and a plurality of outer conductors formed on side faces of the multilayer body L24. The plurality of outer connecting conductors include a plurality of (2 in this embodiment) first terminal conductors 3A, 3B; a plurality of (2 in this embodiment) second terminal conductors 4A, 4B; one first outer connecting conductor 5A; and one second outer connecting conductor 6A. The plurality of outer conductors are formed so as to be electrically insulated from each other on surfaces of the multilayer body L24.

Each of the first terminal conductor 3A, second terminal conductor 4A, and first outer connecting conductor 5A is positioned on a first side face L24a among side faces parallel to the laminating direction of the multilayer body L24 which will be explained later, i.e., on the first side face L24a that is a side face extending longitudinally of side faces orthogonal to the laminating direction of the multilayer body L24. The first terminal conductor 3A, second terminal conductor 4A, and first outer connecting conductor 5A are formed in the order of the first terminal conductor 3A, first outer connecting conductor 5A, and second terminal conductor 4A from the left side to right side in FIG. 57. Namely, the first outer connecting conductor 5A is formed so as to be positioned between the first terminal conductor 3A and second terminal conductor 4A on the first side face L24a.

Each of the first terminal conductor 3B, second terminal conductor 4B, and second outer connecting conductor 6A is positioned on a second side face L24b among side faces parallel to the laminating direction of the multilayer body L24 which will be explained later, i.e., on the second side face L24b that is a side face extending longitudinally of side faces orthogonal to the laminating direction of the multilayer body L24 and opposing the first side face L24a. The first terminal conductor 3B, second terminal conductor 4B, and second outer connecting conductor 6A are formed in the order of the second terminal conductor 4B, second outer connecting conductor 6A, and first terminal conductor 3B from the left side to right side in FIG. 57. Namely, the second outer connecting conductor 6A is formed on the second side face L24b so as to be positioned between the first terminal conductor 3B and second terminal conductor 4B.

The first terminal conductor 3B is located at a position symmetrical to the first terminal conductor 3A about a center axis Ax24 passing respective center positions Pc, Pd of two side faces L24c, L24d orthogonal to the laminating direction of the multilayer body L24 among center axes of the multilayer body L24. The second terminal conductor 4B is located at a position symmetrical to the second terminal conductor 4A about the center axis Ax24 of the multilayer body L24. The second outer connecting conductor 6A is located at a position symmetrical to the first outer connecting conductor 5A about the center axis Ax24 of the multilayer body L24.

The first terminal conductor 3A formed on the first side face L24a and the second terminal conductor 4B formed on the second side face L24b oppose each other along a direction in which the first side face L24a and second side face L24b oppose each other. The second terminal conductor 4A formed on the first side face L24a and the first terminal conductor 3B formed on the second side face L24b oppose each other along the direction in which the first side face L24a and second side face L24b oppose each other. The first outer connecting conductor 5A formed on the first side face L24a and the second outer connecting conductor 6A formed on the second side face L24b oppose each other along the direction in which the first side face L24a and second side face L24b oppose each other.

As shown in FIG. 58, the multilayer body L24 is constructed by alternately laminating a plurality of (11 in this embodiment) dielectric layers 10 to 20 with a plurality of (4 each in this embodiment) first and second inner electrodes 480 to 483, 490 to 493. In the actual multilayer capacitor C24, the dielectric layers 10 to 20 are integrated to such an extent that their boundaries are indiscernible.

Further, one first inner connecting conductor 500 and one second inner connecting conductor 510 are laminated in the multilayer body L24. In the multilayer body L24, a plurality of first inner electrodes 480 to 483 and a plurality of second inner electrodes 490 to 493 are arranged between one first inner connecting conductor 500 which is part of the two inner connecting conductors 500, 510 and the remaining one second inner connecting conductor 510.

Each of the first inner electrodes 480 to 483 has a substantially rectangular form. The plurality of first inner electrodes 480 to 483 are formed at respective positions separated by a predetermined distance from a side face parallel to the laminating direction of the dielectric layers 10 to 20 (hereinafter simply referred to as "laminating direction") in the multilayer body L24. The first inner electrodes 480 to 483 are formed with lead conductors 485A to 488A extending so as to be led to the first side face L24a of the multilayer body L24.

The lead conductor 485A is integrally formed with the first inner electrode 480, and extends therefrom so as to reach the first side face L24a of the multilayer body L24. The lead conductor 486A is integrally formed with the first inner electrode 481, and extends therefrom so as to reach the first side face L24a of the multilayer body L24. The lead conductor 487A is integrally formed with the first inner electrode 482, and extends therefrom so as to reach the first side face L24a of the multilayer body L24. The lead conductor 488A is integrally formed with the first inner electrode 483, and extends therefrom so as to reach the first side face L24a of the multilayer body L24.

The first inner electrode 480 is electrically connected to the first outer connecting conductor 5A through the lead conductor 485A. The first inner electrode 481 is electrically connected to the first outer connecting conductor 5A through the lead conductor 486A. The first inner electrode 482 is electrically connected to the first outer connecting conductor 5A through the lead conductor 487A. The first inner electrode 483 is electrically connected to the first outer connecting conductor 5A through the lead conductor 488A. Consequently, the plurality of first inner electrodes 480 to 483 are electrically connected to each other through the first outer connecting conductor 5A.

Each of the second inner electrodes 490 to 493 has a substantially rectangular form. The plurality of second inner electrodes 490 to 493 are formed at respective positions separated by a predetermined distance from a side face parallel to the laminating direction of the multilayer body L24. The second inner electrodes 490 to 493 are formed with lead conductors 495A to 498A extending so as to be led to the second side face L24b of the multilayer body L24.

The lead conductor 495A is integrally formed with the second inner electrode 490, and extends therefrom so as to reach the second side face L24b of the multilayer body L24. The lead conductor 496A is integrally formed with the second inner electrode 491, and extends therefrom so as to reach the second side face L24b of the multilayer body L24. The lead conductor 497A is integrally formed with the second inner electrode 492, and extends therefrom so as to reach the second side face L24b of the multilayer body L24. The lead conductor 498A is integrally formed with the second inner electrode 493, and extends therefrom so as to reach the second side face L24b of the multilayer body L24.

The second inner electrode 490 is electrically connected to the second outer connecting conductor 6A through the lead conductor 495A. The second inner electrode 491 is electrically connected to the second outer connecting conductor 6A through the lead conductor 496A. The second inner electrode 492 is electrically connected to the second outer connecting conductor 6A through the lead conductor 497A. The second inner electrode 493 is electrically connected to the second outer connecting conductor 6A through the lead conductor 498A. Consequently, the plurality of second inner electrodes 490 to 493 are electrically connected to each other through the second outer connecting conductor 6A.

The first inner connecting conductor 500 is positioned so as to be held between the dielectric layers 19 and 20. The second inner connecting conductor 510 is positioned so as to be held between the dielectric layers 10 and 11. The first inner connecting conductor 500 and second inner connecting conductor 510 are electrically insulated from each other.

The first inner connecting conductor 500 includes a first conductor portion 500A having an oblong form; second and fourth conductor portions 500B, 500D extending from the first conductor portion 500A so as to be led to the first side face L24a of the multilayer body L24; and a third conductor portion 500C extending from the first conductor portion 500A so as to be led to the second side face L24b of the multilayer body L24. The first conductor portion 500A is arranged such that its longitudinal axis is parallel to the first and second side faces L24a, L24b of the multilayer body L24.

The second and fourth conductor portions 500B, 500D are positioned in the order of the second conductor portion 500B and fourth conductor portion 500D from the left side to right side in FIG. 58. The second conductor portion 500B, third conductor portion 500C, and fourth conductor portion 500D are electrically connected to the first terminal conductor 3A, first terminal conductor 3B, and first outer connecting conductor 5A, respectively. As a consequence, the first inner connecting conductor 500 is electrically connected to the first terminal conductors 3A, 3B and first outer connecting conductor 5A.

The second inner connecting conductor 510 includes a first conductor portion 510A having an oblong form; a second conductor portion 510B extending from the first conductor portion 510A so as to be led to the first side face L24a of the multilayer body L24; and third and fourth conductor portions 510C, 510D extending from the first conductor portion 510A so as to be led to the second side face L24b of the multilayer body L24. The first conductor portion 510A is arranged such that its longitudinal axis is parallel to the first and second side faces L24a, L24b of the multilayer body L24.

The third and fourth conductor portions 510C, 510D of the second inner connecting conductor 510 are positioned in the order of the third conductor portion 510C and fourth conductor portion 510D from the left side to right side in FIG. 58. The second conductor portion 510B, third conductor portion 510C, and fourth conductor portion 510D are electrically connected to the second terminal conductor 4A, second terminal conductor 4B, and second outer connecting conductor 6A, respectively. As a consequence, the second inner connecting conductor 510 is electrically connected to the second terminal conductors 4A, 4B and second outer connecting conductor 6A.

The first conductor portion 500A of the first inner connecting conductor 500 is a region opposing the second inner electrode 493 with the dielectric layer 19 in between. The first conductor portion 510A of the first inner connecting conductor 510 is a region opposing the first inner electrode 480 with the dielectric layer 11 in between.

The first and second inner connecting conductors 500, 510 are laminated in the multilayer body L24 such that the multilayer body L24 includes at least one set (four sets in this embodiment) of first and second inner electrodes neighboring each other with a dielectric layer in between in the laminating direction. Specifically, the first and second inner connecting conductors 500, 510 are laminated in the multilayer body L24 such that the multilayer body L24 includes the first inner electrode 480 and second inner electrode 490 neighboring each other with the dielectric layer 12 in between in the laminating direction, for example. Namely, in the multilayer body L24, the first and second inner connecting conductors 500, 510 are arranged on the outside of one set of first and second inner electrodes 480, 490.

In the multilayer capacitor C24, the first terminal conductors 3A, 3B are connected to the first inner electrodes 480 to 483 not directly but electrically through the first outer connecting conductor 5A and first inner connecting conductor 500. Also, in the multilayer capacitor C24, the second terminal conductors 4A, 4B are connected to the second inner electrodes 490 to 493 not directly but electrically through the second outer connecting conductor 6A and second inner connecting conductor 510. As a result, the multilayer capacitor C24 yields an equivalent series resistance greater than that of a conventional multilayer capacitor in which all the inner electrodes are connected to their corresponding terminal conductors through lead conductors.

By adjusting the number of first and second inner connecting conductors 500, 510 directly connected to the first terminal conductors 3A, 3B and second terminal conductors 4A, 4B in such a fashion, this embodiment sets the equivalent series resistance of the multilayer capacitor C24 to a desirable value, and thus can regulate the equivalent series resistance easily with a high precision. Since the equivalent series resistance is controlled by the first and second inner connecting conductors, the multilayer capacitor C24 can regulate the equivalent series resistance while attaining a desirable value (e.g., large value) of capacitance.

The first and second terminal conductors 3A, 3B, 4A, 4B and first and second outer connecting conductor 5A, 6A which are outer conductors of the multilayer capacitor C24, are formed on any of the opposing first and second side faces L24a, L24b of the multilayer body L24. Thus, in the multilayer capacitor C24, all the outer connecting conductors (first terminal conductors 3A, 3B; second terminal conductors 4A, 4B; first outer connecting conductor 5A; and second outer connecting conductor 6A) are formed on the two opposing side faces L24a, L24b of the multilayer body L24. Consequently, the number of steps required for forming outer conductors can be made smaller in the multilayer capacitor C24 than in the case where terminal conductors are formed on three or more side faces (e.g., four side faces) of a multilayer body. Therefore, the multilayer capacitor C24 can be manufactured easily.

The first inner connecting conductor 500 has the first conductor portion 500A that is a region opposing the second inner electrode 493 with the dielectric layer 19 in between in the multilayer body L24 in the laminating direction. Therefore, the first inner connecting conductor 500 can also contribute to forming a capacity component of the multilayer capacitor C24. Consequently, the multilayer capacitor C24 can further increase its capacitance.

The second inner connecting conductor 510 has the first conductor portion 510A that is a region opposing the first inner electrode 480 with the dielectric layer 11 in between in the multilayer body L24 in the laminating direction. Therefore, the second inner connecting conductor 510 can also contribute to forming a capacity component of the multilayer capacitor C24. Consequently, the multilayer capacitor C24 can further increase its capacitance.

In the multilayer body L24 of the multilayer capacitor C24, a plurality of first inner electrodes 480 to 483 and a plurality of second inner electrodes 490 to 493 are arranged between part of the inner connecting conductors 500, 510 (first inner connecting conductor 500) and the rest (second inner connecting conductor 510). Therefore, the multilayer capacitor C24 can set the equivalent series resistance with a favorable balance.

The multilayer capacitor C24 can lower its equivalent series inductance. A reason therefore can be considered as follows. Namely, when the multilayer capacitor C24 is mounted to a substrate or the like such that the first terminal conductors 3A, 3B are directly connected to land patterns, the second terminal conductors 4A, 4B are directly connected to land patterns having a polarity different from that of the land patterns connected to the first terminal conductors 3A, 3B, and the first and second outer connecting conductor 5A, 6A are not directly connected to any land patterns, a current flowing between the first terminal conductor 3A and second terminal conductor 4B and a current flowing between the first terminal conductor 3B and second terminal conductor 4A are directed opposite to each other along the direction in which the first and second side faces L24a, L24b oppose each other. Therefore, a magnetic field caused by the current flowing between the first terminal conductor 3A and second terminal conductor 4B and a magnetic field caused by the current flowing between the first terminal conductor 3B and second terminal conductor 4A cancel each other out. This seems to be the reason why the multilayer capacitor C24 can lower its equivalent series inductance.

In the multilayer capacitor C24, the first terminal conductor 3A and first outer connecting conductor 5A are formed adjacent to each other on the first side face L24a of the multilayer body L24. Therefore, the following effect is obtained when the multilayer capacitor C24 is mounted to a substrate or the like such that the first terminal conductors 3A, 3B are directly connected to land patterns while the first outer connecting conductor 5A is not directly connected to a land pattern.

Namely, a magnetic field caused by a current flowing between the first terminal conductor 3A and the first inner connecting conductor 500 (the second conductor portion 500B of the first inner connecting conductor 500) and a magnetic field caused by a current flowing between the first outer connecting conductor 5A and the first inner connecting conductor 500 (the fifth conductor portion 500D of the first inner connecting conductor 500) cancel each other out. As a result, the multilayer capacitor C24 can lower the equivalent series inductance. When there is at least one pair of first terminal conductor and first outer connecting conductor adjacent to each other, the equivalent series inductance can be lowered.

In the multilayer capacitor C24, the first terminal conductor 4B and second outer connecting conductor 6A are formed adjacent to each other on the second side face L24b of the multilayer body L24. Therefore, the following effect is obtained when the multilayer capacitor C24 is mounted to a substrate or the like such that the second terminal conductors 4A, 4B are directly connected to land patterns while the second outer connecting conductor 6A is not directly connected to a land pattern.

Namely, a magnetic field caused by a current flowing between the second terminal conductor 4B and the second inner connecting conductor 510 (the second conductor portion 510C of the second inner connecting conductor 510) and a magnetic field caused by a current flowing between the second outer connecting conductor 6A and the second inner connecting conductor 510 (the fifth conductor portion 510D of the second inner connecting conductor 510) cancel each other out. As a result, the multilayer capacitor C24 can lower the equivalent series inductance. When there is at least one pair of second terminal conductor and second outer connecting conductor adjacent to each other, the equivalent series inductance can be lowered.

In the multilayer capacitor C24, each of pairs of the first terminal conductors 3A and 3B, the second terminal conductors 4A and 4B, and the first outer connecting conductor 5A and second outer connecting conductor 6A are formed at positions symmetrical to each other about the center axis Ax24 of the multilayer body L24. Therefore, even when the multilayer capacitor C24 is rotated by 180 degrees about the center axis Ax24 on a substrate or the like, the relationship of connections between the land patterns and the terminal conductors and outer connecting conductors is not changed.

Also, in the multilayer capacitor C24, each of pairs of the first terminal conductor 3A and second terminal conductor 4B, the first terminal conductor 3B and second terminal conductor 4A, and the first outer connecting conductor 5A and second outer connecting conductor 6A oppose each other along the direction in which the first side face L24a and second side face L24b oppose each other in the multilayer body L24. Therefore, even when the multilayer capacitor C24 is reversed so as to be mounted to a substrate or the like at the opposite side face, the relationship of connections between the land patterns and the terminal conductors and outer connecting conductors is not changed.

Even when the multilayer capacitor C24 is reversed about an axis orthogonal to the side faces L24a, L24b of the multilayer body L24, the relationship of connections between the land patterns and the terminal conductors and outer connecting conductors is not changed.

Since the terminal conductors 3A, 3B, 4A, 4B and outer connecting conductor 5A, 6A are arranged as mentioned above, the multilayer capacitor C24 can be mounted in conformity to various mounting directions. Therefore, the multilayer capacitor C24 can be mounted easily.

Forty-Fourth Embodiment

Figure 59:
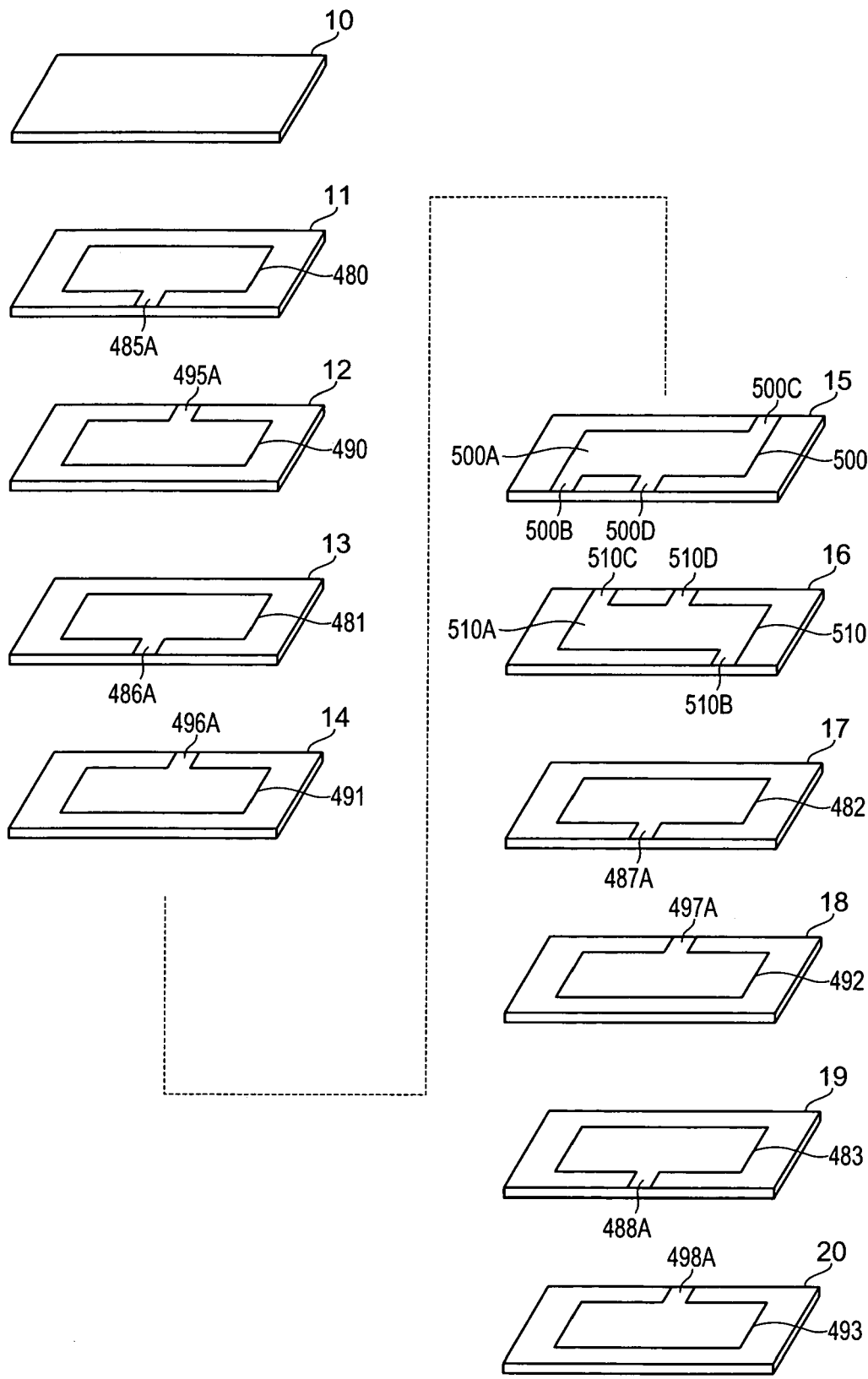
FIG. 59 is an exploded perspective view of the multilayer body included in the multilayer capacitor in accordance with a forty-fourth embodiment.

With reference to FIG. 59, the structure of the multilayer capacitor in accordance with a forty-fourth embodiment will be explained. The multilayer capacitor in accordance with the forty-fourth embodiment differs from the multilayer capacitor C24 in accordance with the forty-third embodiment in terms of positions of inner connecting conductors 500, 510 in the laminating direction. FIG. 59 is an exploded perspective view of the multilayer body included in the multilayer capacitor in accordance with the forty-fourth embodiment.

As shown in FIG. 59, in the multilayer capacitor in accordance with the forty-fourth embodiment, one each of first and second inner connecting conductors 500, 510 is laminated between two layers each of first and second inner electrodes 480, 481, 490, 491 and two layers each of first and second inner electrodes 482, 483, 492, 493. More specifically, the first inner connecting conductor 500 is positioned so as to be held between the dielectric layers 14 and 15. The second inner connecting conductor 510 is positioned so as to be held between the dielectric layers 15 and 16.

In the multilayer capacitor in accordance with the forty-fourth embodiment, each of the first and second inner connecting conductors 500, 510 is laminated in the multilayer body such that the multilayer body includes at least one set of first and second inner electrodes neighboring each other (e.g., first and second inner electrodes 480, 490 with the dielectric layer 11 in between) with a dielectric layer in between in the laminating direction.

In the multilayer capacitor in accordance with the forty-fourth embodiment, the first terminal conductors 3A, 3B are connected to the first inner electrodes 480 to 483 not directly but electrically through the first outer connecting conductor 5A and first inner connecting conductor 500. Also, in the multilayer capacitor in accordance with the forty-fourth embodiment, the second terminal conductors 4A, 4B are connected to the second inner electrodes 490 to 493 not directly but electrically through the second outer connecting conductor 6A and second inner connecting conductor 510. These allow the multilayer capacitor in accordance with the forty-fourth embodiment to yield an equivalent series resistance greater than that of a conventional multilayer capacitor in which all the inner electrodes are connected to their corresponding terminal conductors through lead conductors.

When the first terminal conductors 3A, 3B are concerned, the multilayer capacitor in accordance with the forty-fourth embodiment differs from the multilayer capacitor C24 in accordance with the forty-third embodiment in terms of how the resistance component of the first outer connecting conductor 5A is connected to the first terminal conductors 3A, 3B. Namely, the resistance component of the first outer connecting conductor 5A in the multilayer capacitor C24 in accordance with the forty-third embodiment is connected in series to the first inner connecting conductor 500, so as to be connected to each of the first terminal conductors 3A, 3B. In the multilayer capacitor in accordance with the forty-fourth embodiment, by contrast, the resistance component of the first outer connecting conductor 5A is divided at the first inner connecting conductor 500 as a boundary, whereas thus divided resistance components are connected in parallel to the first terminal conductors 3A, 3B.

When the second terminal conductors 4A, 4B are concerned, the multilayer capacitor in accordance with the forty-fourth embodiment differs from the multilayer capacitor C24 in accordance with the forty-third embodiment in terms of how the resistance component of the second outer connecting conductor 6A is connected to the second terminal conductors 4A, 4B. Namely, the resistance component of the second outer connecting conductor 6A in the multilayer capacitor C24 in accordance with the forty-third embodiment is connected in series to the second inner connecting conductor 510, so as to be connected to each of the second terminal conductors 4A, 4B. In the multilayer capacitor in accordance with the forty-fourth embodiment, by contrast, the resistance component of the second outer connecting conductor 6A is divided at the second inner connecting conductor 510 as a boundary, whereas thus divided resistance components are connected in parallel to the second terminal conductors 4A, 4B.

Therefore, because of the difference in resistance components of the first and second outer connecting conductors 5A, 6A, the multilayer capacitor in accordance with the forty-fourth embodiment yields an equivalent series resistance smaller than that of the multilayer capacitor C24 in accordance with the forty-third embodiment.

By adjusting positions of the first inner connecting conductor 500 directly connected to the first terminal conductors 3A, 3B and the second inner connecting conductor 510 directly connected to the second terminal conductors 4A, 4B as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors, the multilayer capacitor in accordance with the forty-fourth embodiment can regulate the equivalent series resistance while attaining a desirable value (e.g., large value) of capacitance.

All the outer conductors (first and second terminal conductors 3A, 3B, 4A, 4B and first and second outer connecting conductors 5A, 6A) of the multilayer capacitor in accordance with the forty-fourth embodiment are formed on the opposing first and second side faces of the multilayer body. Consequently, the number of steps required for forming outer conductors can be made smaller in the multilayer capacitor in accordance with the forty-fourth embodiment than in the case where outer conductors are formed on three or more side faces (e.g., four side faces) of a multilayer body, whereby the multilayer capacitor in accordance with the forty-fourth embodiment can be manufactured easily.

The first conductor portion 500A of the first inner connecting conductor 500 opposes the second inner electrode 491 with the dielectric layer 14 in between. The first conductor portion 510A of the second inner connecting conductor 510 opposes the first inner electrode 482 with the dielectric layer 16 in between. Therefore, the first and second inner connecting conductors 500, 510 can also contribute to forming the capacity component in the multilayer capacitor in accordance with the forty-fourth embodiment, whereby the capacitance in the multilayer capacitor can further be increased.

As with the multilayer capacitor C24, the multilayer capacitor in accordance with the forty-fourth embodiment can lower the equivalent series inductance. As with the multilayer capacitor C24, the multilayer capacitor in accordance with the forty-fourth embodiment can be mounted easily.

Forty-Fifth Embodiment

Figure 60:
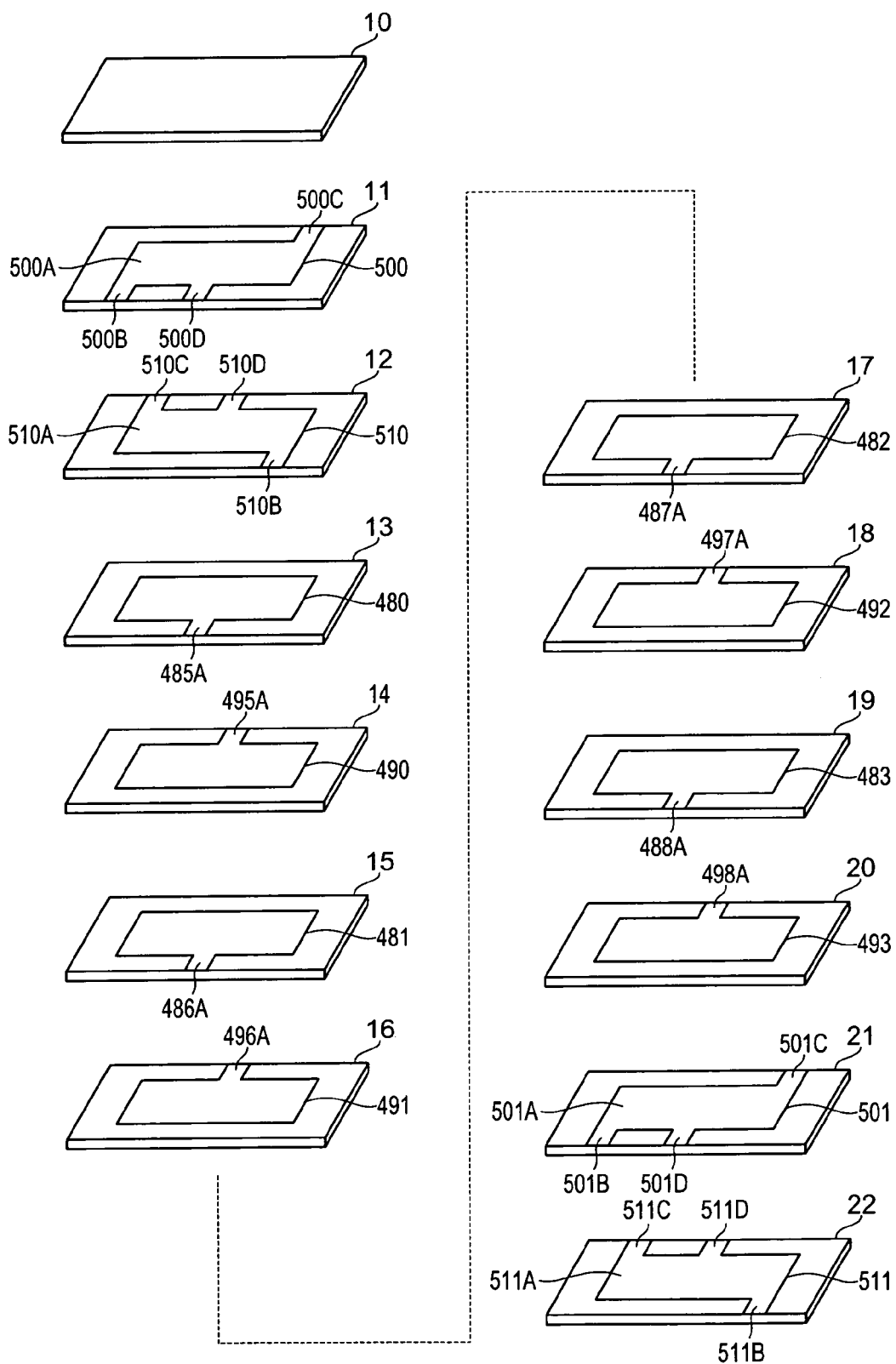
FIG. 60 is an exploded perspective view of the multilayer body included in the multilayer capacitor in accordance with a forty-fifth embodiment.

With reference to FIG. 60, the structure of the multilayer capacitor in accordance with a forty-fifth embodiment will be explained. The multilayer capacitor in accordance with the forty-fifth embodiment differs from the multilayer capacitor C24 in accordance with the forty-third embodiment in terms of the number of first and second inner connecting conductors. FIG. 60 is an exploded perspective view of the multilayer body included in the multilayer capacitor in accordance with the forty-fifth embodiment.

As shown in FIG. 60, the multilayer body of the multilayer capacitor in accordance with the forty-fifth embodiment is constructed by alternately laminating a plurality of (13 in this embodiment) dielectric layers 10 to 22 with a plurality of (4 each in this embodiment) first and second inner electrodes 480 to 483, 490 to 493.

In the multilayer body of the multilayer capacitor in accordance with the forty-fifth embodiment, a plurality of (2 in this embodiment) first inner connecting conductors 500, 501 and a plurality of (2 in this embodiment) second inner connecting conductors 510, 511 are laminated. In the multilayer body of the multilayer capacitor in accordance with the forty-fifth embodiment, four layers of first inner electrodes 480 to 483 and four layers of second inner electrodes 490 to 493 are arranged between one each of the first and second inner connecting conductors 500, 510, which are part of the plurality of inner connecting conductors 500, 501, 510, 511, and the remaining first and second connecting conductors 501, 511.

The first inner connecting conductor 500 is positioned so as to be held between the dielectric layers 10 and 11. The first inner connecting conductor 501 is positioned so as to be held between the dielectric layers 20 and 21. The second inner connecting conductor 510 is positioned so as to be held between the dielectric layers 11 and 12. The second inner connecting conductor 511 is positioned so as to be held between the dielectric layers 21 and 22.

The first inner connecting conductor 501 includes a first conductor portion 501A having an oblong form, and second to fourth conductor portions 501B to 501D extending from the first conductor portion 501A so as to be led to side faces of the multilayer body. The second to fourth conductor portions 501B to 501D of the first inner connecting conductor 501 extend so as to be led to side faces corresponding to respective side faces where the second to fourth conductor portions 500B to 500D of the first inner connecting conductor 500 are led.

The second conductor portion 501B, third conductor portion 501C, and fourth conductor portion 501D are electrically connected to the first terminal conductor 3A, first terminal conductor 3B, and first outer connecting conductor 5A, respectively. As a consequence, the first inner connecting conductor 501 is electrically connected to the first terminal conductors 3A, 3B and first outer connecting conductor 5A.

The second inner connecting conductor 511 includes a first conductor portion 511A having an oblong form, and second to fourth conductor portions 511B to 511D extending from the first conductor portion 511A so as to be led to side faces of the multilayer body. The second to fourth conductor portions 511B to 511D of the second inner connecting conductor 511 extend so as to be led to side faces corresponding to respective side faces where the second to fourth conductor portions 510B to 510D of the second inner connecting conductor 510 are led.

The second conductor portion 511B, third conductor portion 511C, and fourth conductor portion 511D are electrically connected to the second terminal conductor 4A, second terminal conductor 4B, and second outer connecting conductor 6A, respectively. As a consequence, the second inner connecting conductor 511 is electrically connected to the second terminal conductors 4A, 4B and second outer connecting conductor 6A.

In the multilayer capacitor in accordance with the forty-fifth embodiment, the first and second inner connecting conductors 500, 501, 510, 511 are laminated in the multilayer body such that the multilayer body includes at least one set (four sets in this embodiment) of first and second inner electrodes neighboring each other with a dielectric layer in between in the laminating direction.

In the multilayer capacitor in accordance with the forty-fifth embodiment, the first terminal conductors 3A, 3B are connected to the first inner electrodes 480 to 483 not directly but electrically through the first outer connecting conductor 5A and first inner connecting conductors 500, 501. Also, in the multilayer capacitor in accordance with the forty-fifth embodiment, the second terminal conductors 4A, 4B are connected to the second inner electrodes 490 to 493 not directly but electrically through the second outer, connecting conductor 6A and second inner connecting conductors 510, 511. Consequently, the multilayer capacitor in accordance with the forty-fifth embodiment yields an equivalent series resistance greater than that of a conventional multilayer capacitor in which all the inner electrodes are connected to their corresponding terminal conductors through lead conductors.

The number of first inner connecting conductors 500, 501 is greater in the multilayer capacitor in accordance with the forty-fifth embodiment than in the multilayer capacitor C24, whereas the first inner connecting conductors 500, 501 are connected in parallel to their corresponding first terminal conductors 3A, 3B. Since the number of first inner connecting conductors 500, 501 is greater, the number of current paths between the first terminal conductors 3A, 3B and first inner electrodes 480 to 483 increases. On the other hand, the number of second inner connecting conductors 510, 511 is greater in the multilayer capacitor in accordance with the forty-fifth embodiment than in the multilayer capacitor C24, whereas the second inner connecting conductors 510, 511 are connected in parallel to their corresponding second terminal conductors 4A, 4B. Since the number of second inner connecting conductors 510, 511 is greater, the number of current paths between the second terminal conductors 4A, 4B and second inner electrodes 490 to 493 increases. Consequently, the multilayer capacitor in accordance with the forty-fifth embodiment yields an equivalent series resistance smaller than that of the multilayer capacitor C24.

By adjusting the number of first inner connecting conductors 500, 501 directly connected to the first terminal conductors 3A, 3B and the number of second inner connecting conductors 510, 511 directly connected to the second terminal conductors 4A, 4B as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors, the multilayer capacitor in accordance with the forty-fifth embodiment can regulate the equivalent series resistance while attaining a desirable value (e.g., large value) of capacitance.

All the outer conductors (first and second terminal conductors 3A, 3B, 4A, 4B and first and second outer connecting conductors 5A, 6A) of the multilayer capacitor in accordance with the forty-fifth embodiment are formed on the opposing first and second side faces of the multilayer body. Consequently, the multilayer capacitor in accordance with the forty-fifth embodiment can be manufactured more easily than in the case where outer conductors are formed on three or more side faces (e.g., four side faces) of a multilayer body.

The first conductor portion 501A of the first inner connecting conductor 501 opposes the second inner electrode 493 with the dielectric layer 20 in between. The first conductor portion 510A of the second inner connecting conductor 510 opposes the first inner electrode 480 with the dielectric layer 12 in between. Therefore, the first and second inner connecting conductors 501, 510 can also contribute to forming the capacity component in the multilayer capacitor in accordance with the forty-fifth embodiment, whereby the capacitance in the multilayer capacitor can further be increased.

In the multilayer body of the multilayer capacitor in accordance with the forty-fifth embodiment, a plurality of first and second inner electrodes 480 to 483, 490 to 493 are arranged between the first and second inner connecting conductors 500, 510 and the first and second inner connecting conductors 501, 511. Therefore, the multilayer capacitor in accordance with the forty-fifth embodiment can set the equivalent series resistance with a favorable balance.

As with the multilayer capacitor C24, the multilayer capacitor in accordance with the forty-fifth embodiment can lower the equivalent series inductance. Also, the multilayer capacitor in accordance with the forty-fifth embodiment can be mounted easily as with the multilayer capacitor C24.

Forty-Sixth Embodiment

Figure 61:
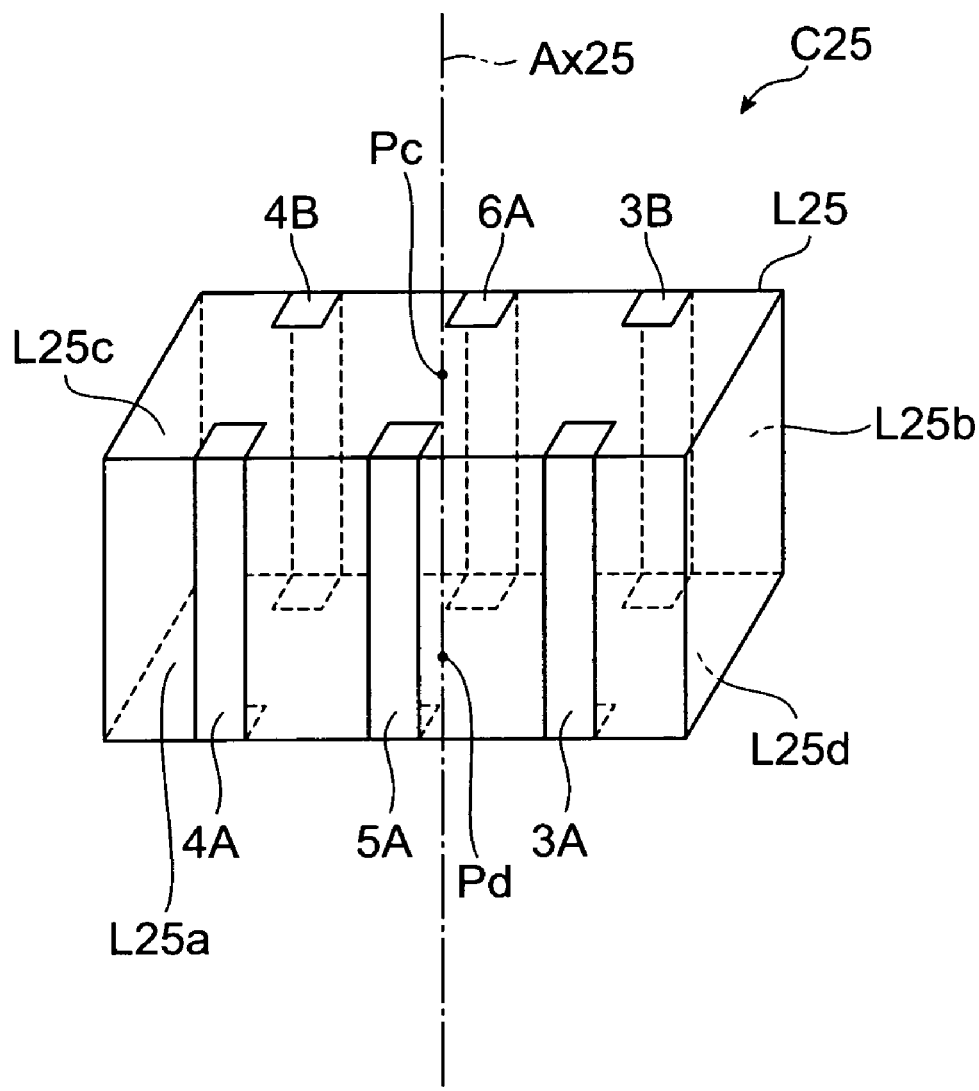
FIG. 61 is a perspective view of the multilayer capacitor in accordance with an forty-sixth embodiment.
Figure 62:
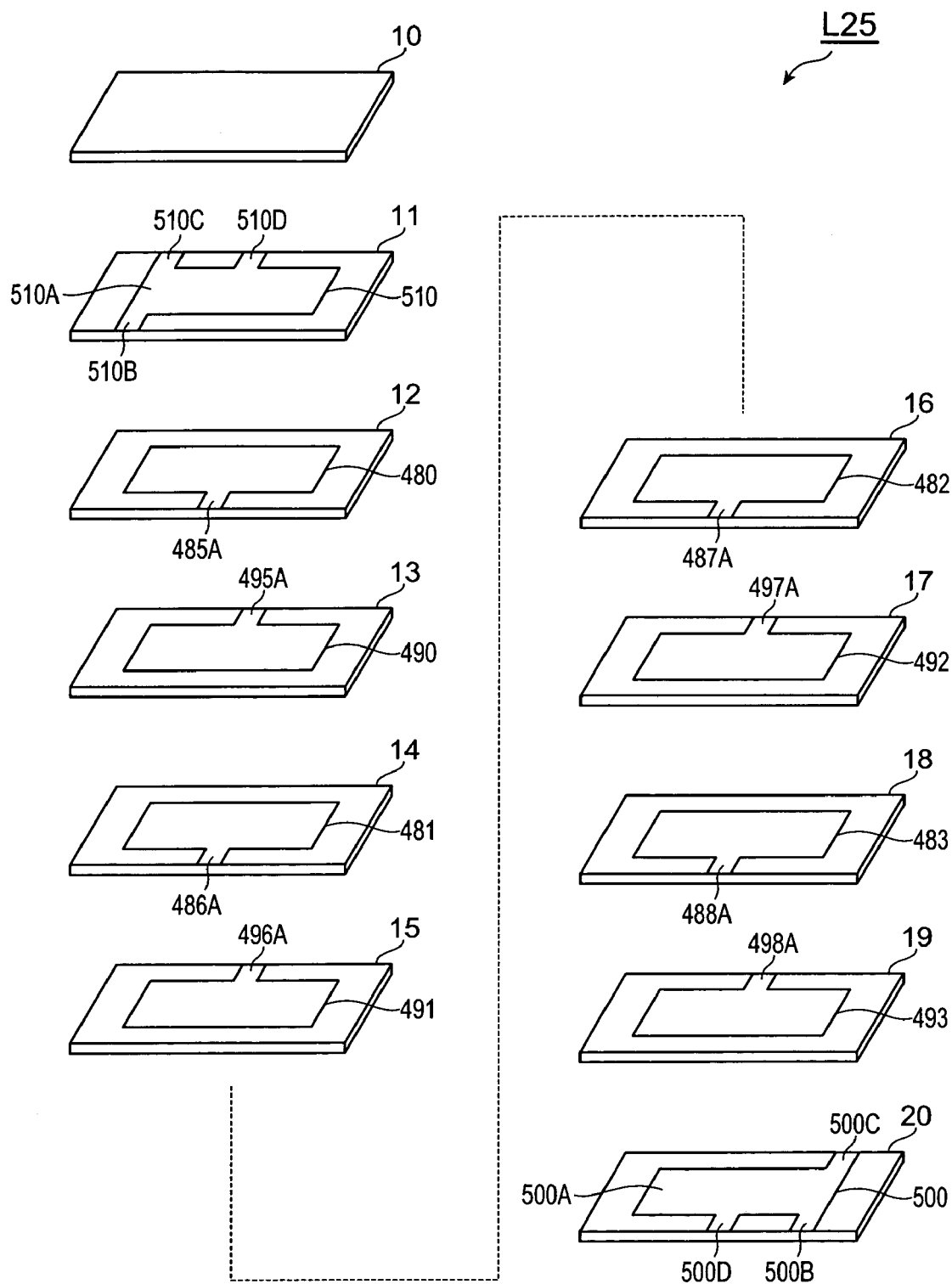
FIG. 62 is an exploded perspective view of the multilayer body included in the multilayer capacitor in accordance with the forty-sixth embodiment.

With reference to FIGS. 61 and 62, the structure of the multilayer capacitor C25 in accordance with a forty-sixth embodiment will be explained. The multilayer capacitor C25 in accordance with the forty-sixth embodiment differs from the multilayer capacitor C24 in accordance with the forty-third embodiment in terms of arrangement of outer conductors formed on the multilayer body. FIG. 61 is a perspective view of the multilayer capacitor in accordance with the forty-sixth embodiment. FIG. 62 is an exploded perspective view of the multilayer body included in the multilayer capacitor in accordance with the forty-sixth embodiment.

A second terminal conductor 4A, a first outer connecting conductor 5A, and a first terminal conductor 3A are formed in this order from the left side to right side in FIG. 61 on a first side face L25a which is a side face extending longitudinally of faces L25c, L25d orthogonal to the laminating direction of the multilayer body L25 among side faces parallel to the laminating direction of the multilayer body L25. Namely, on the first side face L25a, the first outer connecting conductor 5A is formed so as to be positioned between the first terminal conductor 3A and second terminal conductor 4A.

On a second side face L25b which opposes the first side face L25a and which is a side face extending longitudinally of the faces L25c and L25d orthogonal to the laminating direction of the multilayer body L25 among the side faces parallel to the laminating direction of the multilayer body L25, a second terminal conductor 4B, a second outer connecting conductor 6A, and a first terminal conductor 3B are formed in this order from the left side to right side in FIG. 61. Namely, on the second side face L25b, the second outer connecting conductor 6A is formed so as to be positioned between the first terminal conductor 3B and second terminal conductor 4B.

Therefore, a pair of the first terminal conductor 3A and first outer connecting conductor are formed adjacent to each other on the same side face, i.e., first side face L25a, of the multilayer body L25. A pair of the second terminal conductor 4B and second outer connecting conductor 6A are formed adjacent to each other on the same side face, i.e., second side face L25b, of the multilayer body L25.

Each of pairs of the first terminal conductor 3A and second terminal conductor 4B, the first terminal conductor 3B and second terminal conductor 4A, and the first outer connecting conductor 5A and second outer connecting conductor 6A are symmetrical to each other about a center axis Ax25 passing respective center positions Pc, Pd of the two side faces L25c, L25d orthogonal to the laminating direction of the multilayer body L25 among center axes of the multilayer body L25. Each of pairs of the first terminal conductors 3A and 3B, the second terminal conductor 4A and 4B, and the first outer connecting conductors 5A and second outer connecting conductor 6A oppose each other along a direction in which the first side face L25a and second side face L25b of the multilayer body L25 oppose each other.

As shown in FIG. 62, the multilayer body L25 is constructed by alternately laminating a plurality of (11 in this embodiment) dielectric layers 10 to 20 with a plurality of (4 each in this embodiment) first and second inner electrodes 480 to 483, 490 to 493. Further, one first inner connecting conductor 420 and one second inner connecting conductor 510 are laminated in the multilayer body L25.

Lead conductors 485A to 488A extend from their corresponding first inner electrodes 480 to 483 so as to reach the first side face L25a of the multilayer body L25. Lead conductors 495A to 498A extend from their corresponding second inner electrodes 490 to 493 so as to reach the second side face L25b of the multilayer body L25.

The first inner connecting conductor 500 includes a first conductor portion 500A having an oblong form; second and fourth conductor portions 500B, 500D extending from the first conductor portion 500A so as to be led to the first side face L25a of the multilayer body L25; and third conductor portion 500C extending from the first conductor portion 500A so as to be led to the second side face L25b of the multilayer body L25.

The second inner connecting conductor 510 includes a first conductor portion 510A having an oblong form; second conductor portion 510B extending from the first conductor portion 510A so as to be led to the first side face L25a of the multilayer body L25; and third and fourth conductor portions 510C, 510D extending from the first conductor portion 510A so as to be led to the second side face L25b of the multilayer body L25.

In the multilayer capacitor C25, the first terminal conductors 3A, 3B are connected to the first inner electrodes 480 to 483 not directly but electrically through the first outer connecting conductor 5A and first inner connecting conductor 500. Also, in the multilayer capacitor C25, the second terminal conductors 4A, 4B are connected to the second inner electrodes 490 to 493 not directly but electrically through the second outer connecting conductor 6A and second inner connecting conductor 510. These allow the multilayer capacitor C25 to yield an equivalent series resistance greater than that of a conventional multilayer capacitor in which all the inner electrodes are connected to their corresponding terminal conductors through lead conductors.

By adjusting the number of first inner connecting conductor 500 directly connected to the first terminal conductors 3A, 3B and the number of second inner connecting conductor 510 directly connected to the second terminal conductors 4A, 4B in such a fashion, this embodiment sets the equivalent series resistance of the multilayer capacitor C25 to a desirable value, and thus can regulate the equivalent series resistance easily with a high precision. Since the equivalent series resistance is controlled by the first and second inner connecting conductors, the multilayer capacitor C25 can regulate the equivalent series resistance while attaining a desirable value (e.g., large value) of capacitance.

All of the first and second terminal conductors 3A, 3B, 4A, 4B and first and second outer connecting conductors 5A, 6A, which are outer conductors of the multilayer capacitor C25, are formed on the opposing first and second side faces L25a, L25b of the multilayer body L25. Consequently, the number of steps required for forming outer conductors can be made smaller in the multilayer capacitor C25 than in the case where terminal conductors are formed on four side faces of the multilayer body L25. Therefore, the multilayer capacitor C25 can be manufactured easily.

The first conductor portion 500A of the first inner connecting conductor 500 and the first conductor portion 510A of the second inner connecting conductor 510 oppose their corresponding inner electrodes with a dielectric layer in between respectively, and thus can contribute to forming a capacity component. Therefore, the multilayer capacitor C25 can further increase its capacitance.

Since a plurality of first and second inner electrodes 480 to 483, 490 to 493 are arranged between the first inner connecting conductor 500 and second inner connecting conductor 510 in the multilayer body L25 of the multilayer capacitor C25, the equivalent series resistance can be set with a favorable balance.

In the multilayer capacitor C25, the first terminal conductor 3A and first outer connecting conductor 5A are formed adjacent to each other on the first side face L25a of the multilayer body L25. Also, in the multilayer capacitor C25, the second terminal conductor 4B and second outer connecting conductor 6A are formed adjacent to each other on the second side face L25b of the multilayer body L25. Therefore, when the multilayer capacitor C25 is mounted to a substrate or the like such that the terminal conductors 3A, 3B, 4A, 4B are directly connected to land patterns, whereas the outer connecting conductors 5A, 6A are not directly connected to land patterns, magnetic fields caused by currents flowing through the multilayer body L25 cancel each other out, thereby lowering the equivalent series inductance of the multilayer capacitor C25.

The multilayer capacitor C25 can be mounted easily because of positional relationships of the outer conductors 3A, 3B, 4A, 4B, 5A, 6A with the center axis Ax25, and positional relationships among the outer conductors 3A, 3B, 4A, 4B, 5A, 6A in the opposing direction of the first side face L25a and second side face L25b of the multilayer body L25.

Forty-Seventh Embodiment

Figure 63:
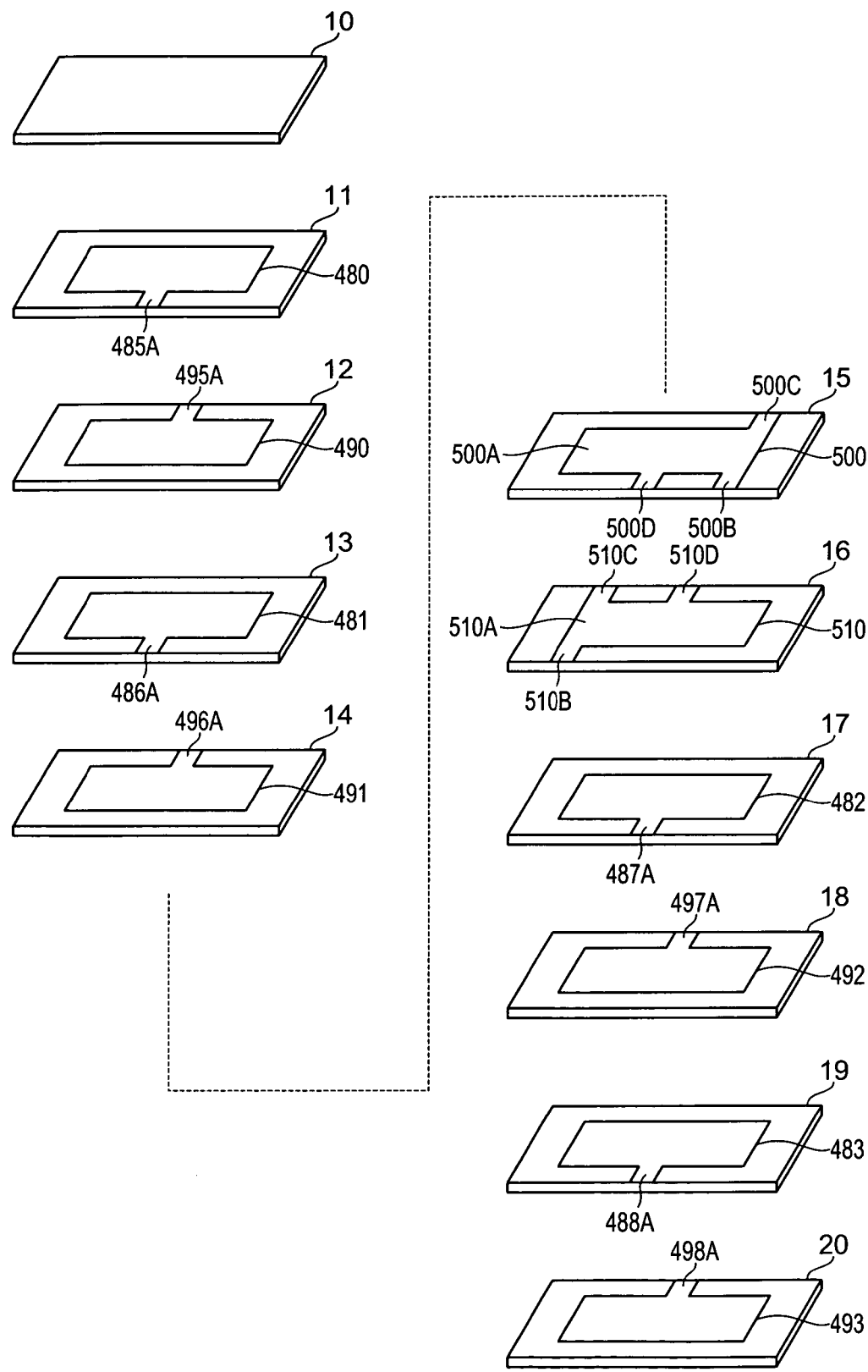
FIG. 63 is an exploded perspective view of the multilayer body included in the multilayer capacitor in accordance with a forty-seventh embodiment.

With reference to FIG. 63, the structure of the multilayer capacitor in accordance with a forty-seventh embodiment will be explained. The multilayer capacitor in accordance with the forty-seventh embodiment differs from the multilayer capacitor C25 in accordance with the forty-sixth embodiment in terms of positions of inner connecting conductors 500, 510 in the laminating direction. FIG. 63 is an exploded perspective view of the multilayer body included in the multilayer capacitor in accordance with the forty-seventh embodiment.

In the multilayer capacitor in accordance with the forty-seventh embodiment, as shown in FIG. 63, one each of the first and second inner connecting conductors 500, 510 is laminated between two each of first and second inner electrodes 480, 481, 490, 491 and two each of first and second inner electrodes 482, 483, 492, 493. More specifically, the first inner connecting conductor 500 is positioned so as to be held between dielectric layers 14 and 15. The second inner connecting conductor 510 is positioned so as to be held between dielectric layers 15 and 16.

In the multilayer capacitor in accordance with the forty-seventh embodiment, terminal conductors 3A, 3B, 4A, 4B are connected to the inner electrodes 480 to 483, 490 to 493 not directly but electrically through the outer connecting conductors 5A, 6A and the inner connecting conductors 500, 510. Therefore, the multilayer capacitor in accordance with the forty-seventh embodiment can yield an equivalent series resistance greater than that of a conventional multilayer capacitor in which all the inner electrodes are connected to their corresponding terminal conductors through lead conductors.

When the first terminal conductors 3A, 3B are concerned, the multilayer capacitor in accordance with the forty-seventh embodiment differs from the multilayer capacitor C25 in accordance with the forty-sixth embodiment in terms of the position of the first inner connecting conductor 500 and, consequently, in terms of how the resistance components of the first outer connecting conductor 5A are connected to the respective first terminal conductors 3A, 3B. Also, when the second terminal conductors 4A, 4B are concerned, the multilayer capacitor in accordance with the forty-seventh embodiment differs from the multilayer capacitor C25 in accordance with the forty-sixth embodiment in terms of the position of the second inner connecting conductor 510 and, consequently, in terms of how the resistance components of the second outer connecting conductor 6A are connected to the respective second terminal conductors 4A, 4B.

Because of the difference in resistance components of the first and second outer connecting conductors 5A, 6A, the multilayer capacitor in accordance with the forty-seventh embodiment yields an equivalent series resistance smaller than that in the multilayer capacitor C25 in accordance with the forty-sixth embodiment.

By adjusting positions of the first inner connecting conductors 500, 510 in the laminating direction as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors 500, 510, the multilayer capacitor in accordance with the forty-seventh embodiment can regulate the equivalent series resistance while attaining a desirable value (e.g., large value) of capacitance.

The first conductor portion 500A of the first inner connecting conductor 500 and the first conductor portion 510A of the second inner connecting conductor 510 oppose their corresponding inner electrodes with a dielectric layer in between respectively, and thus can contribute to forming a capacity component. Therefore, the multilayer capacitor in accordance with the forty-seventh embodiment can further increase its capacitance.

Since the outer conductors are arranged such as in the multilayer capacitor C25, the multilayer capacitor in accordance with the forty-seventh embodiment can be manufactured easily as with the multilayer capacitor C25. The multilayer capacitor in accordance with the forty-seventh embodiment can lower the equivalent series inductance as with the multilayer capacitor C25. Also, the multilayer capacitor in accordance with the forty-seventh embodiment can be mounted easily as with the multilayer capacitor C25.

Forty-Eighth Embodiment

Figure 64:
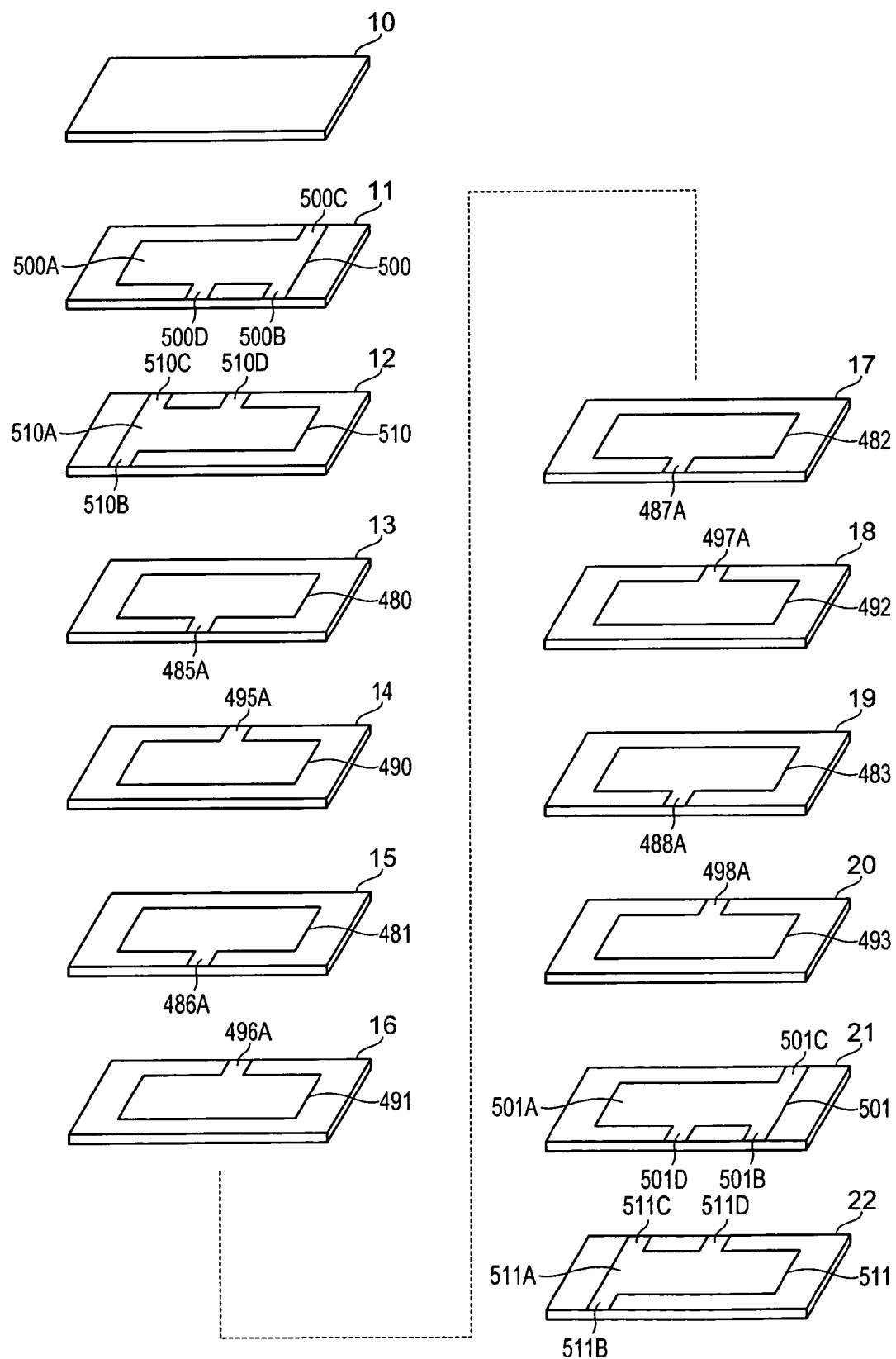
FIG. 64 is an exploded perspective view of the multilayer body included in the multilayer capacitor in accordance with a forty-eighth embodiment.

With reference to FIG. 64, the structure of the multilayer capacitor in accordance with a forty-eighth embodiment will be explained. The multilayer capacitor in accordance with the forty-eighth embodiment differs from the multilayer capacitor C25 in accordance with the forty-third embodiment in terms of the number of first and second inner connecting conductors. FIG. 64 is an exploded perspective view of the multilayer body included in the multilayer capacitor in accordance with the forty-eighth embodiment.

As shown in FIG. 64, the multilayer body of the multilayer capacitor in accordance with the forty-eighth embodiment is constructed by alternately laminating a plurality of (13 in this embodiment) dielectric layers 10 to 22 and a plurality of (4 each in this embodiment) first and second inner electrodes 480 to 483, 490 to 493.

In the multilayer body of the multilayer capacitor in accordance with the forty-eighth embodiment, a plurality of (2 in this embodiment) first inner connecting conductors 500, 501 and a plurality of (2 in this embodiment) second inner connecting conductors 510, 511 are laminated. In the multilayer body of the multilayer capacitor in accordance with the forty-eighth embodiment, the first inner electrodes 480 to 483 and second inner electrodes 490 to 493 are arranged between the first and second inner connecting conductors 500, 510 and the first and second inner connecting conductors 501, 511.

The first inner connecting conductor 500 is positioned so as to be held between the dielectric layers 10 and 11, whereas the first inner connecting conductor 501 is positioned so as to be held between the dielectric layers 20 and 21. The second inner connecting conductor 510 is positioned so as to be held between the dielectric layers 11 and 12, whereas the second inner connecting conductor 511 is positioned so as to be held between the dielectric layers 21 and 22.

In the multilayer capacitor in accordance with the forty-eighth embodiment, terminal conductors 3A, 3B, 4A, 4B are connected to the inner electrodes 480 to 483, 490 to 493 not directly but electrically through the outer connecting conductors 5A, 6A and the inner connecting conductors 500, 501, 510, 511. Therefore, the multilayer capacitor in accordance with the forty-eighth embodiment yields an equivalent series resistance greater than that of a conventional multilayer capacitor in which all the inner electrodes are connected to their corresponding terminal conductors through lead conductors.

The number of first inner connecting conductors 500, 501 and second inner connecting conductors 510, 511 is greater in the multilayer capacitor in the forty-eighth embodiment than in the multilayer capacitor C25, whereas the inner connecting conductors 500, 501, 510, 511 are connected in parallel to their corresponding terminal conductors 3A, 3B, 4A, 4B. Since the number of inner connecting conductors 500, 501, 510, 511 is greater, the number of current paths between the terminal conductors 3A, 3B, 4A, 4B and inner electrodes 480 to 483, 490 to 493 increases. Therefore, the multilayer capacitor in accordance with the forty-eighth embodiment yields an equivalent series resistance smaller than that of the multilayer capacitor C25.

By adjusting the number of first inner connecting conductors 500, 501 and the number of second inner connecting conductors 510, 511 as in the foregoing, this embodiment sets the equivalent series resistance of the multilayer capacitor to a desirable value, and thus can regulate the equivalent series resistance easily with a high precision. Since the equivalent series resistance is controlled by the first and second inner connecting conductors, the multilayer capacitor in accordance with the forty-eighth embodiment can regulate the equivalent series resistance while attaining a desirable value (e.g., large value) of capacitance.

The first conductor portion 501A of the first inner connecting conductor 501 and the first conductor portion 510A of the second inner connecting conductor 510 oppose their corresponding inner electrodes with a dielectric layer in between respectively, and thus can contribute to forming a capacity component. Therefore, the multilayer capacitor in accordance with the forty-eighth embodiment can further increase its capacitance.

In the multilayer body of the multilayer capacitor in accordance with the forty-eighth embodiment, a plurality of first and second inner electrodes 480 to 483, 490 to 493 are arranged between the first and second inner connecting conductors 500, 510 and the first and second inner connecting conductors 501, 511. Therefore, the multilayer capacitor in accordance with the forty-eighth embodiment can set the equivalent series resistance with a favorable balance.

Since the outer conductors are arranged as in the multilayer capacitor C25, the multilayer capacitor in accordance with the forty-eighth embodiment can be manufactured easily as with the multilayer capacitor C25. The multilayer capacitor in accordance with the forty-eighth embodiment can lower the equivalent series inductance as with the multilayer capacitor C25. Also, the multilayer capacitor in accordance with the forty-eighth embodiment can be mounted easily as with the multilayer capacitor C25.

Though preferred embodiments of the present invention is explained in detail in the foregoing, the present invention is not limited to the above-mentioned embodiments. For example, the number of laminated dielectric layers 10 to 22 and the numbers of laminated first and second inner electrodes 400 to 405, 410 to 415, 440 to 445, 450 to 455, 480 to 485, and 490 to 495 are not limited to those described in the above-mentioned embodiments.

The numbers of the first inner connecting conductors 420, 421, 460, 461, 500, 501 and their positions in the laminating direction are not limited to those described in the above-mentioned embodiments. The numbers of the second inner connecting conductors 430, 431, 470, 471, 510, 511 and their positions in the laminating direction are not limited to those described in the above-mentioned embodiments.

The forms of the first inner connecting conductors 420, 421, 460, 461, 500, 501 are not limited to those described in the above-mentioned embodiments as long as they are electrically connected to the first terminal conductor and first outer connecting conductor. The forms of the second inner connecting conductors 430, 431, 470, 471, 510, 511 are not limited to those described in the above-mentioned embodiments as long as they are electrically connected to the second terminal conductor and second outer connecting conductor.

It is not necessary for the first inner connecting conductors 420, 421, 460, 461, 500, 501 to have a region opposing the second inner electrode in the laminating direction of the multilayer body. It is not necessary for the second inner connecting conductors 430, 431, 470, 471, 510, 511 to have a region opposing the first inner electrode in the laminating direction of the multilayer body.

The numbers of the first and second terminal conductors 3A to 3D, 4A to 4D are not limited to those described in the above-mentioned embodiments. Therefore, the first and second terminal conductors may be provided five each or more each, for example. The first and second terminal conductors 3A to 3D, 4A to 4D may be provided by numbers different from each other. The numbers of the first and second outer connecting conductors 5A, 5B, 6A, 6B are not limited to those described in the above-mentioned embodiments. Therefore, the first and second outer connecting conductors 5A, 5B, 6A, 6B may be provided one each or three or more each, for example. The first and second outer connecting conductors 5A, 5B, 6A, 6B may be provided by numbers different from each other.

The positions of the first and second terminal conductors 3A to 3D, 4A to 4D and first and second outer connecting conductors 5A, 5B, 6A, 6B are not limited to those described in the above-mentioned embodiments.

It is not necessary for the terminal conductors to be positioned axisymmetrical to each other about the center axis (e.g., Ax10 to Ax25) of the multilayer body. It is not necessary for the outer connecting conductors to be positioned axisymmetrical to each other about the center axis (e.g., Ax10 to Ax25) of the multilayer body.

The second terminal conductor is not required to be located at a position on the second side face opposing the first terminal conductor on the first side face along the direction in which the first and second side faces of the multilayer body oppose each other. The second terminal conductor is not required to be located at a position on the first side face opposing the first terminal conductor on the second side face along the direction in which the first and second side faces of the multilayer body oppose each other. Terminal conductors are not required to be located at positions opposing terminal conductors along the direction in which the first and second side faces of the multilayer body oppose each other. Outer connecting conductors are not required to be located at positions opposing outer connecting conductors along the direction in which the first and second side faces of the multilayer body oppose each other.

In the multilayer body of the multilayer capacitor in accordance with the present invention, dielectric layers may further be laminated, or dielectric layers and inner electrodes may be laminated alternately.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising a multilayer body in which a plurality of dielectric layers and a plurality of inner electrodes are alternately laminated, and a plurality of outer conductors formed on side faces of the multilayer body;
   wherein the plurality of inner electrodes include a plurality of first inner electrodes and a plurality of second inner electrodes alternately arranged;
   wherein the plurality of outer conductors include a plurality of first terminal conductors, a plurality of second terminal conductors, a first outer connecting conductor, and a second outer connecting conductor;
   wherein with respect to two selected first terminal conductors from among the plurality of first terminal conductors, one is formed on a first side face of the multilayer body, whereas the other is formed on a second side face of the multilayer body opposing the first side face;
   wherein with respect to two selected second terminal conductors from among the plurality of second terminal conductors, one is formed on the first side face of the multilayer body, whereas the other is formed on the second side face of the multilayer body;
   wherein the first outer connecting conductor is formed on the first side face of the multilayer body;
   wherein the second outer connecting conductor is formed on the second side face of the multilayer body;
   wherein each of the first inner electrodes is electrically connected to the first outer connecting conductor through a lead conductor;
   wherein each of the second inner electrodes is electrically connected to the second outer connecting conductor through a lead conductor;
   wherein at least one first inner connecting conductor and at least one second inner connecting conductor are laminated in the multilayer body;
   wherein the first inner connecting conductor is electrically connected to the plurality of first terminal conductors and the first outer connecting conductor, whereas the second inner connecting conductor is electrically insulated from the first inner connecting conductor but is electrically connected to the plurality of second terminal conductors and the second outer connecting conductor;
   wherein the first and second inner connecting conductors are laminated in the multilayer body such that the multilayer body includes at least one set of the first and second inner electrodes neighboring each other with the dielectric layer in between in a laminating direction; and wherein an equivalent series resistance is set to a desirable value by adjusting the number of first inner connecting conductors and the number of second inner connecting conductors respectively.

2. A multilayer capacitor according to claim 1, wherein the first outer connecting conductor is formed so as to be positioned between the first and second terminal conductors on the first side face; and wherein the second outer connecting conductor is formed so as to be positioned between the first and second terminal conductors on the second side face.

3. A multilayer capacitor according to claim 1, wherein the first terminal conductor formed on the first side face and the second terminal conductor formed on the second side face oppose each other along a direction in which the first and second side faces oppose each other; and wherein the first terminal conductor formed on the second side face and the second terminal conductor formed on the first side face oppose each other along the direction in which the first and second side faces oppose each other.

4. A multilayer capacitor comprising a multilayer body in which a plurality of dielectric layers and a plurality of inner electrodes are alternately laminated, and a plurality of outer conductors formed on side faces of the multilayer body;

wherein the plurality of inner electrodes include a plurality of first inner electrodes and a plurality of second inner electrodes alternately arranged;

wherein the plurality of outer conductors include a plurality of first terminal conductors, a plurality of second terminal conductors, a first outer connecting conductor, and a second outer connecting conductor;

wherein with respect to two selected first terminal conductors from among the plurality of first terminal conductors, one is formed on a first side face of the multilayer body, whereas the other is formed on a second side face of the multilayer body opposing the first side face;

wherein with respect to two selected second terminal conductors from among the plurality of second terminal conductors, one is formed on the first side face of the multilayer body, whereas the other is formed on the second side face of the multilayer body;

wherein the first outer connecting conductor is formed on the first side face of the multilayer body;

wherein the second outer connecting conductor is formed on the second side face of the multilayer body;

wherein each of the first inner electrodes is electrically connected to the first outer connecting conductor through a lead conductor;

wherein each of the second inner electrodes is electrically connected to the second outer connecting conductor through a lead conductor;

wherein at least one first inner connecting conductor and at least one second inner connecting conductor are laminated in the multilayer body;

wherein the first inner connecting conductor is electrically connected to the plurality of first terminal conductors and the first outer connecting conductor, whereas the second inner connecting conductor is electrically insulated from the first inner connecting conductor but is electrically connected to the plurality of second terminal conductors and the second outer connecting conductor;

wherein the first and second inner connecting conductors are laminated in the multilayer body such that the multilayer body includes at least one set of the first and second inner electrodes neighboring each other with the dielectric layer in between in a laminating direction; and wherein an equivalent series resistance is set to a desirable value by adjusting a position of the first inner connecting conductor in the multilayer body in the laminating direction and a position of the second inner connecting conductor in the multilayer body in the laminating direction.

5. A multilayer capacitor according to claim 4, wherein the first outer connecting conductor is formed so as to be positioned between the first and second terminal conductors on the first side face; and wherein the second outer connecting conductor is formed so as to be positioned between the first and second terminal conductors on the second side face.

6. A multilayer capacitor according to claim 4, wherein the first terminal conductor formed on the first side face and the second terminal conductor formed on the second side face oppose each other along a direction in which the first and second side faces oppose each other; and wherein the first terminal conductor formed on the second side face and the second terminal conductor formed on the first side face oppose each other along the direction in which the first and second side faces oppose each other.

* * * * *